US008468461B2

(12) United States Patent
Madireddi et al.

(10) Patent No.: US 8,468,461 B2
(45) Date of Patent: Jun. 18, 2013

(54) FORM-BASED USER-CONFIGURABLE PROCESSING PLANT MANAGEMENT SYSTEM AND METHOD

(75) Inventors: Kapaleeswar Madireddi, Highlands Ranch, CO (US); Bruno Bernard Levine, Philadelphia, PA (US)

(73) Assignee: FLOWatch LLC, Newark, DE (US)

( * ) Notice: Subject to any disclaimer, the term of this patent is extended or adjusted under 35 U.S.C. 154(b) by 277 days.

(21) Appl. No.: 12/932,755

(22) Filed: Mar. 5, 2011

(65) Prior Publication Data

US 2012/0227004 A1 Sep. 6, 2012

(51) Int. Cl.
*G06F 3/048* (2006.01)
*G06F 17/00* (2006.01)

(52) U.S. Cl.
USPC ........... 715/771; 715/221; 715/764; 715/780; 700/9; 700/17; 700/18

(58) Field of Classification Search
USPC ...... 715/221-225, 764, 765, 771, 780; 700/9, 700/17-20, 117
See application file for complete search history.

(56) References Cited

U.S. PATENT DOCUMENTS 4,965,742 A 10/1990 Skeirik
5,623,109 A 4/1997 Uchida et al.
5,778,386 A * 7/1998 Lin et al. ............................... 1/1
6,728,660 B2 4/2004 Bjornson
6,813,532 B2 11/2004 Eryurek et al.
6,889,096 B2 * 5/2005 Spriggs et al. .................. 700/17
6,961,753 B1 * 11/2005 Osburn, III ................... 709/203
7,206,646 B2 * 4/2007 Nixon et al. ..................... 700/83
7,509,238 B1 3/2009 Dumler et al.
7,515,977 B2 4/2009 Eryurek et al.
7,557,702 B2 * 7/2009 Eryurek et al. ............... 340/511
7,650,425 B2 1/2010 Davis et al.
7,676,287 B2 3/2010 Eryurek et al.
7,698,073 B2 4/2010 Wolfe
7,734,379 B2 6/2010 Graves
7,860,857 B2 12/2010 Kagan et al.
2003/0023518 A1 * 1/2003 Spriggs et al. .................. 705/28
2003/0028269 A1 * 2/2003 Spriggs et al. .................. 700/83

OTHER PUBLICATIONS

Download of www.webscada.com/SCADA/ProdEventAlarm_01.aspx on Mar. 1, 2011. (1 page attached).
Download of www.automatech.com/Collateral/Documents/English-US/proficyplantapp_cutsheet_gfa594.pdf on Mar. 1, 2011 (8 pages attached).
Download of www.aquaticinformatics.com/sites/default/files/AQUARIUS_System_Solutions.pdf on Mar. 1, 2011 (3 pages attached).

(Continued)

*Primary Examiner* — Tadeese Hailu

(57) ABSTRACT

A computer-implemented system and method for defining the processes in a processing plant are disclosed. In one embodiment, the system uses input forms to allow a user to define the processes, chemicals, process streams, and sampling points in the plant in a way that requires no programming code to be written by the person defining the plant. In one embodiment, the electronic form-based user-configurable system can be used to configure and manage multiple plants belonging to one organization. The plant definition can be used to log information about the plant. The logged information can be used to generate reports or charts. Logging, reporting, and charting can be managed using input forms and without the user needing to write any computer code.

20 Claims, 112 Drawing Sheets

OTHER PUBLICATIONS

Download of www2.emersonprocess.com/siteadmincenter/PM Delta V Documents/ProductDataSheets/PDF__OperatorStation.PDF on Mar. 1, 2011 (6 pages attached).

Download of http://iom.invensys.com/EN/pdfLibrary/Datasheet__Wonderware__ArchestrAWorkflowSoftware__12-10.pfg on Mar. 1, 2011 (6 pages attached).

* cited by examiner

409

416

| | Componente | Terms | System Administrator (401) | Super Administrator (402) | Administrator (403) | Area Manager (404) | Plant Manager (405) | Superintendent (406) | Operator (407) | External Users (408) |
|---|---|---|---|---|---|---|---|---|---|---|
| 410 | Organization and User Permission | All Organizations and all Users | ✓ | - | | | | | | |
| | | All Users (1) | ✓ | ✓ | - | - | - | - | - | - |
| | | All but Super Aministrator (1) | | - | ✓ | - | - | - | - | - |
| | | All users in a specific area (1) | ✓ | ✓ | ✓ | ✓ | - | - | - | - |
| | | All users in a specific plant (1) | ✓ | ✓ | ✓ | ✓ | ✓ | - | - | - |
| 411 | Administer | All Organizations | ✓ | - | - | - | - | - | - | - |
| | | (1) | ✓ | ✓ | ✓ | ✓ | View Only | View Only | - | - |
| 412 | Define | (1) | ✓ | ✓ | ✓ | ✓ | ✓ | View Only | View Only | Variable |
| 413 | Data Logging | (1) | ✓ | ✓ | ✓ | ✓ | ✓ | ✓ | ✓ | Variable |
| 414 | Data Reporting | (1) | ✓ | ✓ | ✓ | ✓ | ✓ | ✓ | View Only | Variable |
| 415 | User Home Page | (1) | ✓ | ✓ | ✓ | ✓ | ✓ | ✓ | ✓ | ✓ |

*(1) Under a specific organizational account*

FIG 4

Add / Edit New Organization
1201

*Organization Details*

| Organization Name | XYZ Corporation |
|---|---|
| Super Administrator | Jim Smith |
| e-mail | xx@test.net |
| Password | xxxxxxxxx |
| Phone number | 222-111-1111 |
| Address | |
| Contract Type | Standard |
| Plant quantity | 3 |
| User quantity | 6 |

1202

Organization Description

| Cheese Factory |
|---|

1203

[ Submit ] 1204

Organization and User Access

Edit Users
1701

*Editing User Information*

General Information

| Category | Info |
|---|---|
| First Name | Sam |
| Last Name | Jones |
| Job Title | Project Manager |
| User Type | Plant User |
| Phone | 111-555-1111 |
| Email | xx@test.net |
| Password | xxxxx |

1702

User Access Definition  1703

Last Edit Track

| Name | Jim Smith |
|---|---|
| Date | Aug 1, 2010 |

1704

Submit  1705

Add New Plant Listing
1801

*New Plant Details*

| Name | Plant # 3 |
| Location | City |
| Manager | Jim Smith |
| e-mail | xx@test.net |

1802

Plant Description

Drinking water plant

1803

Submit — 1804

Plant Details

2001

*Plant Details*

| Name | Plant # 3 |
|---|---|
| Location | City |
| Manager | Jim Smith |
| e-mail | xx@test.net |

} 2002

Plant Description

| Drinking water plant |
|---|

} 2003

Last Edit Track

| Name | Sam Jones |
|---|---|
| Date | January 1, 2010 |

} 2004

[Submit] — 2005

Administer

Edit Global Parameter
2301

*Edit Global Parameter*

Definition

| Name | Energy Usage |
|---|---|
| Application | Plant |
| Units | kW/day |

2302

Description

Plant daily energy usage

2303

Last Edit Track

| Name | Jim Smith |
|---|---|
| Date | July 10, 2010 |

2304

Submit  2305

Administer

Add Global Task

2401

New Global Task

| Category | Info |
|---|---|
| Title | EPA Task 101 |
| Contact Details | Sam Jones |

2402

Description

EPA Task 101

2403

Attach documents or links specific to the task

| Upload Files | Attach Links |

2404

Submit

2405

Administer

Global Task Listing

2501

Global Task Listing

2503

| Title | Contact | | |
|---|---|---|---|
| EPA Task 101 | Sam Jones | Edit | Delete |
| EPA Task 102 | Judy Black | Edit | Delete |

2504

2502

Click Edit / Delete to edit task information or delete the task

Administer

Edit Global Task

2601

Edit Global Task

| Category | Info |
|---|---|
| Title | EPA Task 101 |
| Contact Details | Sam Jones |

2602

Description

EPA Task 101

2603

Attach documents or links specific to the task

| Upload Files | Attach Links |

2604

Last Edit Track

| Name | Jim Smith |
|---|---|
| Date | July 1, 2010 |

2605

Submit — 2606

Administer

Add Files and Links
2701

Add Files and Links

File Upload

| Select File Type | Excel ▼ |
|---|---|
| Name | New Excel Document |
| File to Upload | NewExceldoc.xls |

2702, 2703

Description
| Background |

2704

[Upload] 2705

Attach Link

| Name | EPA |
|---|---|
| Link Path | www.newlink.com |

2706

Description
| EPA |

2707

[Attach] 2708

[Submit] 2709

Administer

Edit Files and Links

2901

*Edit Link*

Attached Link

| Name | AWWA |
|---|---|
| Link Path | www.awwa.org |

2902

Description

| Trade association |
|---|

2903

Attach — 2904

Last Edit Track

| Name | Jim Smith |
|---|---|
| Date | July 1, 2010 |

2905

Submit — 2906

Administer

Add Parameter
Plant #3
3101

Define

*New Parameter*
Definition

| Name  | TOC            |
|-------|----------------|
| Type  | Sampling point ▼ | 3103
| Units | mg/L           |

} 3102

Description
{ TOC = Total Organic Carbon } 3104

[ Submit ] — 3105

Define

*Edit Parameter*

Edit Parameter
Plant #3 — 3301

Definition
| Name | TOC |
|---|---|
| Application | Sampling point |
| Units | mg/L |

} 3302

Description
| TOC = Total Organic Carbon |

} 3303

Last Edit Track
| Name | Jim Smith |
|---|---|
| Date | July 10, 2010 |

} 3304

[ Submit ] — 3305

Define

*New Chemical*

Definition

| Name | Chlorine |
|---|---|
| Dose Unit | mg/L |
| Loading Unit | lbs/d |

3402

Description

Used for filter backwash and final disinfection

3403

Submit — 3404

Add Chemical Plant #3
3401

Edit Chemical Plant #3 3601

Define

*Edit Chemical*

Definition

| Name | Chlorine |
|---|---|
| Dose Unit | |
| Loading Unit | lbs/d |

} 3602

Description

{ Used for filter backwash and final disinfection } 3603

Last Edit Track

| Name | Jim Smith |
|---|---|
| Date | July 10, 2010 |

} 3604

[ Submit ] ~ 3605

Define

*New Process*

Definition

| Name | Filter |
| --- | --- |
| Type | Single stage |
| Placement Order | 3 |

} 3702

Description

| Fine Sand, 0.8mm Silica |

} 3703

Parameter } 3704

■ Alkalinity  ☐ Alum  ☐ Chlorine } 3705

Chemical
☐ Acid

[ Submit ] } 3706

Add
Process
Plant #3
} 3701

Edit Process Plant #3
3901

*Edit Process*

Definition
| Name | Filter |
| Type | Single stage |
| Placement Order | 2 |

3902

Description
| Fine Sand, 0.8mm Silica |

3903

Parameter
■ Alkalinity
3904

Chemical
☐ Acid  ☐ Alum  ■ Chlorine
3905

Last Edit Track
| Name | Jim Smith |
| Date | July 10, 2010 |

3906

[Submit]
3907

Add
Process Stream
Plant #3
  ⎫
  ⎬ 4001
  ⎭

Define

*New Process Stream*

| Definition | |
|---|---|
| Name | Filter feed |
| Type | Regular |
| Upstream | Tank |
| Downstream | Filter |

⎫
⎬ 4002
⎭

4006, 4003, 4004, 4005

| Description |
|---|
| Feed stream |

⎫ 4007
⎭

Parameter  ⎫
☐ TOC    ⎬ 4008
Chemical ⎭
☐ Acid    ■ Alum    ☐ Chlorine  ⎫ 4009
                                ⎭

[ Submit ] — 4010

Edit
Process Stream
Plant #3 — 4201

Define

*Edit Process Stream*

Definition — 4202
| Name | Filter Feed |
| Type | Regular ▶ |
| Upstream | Tank ▶ |
| Downstream | Filter ▶ |

Description — 4203
| Final effluent |

Parameter — 4204
■ TOC

Chemical
☐ Acid   ☐ Alum   ■ Chlorine — 4205

Last Edit Track — 4206
| Name | Jim Smith |
| Date | July 10, 2010 |

[ Submit ] — 4207

Define

Add
Sampling Point
Plant #3
— 4301

*New Sampling Point*

Definition

| Name | Lake intake |
|------|-------------|
| Code | 0110 |

} 4302

Description
| Intake |

} 4303

Parameter
☐ Turbidity } 4304

[ Submit ] — 4305

Sampling Point
List Plant #3

4401

Define

*Sampling Point List*

Plant Sampling Points

| Name | Code | | |
|------|------|------|--------|
| Network | 012 | Edit | Delete |
| Lake intake | 0110 | Edit | Delete |

4403

4404

4402

*Click Edit / Delete to edit sampling point information or delete the sampling point*

Edit
Sampling Point
Plant #3
4501

Define

*Edit Sampling Point*

Definition

| Name | Lake intake |
|---|---|
| Code | 0110 |

} 4502

Description

| Intake |
|---|

} 4503

Parameter
4504 ▪ Turbidity

Last Edit Track

| Name | Jim Smith |
|---|---|
| Date | July 10, 2010 |

} 4505

[ Submit ] — 4506

Define

Add
Issue Type
Plant #3
  4601

*New Issue Type*

Definition
Name | pH Alert |   } 4602

Description
| pH Issue Management |   } 4603

Parameter   } 4604
☐ pH Alarm

[ Submit ]  4605

Define

Edit
Issue Type
Plant #3 — 4801

*Edit Issue Type*

Definition
| Name | pH Alert |
— 4802

Description
| pH issue Management |
— 4803

— 4804 Parameter
— 4805 ■ pH Alarm

Last Edit Track
| Name | Jim Smith |
| Date | July 10, 2010 |
— 4806

[ Submit ] — 4807

Add Notification
Plant #3 — 4901

Define

*New Notification*

Definition

| Name | pH Alert |
|---|---|
| Category | Issue |

} 4902 — 4903

| Issue Type | pH Alert | — 4905

4904

Description

| pH values are outside recommended limits |

4906

Users
☐ Jones, Sam  ■ Black, Judy  ☐ Smith, Jim  } 4907

Trigger

| Parameter | unit | Low | High |
|---|---|---|---|
| pH Alarm | #/day | | 12 |

} 4908

[ Submit ] — 4909

Define

*Edit Notifications*

Edit Notifications Plant #3
5101

Definition

| Name | pH Alert |
|---|---|
| Issue Type | Issue |

} 5102

Description

| Plant Alert |
|---|

} 5103

Users

■ Jones, Sam   ■ Black, Judy   ☐ Smith, Jim

5104

Trigger

| Parameter | unit | Low | High |
|---|---|---|---|
| pH Alarm | #/day | | 12 |

5105

Last Edit Track

| Name | Jim Smith |
|---|---|
| Date | July 10, 2010 |

} 5106

[ Submit ]  5107

Define

*Edit Task Type*

**Edit
Tasks
Plant #3**
5401

Title
[Verify Flow meter] } 5402

Description
[Check Flowmeter]
5403

Contact
[Smith, Jim P.] } 5404

Additional Info
[Uploaded File] — 5405
[Attached Link]
5406

Last Edit Track
| Name | Jim Smith |
| Date | July 10, 2010 |
} 5407

[Submit] — 5408

Add Action Plant #3
5501

Define

*New Action*

Definition

| Name | pH adjustment | } 5502 |
| --- | --- | --- |
| Event Type | Notification ▼ | 5503 |

Notification  } 5504
- ☐ Task Alert    ☐ Plant Alert    ■ pH Alert
- ☐ Lake Intake   ☐ Alum Alert Description
| Compliance to pH requirements |  } 5505

Tasks

| Task Name | Task Type | Step |
| --- | --- | --- |
| EPA report | Organization | 1 |
| Verify Flow meter | Plant | 2 |

} 5506

Users
☐ Jones, Sam  ☐ Black, Judy  ■ Smith, Jim  } 5507

[ Submit ]  5508

Define

Action
List Plant #3

5601

*Action List*

Plant Actions

5603

| Name | Event Type | | |
|------|------------|------|--------|
| Lake Intake Action | Log data | Edit | Delete |
| pH adjustment | Notification raised | Edit | Delete |
| Submit to Compliance | Report Published | Edit | Delete |

5602

5604

*Click Edit / Delete to edit action information or delete the action*

Edit
Actions
Plant #3 — 5701

Define

*Edit Action*

Definition
| Name | pH adjustment |
| Event Type | Notification |
⎫ 5702

Notification
☐ Task Alert  ☐ Plant Alert  ■ pH Alert  ⎫ 5703
☐ Lake Intake ☐ Alum Alert Description
| TOC content |
⎫ 5704

Tasks
| Task Name | Task Type | Step |
|---|---|---|
| EPA report | Organization | 1 |
| Verify | Plant | 2 |
⎫ 5705

Users
■ Jones, Sam  ☐ Black, Judy  ☐ Smith, Jim  — 5706

Last Edit Track
| Name | Jim Smith |
| Date | July 10, 2010 |
⎫ 5707

[ Submit ] — 5708

Add Plant

Log Plant #3 — 5901

Log Data

*New Plant Log*

Time Stamp

| Date | 8/1/2010 | Log Time | 8:00 am |

5902

Comment

| Normal |

5903

Parameter Log Data

| Parameter | Unit | Value |
|---|---|---|
| Energy usage | KW/day | 102 |
| Total Discharge | MGD | |

5904

[ Submit ] — 5905

Log Data

*Edit Plant Log*

Plant #3
6101

Time Stamp

| Date | 8/1/2010 | Time | 8:00 am |

} 6102

Comment

| Normal |

} 6103

Logged Data

| Parameter | Unit | Measurement |
|---|---|---|
| Energy usage | KW/day | 1020 |

} 6104

6105

Last Edit Track

| Name | Jim Smith |
| Date | Aug 1, 2010 |

} 6106

[ Submit ] — 6107

Log Data

Add Process Log
Plant #3 — 6201

*New Process Log*

Time Stamp

| Log Date | Time |
|---|---|
| 8/1/2010 | 8:00 am | — 6202

Select Process — 6203

Filter ▼ — 6204

Comment — 6205

Process Value Log

| Process | Pressure | Flow | Temp |
|---|---|---|---|
| Filter | 332 | | 20 | — 6206

Parameter Log

| Parameter | Unit | Value |
|---|---|---|
| Alkalinity | mg/L | 120 | — 6207

Chemical Log

| Chemical | Dose | Concentration |
|---|---|---|
| Chlorine | | | — 6208

[Submit] — 6209

Log Data

*Edit Process Log*

Edit Process Log
Plant #3 — 6401

Date - Time — 6402
| Date | 8/1/2010 | Time | 8:00 am |

Process — 6403
| Filter |

Comment — 6404

Process Value Log — 6405
| Pressure | Flow | Temp |
| --- | --- | --- |
| 35 | | 20 |

6408

Parameter Log — 6406
| Parameter | Unit | Value |
| --- | --- | --- |
| Alkalinity | mg/L | 120 |

Chemical Log — 6407
| Chemical | Dose | Concentration |
| --- | --- | --- |
| Chlorine | | |

Last Edit Track — 6409
| Name | Jim Smith |
| Date | Aug 1, 2010 |

[Submit] — 6410

Log Data

Add
Process Stream Log
Plant #3 — 6501

*New Process Stream Log*

Time Stamp — 6502

| Log Date | Time |
|---|---|
| 8/1/2010 | 8:00 am |

Select Process Stream

Product Water ▼ — 6503

Comment

— 6504

Process Stream Value Log — 6505

| Stream | Pressure | Flow | Temp |
|---|---|---|---|
| Product Water | 332 | | |

Parameter Log — 6506

| Parameter | Unit | Value |
|---|---|---|
| TOC | mg/L | 120 |

Chemical Log — 6507

| Chemical | Dose | Concentration |
|---|---|---|
| Chlorine | | |

[ Submit ] — 6508

Log Data

Edit
Process Stream Log

Plant #3 — 6701

*Edit Process Stream*

Date - Time

| Date | 8/1/2010 | Time | 8:00 am |
|---|---|---|---|

} 6702

Process Stream

| Product Water |
|---|

} 6703

Comment

|  |
|---|

} 6704

Process Value Log

| Pressure | Flow | Temp |
|---|---|---|
| 250 |  |  |

} 6705

Parameter Log

| Parameter | Unit | Value |
|---|---|---|
| TOC | mg/L | 12 |

} 6706 , 6709

Chemical Log

| Chemical | Dose | Concentration |
|---|---|---|
| Chlorine |  |  |

} 6707

6708

Last Edit Track

| Name | Jim Smith |
|---|---|
| Date | Aug 1, 2010 |

} 6710

[ Submit ] — 6711

Log Data

Add Sampling Point Log

Plant #3 — 6801

*New Sampling Point Log*

Time Stamp

| Log Date | 8/1/2010 | Time | 8:00 am |

⎵ 6802

Select Sampling Point

| Lake Intake ▼ | — 6803

Comment

[                    ] ⎵ 6804

Parameter Log

| Parameter | Unit | Value |
|-----------|------|-------|
| Turbidity | NTU  | 12    |

⎵ 6805

[ Submit ] — 6806

Log Data

*Sampling Point Log Edit*

Date - Time
| Date | 8/1/2010 | Time | 8:00 am |

— 7002

Sampling Point
| Lake Intake |

} 7003

Comment
|  |

} 7004

Parameter Log
| Parameter | Unit | Value |
|---|---|---|
| Turbidity | NTU | 1.2 |

} 7005    — 7006

Last Edit Track
| Name | Jim Smith |
| Date | Aug 1, 2010 |

} 7007

| Submit |  — 7008

Edit
Sampling Point Log
Plant #3
  7001

Log Data

New Issue Log

Add Issue Log Plant #3 — 7101

Time Stamp

| Log Date | 8/1/2010 | Time | 8:00 am |

— 7102

Select Issue Type pH Alarm ▼ — 7103

Comment

— 7104

Parameter Log

| Parameter | Unit | Value |
|---|---|---|
| pH Alarm # | # / day | 6 |

— 7105

Assign to

Judy Black ▼ — 7106

Submit — 7107

Log Data

Search
Issue Log
Plant #3 — 7201

*Issue Search/Listing Log*

Issue Log Date Search

| From | 8/1/2010 | To | 8/1/2010 |

⎱ 7202

Select Issue Type

| pH Alarm ▼ | — 7203

Select contact name for the assigned issue

| Judy Black ▼ | — 7204

Issue Status (open or close)

| Open ▼ | — 7205

Key word Search in comment section

⎱ 7206

| Search | — 7207

Search Results

Process Value Log

| Date - Time | Name | Assigned to | Status | |
|---|---|---|---|---|
| 8/1/2010-8:00 | pH Alarm | J. Black | Open | Edit |

7208 / 7209

Log Data

*Edit*
*Issue Log*
*Plant #3* — 7301

*Issue Log Edit*

Time Stamp — 7302

| Log Date | 8/1/2010 | Time | 8:00 am |

Select Issue Type — 7303

| pH Alarm |

Comment

| |

Parameter Log

| Parameter | Unit | Value |
|---|---|---|
| pH Alarm # | # / day | 20 |

7304, 7305, 7308

Assign to — 7306

| Judy Black ▼ |

Issue Status — 7307

| Closed ▼ |

Last Edit Track — 7309

| Name | Jim Smith |
| Date | Aug 1, 2010 |

[ Submit ] — 7310

Add Report
Plant #3

7501

Report

Name
| Filter Report | } 7502

Time Selection
| From | 8/1/2010 – 8:00 AM | To | 8/2/2010 – 8:00 AM |

7503

Report Focus

| Category | Process Log | ⏵ 7505
| System | Filter | ⏵ 7509
| Type | Parameter | ⏵ 7510

7504
7507
7508

Process Value
■ Pressure   ☐ Flow   ■ Temperature  ⎬ 7506
Parameter
☐ TOC   ☐ Energy   ☐ Sludge Production Submit Report to
■ Jones, Sam   ☐ Black, Judy   ■ Smith, Jim  ⎬ 7512

| Submit | — 7513

Add Chart
Plant #3
7901

*Add chart*

Name
[Filter Profile]

Time Selection
| From | 8/1/2010 – 8:00 AM | To | 8/2/2010 – 8:00 AM |

7903

Report Focus
| Category | Process Log |
| System | Filter |
| Type | Parameter |

7904
7907
7908

7902
7905
7509
7510

Process Value
■ Pressure    ☐ Flow    ☐ Temperature

Parameter
☐ TOC    ☐ Energy    ☐ Sludge Production

Submit Report to
■ Jones, Sam    ☐ Black, Judy    ■ Smith, Jim

[Submit] — 7913

7906
7911
7912

Add Model — 8301

Report

*New Model*

| Name | Filter Efficiency model |
|---|---|
| Category | Process |
| System | Filter |

⟩ 8302

▶▶ 8303
▶▶ 8304

Parameters
■ Pressure  ■ Flow  ☐ Temperature  ☐ Alkalinity  ⟩ 8305

Chemicals
☐ Chlorine  ☐ Alum  ☐ Acid  ⟩ 8306

☐ Complex model — 8307

Output
■ Report  ☐ Chart  ⟩ 8308

User
☐ Jones, Sam  ☐ Black, Judy  ■ Smith, Jim  ⟩ 8309

Attach model file or link

| Upload File | Attach Link |

⟩ 8310

[ Submit ] — 8311

Run
Model
Plant #3 } 8501

*Model Run*

Model Name: Filter Efficiency model } 8502

Time Selection

8503 { | From | 8/1/2010 – 8:00 AM | To | 8/2/2010 – 8:00 AM |

Select Format

| Table Format ▼ | ← 8504

Statistical Analysis

■ Average  ☐ Sum  ☐ Standard deviation } 8505

| Submit | ← 8506

Report

| Date Log | Pressure | Flow | Removal - EFF |
|---|---|---|---|
| 8/1/2010 – 8:00 AM | 35 | 20 | 100 % |
| 8/1/2010 – 2:00 PM | 37 | 21 | 100 % |
| 8/1/2010 – 8:00 PM | 39 | 20 | 97 % |
| 8/1/2010 – 2:00 AM | 41 | 19 | 93 % |
| 8/2/2010 – 8:00 AM | 26 | 20 | 100 % |
| Average | 36 | 20 | 99 % |

Report

Add Form

| Name | Permit 101 |
|---|---|
| Category | Process Stream |
| System | Product Water |

8703, 8704, 8702

*Data Input:* Select process value and parameters
☐ Pressure  ■ Temperature  ■ TOC  ☐ Complex form 8705, 8706, 8707

*Output*
■ Text Report  ☐ Chart

*User and approval*
■ Jones, Sam  ☐ Black, Judy  ☐ Smith, Jim 8708, 8709

Attach form or link

| Upload File | Attach Link |
|---|---|

| Submit |
|---|

8710

Add Form 8701

Form List 8801

*List of Existing Forms*

| Form | Contact | | | |
|---|---|---|---|---|
| Permit 101 | Sam Jones | Run | Edit | Delete |
| Permit 102 | Judy Black | Run | Edit | Delete |

8803 — (Form rows)
8805 — Run column
8804 — Edit column
8802 — {Run, Edit, Delete}

Report

*Click Edit / Delete to edit task information or delete the task*

Add
Global Report
  9101

*Add Global Report*

Name
[Sludge Production Report]  } 9102

Time Selection
| From | 8/1/2010 – 8:00 AM | To | 8/5/2010 – 8:00 AM |

Report Focus
| Category | Plant ▶ |   } 9104
| Type | Parameter ▶ |   } 9105

Global Parameter
☐ Energy usage   ■ Sludge Production   } 9106

Submit Report to
■ Jones, Sam  ☐ Black, Judy  ■ Smith, Jim   } 9107

[Submit]  9108

Global Report
List

9201

*List of Existing Global Reports*

| Report Name | Category | From | To | | | | |
|---|---|---|---|---|---|---|---|
| Sludge Production Report | Plant | 8/1/10 | 8/2/10 | Edit | Run | Delete | |
| Energy Usage | Plant | 7/1/10 | 7/31/10 | Edit | Run | Delete | |

9203

9202

9204

*Click Edit / Delete to edit or delete the report. Click on run to generate the report*

Report

| Date Log | Plant #1 | Plant #2 | Plant #3 |
|---|---|---|---|
| 8/1/2010 | 3 | 5 | 1 |
| 8/2/2010 | 4 | 4 | 2 |
| 8/3/2010 | 3 | 6 | 1 |
| 8/4/2010 | 2 | 5 | 3 |
| 8/5/2010 | 4 | 3 | 2 |
| Sum | 16 | 23 | 9 |

Add Global Chart
9501

*Add Global Chart*

Name
[ Sludge Production ] 9502

Time Selection
From [ 8/1/2010 – 8:00 AM ]  To [ 8/2/2010 – 8:00 AM ]  } 9503

Report Focus
| Category | Plant Log |   } 9504
| Type | Parameter |   } 9506

9505
9507
} 9508

Parameter
■ Energy usage   ■ Sludge Production   ■ Smith, Jim  } 9509

Submit Report to
■ Jones, Sam   ☐ Black, Judy

[ Submit ] 9510

Report

Home Page

Notification
10001

*In-box Notification*

| Date Posted | Facility | Type | Message |
|---|---|---|---|
| ☐ 8/5/2010 8:15 AM | Plant #3 | Process | pH Alert |
| ☐ 8/10/2010 3:23 PM | Plant #3 | Sampling Point | Intake lake water Turbidity level greater than 10 NTU |

} 10002

*Check item when notification was acknowledge*

Delete Checked Items ⎯ 10003

Home Page

Action Logs

*Action Logs* 10101

| Date Posted | Facility | Event | Type | Task / Event |
|---|---|---|---|---|
| ☐ 8/5/2010 8:15 AM | Plant #3 | Log Data | Process | Detail |
| ☐ 8/9/2010 3:23 PM | Plant #3 | Report | Permit | Detail |
| ☐ 8/11/2010 11:23 PM | Plant #3 | Notification | pH adjustment | Detail |

10102  
10104

*Check item when action was completed*

Delete Checked Items — 10103

Home Page

Dashboard Manager — 10501

*Home Page data selection*

Number of parameters [ 4 ] — 10503

10502

Select Parameter

| # | Location | Category | System | Parameter | Data Type | Data Type |
|---|----------|----------|--------|-----------|-----------|-----------|
| 1 | Plant # 3 ▶ | Process Log ▶ | Filter ▶ | Pressure ▶ | current ▶ | Daily avg ▶ |
| 2 | ▶ | ▶ | ▶ | ▶ | ▶ | ▶ |
| 3 | ▶ | ▶ | ▶ | ▶ | ▶ | ▶ |
| 4 | ▶ | ▶ | ▶ | ▶ | ▶ | ▶ |

10504

[ Submit ] — 10505

User Profile 10801

*Personal Profile*

| Category | Info |
|---|---|
| First Name | Jim |
| Last Name | Smith |
| Job Title | Project Manager |
| User Type | Plant User |
| Phone | 111-555-1111 |
| Email | xx@test.net |
| Password | xxxxx |

10802

10803

User Access Definition — 10805

Submit — 10804

Home Page

User Access Permission

10901

*User Information*

| Category | Info |
|---|---|
| Name | Jim Smith |
| Plant Selection | Plant # 1 ▼ |
| Access Level | Plant Manger ▼ |

*User Access*

● Add / edit user accounts*  ○ Define elements View only
● All Define elements  ○ Data Logging elements View only
● All Data Logging elements  ○ Data reporting elements View only
● All Data Reporting elements  ● Administer elements View Only
○ All Administer elements

* user rights dependent

User Access

[Submit]

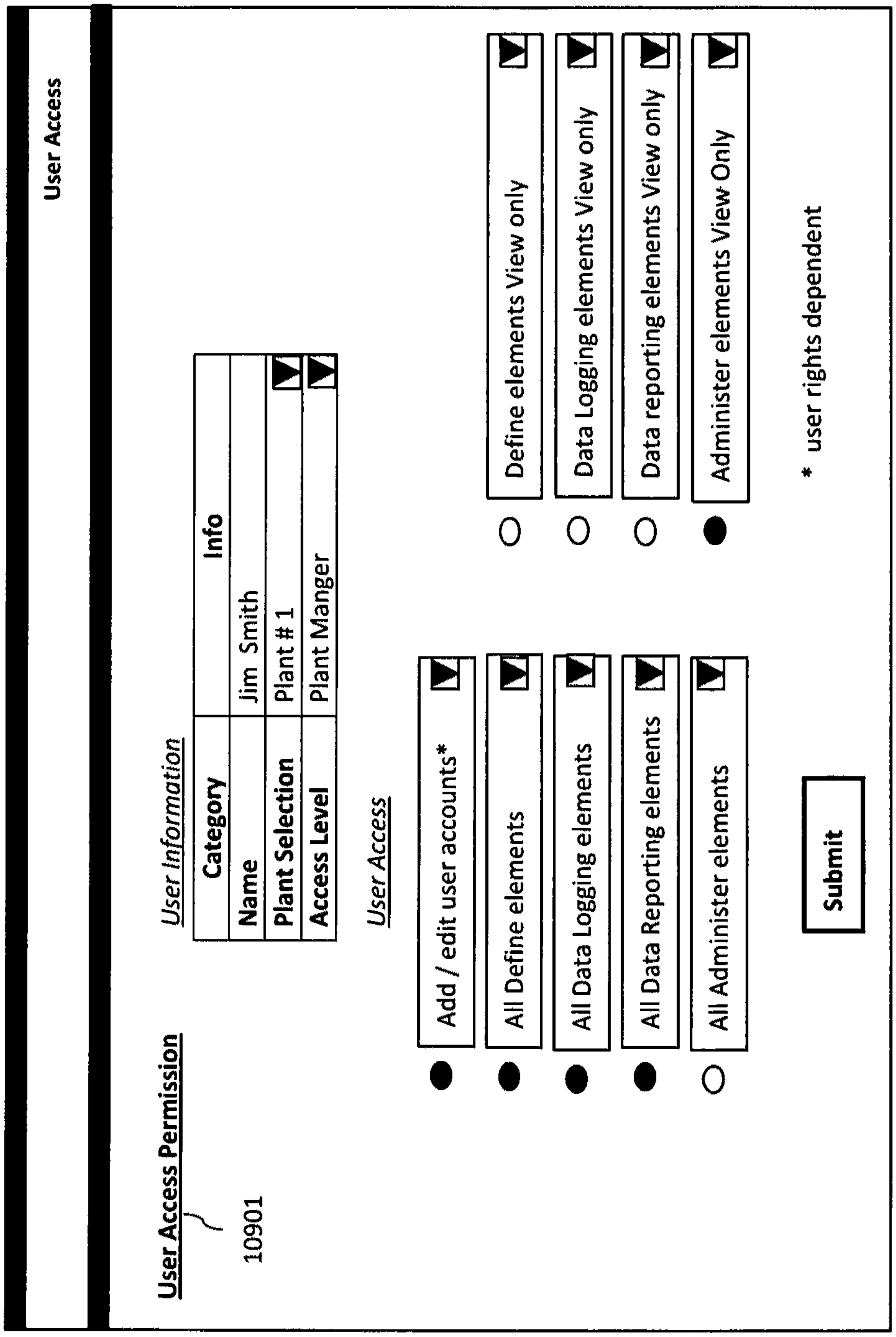

FIG 109

Home Page

Files and Links

11201

*Organizational files*

11202

| Date Posted | Topic | File Type | |
|---|---|---|---|
| 1/1/10 | EPA doc on low pressure membranes | word | Download |
| 7/1/10 | DO review chart | pdf | Download |

11203

*Links*

11204

| Date Posted | Topic | Link |
|---|---|---|
| 1/1/10 | AWWA website | www.awwa.org |
| 7/1/10 | WERF website | www.wef.org |

11205

FORM-BASED USER-CONFIGURABLE PROCESSING PLANT MANAGEMENT SYSTEM AND METHOD

No related U.S. or foreign application data.

BACKGROUND OF THE DISCLOSURE

Current practices relating to data management of plant operational data are typically based (1) on paper-based log data storage, where operators who operate the plant collect information from the plant and store the information in a paper notebook or (2) on Supervisory Control and Data Acquisition (SCADA) systems, which are pre set two-way controls commonly used to operate the plant at critical points in the process and require someone with computer programming skills to configure and set up.

Paper-based information storage has been practiced because of regulatory requirements. Governmental agencies typically require plant managers to report regulated parameters in a paper format. This results in a significant drawback from an operational point of view, the inability for plant managers to readily access the data and perform data trending analysis. As a result of this situation, plant managers are unable to use these data to perform optimization changes. In many instances, such paper-based information is simply not available on time, to be included in any decision making process, because most chemical plants are located in isolated locations significantly removed from the location of administrative and executive staff. In addition, most chemical plants employ external entities such as consulting engineering firms, laboratories and subject matter experts to assist in the optimal operation of chemical based plants. This process typically involves providing plant operational data to the requisite parties so that correct analysis can be conducted. Because information is stored on paper, significant processing time is incurred in understanding and interpreting operational notes, thus increasing operational costs.

Plants also suffer from human attrition. For example, when operating personnel leave the plant, operational intelligence and knowledge tied to the employee are no longer available to the organization. This, when coupled with paper-based information storage makes the problem of correctly interpreting plant operational data logged by an employee who has left the organization, more acute.

Some plants have adopted automation as the solution, where a portion or the whole plant is automated, and information is logged using data logging devices placed at different locations in the plant flow scheme. This approach is often referred to as SCADA. For the most part, the brains of a SCADA system are performed by the Remote Terminal Units (RTU), which consists of a programmable logic converter. The RTU are usually set to specific requirements, and monitor specific processes in a given treatment train. In addition to the RTU, a SCADA system requires a Human Machine Interface (HMI). The HMI of a SCADA system processes data and presents it be viewed and monitored by a human operator. This interface usually includes controls where the individual can interface with the SCADA system.

The introduction of SCADA and automation in facilities has significantly improved operational reliability and operator response time, On the other hand, SCADA systems remain an expensive option for small to medium size plants, which do not have the operational budget to support automation devices and programs. SCADA systems are not flexible—device compatibility, system upgrades or plant modifications are key concerns. In addition, it is critical to understand that SCADA systems cannot be used as a compliance-reporting tool because SCADA systems focus on operating parameters. SCADA systems have also been identified as a potential vulnerability and opening SCADA to the web has become a risk and security concern.

With the advent of the web and web-like communication options, the ability of closing the gap between automated and paper-based operational data storage with a computer implemented approach is now possible. There is a need for a system and method that enables users to store and retrieve data without loss of time and resources. Such a system should meet the following criteria:

- capable of meeting all operational and regulatory reporting requirements;
- capable of being configured to describe any processing plant without requiring the use of any programming skill;
- capable of combining automated and non-automated data;
- provide pre-defined reports;
- capable of setting alerts;
- capable of providing different levels of access to different users who serve in different roles;
- and be highly secure while operating over a widely-available information medium such as the internet.

SUMMARY OF THE INVENTION

The present invention uses electronic forms in a client-server environment to allow a user to define a processing plant. This definition of the plant can include processes, chemicals, process streams, and sampling points in the plant. The plant definition can be used to log information about the plant. The logged information can be used to generate reports or charts. Logging, reporting, and charting can be managed using electronic input forms on computer screens without the user needing to write any computer code. In one embodiment, multiple processing plants can be grouped into one organization and the data from multiple organizations can be managed in one computer system. In one embodiment, access to different parts of the system can be controlled through modules that manage users and functions.

BRIEF DESCRIPTION OF THE DRAWINGS

The present disclosure is described in conjunction with the appended figures in which:

FIG. 4 is a user access summary table of the different user access levels;

FIG. 109 is a display of a User Profile Site Access Viewing Module;

Figure 1:
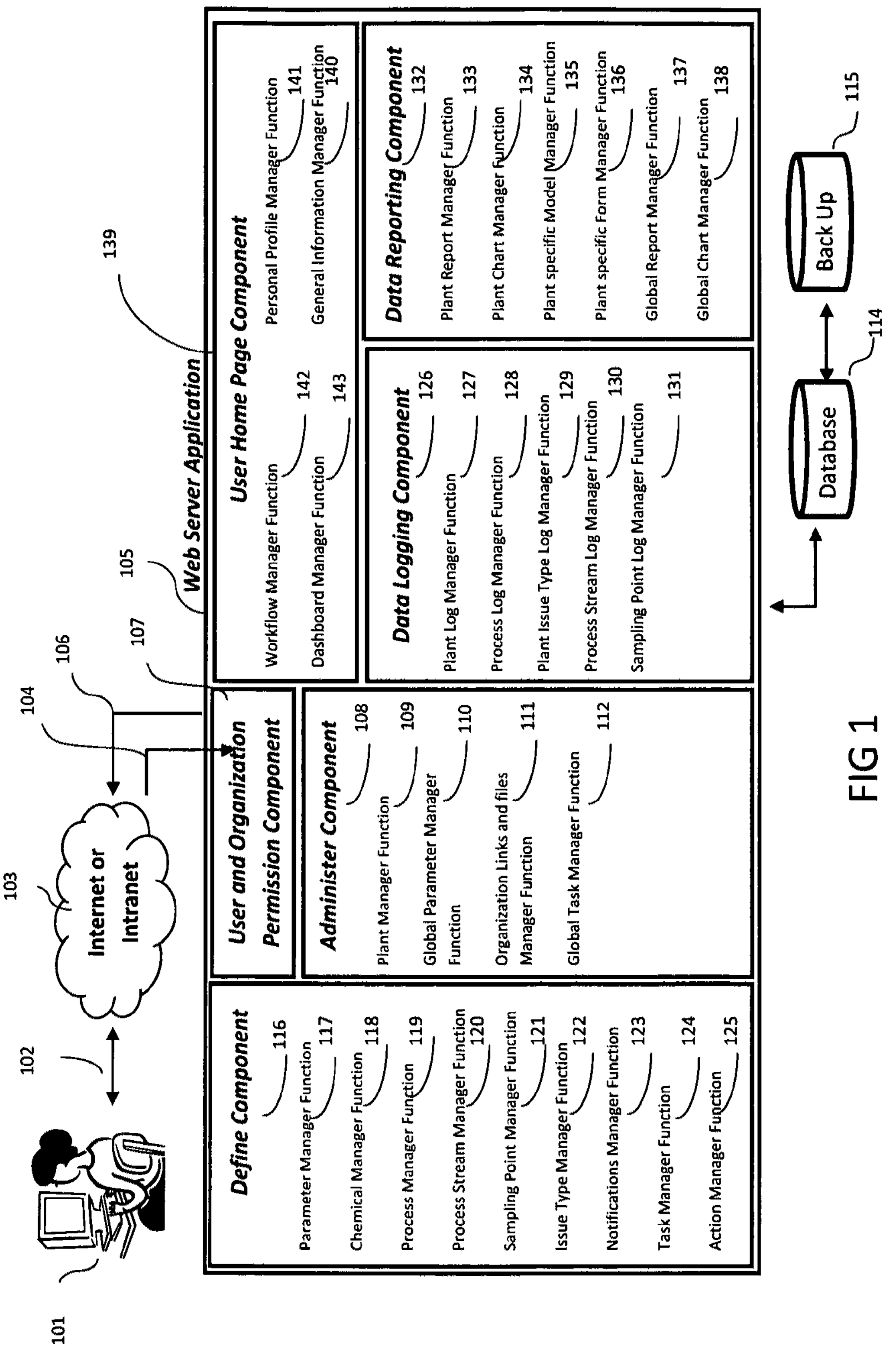
FIG. 1 is a schematic identifying the key components of a web server application.

In the appended figures, similar components and/or features may have the same reference label. For items with the same reference label, the description is applicable to any one of the similar components.

DETAILED DESCRIPTION OF THE PREFERRED EMBODIMENT

1—Overview

In the following description, specific details are set forth in order to provide a clear and thorough understanding of the invention. The examples and figures displayed hereafter aim to illustrate the different functionalities associated with the invention, and demonstrate the extent by which the invention can be implemented.

The purpose for the present invention is to enable Plant Managers and other Professionals in equivalent or related positions to effectively manage key operational or process data, which would include but would not be limited to numeric data, alpha-numeric data, documents, pictures, video or any other information source or type that would enable an organization to better manage their facility or facilities. The present invention can be used on any plant independently of its location and size. The present invention can be used for multiple plants under same organizations. Among the most obvious benefits this innovation brings to adopting organizations are compliance linkage, efficiency, reliability, savings, and communication; other benefits can be identified through more specific applications.

While the core invention provides the user with a great deal of freedom in configuring, managing and organizing its data, the system disclosed here is also amicable to adding and incorporating an arrangement of modules and functionalities which are not viewed as core to the innovation but can be viewed as business critical. Such modules or functions include but are not limited to notification, scheduling, user control access, communication and workflow. The following paragraphs will include some of these modules and functions, as well as components, in addition to the core modules and elements designed in the system disclosed here. Finally, the innovation can be structured in any specific manner; hence the examples provided hereafter are just an illustration of how the different modules can be organized. The user configurability concept core to the invention can be achieved by shifting modules around or even splitting modules while still providing the same core functionalities. Additionally, the sample screenshots presented are system-generated forms that can be designed to organizational user preferences. The critical point is to assure the links among the modules are consistent with the goals set forth by the invention.

The system disclosed here, is based on a thorough understanding of the operational requirements plant managers face on a daily basis, combined with basic chemical engineering principles and computer science. The innovation encompasses these three fields through the utilization of a series of modules and elements; an integrated architecture allows data to flow freely between the modules and elements. For clarity these modules and elements were grouped in functional areas or functions which in turn were grouped under six Components: (a) the User and Organization Permission Component, (b) the Administer Component, (c) the Define Component, (d) the Data Logging Component, (e) the Data Reporting Component and (f) the User Homepage Component. The key features associated with the system disclosed here are (a) the point and click features common across all components that enable the Authorized User to set up the system without the assistance of a programmer, and (b) the ability for the Authorized User to perform all necessary functions and actions from one site, including but not limited to data storage, data management, data reporting, workflow management, and alerts or notifications. Another key feature included in the document is the use of a role-based access control feature associated with the User and Organization Permission Component. Even though this feature isn't core to the invention, this feature is critical from an implementation point of view and in defining the organization full control when adopting the system disclosed here described here after.

Figure 112:
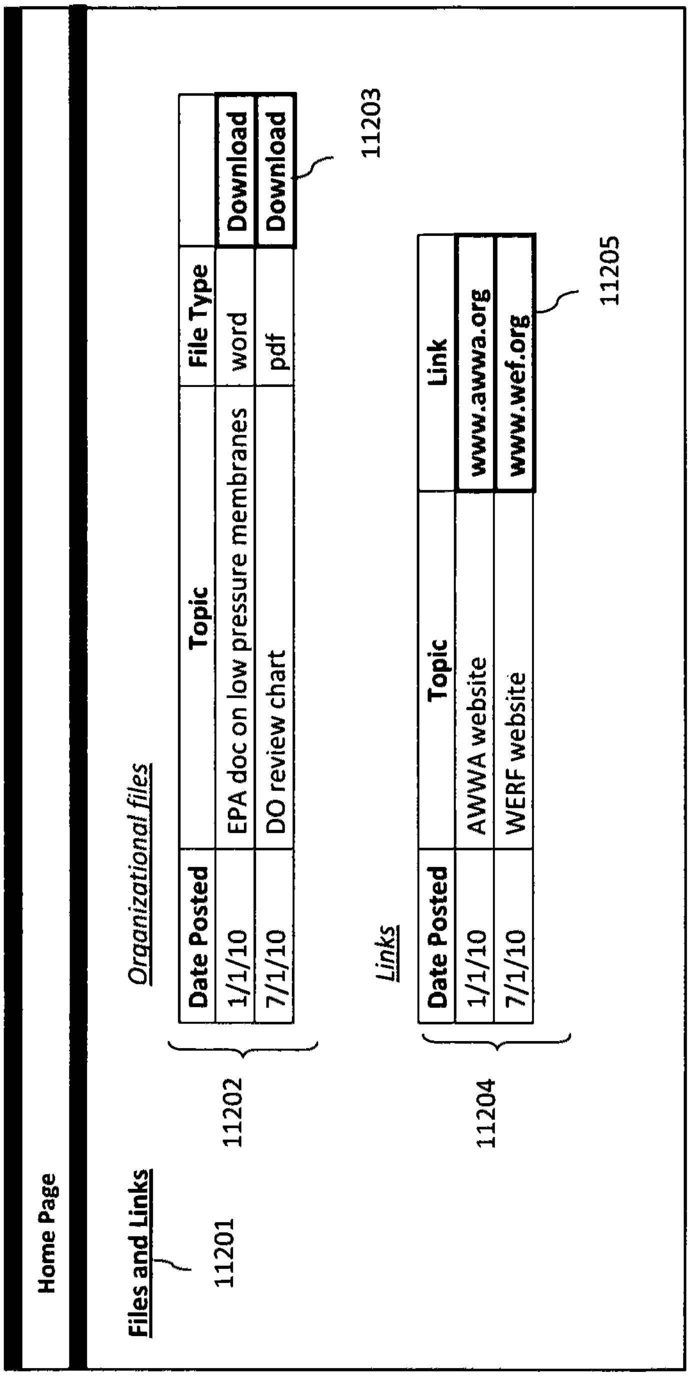
FIG. 112 is a display of a File Downloads and Link Access Module

FIG. 1 illustrates how information flows (102, 104, and 106) to and from the user (101) through the internet or intranet (103). As part of the system disclosed here, the user (101) accesses the system disclosed here through a terminal, which is connected to the internet or a specified intranet. The initial command or message (102) flows through the internet or intranet (103) to the web server application (105). FIG. 1 also identifies the key components of the system disclosed here, which is comprised for clarity purposes, of six interrelated components: User and Organization Permission Component (107), Administer Component (108), Define Component (116) Data Logging Component (126), Data Reporting Component (132), User Home Page Component (139), a database (114) and a backup system (115). FIG. 1 only presents the first two levels (i.e. Component and function), while FIGS. 3 through 11 provide additional information on the different Components including the User and Organization Permission Component and the process by which the form driven user configurable computer implemented solution enables the user to manage its data. Finally, FIGS. 12 through 112 are sample screen displays of the specific modules forming the system disclosed here in addition to those modules that are not core to the invention but are critical when implementing the system disclosed here. In one embodiment, the system is implemented using a client-server architecture in which forms are displayed on a client computer and data is stored on a server. Forms can be displayed on a client computer in a variety of ways capable of being understood by any one schooled in the art including text terminals, terminal servers (also known as remote desktop servers), or through a web browser. In one embodiment, the client and the server communicate by using an internet protocol, also known as TCP/IP or the Internet Protocol Suite.

Figure 3:
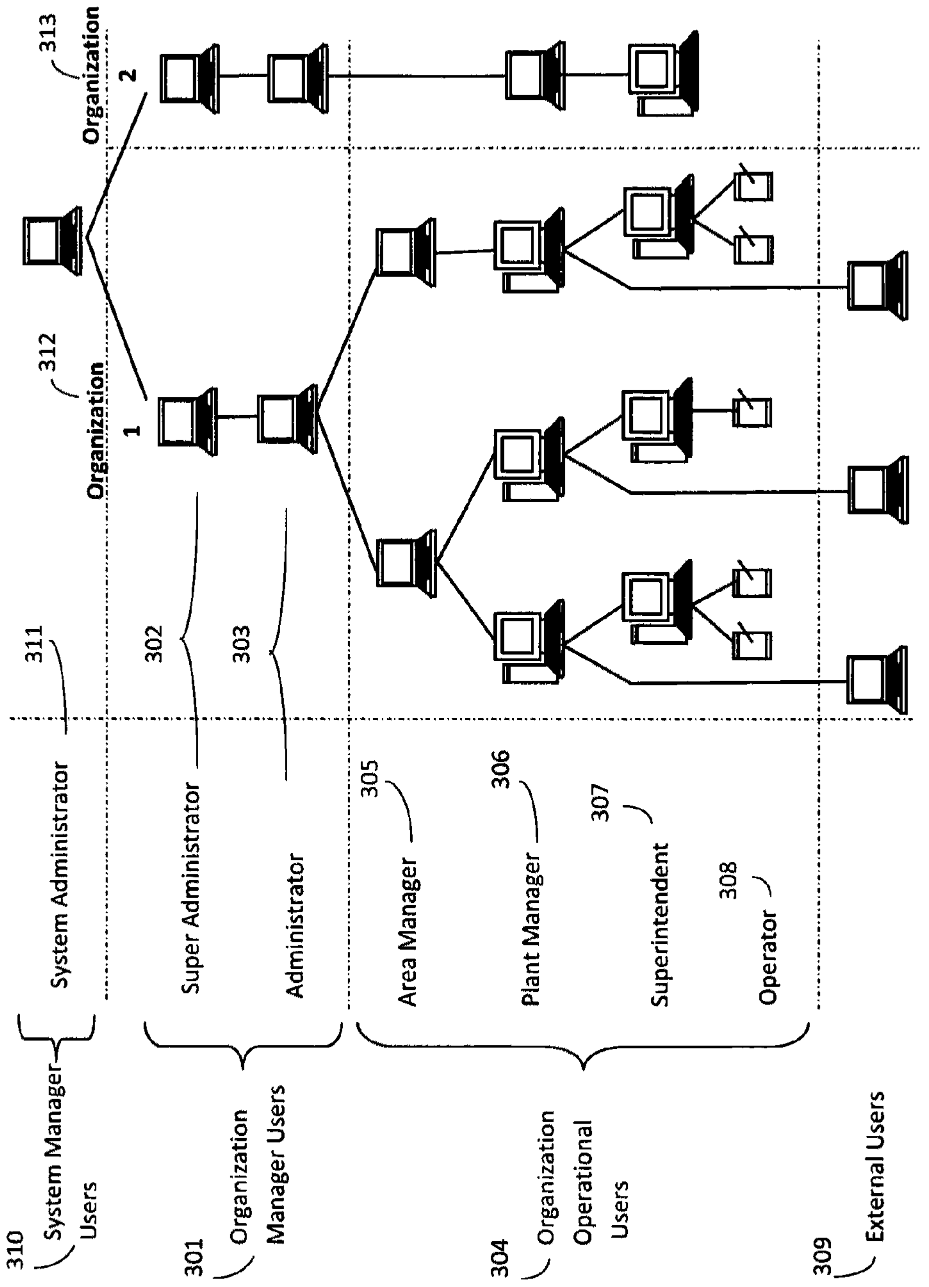
FIG. 3 illustrates key access levels used to define the User Permission Component.
Figure 5:
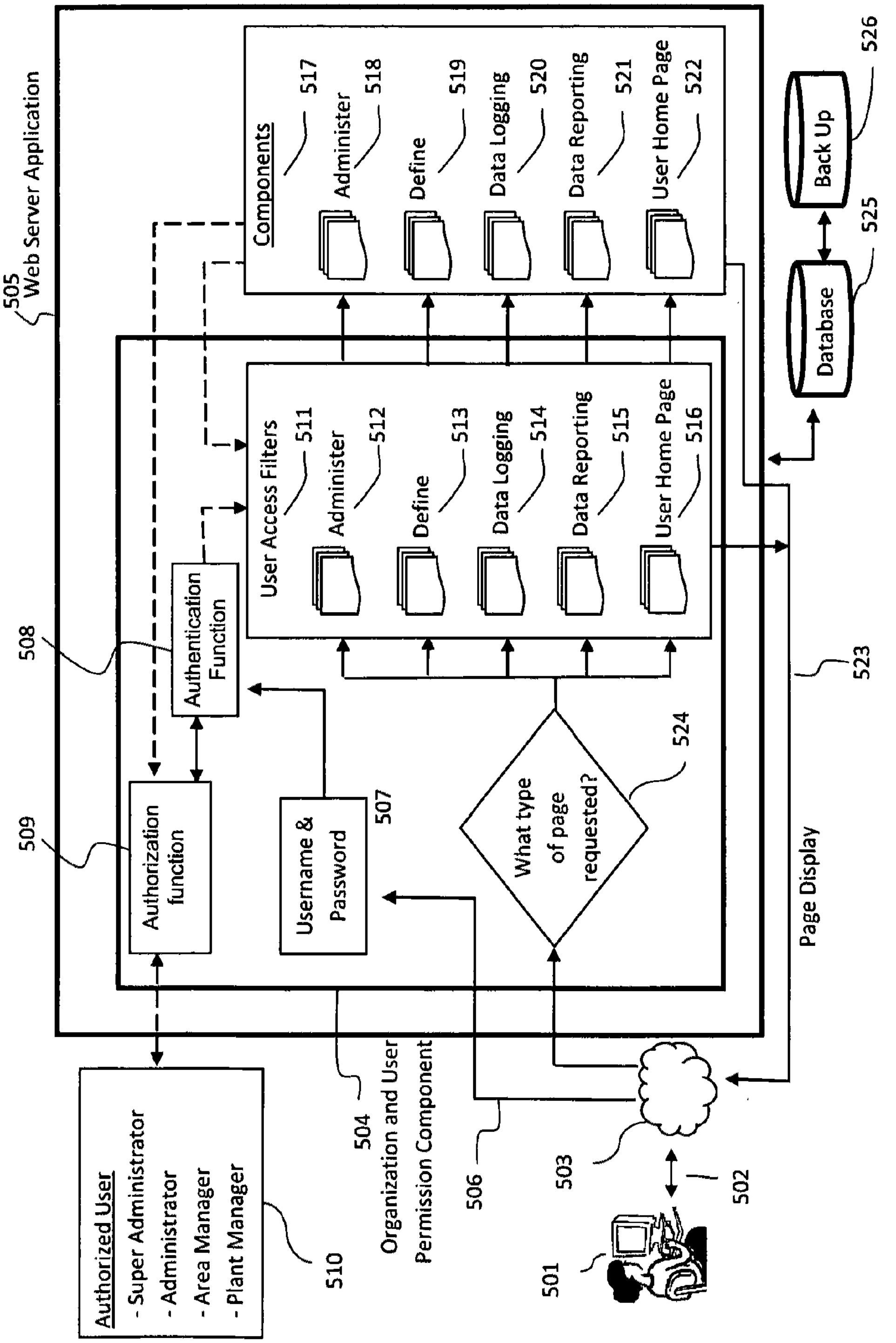
FIG. 5 illustrates the functionalities of the User Permission Component.

As mentioned above, the following example requires users to access the system disclosed here through the User and Organization Permission Component (107). In this component the user's access to the specified organization account must be authorized and authenticated. Authentication is defined as the process of verifying the user's login credentials (i.e. login and password), before allowing access to the application. Authorization is defined as verifying user credentials, and allowing access to only those areas of the application that user is approved for and preventing access to areas that are not approved. FIGS. 3 through 5 provide additional information on the functionalities associated with the User and Organization Permission Component.

Once the user access has been authenticated and authorized by the User and Organization Permission Component (107), the user is able to access the five other Components (1) the Administer Component (108), (2) the Define Component (116), (3) the Data Logging Component (126), (4) the Data Reporting Component (132), and (4) User Home Page Component (139). Within each Component lies a series of functions. FIG. 1 lists the key functions associated with each Component. Located in the Administer Component (108) are the Plant Manager Function (109), Global Parameter Manager Function (110), the Organization Links and Files Manager Function (111), and the Global Task Manager Function (112). The functions located in the Define Component (116) are Parameter Manager Function (117), Chemical Manager Function (118), Process Manager Function (119), Process Stream Manager Function (120), Sampling Point Manager Function (121), Issue Type Manager Function (122), Notifications Manager Function (123), Task Manager Function (124), and Action Manager Function (125). The Data Logging Component (126) is formed of the Plant Log Manager Function (127), Process Log Manager Function (128), Plant Issue Type Log Manager Function (129), Process Stream Log Manager Function (130), and Sampling Point Log Manager Function (131). In the Data Reporting Component (132) are the Plant Report Manager Function (133), Plant Chart Manager Function (134), Plant-specific Model Manager Function (135), Plant-specific Form Manager Function (136), Global Report Manager Function (137), and Global Chart Manager Function (138). The functions located in the User Homepage Component (139) are General Information Manager Function (140), Personal Profile Manager Function (141), Workflow Manager Function (142) and the Dashboard Manager Function (143). Within each function, an additional hierarchy of modules is presented. FIGS. 6, 7, 9, 10, and 11 list the modules associated with each function. The add and edit modules notated in these figures form the definition modules, which are presented as two separate modules to demonstrate the specific functionalities. The definition modules interface with all listing modules. The modules can be arranged in a variety of ways when implementing the system disclosed here. For example the editing modules and the adding modules can be designed as one definition module. In conjunction with the different modules are facilitating elements, which will enable the data to be displayed or will enable the data to move among the different modules, the data base (114) and the backup system (115). The display element enables data to be presented to the user in a systematic form, thus displays of computer generated tables and/or checkboxes, charts, reports, and maps are recurring throughout the system. The data movement element transfers the user-provided contents of input fields to a computer memory in response to a signal from a submit or save button and does not require user-supplied computer code to transfer.

The system disclosed here described herein that is illustrated in FIG. 1 is well-suited for storing and managing operational information from a wide range of chemical, process and treatment plants (without limitation), but it is also particularly well-suited for internet-based application and cloud computing type applications. The invention may be implemented in computer hardware, in computer software, or a combination of computer hardware and computer software and is not limited to a particular hardware or software implementation.

Figure 2:
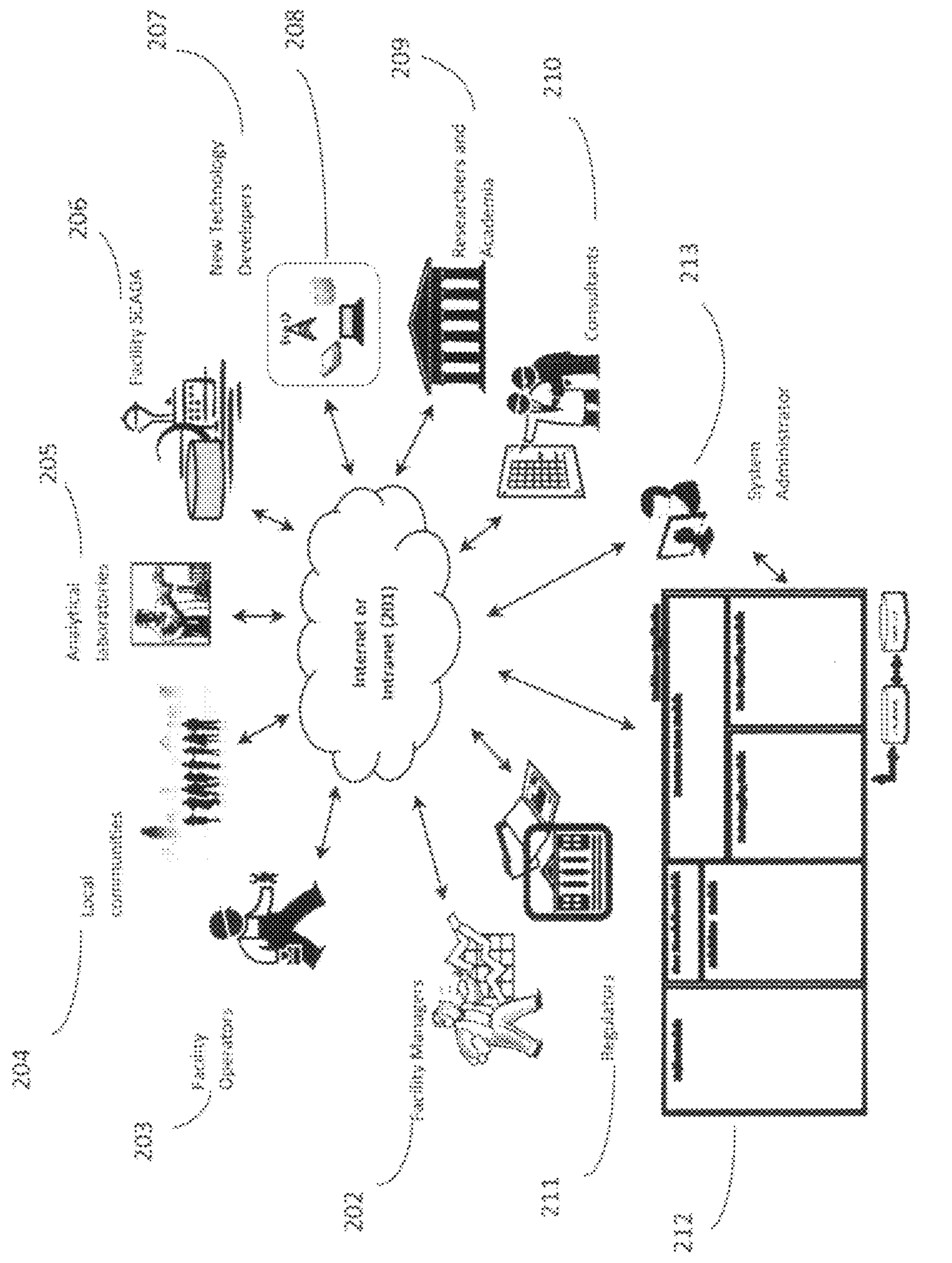
FIG. 2 is a schematic identifying user types of the web server application.

In FIG. 1, this user of the system disclosed here was identified as one entity (101). The users within a specified organization involved in the operation and management of the system disclosed here as well as any individual plant or facility usually encompasses a wide range of users. FIG. 2 identifies key users of the system disclosed here. Among these users are system managers (213), organization users (202, 203, and 206) and external users (204, 205, 207, 209, 210, and 211). An example of an organization user is the facility or plant manager (202) which may have access to a wide range of options including but not limited to changing specific settings, importing and modifying data, and exporting data. External users, such as consultants (210), are users for which organization users grant access to the site or service for a specific task, hence providing the External user with limited access to the system such as read-only rights, due to confidentiality and security purposes. Additional information regarding the User and Organization Permission Component is provided in FIGS. 3, 4 and 5.

The web server application (212) interfaces with the web (201) and is accessible to multiple users concurrently. While system upgrades are performed through the system manager (213), data backups are performed within the system. Thus the data is further protected despite the available access by multiple user types. The database stores historical data as well as current information, which provide the system disclosed here with audit and tracking capability, necessary in the case of regulatory applications.

To access the system disclosed here, users may use any of the commonly available means of communication which interfaces with the internet including but not limited to laptop computers, desktops, other servers, handheld communication devices, PDAs, any online monitoring device including SCADA systems. FIG. 3 is an example of an organizational chart identifying the distinctive user types and how the hierarchical interaction is designed. The system disclosed here involves four types of users: a System Manager User (310), two types of internal or organizational users, Organization Manager Users (301) and Organization Operational Users (304) and lastly a wide variety of External Users (309).

Under the System Manager User category (310) is the System Administrator (311). The System Administrator is responsible for the overall management of the system disclosed here. This would include data backup, creating new Organization Accounts, and providing technical services to all other users. The System Manager User is also the only user category which has access to the computer code which constitutes the system disclosed here. Hence this is the only user which has the ability to implement system wide upgrades. In the example presented here, the System Manager User is likely to be a third party provider unrelated to the organizational account users; however this will not always be the case.

In FIG. 3, the System Administrator (311) created two organizational accounts, Organization 1 (312) and Organization 2 (313). These two Organizations are distinct in nature and none of the users under Organization 1 have access to the portion of the system disclosed here assigned and developed by Organization 2 and vice versa. Under the system disclosed here, data does not cross over among organizational accounts.

The next six levels of users involve users that are affiliated to a specific organization as internal or external users. The first category of users is the Organization Manager Users (301). Under this category are two levels: the Super Administrator (302) and Administrator (303). Generically, the role of an Administrator is to provide oversight and control on all technical and organizational functionalities associated with the operation of the system disclosed here. Hence, the Administrator has rights to create and modify facilities, override settings, produce and modify reports, provide users with login and access authentication and authorization, and assist users with any functions associated with the system disclosed here. The role of Super Administrator (302) is to assign these managerial capabilities to the Administrator(s) as corporate guidelines dictate. Thus, the Super Administrator has overall authority of the operation and execution of the system disclosed here.

The second category of internal or organizational users is the Organization Operational User (302) which has four levels of hierarchy (a) the Area Manager (305), (b) the Plant Manger (306), the Superintendent (307) and the Operator (308). Each level corresponds to a specific user-type function of his or her responsibility. FIG. 4 further illustrates the different access levels associated with the different user types. Under the system disclosed here, each user type has a specific role and the system disclosed here will assist the user type to perform its duties.

Under FIG. 3, the Area Manager (305) may have oversight over one or more facilities. Under the supervision of the Area Manager, the Plant Manager (306) is responsible for defining the process and process streams in the system disclosed here that is applicable for each facility. The Plant Manager is also responsible for defining the parameters, the actions, the related tasks and all other components listed in the Define Component. Once the system disclosed here for each facility is set up, the Plant Manager may assign responsibilities to both the Superintendent (307) and the Operator (308). The Superintendent (307) supervises the Operator (308) and can create as many user operator accounts as employees under his or her direct supervision.

User access can be granted to External Users (308) by the Plant Manager (306), the Area Manager (305) or any Administrator (302, 303). In the case where the Plant Manager (305) grants access, the external user will only have access to specific components and modules as they relate to the task at hand for the specific facility for which the Plant Manager has oversight. In the case where a third party provides a service across several facilities, the Area Manager will grant access to all the facilities simultaneously. Another possibility could be to have each Plant Manager grant access to the relevant components or modules for the specific contractor. For example, an analytical lab may have data input rights to multiple facilities with no data search rights. In another example, an operational consultant may be responsible for generating reports across all three facilities. In that case, the operational consultant would have read-only rights to the system disclosed here for all three facilities. In a slightly different configuration, a Corporate Manager may have access to specific reports that would enable the corporate manager to perform his or her function. More specific information on user access rights are presented in FIG. 4.

FIG. 4 is a summary table for each user type identified in FIG. 3 and their respective access rights to the different components of the system disclosed here. While FIG. 3 outlined the hierarchy of potential user types, FIG. 4 displays the capability for each user type to access different parts of the system disclosed here.

Under FIG. 4, all user types are listed on the top row of the table (416) and all the components are listed in the first column (409). The table illustrates the different access levels to the form-driven user configurable computer implemented solution for each user category using the following terminology or symbols: (a) no restrictions (indicated by a checkmark), (b) view only, (c) no access (marked by a dash) and (d) Variable, which only applies to external users.

The System Administrator (401) is the only user that has complete access to the system disclosed here and is able to create, edit and delete organizational accounts, which includes identifying the Super Administrator for each organization. The System Administrator is also responsible for system maintenance and guarantying access to the site to all authorized and authenticated users.

The Super Administrator (402) has complete access to the components, functions and modules of the system disclosed here dedicated to its specific organization. The Super Administrator has more permissions than any other user for its organizational account and may have access to certain segments of the original code in the case of special needs or applications, including but not limited to the modeling, reporting or data logging. Administrators (403) have comparable access to the web server application as the Super Administrator (402) except that the Administrator cannot delete nor edit the Super Administrator Account.

The next level down involves all Organization Operational Users, the Area Manager (404), Plant Manager (405), Superintendent (406) and the Operator (407). Under the current configuration of the web server application, the User and Organization Permission Component (410) is only accessible to the Area Manger (404) and the Plant Manager (405). The Area Manager (404) is authorized to create accounts for any user that needs to access the web server application components, functions and modules dedicated to the facilities under its responsibility, including Plant Mangers (405) or External Users (408). The Plant Manger (405) is authorized to create accounts for any user that requires access to the web server application components, functions and modules dedicated to the facility or plant under its responsibility.

Another distinction between the Area Manger (404) and the Plant Manager (405) is the inability for the Plant Manger (405) to create or edit plant account information in the Administer Component, since the Plant Manger (406) has view-only access, while the Area Manger (404) has complete access to the Administer component.

The next levels of Organization Operational Users include the Superintendent (406) and the Operator (407). Neither of them have the ability to access the User and Organization Permission Component (410) nor do they have access to the Add or Edit Modules under the Define Component (412). The main differences between the two user levels involve their ability to access the Administer Component (411) as well as the Data Reporting Component (414). Superintendents (406) have view-only access to the Administer Component (411), while the Operator (407) does not have access to the Component. The second significant distinction relates to the Data Reporting Component (414); Superintendents (406) will have complete access to the Data Reporting Component (414), while the Operator (407) will have partial access with the ability to view the reports or graphs but not to modify or add any new reports or graphs.

The last user type is the External Users (408). External Users (408) would be granted access depending on their association to the organization's facility and their responsibility. The term "Variable" denotes the notion that access can be granted or removed at any given time by the authorized user. For instance, an External User could have access to the Define Component (412) for a workflow management project, the Data Logging Component (413) if the user was associated with an external lab or the Data Reporting Component (414) for a process optimization case. In any case the Authorized User providing access to the external user can limit the access to the component depending on the project or the needs. Due to confidentiality and security purposes, the External User may have access only to data pertinent to his or her objective. The External User (408) will be given complete access to User Homepage Component (415).

Figure 12:
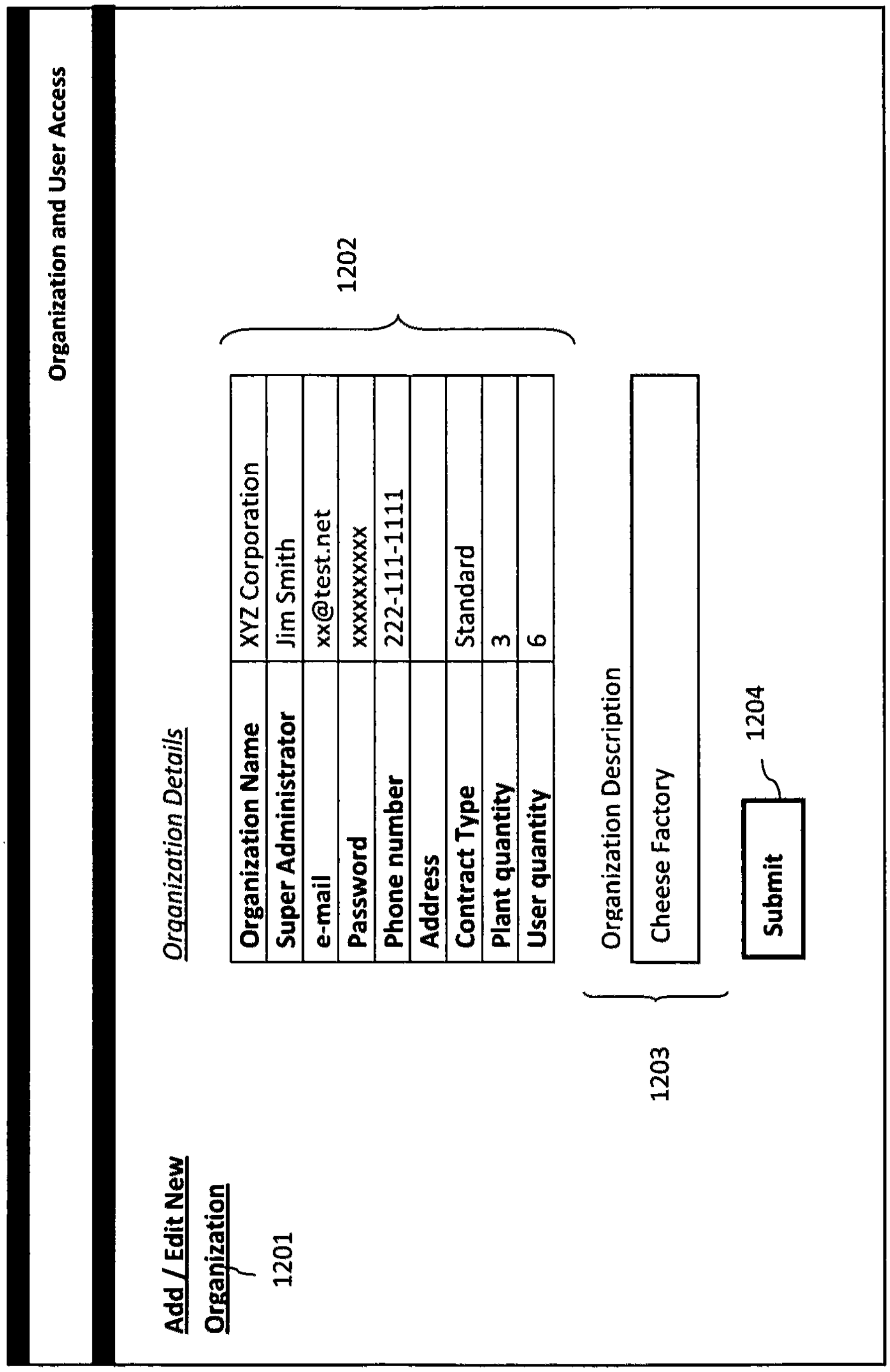
FIG. 12 is a display of an Organization Adding/Editing Module.
Figure 13:
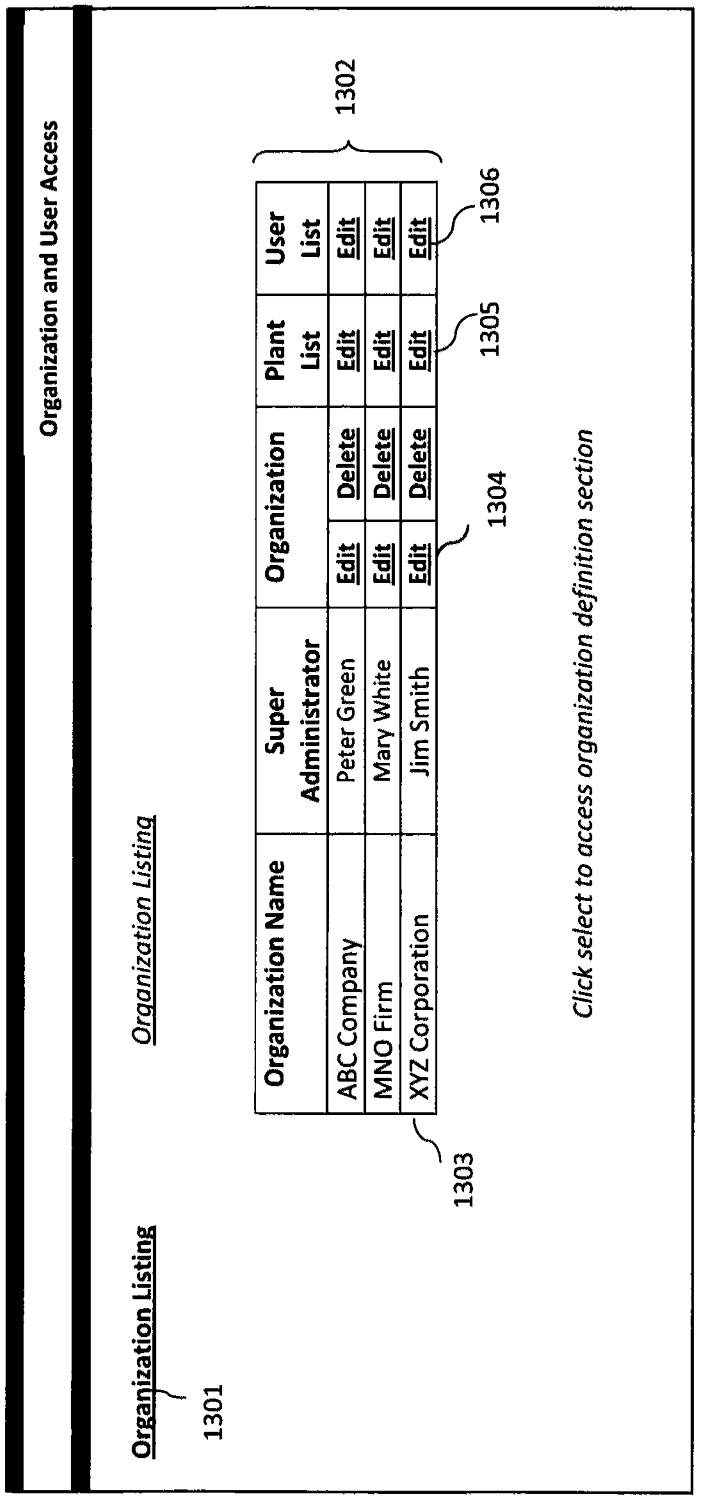
FIG. 13 is a display of an Organization Listing Module.

FIG. 5 illustrates how information flows within the boundaries of the User and Organization Permission Component to the other components of the system disclosed here and back to the user. In FIG. 5, the user (501), of the specified organization, accesses the system disclosed here or web server application (505) through the use of a web or internet (503). Once on the site, the web server application prompts the user to identify him or her with a secure password and username (507). This initial step is a key component of the User and Organization Permission Component (504). If the information entered is incorrect, the user will be denied access to the web server application. The Authentication Function (508) is a key component of the User and Organization Permission Component. Once the user information provided has been authenticated, the User and Organization Permission Component assesses the user's access to the site through the Authorization Function (509). This function is essential in defining the user's ability to operate and access the different components of the web server application. The Add User Module (FIG. 12) and User Access Defining Module (FIG. 13) are the two modules controlling these first two steps. It is critical to realize that only specific Authorized Users (510) have the ability to add or delete accounts under their direct responsibility. The dashes in FIG. 5 illustrate control links exerted by the Authorization Function (509) in the User and Organization Permission Component (504). In addition to the User Adding Module (FIG. 14) and the User Access Defining Module (FIG. 15), the Authorized User will have access to four other modules. The first is the Add and Edit Organization Module (FIG. 12). The second is the Organization Listing module (FIG. 13). The third is the Organization specific User Listing Module (FIG. 16), which will enable the Authorized User (510) to view all users for which they are authorized to edit and delete the account. The fourth is the Organization User Editing Module (FIG. 17) which allows the Authorized User (510) to edit and update user information.

Note that the screens for the Edit Organization Module (FIG. 12), the Organization Listing Module (FIG. 13), the User Listing Module (FIG. 16), the Organization User Editing Module (FIG. 17), and other modules in the system described here are form-based. By this, we mean that there are specified areas for data entry, such as checkboxes and or finable text fields. There can be a cursor on these screens that moves to the next data entry area (i.e. box to be filled in). In some systems, the boxes to be filled in might be highlighted to make it clear to the user where the data is to be inserted. There can be a button that the user clicks when the information is to be processed, such as the submit button show at 1204 in FIG. 12) or the information can be processed as it is entered into each specified area for data entry, or when the cursor moves to the next data entry field. The form-based screens of the type shown here can also have functionality to check that data being entered is sensible before allowing the user to move to the next data entry field. Such a form-based user-configurable system (also sometimes referred to as a template-based system) makes it much easier to guide a user through the tasks needed to manage processing plant information without the user needing to write computer code. In this way, the processing plant or plants can be defined; data can be logged; and reports and/or charts can be generated without requiring any custom code for a specific plant or set of plants belonging to an organization.

For all examples, the edit modules emulate the 'add new' modules in that both display identical fields. However, the edit modules are self-populated by the data displacement element allowing the user to edit and update information in each field before saving modifications into the database by clicking the Save or Submit button.

Once the user has been authenticated and authorized access to the web server application, the User and Organization Permission Component sets User Access Filters (511) for each one of the remaining five components (512, 513, 514, 515 and 516). On the initial user login command, the web server application will automatically access the User Home Page Component (522) and provide the user with a page display response (523) that could be either the default view, which is the User Home Page Selection Module (FIG. 99) or the personalized user dashboard view set by the user in the Dashboard Management Modules (FIGS. 104,105, 106 and 107).

When the first screen is displayed, the user will view relevant key information and will be able to access all user home page functionalities and web server application components using the navigation links displayed on the screen by simply clicking the relevant link. Hence if the user is looking to access the Define Component of a specific facility, the user will click on the Define Component link. The access request signal is sent to the web server application through the web (503). Within the User and Organization Permission Component, the request is redirected (524) to the appropriate user access filter (511), which in this case would be the Define User Access filter (513). If the user is authorized to access the Define Component (519), the user display message sent by the web server application back to the user will be the Define Component/Plant Selection/Plant Listing and Selection Modules (FIG. 30), which will only display those facilities for which the user has access in the Define Component. If the user is not authorized to access the Define Component, the web server application will display a denial message using the page display (523) and give the option to the user to access other components.

The number of cycles and combination can be extensive depending on the number of facilities managed by the web server application and the number of users within the specified organization. Under the present configuration the system disclosed here provides its users with a secure platform where all key operational data can be stored, accessed and analyzed. Data stored can be as numeric and text-based values. The system disclosed here also provides the ability to store files, images, documents of all formats, which can be accessed by authorized and authenticated users.

In conclusion, the User and Organization Permission Component in FIG. 5 is a key component of the security and information management of the web server application. All tasks and requests are channeled through the user access filters, which in turn can be modified at any time by Authorized Users, through a series of clicks. The following paragraphs will now focus on the remaining five components.

Figure 6:
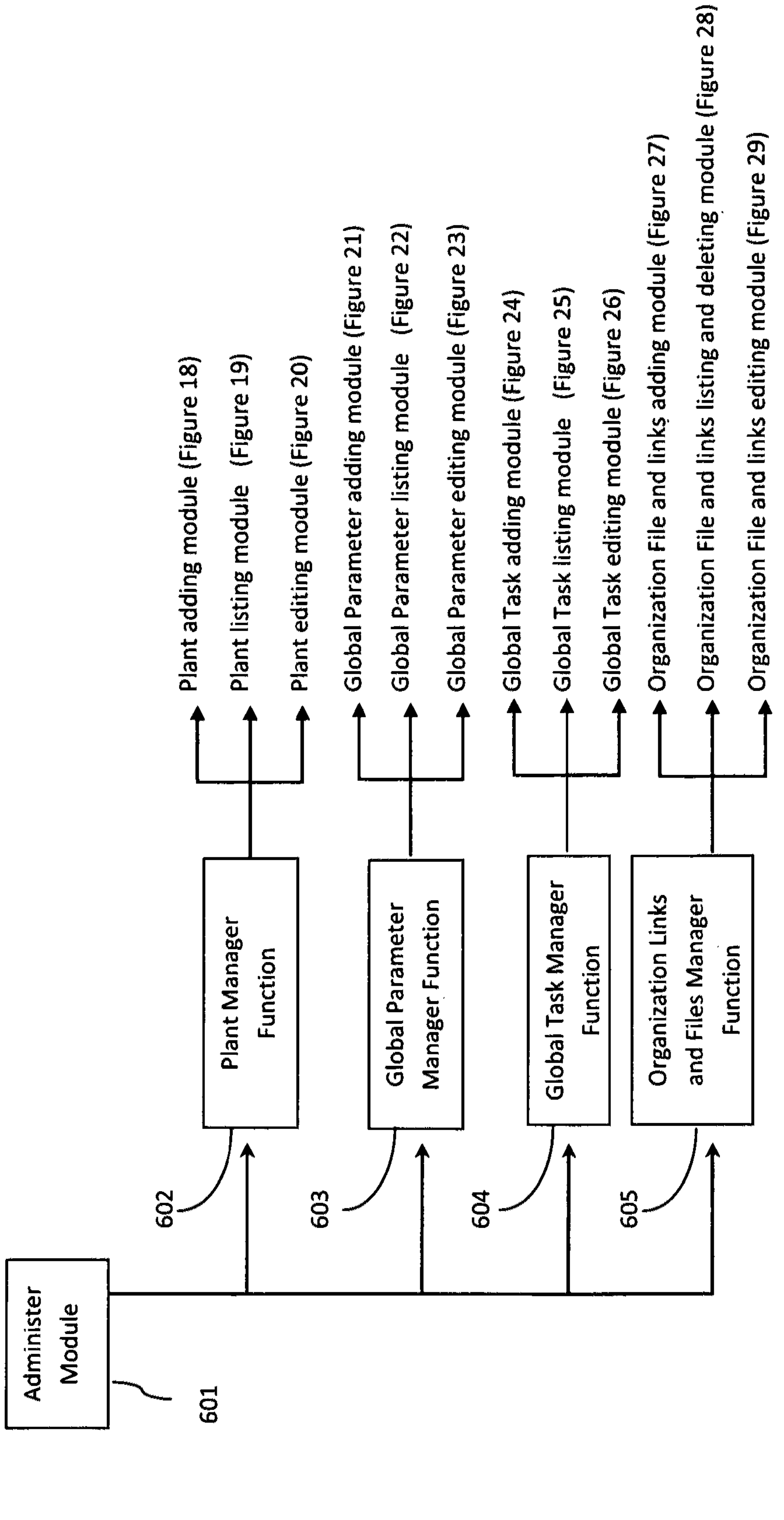
FIG. 6 illustrates the functionalities of the Administer Component.

FIG. 6 is a flowchart identifying the different functionalities and modules in the Administer Component (601). The purpose of the Administer Component is to provide Authorized Users within the specified organization with the ability to (a) add, list and edit plants or facilities under the Plant Manager Function (602), (b) add, list and edit global parameters under the Global Parameter Manager Function (603), (c) add, list and edit global tasks under the Global Task Manager Function (604), and (d) add, list and edit links and files under the Organization Links and Files Manager Function (605). The component comprises a total of 12 modules, which can be grouped differently. Screen displays of these modules can be viewed in FIGS. 18 through 29.

As it was presented in FIG. 1 and FIG. 5, the Administer Component is related to all of the other components within a specific organizational account. For example a new facility can be created using the modules under the Plant Manager Function (602) through the Add, List, and Edit Plant Modules . . . . Global or organization wide parameters are managed under the Global Parameter Manager Function (603) through the Add, List, and Edit Global Parameter Modules.

Figure 7:
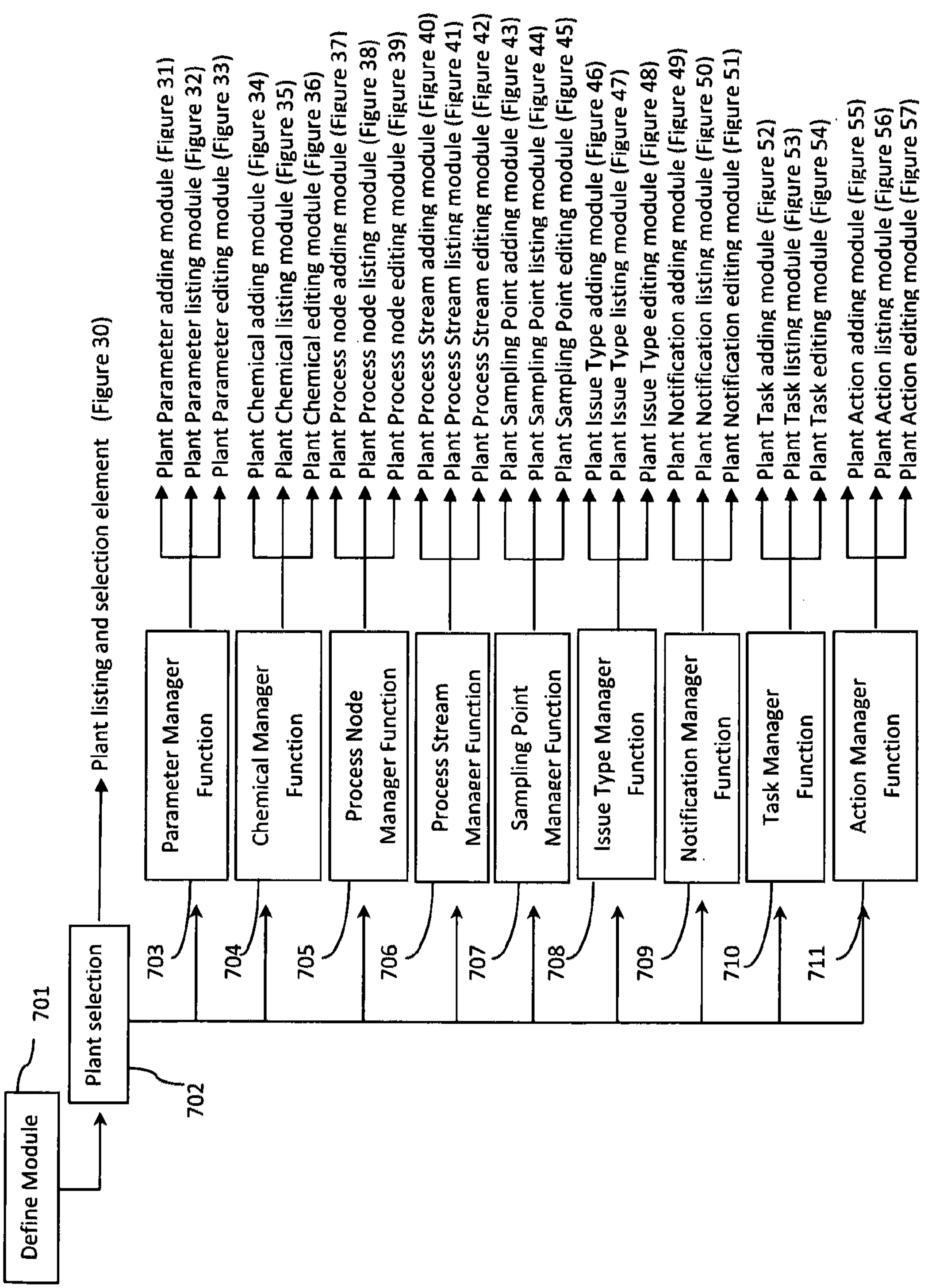
FIG. 7 illustrates the functionalities of the Define Component.

FIG. 7 is a flowchart identifying the different functionalities and modules in the Define Component (701). When accessing this component, Authorized Users within the specified organization are prompted to the Define Component Plant Selection Module (702). Under the User and Organization Permission Component configuration, the Authorized User will only be prompted to those facilities to which the user has access.

The purpose of the Define Component is to organize and identify all key information that will be used by the web server application to organize the database. The information captured can be grouped into two large categories: operational and managerial. Under the operational category are functionalities and modules required to manage plant data and plant information, which are comprised of (a) the Add, List and Edit Plant Parameter Modules under the Parameter Manager Function (703), (b) the Add, List and Edit Plant Chemical Modules under the Chemical Manager Function (704), (c) the Add, List and Edit Plant Process Modules under the Process Manager Function (705), (d) the Add, List and Edit Plant Process Stream Modules under the Process Stream Manager Function (706), (e) the Add, List and Edit Plant Sampling Point Modules under the Sampling Point Manager Function (707), and the Add, List and Edit Plant Issue Type Modules under the Issue Type Manager Function (708).

Figure 8:
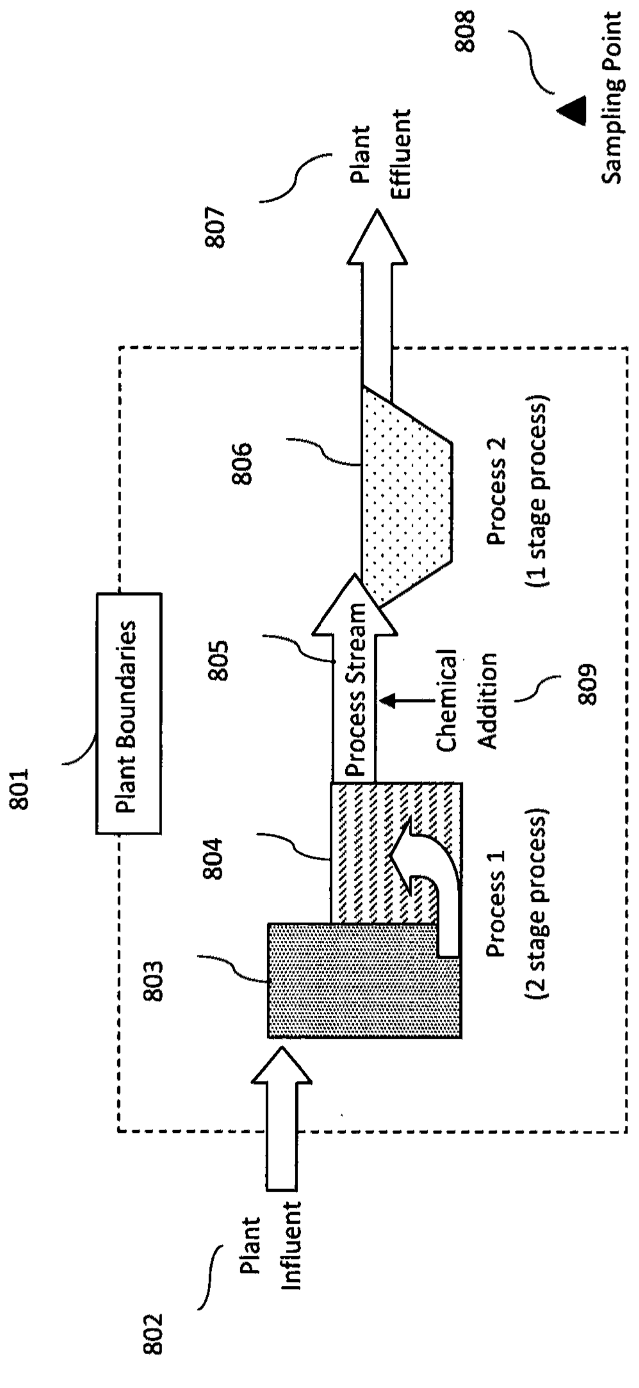
FIG. 8 illustrates key Modules under the Define Component.

FIG. 7 illustrates how the different plant components fit together. This classification is a core contribution to the computer based application data management architecture. The Define Component user is able to define, review or edit all key components and parameters. The only function not discussed in FIG. 8 is the Issue Type Manager Function. Using this function, the Plant Manager can track non-conventional operating parameters such as energy consumption, maintenance cost or any other parameter which do not fall under the other more conventional physical-chemical parameters. Screen displays of these modules can be viewed in FIGS. 31 through 48.

The second category identified above includes all functionalities and modules required to actively manage the facility which includes (a) the Add, List and Edit Plant Notification Modules under the Notification Manager Function (709), (b) the Add, List and Edit Plant Notification Modules under the Task Manager Function (710), ands the Add, List and Edit Plant Action Modules under the Plant Action Manager Function (711).

Plant notifications are messages automatically generated by the system disclosed here. In the Define Component, the Authorized User defines the triggers and the recipient of the notification. Under the Task Manager Function, the Authorized User builds a list of tasks which are then integrated under the Action Manager Function (711). The combination of these two functionalities provides the system disclosed here with a basic yet valuable workflow management tool. Similarly to the Notification Manager Function, the Action Manager Function issues messages to target users who may become accountable in the organization.

FIG. 8 is a diagram that depicts a generic elemental treatment or process facility (801) such as a drinking water treatment plant or a chemical plant. The plant consists of a collection of processes (803, 804, 806) and receives inputs in the form of raw materials (802) to be processed, and produces outputs (807) such as finished product. The general flow of the plant can be established as the inputs received to the plant are transformed in each process.

The system disclosed here provides a method to define such a plant by allowing an end-user such as a Plant Manager to create a plant project in a computer-based medium. Once the project is created, the method allows for creation of unit processes, which can be a multi-stage process (803, 804) or a single stage process (806), and further associate the unit processes to the newly created plant. By providing information on processes such as their placement order in the plant, the system disclosed here creates a computer embodiment of the actual plant, thus illustrating the actual placement of processes in the plant.

In addition to the processes, a plant also contains process streams (805) that carry material to and from the process. The raw material is typically carried to the first process in the plant, and the finished material after transformation exits from the last process in the plant. Each process can receive one or more streams, and also generate one or more streams that may either enter another process or be discarded or used as waste material or as a potential product. By providing information on process streams such as their upstream and downstream process and other details, the system disclosed here creates a computer embodiment of the actual plant, illustrating the actual flow of material in the plant.

The system disclosed here allows the user to define the type of information that is logged during the normal operation of a plant. These include flow, temperature and other information that describe the process or process stream. The approach provides a method to set the scope of the parameters, thus limiting or expanding the use of parameters to the plant, processes and process streams. By providing information on parameters, the system disclosed here creates a computer embodiment of the actual plant, illustrating the actual monitoring of the transformation of material as it moves through the plant.

The system disclosed here also allows the user to define the type of chemicals (809) that are used during the normal operation of a plant. These include chemicals that are added to processes and process streams in order to alter the chemical behavior of material to improve efficiency of plant production. The approach provides a method to set the scope of the chemicals, thus limiting or expanding the use of chemicals in certain processes and process streams. The system disclosed here provides information on the chemicals and monitors the actual transformation of material as it moves through a plant where additional chemicals are used.

Sampling points (808) that are points outside or inside the plant boundaries can also be defined in the system disclosed here. Sampling points are used to monitor a specific point that can be subject to cross-utility analysis or that may be critical from an operational, regulatory or management point of view.

FIGS. 30 through 57 are sample screenshots of the system disclosed here, providing additional information on how to define key components of the plant.

Once the Authorized User has defined the plant, its processes, process streams, parameters and chemicals, and establish the scope of how parameters are monitored and chemicals used, operational information can be collected and stored in the database. Individual plant users or third party service providers can store data, automatically, manually or semi-manually through a type of data upload process.

Figure 9:
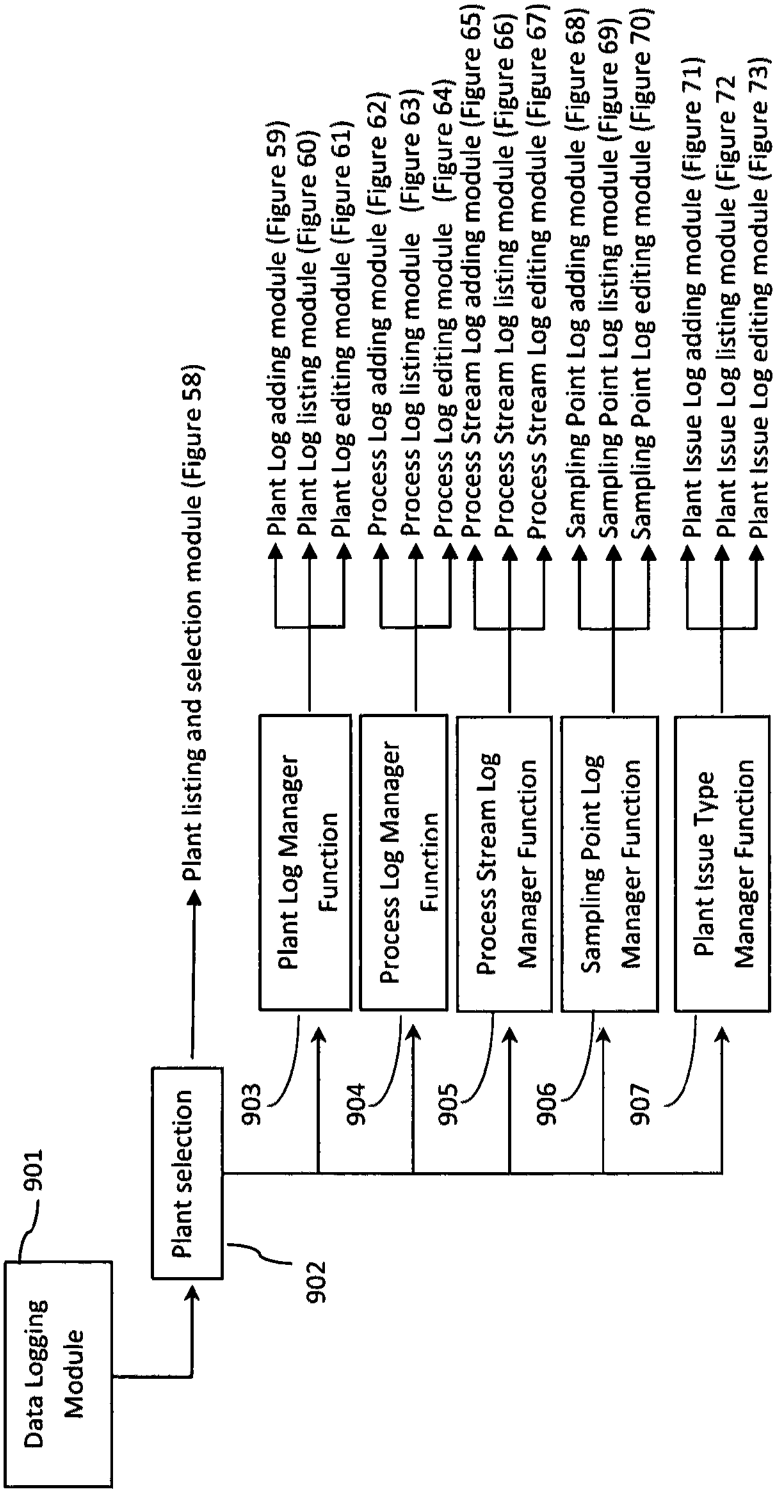
FIG. 9 illustrates the functionalities of the Data Logging Component.

FIG. 9 is a flowchart identifying the different functionalities and modules in the Data Logging Component (901). When accessing this component, Authorized Users within the specified organization are prompted to the Data Logging Component Plant Selection Module (902). The Plant Selection Module will only display those plants or facilities to which a user has access. Those permissions are set in the User and Organization Permission Component.

The purpose of the Data Logging Component is to capture the information and data viewed as critical for the Plant or Area Manager. Under the system disclosed here, the Plant Manager can log operational information in various formats such as numeric; text-based, audio or visual information. The Plant Manager also has the ability to attach other relevant computer files, such as documents and spreadsheets. The system disclosed here is able to accept data from a wide range of sources. For example, data can be captured on site by the operator or by using on-line monitors. Data can also be imported using off-site sources such as laboratories or data upload. At all times, Authorized Users can review and edit the data. Any changes made to the data are recorded by the system disclosed here and can be reviewed by the Administrator or the Super Administrator.

Among the key functionalities and modules associated with the Data Logging Component are (a) the Add, List and Edit Plant Log Modules under the Plant Log Manager Function (903), (b) the Add, List and Edit Process Log Modules under the Process Log Manager Function (904), (c) the Add, List and Edit Process Stream Log Modules under the Process Stream Log Manager Function (905), (d) The Add, List and Edit Sampling Point Log Modules under the Sampling Point Log Manager Function (906), and (e) the Add, List and Edit Plant Issue Log Modules under the Plant Issue Log Manager Function (907).

The terms Plant Log, Process Log, Process Stream Log, and Sampling Point Log used in the previous paragraph are referenced in FIG. 8 and available in Define Component. Additional information regarding the different modules under the Data Logging Component is provided in FIGS. 58 through 73.

Once data has been stored in the database, the Authorized User is able to run queries on these data and produce reports and charts. Another option is to integrate the information into pre-defined models or forms, which would have been approved by the Super Administrator or the Administrator. The approach allows for individual plant users or third party service providers to access the data, automatically, manually or semi-manually by using pre-developed reports or queries.

Figure 10:
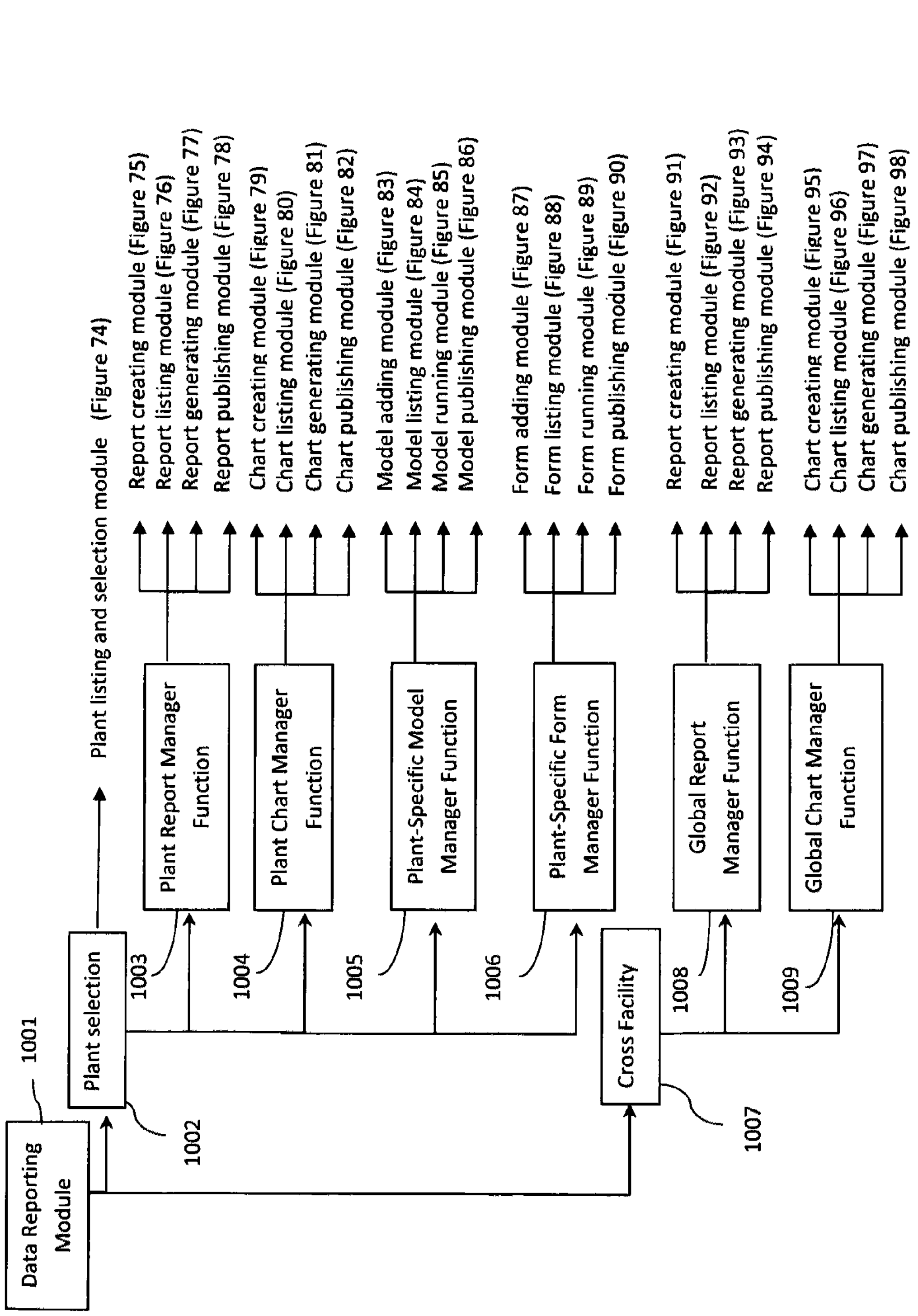
FIG. 10 illustrates the functionalities of the Data Reporting Component.

FIG. 10 is a flowchart identifying the different functionalities and modules under the Data Reporting Component (1001). When accessing this Component, Authorized Users are prompted to the Data Reporting Component Plant Selection Module (1002). The Authorized User within the specified organization will only be prompted to those facilities to which the user has access as defined in the User and Organization Permission Component.

The purpose of the Data Reporting Component is to allow Plant Managers and Area Managers to meet their reporting requirements using the different functionalities made available by the system disclosed here. In order to meet the reporting needs of both Plant Managers and Area Managers, the key functionalities and modules associated with the Data Reporting Component were divided into two large categories: plant-specific functions and cross-facility functions.

The plant-specific functions identify those functions and modules that allow the Plant Manager to focus on plant data. The modules listed in FIG. 10 include the following (a) Create, List, Generate and Publish Report Modules under the Plant Report Manager Function (1003), (b) Create, List, Generate and Publish Chart Modules under the Plant Chart Manager Function (1004), (c) Add, List, Run and Publish Plant Model Modules under the Plant-Specific Model Manager Function (1005), and (d) Add, List, Run and Publish Plant Form Modules under the Plant-Specific Form Manager Function (1005).

The cross-facility functions offer global parameters to allow the Area Manager to perform trending analysis across several facilities. The modules listed under FIG. 10 include the following (a) Create, List, Generate and Publish Report Modules in the Global Report Manager Function (1008) and (b) Create, List, Generate and Publish Chart Modules in the Global Chart Manager Function (1009).

Additional information regarding the different modules under the Data Reporting Component is provided in FIGS. 74 through 98.

The last Component is the User Home Page Component. The User Home Page Component is the only Component that all users within the given organization have access to. This Component allows the user to focus on what is essential to perform his/her duty. Hence it is through the User Home Page Component that notifications and action lists are displayed. The web server application can also issue notifications to e-mail addresses. The User Home Page Component also enables the user to view key information and update personal information when needed.

Figure 11:
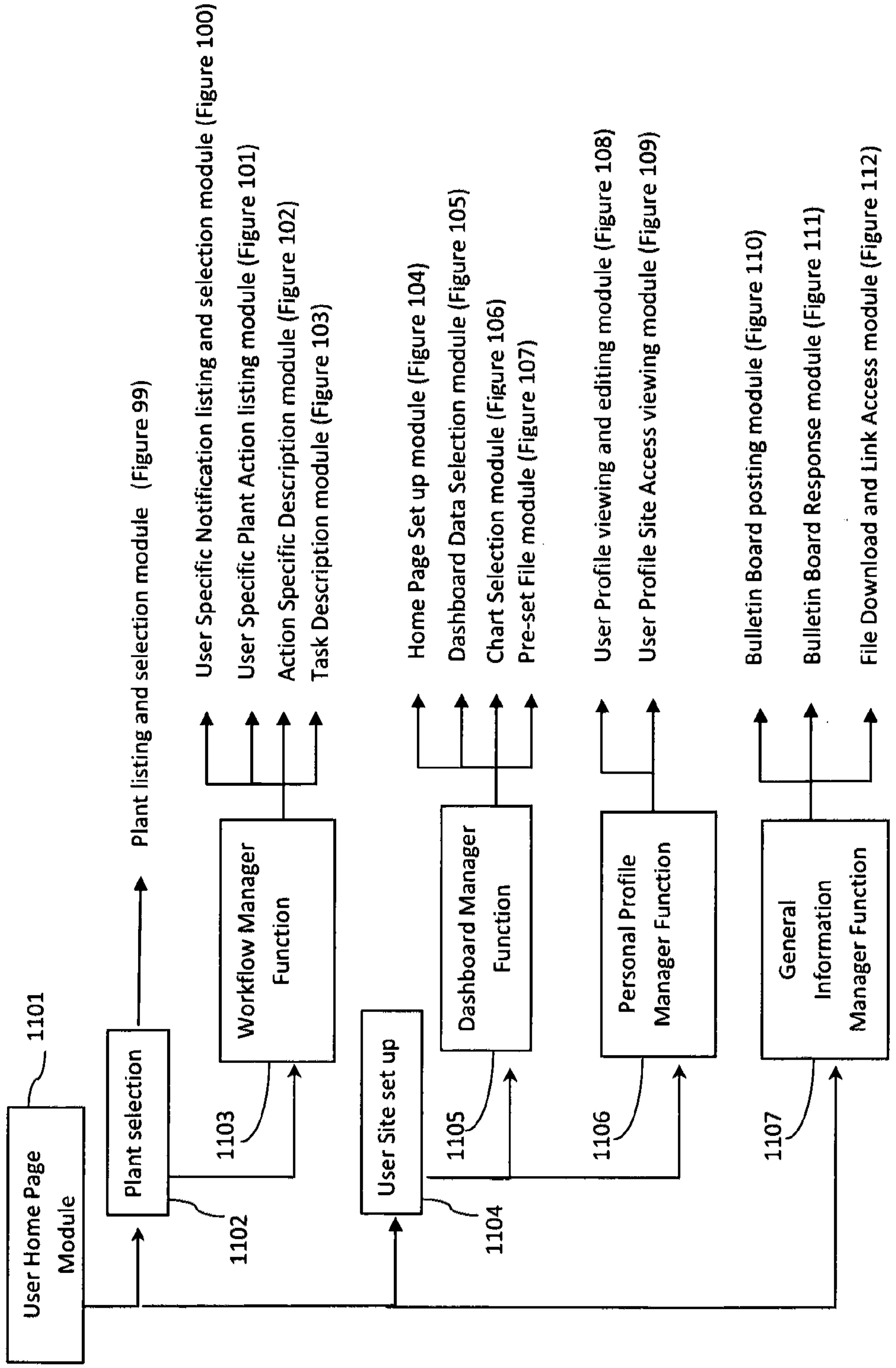
FIG. 11 illustrates the functionalities of the User Homepage Component.

FIG. 11 is a flowchart identifying the different functionalities and modules under the User Home Page Component (1101). When accessing this Component, Authorized Users are prompted to the User Home Page Component Plant Selection Module (1102). The Authorized User within the specified organization will only be able to view those facilities to which the user has access as set in the User and Organization Permission Component configuration. By selecting a plant, the user will be prompted to the Workflow Manager Function (1103), which is composed of four key modules (a) the User Specific Notification Listing and Selection Module, (b) the User Specific Plant Action Listing Module, (c) the Action Specific Description Module, and (d) the Task Description Module.

The remaining three functionalities relate to user-specific information. First, the Dashboard Manager Function (1105) relates to critical information that the user needs to track. The Dashboard Manager Function is formed of four modules (a) the Home Page Set Up Module, (b) Dashboard Data Selection Module, (c) Chart Selection Module, and (d) Pre-set File Module. The second function is the Personal Profile Manager Function (1106), which enables the user to update his or her information including the password set in the User and Organization Permission Component. The two modules that form this function are the User Profile Viewing and Editing Module and the User Profile Site Access Viewing Module.

The final function is the General Information Manager Function (1107). Through this function, the user can communicate to the organization and receive messages from the organization. This function is formed of three modules. The first two are the Bulletin Board Posting Module and the Bulletin Board Response Module . . . . The last module is the File Download and Link Access Module, which enables the user to download files or access links.

Additional information regarding the different modules under the User Home Page Component is provided in FIGS. 99 through 112.

The following sections describe the individual modules associated with the Components and functions presented in FIG. 1.

2—User and Organization Permission Component

The User and Organization Permission Component determines access to the application. The component utilizes a dual method of authentication and authorization to verify user access and provide the user access to the web server application. Simultaneously, Authorized Users within the specified organization have the ability to create Organization and User accounts. The following six modules are only accessible to the System Administrator, while the Super Administrator, the Administrator, the Area Manger and the Plant Manger will have the ability to add, list and edit new user accounts within the confines of their Organizational account.

The six modules in the User and Organization Permission Component are only accessible for Authorized Users. FIGS.

Figure 16:
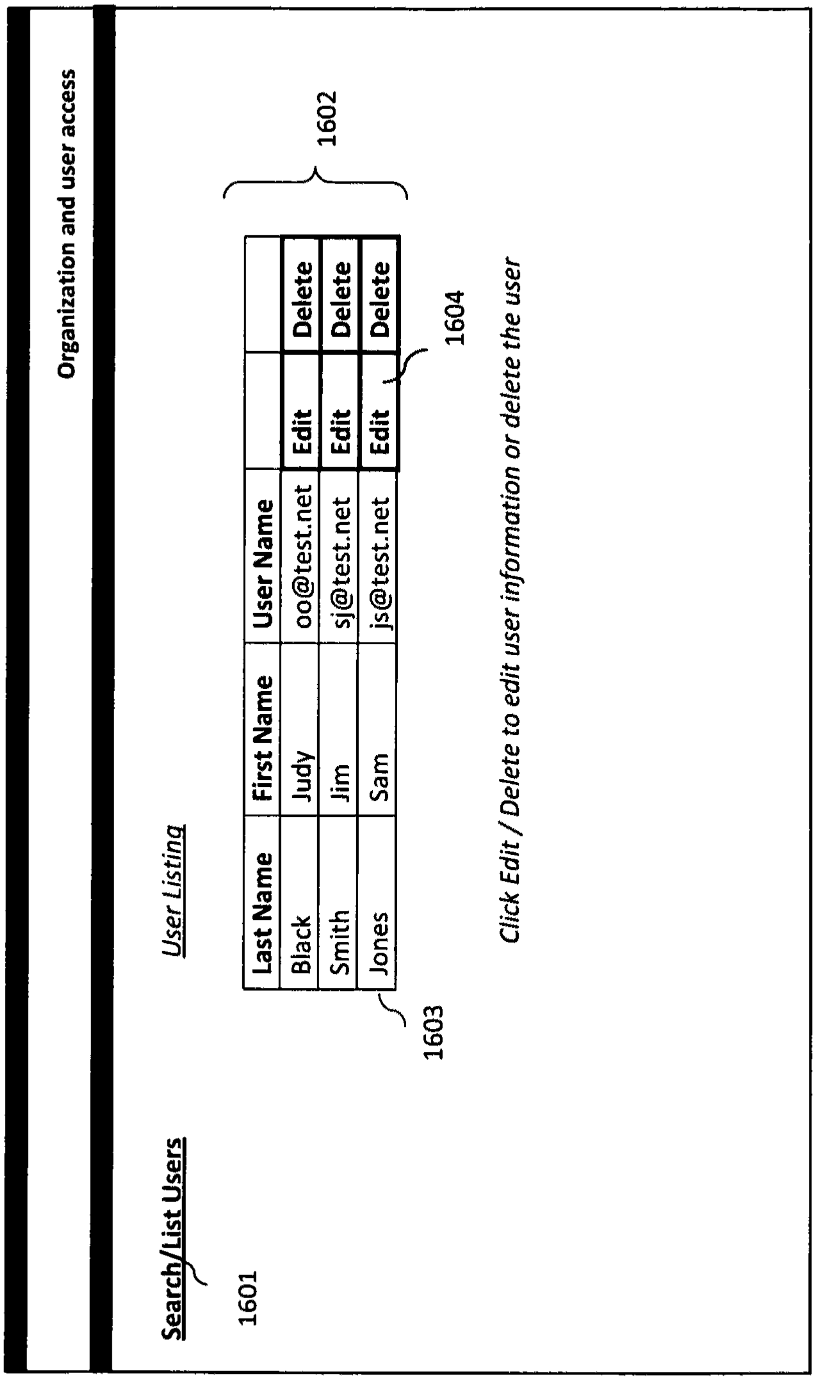
FIG. 16 is a display of a User Listing Module.
Figure 17:
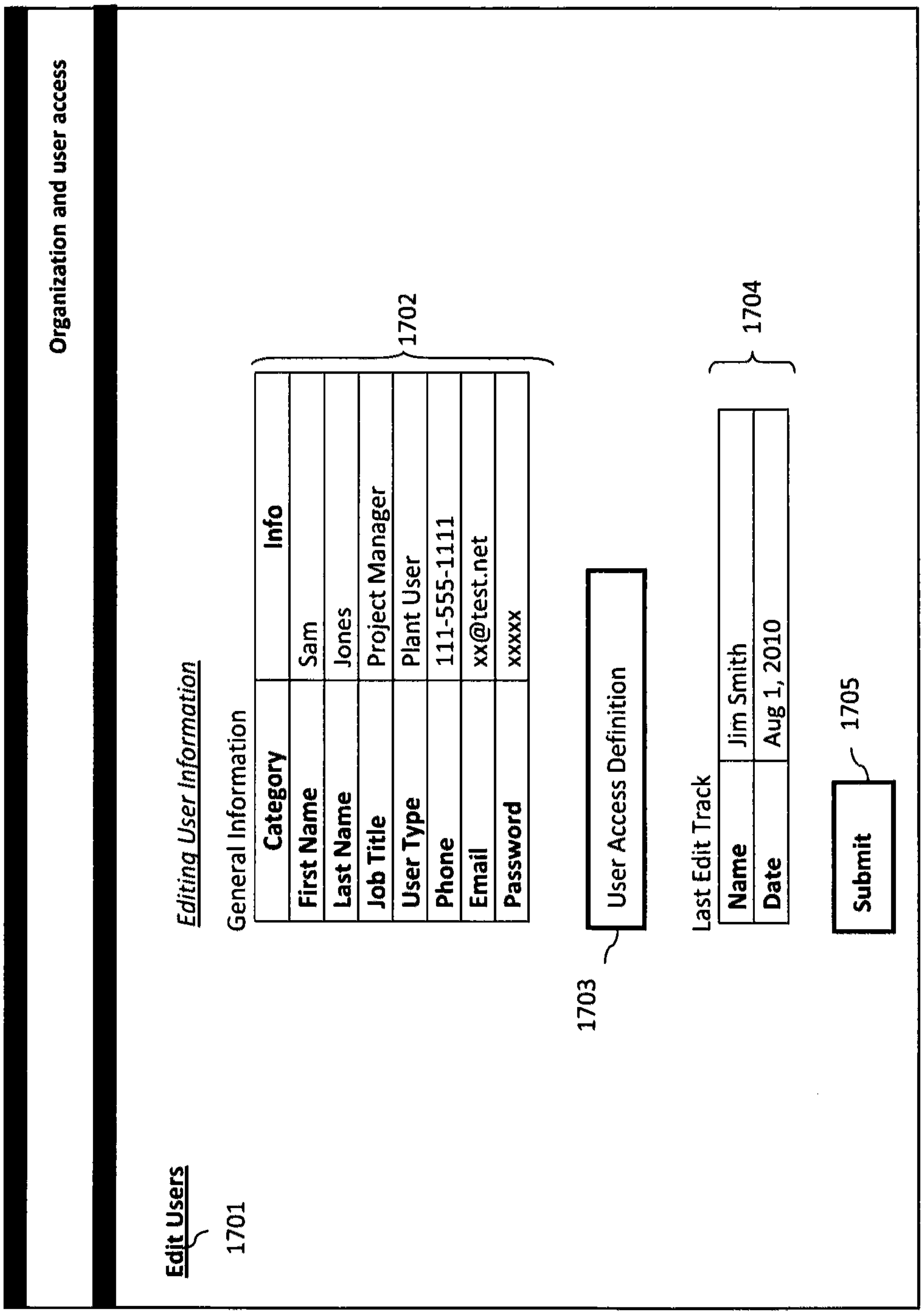
FIG. 17 is a display of a User Editing Module.

12 through 17 are screenshots of the six modules and are as follow: Add and Edit Organization (FIG. 12). Organization Listing (FIG. 13), Add User (FIG. 14), User Access Permission (FIG. 15), User Listing (FIG. 16), and User Edit (FIG. 17). By clicking on the component, a menu will appear with the linked modules, which are then each accessed by clicking on the individual module button.

The organization definition module is comprised of, but not limited to, a plant listing module and a users listing module. Under the system disclosed here, the users listing module is responsive to both a user definition module (add/edit) and a user functions listing module.

The process begins with the Authorized User creating a new organization account (FIG. 12). Connecting to the internet or intranet, the System Administrator accesses the form-driven user configurable computer implemented solution and clicks on the Organization and User Access tab, which will enable the user to view all the options he/she has access to. The user then clicks on the Add/Edit New Organization button on the left side of the screen (1201) and is provided with a self generated form (1202). This module defines the organization. The input fields (1202) are for organization name, organization contact person name, which will also be the Super Administrator for the Organization, the organization address, organization phone number, organization fax number, organization email address, and organization web address. Additionally, fields identifying the number of authorized plants and users are available for input. A comment or description may be added in the Organization description field (1203). The Submit button (1204) is selected when input is complete. This save button is responsive to user input, whereby the data movement element is capable of transferring the user-provided contents to computer memory in response to a signal and does not require user-supplied computer code to transfer. At this point, a new organization is created and stored in the database.

FIG. 13 illustrates the screen display for the Organization Listing module or Organization module. This module is accessed by clicking on the Organization button on the left side of the page (1301). This screen display allows the System Administrator to edit or delete a particular organization's information. The self generated Organization Listing table (1302) lists the organizations currently set up in the application organized by name and particular details. Note that per the example, XYZ Corporation (1303) has been added to the Organization Listing. Clicking Edit button (1304) launches the screen in FIG. 12, while clicking on the delete button would delete the entry. Clicking the Edit button under the Plant List column (1305) will open the plant listing module for that specific organization (see FIG. 19), while clicking on the Edit button under the User List column (1306) will open the user listing module for that specific organization (see FIG. 16).

Figure 14:
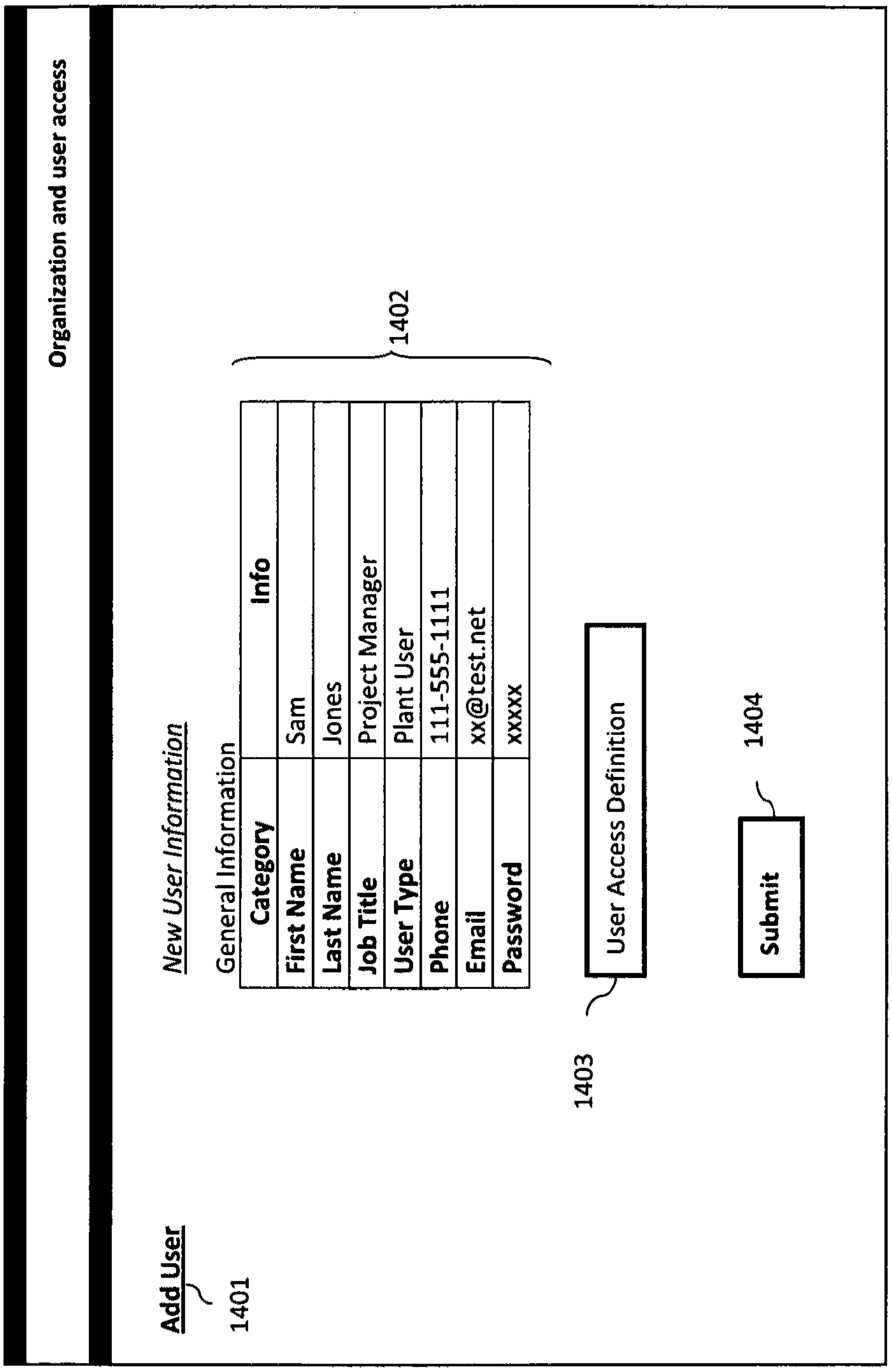
FIG. 14 is a display of a User Adding Module.

Once the Organization is created, the organization super administrator is able to create new users for that specific account. FIG. 14 illustrates the screen display for Add User, where the Authorized User inputs new user information; for this example, the new user is Sam Jones. To access this module the user clicks on Add User button (1401) on the left side of the screen and is provided with a self generated form (1402). The fundamental input fields are user login name, login password, contact, location address, phone and fax numbers, and email address. The Authorized User is able to define the user's access to the different modules of the application by clicking on User Access Definition (1403). Once the input is complete, the Authorized User selects the Submit button (1404) to transfer the data to the database by use of a data transfer element.

Clicking User Access Definition button (1403) opens a window and activates the user functions listing module. Illustrated in FIG. 15, User Access Permission (1501) is where the Authorized User configures component module permission for a new user, one plant at a time, under the specified organization account. Under the User Information Table (1502), the system disclosed here confirms the user's name for which the Authorized User is defining the web server user access. In the case of the example presented in FIG. 15, the name of Sam Jones is confirmed.

To select the plants that the user will have access to, a selection will be made from the Plant Selection drop-down menu (1503). The content in the drop-down menu will be determined by the Authorized User, who will also determine the number of facilities that the user will have access to. For example, if the system was set for three plants (#1, #2, #3), and the Authorized User was an Administrator, the Plant Selection drop-down menu would offer four choices: Plant #1, Plant #2, Plant #3, or All. In the example, the Authorized User selected Plant #1. If the Authorized User accessing this window was the Plant Manger of Plant #1, the Plant Selection drop-down menu would contain only one choice: Plant #1. This adjustment is performed by the computer-implemented application through the User and Organization Permission Component Authorization Module.

To define Sam Jones's access level, the Authorized User has access to the Access Level drop-down menu (1504); the choices under this drop-down are dependent on the Authorized User access. In the case of an Administrator, the drop-down menu will offer five choices: Area Manager, Plant Manager, Superintendent, Operator or External User. In the case where the Area Manger is the Authorized User, the choices under the drop-down menu would be Plant Manager, Superintendent, Operator or External User. In the case illustrated in FIG. 15, the selected Authorized User level was set to Plant Manager. As a result of this choice the system disclosed here auto-populated the User Access requirements (1505) to match those of a Plant Manger, as defined in FIG. 4; the radio boxes being marked accordingly by the system's display element.

Some Authorized Users, such as Area Manager or Plant Manager, have the ability to override another user's access whenever warranted. This flexibility is particularly important in the case of an External User. The Authorized User may select to give access to all modules, access to specific modules or View-only rights. In this example, since a Plant Manager can create new user accounts, Add/Edit User Accounts (1506) is selected in FIG. 15. The content of the drop-down menu identified by the triangle at the right of the box will include a suite of user types consistent with the Authorized User's access.

Figure 15:
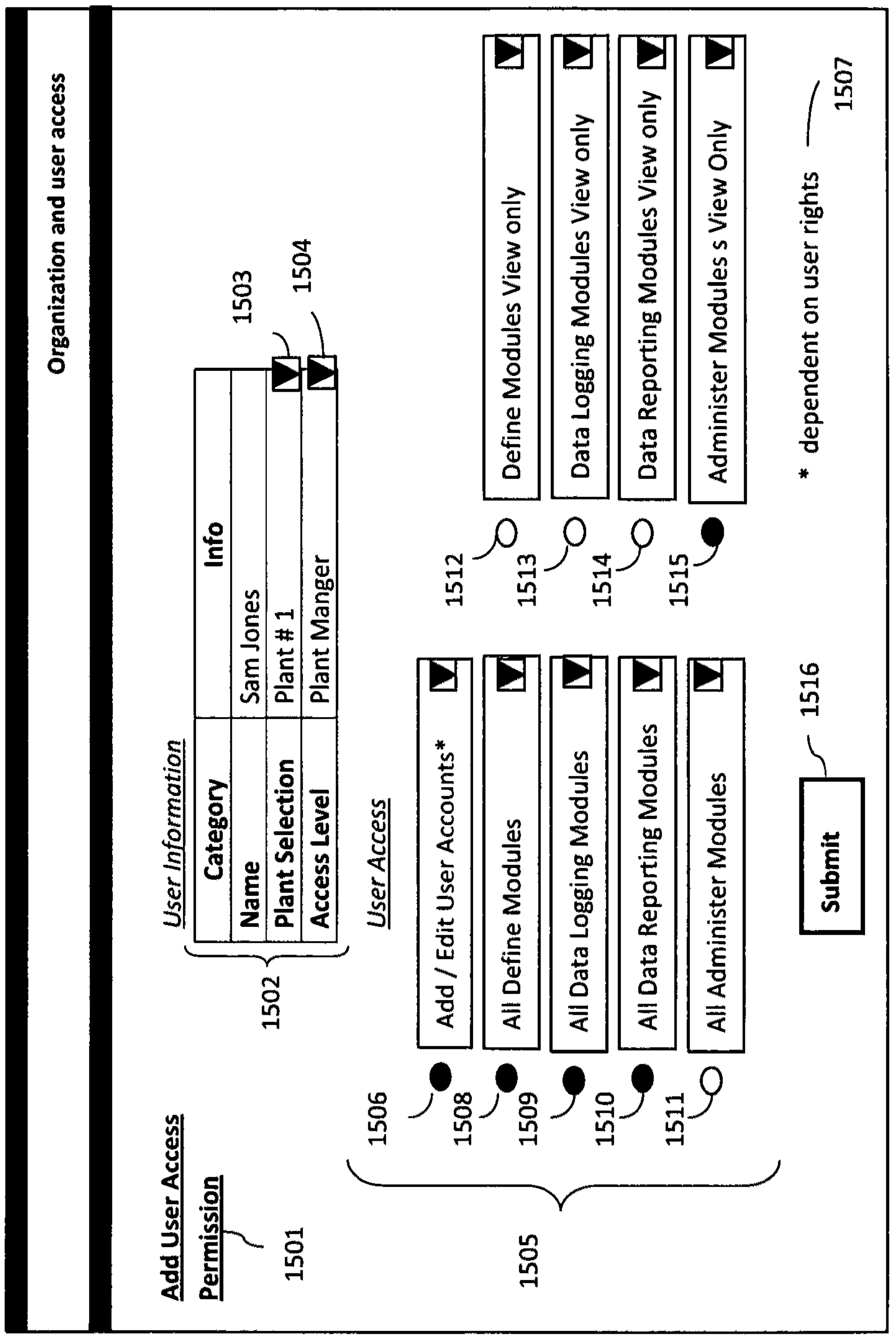
FIG. 15 is a display of a User Access Permission Adding Module.

The Define (1508), Data Logging (1509), and Data Reporting (1510) Modules have been selected, as indicated by the checked radio boxes next to the fields in FIG. 15. The choices in the corresponding drop-down menu are Add, List, Edit, or All modules. The Administer Component Modules (1511) have not been selected as indicated by the empty radio box because of the user's access level. In this case, Global Task Manager Function, Announcement Manager Function, Plant Manager Function, Global Parameter Function, and Links and Files Manager Function and their corresponding modules of Add, List, Edit, or All (function) modules would not be accessible to the user. The second column presents the View only for the all or any of the components. If the View only cells were selected by the Authorized User for the Define modules View only (1512) Data Logging Modules View only (1513), and Data Reporting Modules View only (1514), the choices in the drop-down menus would be Add, List, Edit, or All (Component) modules View only. The Administer Modules View only (1515) was selected, so the user is able to review all information in the Global Task Manager Function, Announcement Manager Function, Plant Manager Function, Global Parameter Function, and Links and Files Manager Function, but unable to add or modify any information. Clicking Submit button (1516) saves these settings, closes the window and returns to previous page in FIG. 14. In FIG. 14, Submit button (1404) is selected to save all input.

To provide access to another plant for this specific user account, the Authorized User would click a second time on the User Access Definition Button (1403) in FIG. 14, which in turn would open the User Access Definition Window (FIG. 15).

To access all users enrolled in the application for the organization's account, Search/List Users is required. FIG. 16 illustrates the screen display for Search/List Users (1601), which enables the Authorized User to review, edit or delete existing user information. This page is accessed by clicking on Search/List Users button on the left side of the page (1601). The User Listing table (1602) lists the users currently permitted to utilize the application organized by name and particular details. Based on the example above, Sam Jones (1603) has been added to the User Listing. Upon selecting Edit button (1604) from table, the Authorized User will be prompted to FIG. 17. FIG. 17 illustrates the screen display for Edit Users (1701), where the Authorized User is permitted to update general information (1702) and modify or update the user's application access (1703). The latest changes are logged identifying the name of editor and the date last modified (1704). Changes are saved upon selecting Submit button (1705).

Figure 108:
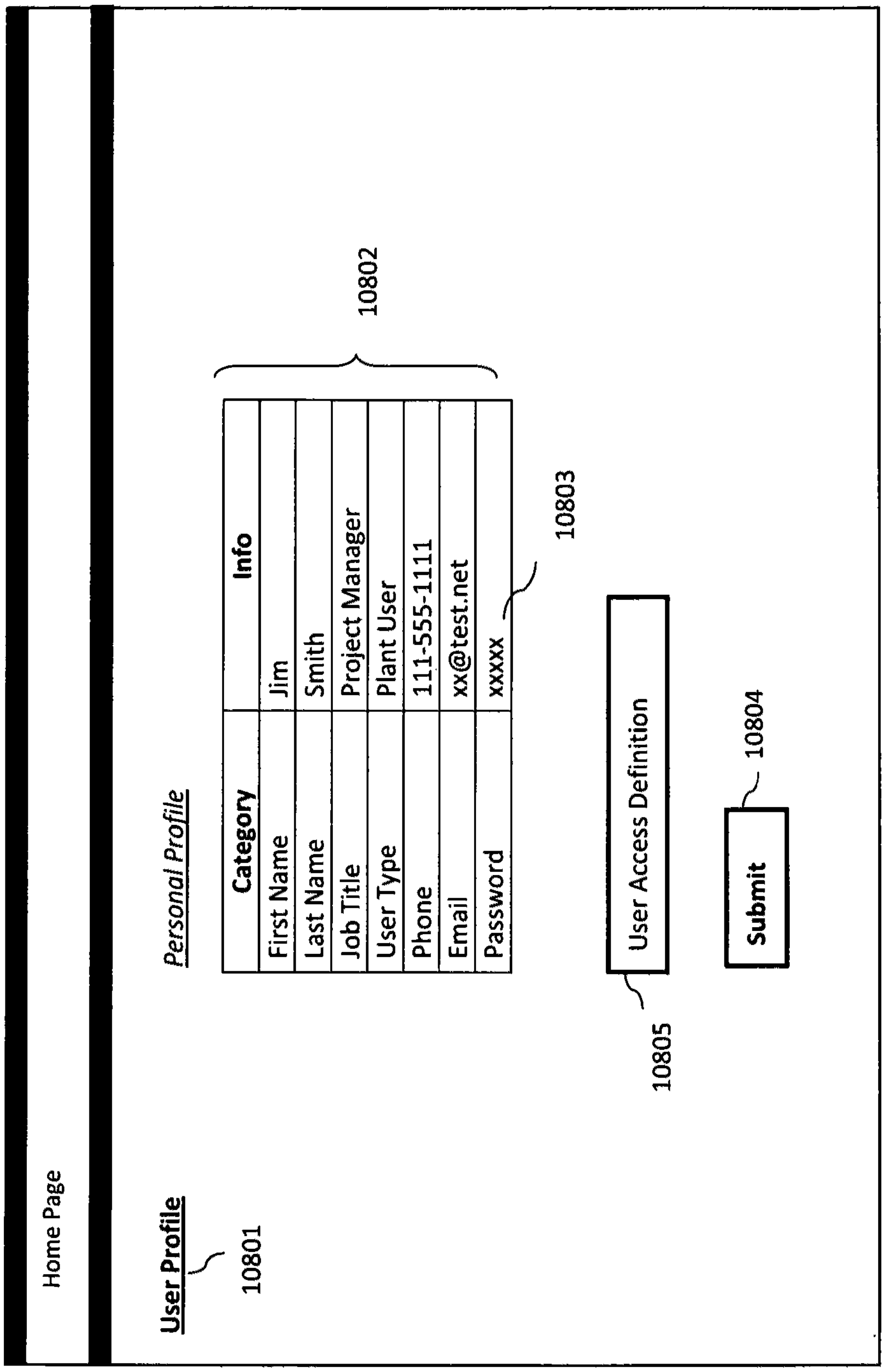
FIG. 108 is a display of a User Profile Viewing and Editing Module.

Individual users are able to update their personal information through the Home Page Component (see FIG. 108).

3—Administer Component

Figure 19:
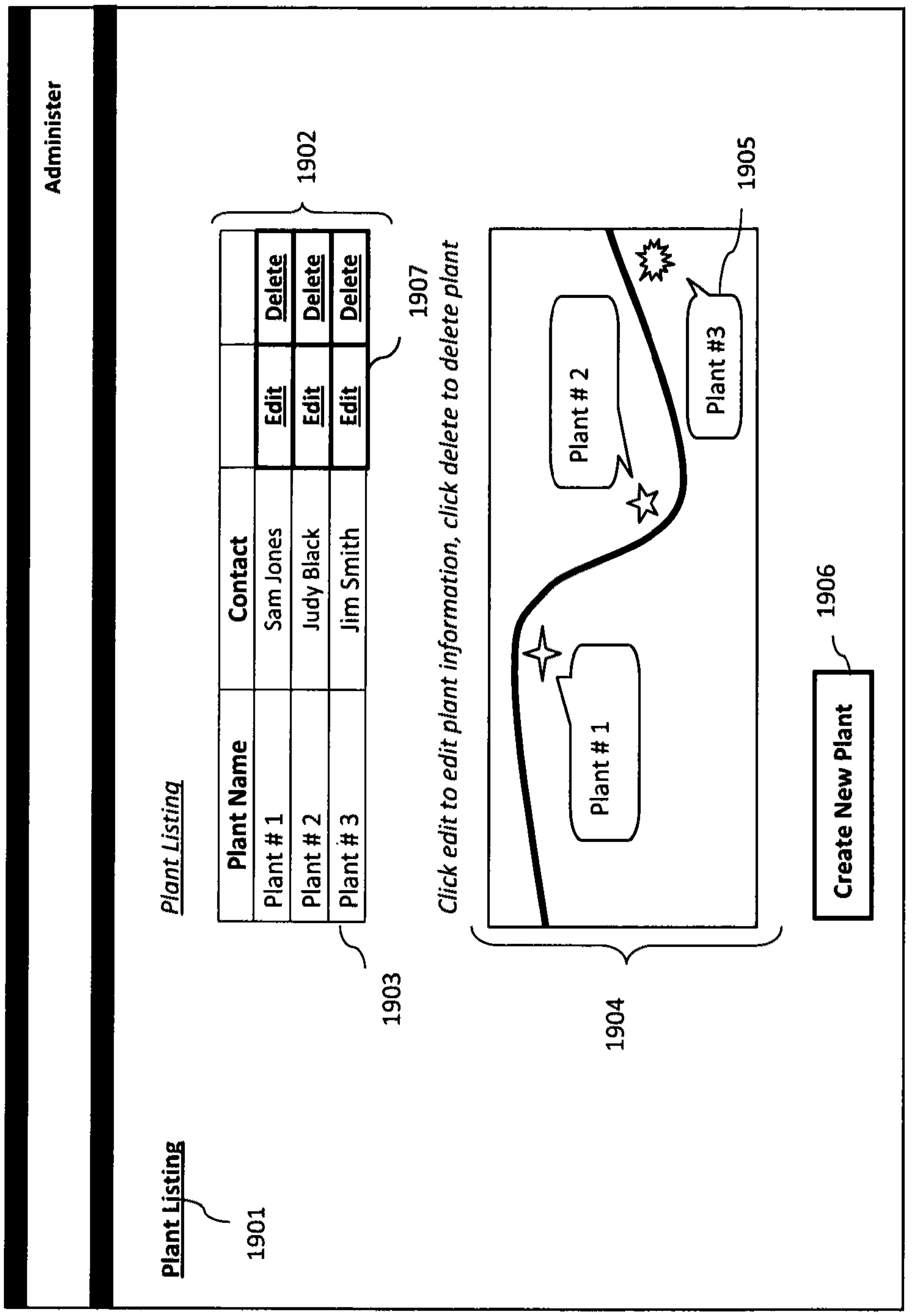
FIG. 19 is a display of a Plant Listing Module.
Figure 20:
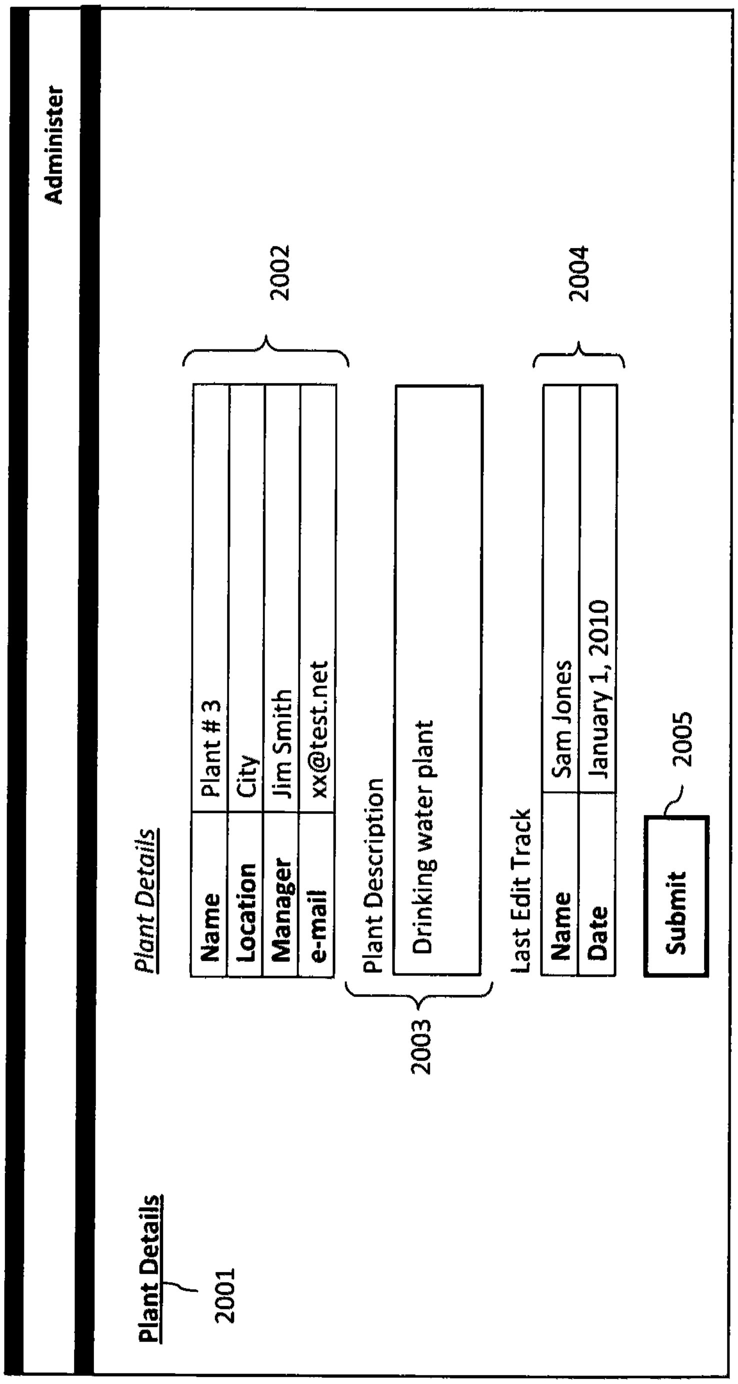
FIG. 20 is a display of a Plant Editing Module.
Figure 25:
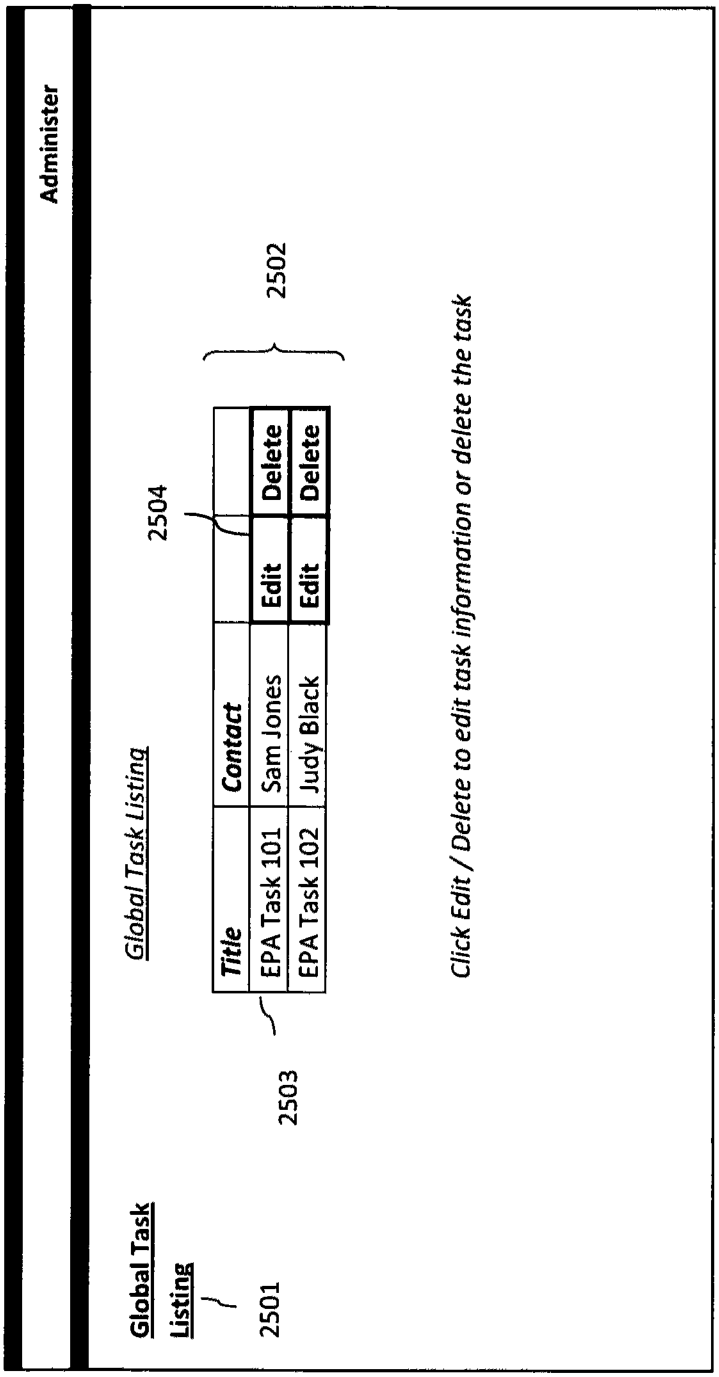
FIG. 25 is a display of a Global Task Listing Module.
Figure 26:
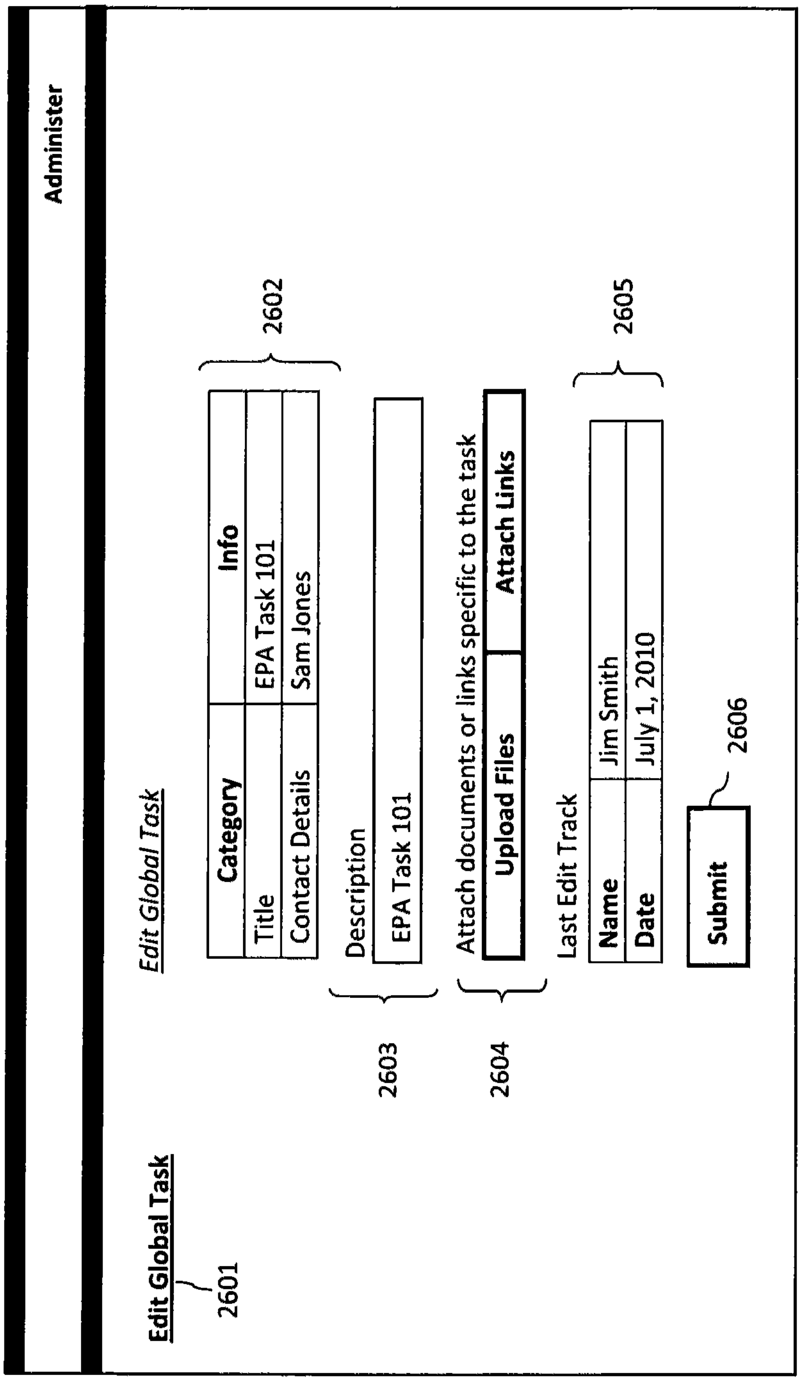
FIG. 26 is a display of a global Task Editing Module.

The Administer Component establishes the specified organization's structure for their facilities. There are five functions in the Administer Component that are only accessible for Authorized Users within the specified organization. The functions are comprised of, but not limited, to 3 modules and are presented in the following figures as screenshots of the Administer Component. The function and modules are as follow: Plant Manager Function Modules are Plant Adding (FIG. 18), Plant Listing (FIG. 19), and Plant Editing (FIG. 20); Global Parameter Function Modules are Global Parameter Adding (FIG. 21), Global Parameter Listing (FIG. 22), and Global Parameter Editing (FIG. 23); Global Task Manager Function Modules are Global Task Adding (FIG. 24), Global Task Listing (FIG. 25), and Global Task Editing (FIG. 26); Links and Files Manager Function Modules are Links and Files Adding (FIG. 27), Links and Files Listing (FIG. 28), and Links and Files Editing (FIG. 29). By clicking on the component, a menu will appear with the linked modules, which are then each accessed by clicking on the individual module button. Utilizing the system disclosed here; Authorized Users are able to set-up individual facilities under their organization and have the ability to assign specific managerial attributes for all facilities. The Administer Component can be used as a source for providing guidelines and tools for users to utilize for the tracking of pertinent data.

Figure 18:
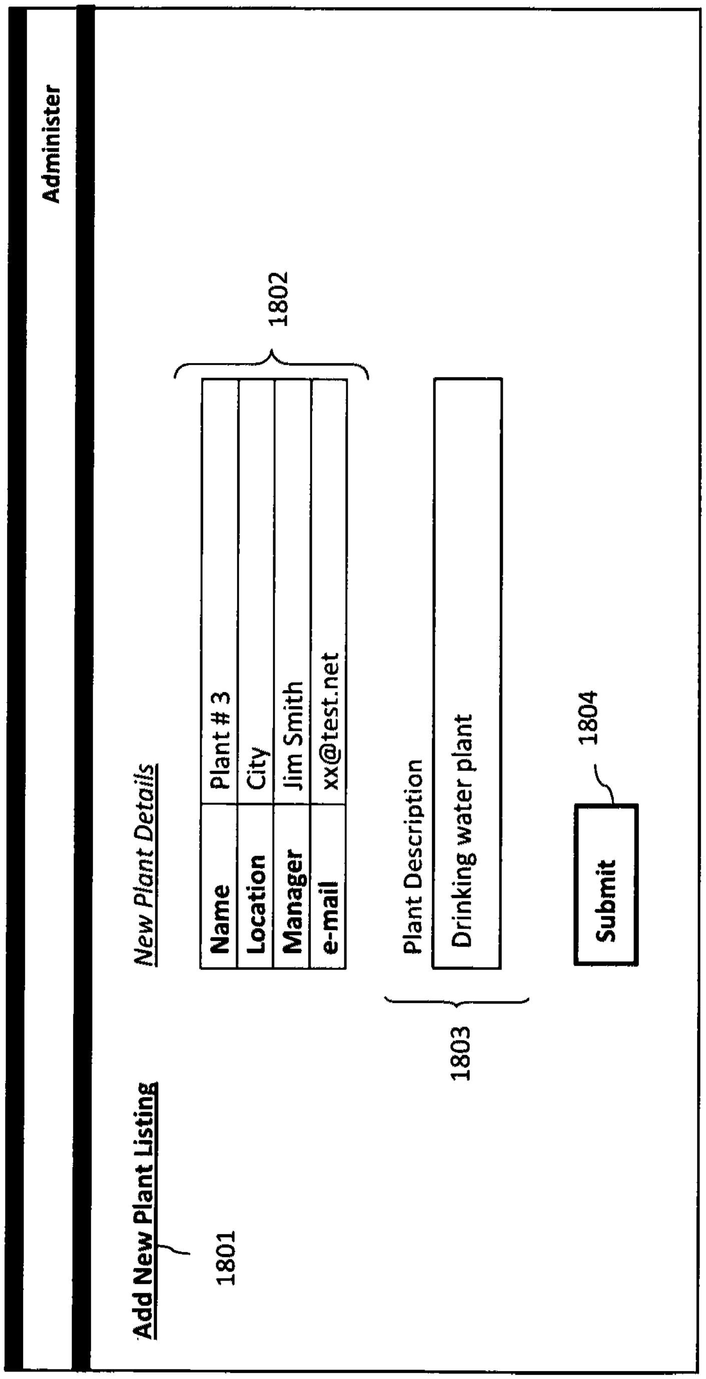
FIG. 18 is a display of a Plant Adding Module.

The process begins with the creation of a new plant for the organization. Authorized Users are provided with three options to navigate to the configuration page for a new plant. The first option is through the Define Component, which will be described in the following section. The second and third options are through the Administer Component in the Add New Plant Listing Module and the Plant Listing Module. FIG. 18 illustrates the screen display for Add New Plant Listing (1801) which enables the Authorized User to input new plant information into the application; Plant #3 is the example. The user clicks on the Add New Plant Listing button on the left side of the screen (1801) and is provided with a self generated form (1802). Particular field input on the form displayed will be required such as plant name, plant location address, plant phone and fax numbers, plant email and web addresses, and the plant contact person's name. Also default parameter fields require input for the new plant. These default parameters consist of plant flow unit, plant pressure unit, plant temperature unit, and the plant start date and history. This data is the predefined plant parameters utilized in the next sections. A comment or description may be added in the Plant Description field (1803). The Submit button (1804) is selected when input is complete. At that time, a new facility is created and stored in the database. FIG. 19 illustrates the screen display for Plant Listing (1901). This screen allows the user to review, edit or delete existing plant information. This page is accessed by clicking on the Plant Listing button on the left of the page (1901). The Plant Listing table (1902) lists the plants currently set up in the application for a specific organization by name and particular details. Note that per the example, Plant #3 (1903) has been added to the Plant Listing. A map (1904) provides the geographic location of all facilities. With the entry of the new plant, Plant #3, its location is pinpointed on the map (1905), which is auto populated by the system's display element. The user may click the Create New Plant button (1906) to add another plant under the same organization. This selection will navigate the user to FIG. 18, Add New Plant Listing to configure a new plant.

Clicking Edit button (1907) launches the screen in FIG. 20. This screen, Plant Details (2001), is where the Authorized User is permitted to update plant information in the Plant Details table (2002) and in the Plant Description field (2003) when warranted.

The latest changes are logged identifying the name of the editor and the date last modified (2004). Selecting Submit button (2005) saves the completed changes and transfers the data to the database by use of a data transfer element.

Figure 21:
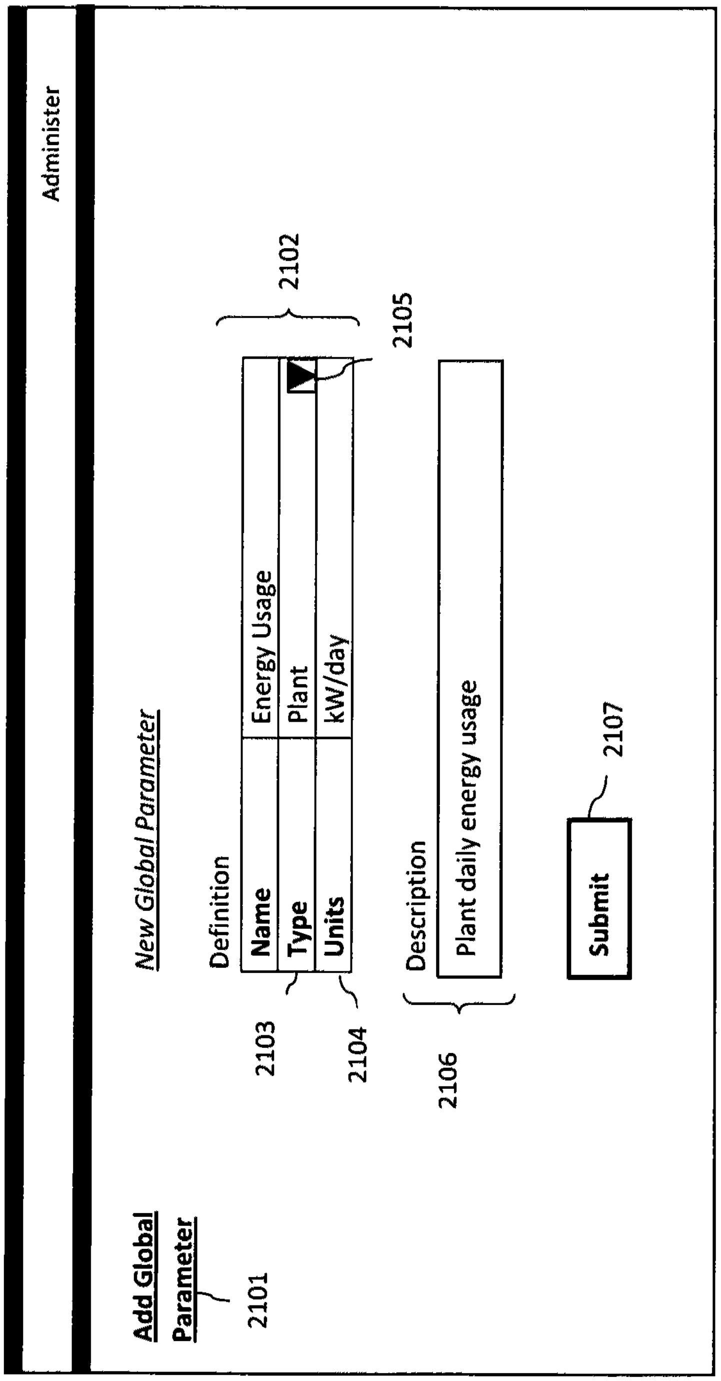
FIG. 21 is a display of a Global Parameter Adding Module.

FIG. 21 illustrates the screen display for Add Global Parameter, where the Authorized User sets new global parameters (2102), which are parameters that will be measured for all facilities within the organization. This module is a key feature in the organization definition module. Furthermore, this feature is also linked to the plant definition module, and the Log and Reporting Components. To access this module the user clicks on the Add Global Parameter button on the left side of the screen (2101) and is provided with a self generated form (2102). The form displayed will require input in the fields of the parameter name, type, units, minimum and maximum values, enforce minimum and maximum values, and any special operand. This data will be utilized in the next sections for the predefined organization parameters. The example of global parameter used in FIG. 21 is plant energy usage. When defining the Global Parameter the user will need to define two key criteria (1) the system type (2103) and (2) the units (2104). The Type field (2105) is a drop-down menu which provides the user with a choice of 5 options for the application. The Global Parameter could be applied to one of the following: at plant level, at process level, at process stream level, as an issue type or as a specific predefined sampling point; the user must select one of these 5 options.

In the example presented in FIG. 21, the new global parameter being introduced into the system is named "Energy usage"; the parameter will apply at the plant level and the units which are manually introduced are kW/day. To add further information on the Global Parameter being created, a Description field (2106) can be used. Click Submit button (2107) when input is complete.

Figure 22:
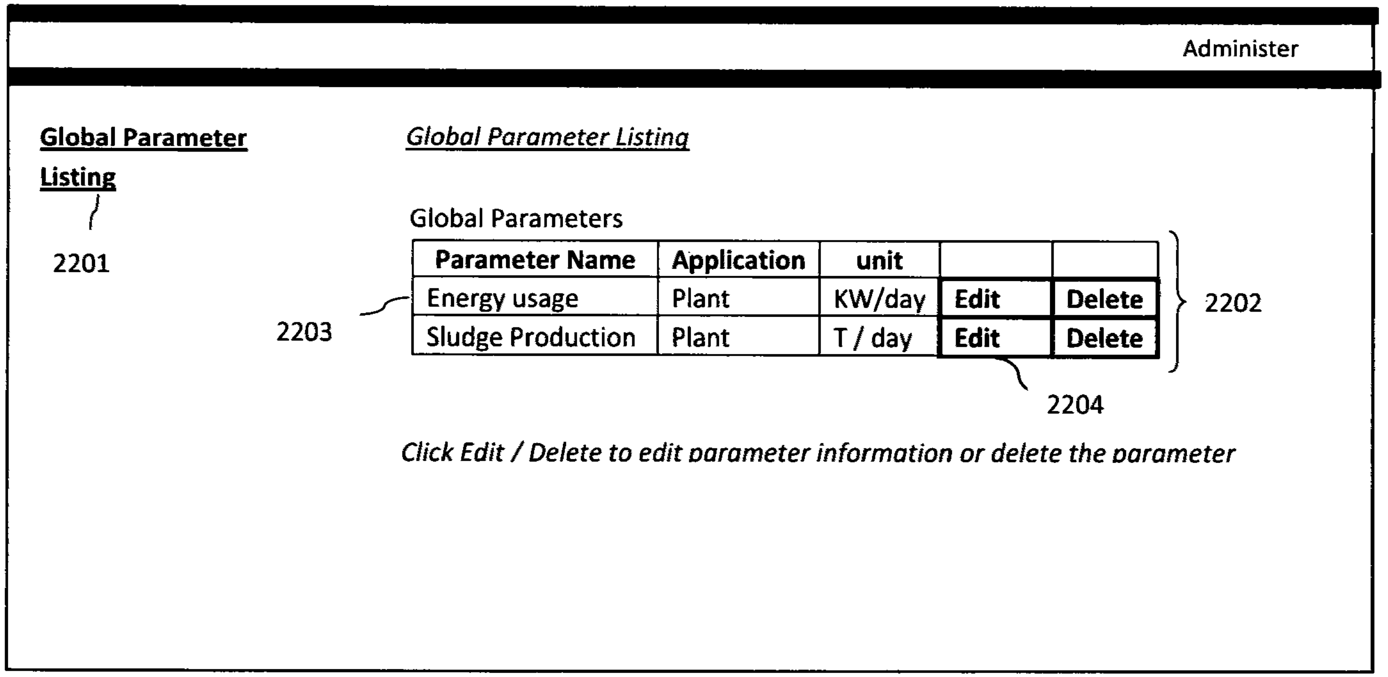
FIG. 22 is a display of a Global Parameter Listing Module.
Figure 23:
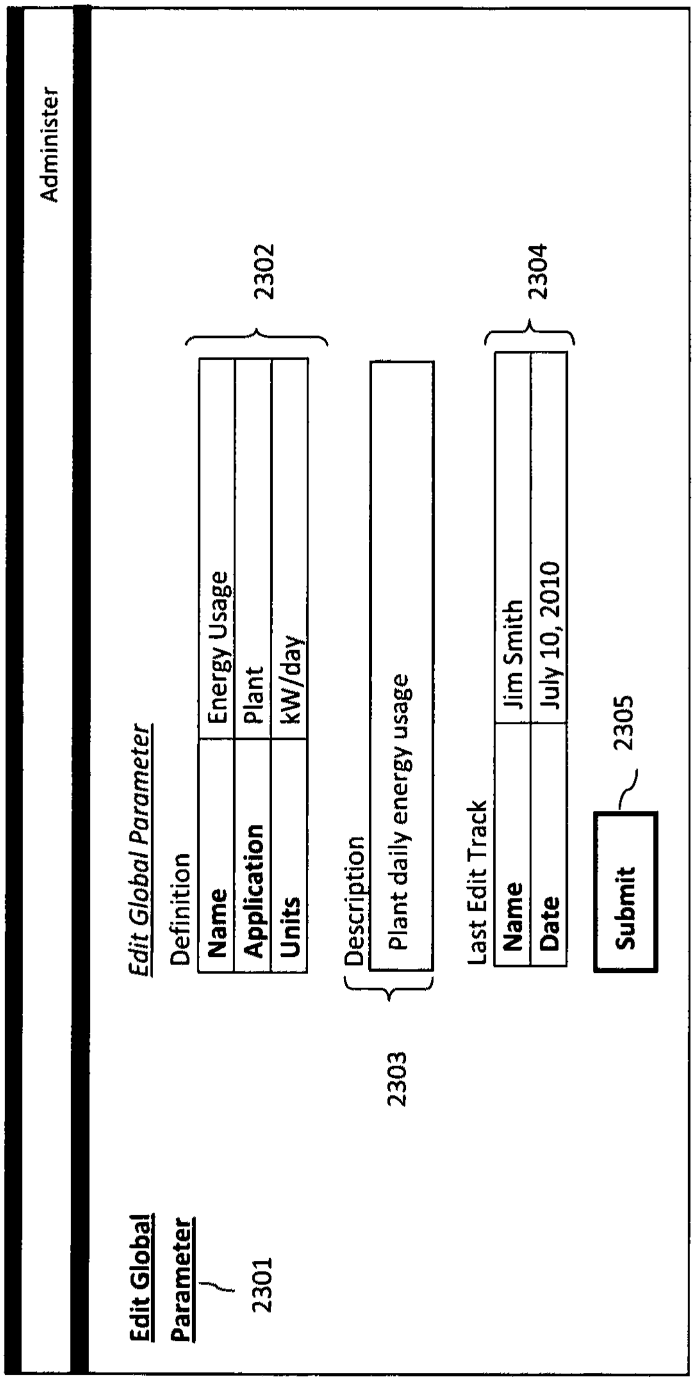
FIG. 23 is a display of a Global Parameter Editing Module.

FIG. 22 illustrates the screen for Global Parameter Listing module, which enables the Authorized User option to review, edit or delete existing organization parameters. This module is accessed by clicking on the Global Parameter Listing button on the left side of the page (2201). Global Parameters table (2202) lists the current organization parameters utilized for all facilities by name and description. Note that per the example, a new parameter, Energy usage (2203), has been added to the Global Parameter Listing. Selecting Edit button (2204) launches the Edit Global Parameter screen as illustrated in FIG. 23. On the Edit Global Parameter screen (2301), the Authorized User is permitted to update the Definition (2302) and the Description field (2303) when required. The latest changes are logged in Last Edit Track and identify the name of editor and the date last modified (2304). Changes are saved when Submit button (2305) is selected.

Figure 24:
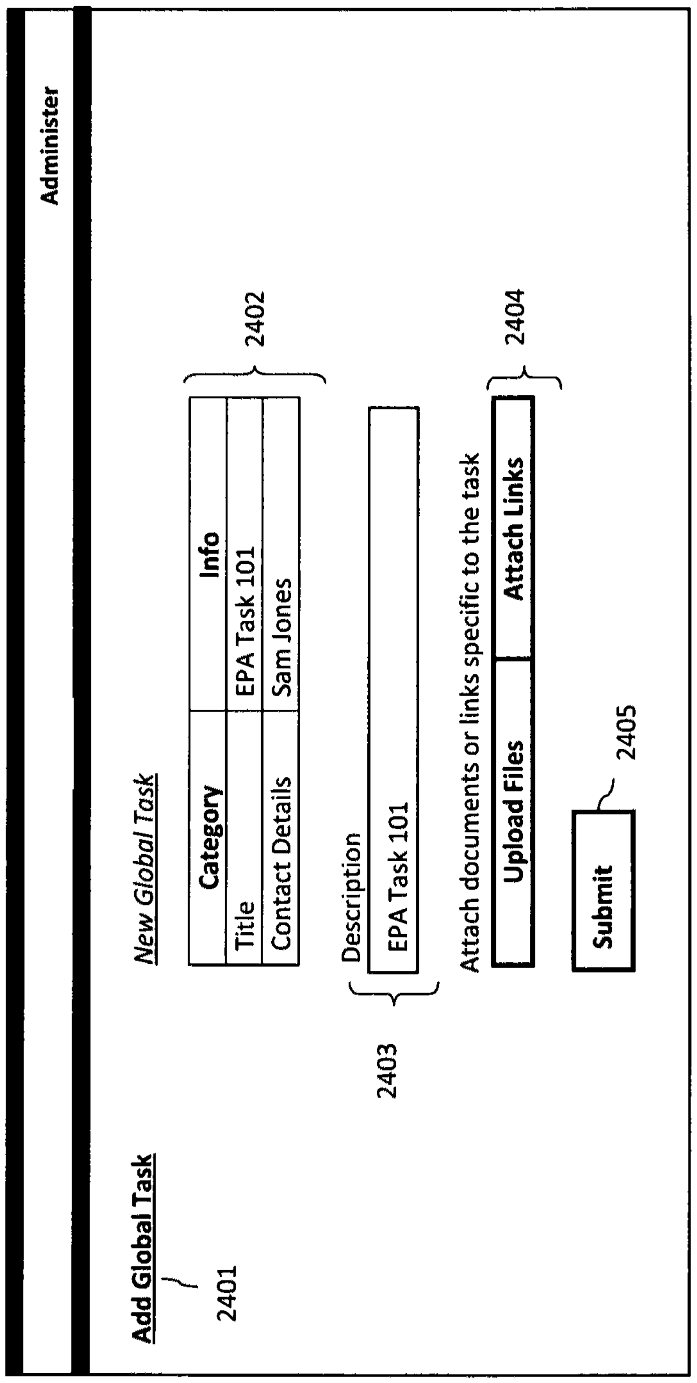
FIG. 24 is a display of a Global Task Adding Module.

FIG. 24 illustrates the screen display for Add Global Task, where the Authorized User assigns a new multi-facility task to be completed in the case of an event. The user clicks on the Add Global Task button on the left side of the screen (2401) and is provided with a self generated form (2402). Whereas a task can be defined for a specific facility in the Define Component, the Global Task is for several facilities within a specified organization. The information displayed can include, for example, a title and a contact name (2402) and a brief description of the task (2403) with the opportunity to add reference documents or links (2404) to assist the operator in completing the task. In FIG. 24, the example displays a task titled EPA Task 101 and the contact name is Sam Jones. Submit button (2405) is selected when input is complete. FIG. 25 illustrates the screen display for Global Task Listing (2501), which provides the Authorized User option to review, edit or delete existing multi-facility tasks. This page is accessed by clicking on the Global Task Listing button on the left side of the page (2501).

The Global Task Listing table (2502) lists the global tasks currently assigned for all facilities within a specified organization by name and particular details. Based on the example above, EPA Task 101 and Sam Jones have been added to the Global Task Listing (2503). Selecting Edit button (2504) launches the Global Task screen, as illustrated in FIG. 26. In the Global Task screen (2601), the Authorized User is permitted to update Task Requirements (2602) and the Description (2603) as necessary. Any documents or links related to the particular task can be uploaded or attached (2604). The latest changes are logged and displayed in Last Edit Track, which identifies the name of editor and the date last modified (2605). Selecting Submit button (2606) saves any changes.

Figure 27:
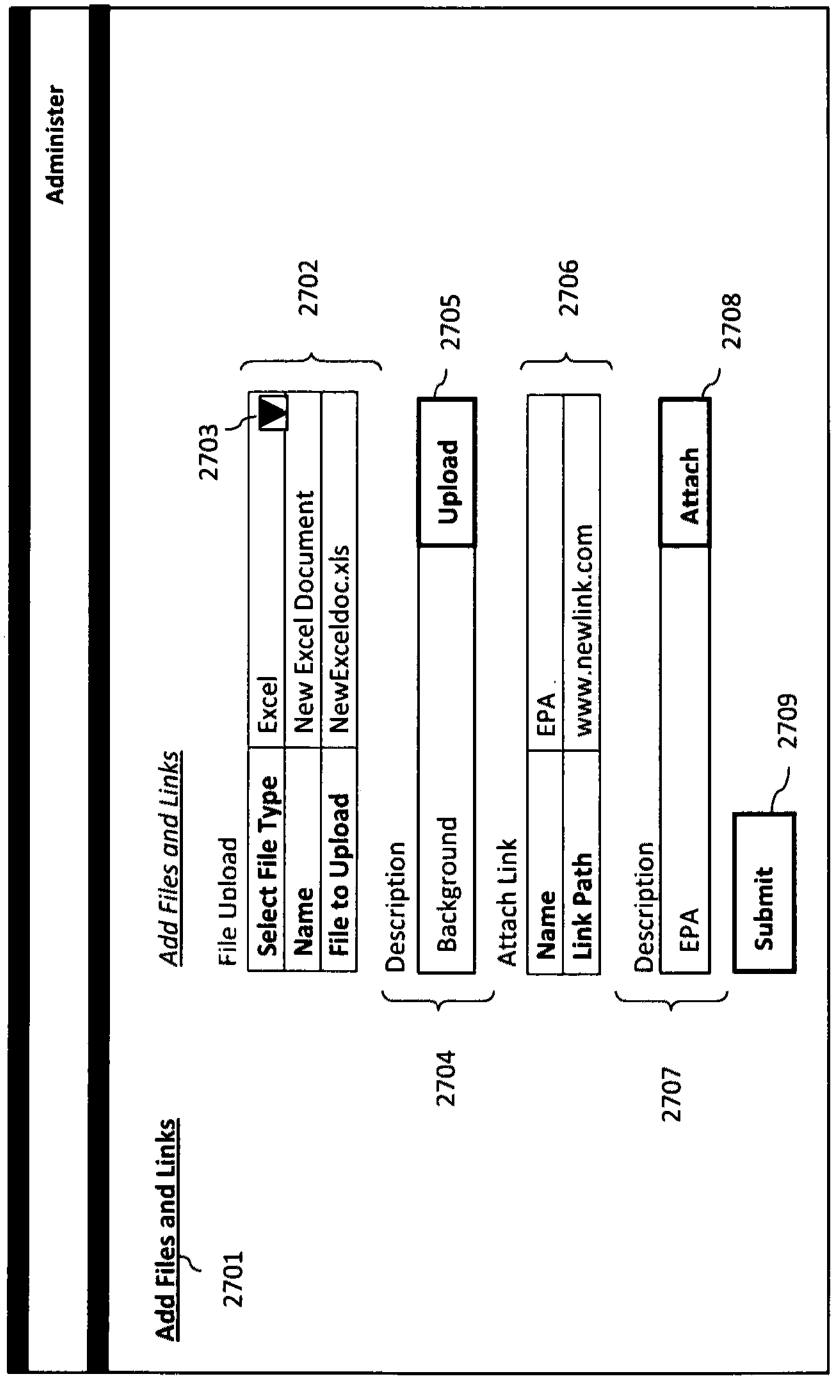
FIG. 27 is a display of an Organization Files and Links Management Add Module.

FIG. 27 illustrates the screen display for Add Files and Links, which gives the Authorized User the ability to upload documents and attach links applicable to the facility or the organization which manages the facility. Once uploaded, these documents will be visible by all users. The user clicks on the Add Files and Links button on the left side of the screen (2701) and is provided with a self generated form (2702). For document upload, a range of file types are available in the Select File Type drop-down menu (2703): pdf format, Word documents, text files, image, and video. Excel (2702) is used as an example in FIG. 27. Once the file type is selected, the user can provide additional information on the file by using the Description text field (2704). Upload button (2705) is selected to execute. To link an attachment, both name and path are typed in the Name and Link Path fields (2706), respectively. The link, www.newlink.com, is the example in FIG. 27. A description or comment may be typed in the Description text field (2707). Attach button (2708) is selected to attach the link. Clicking Submit button (2709) saves changes this screen.

Figure 28:
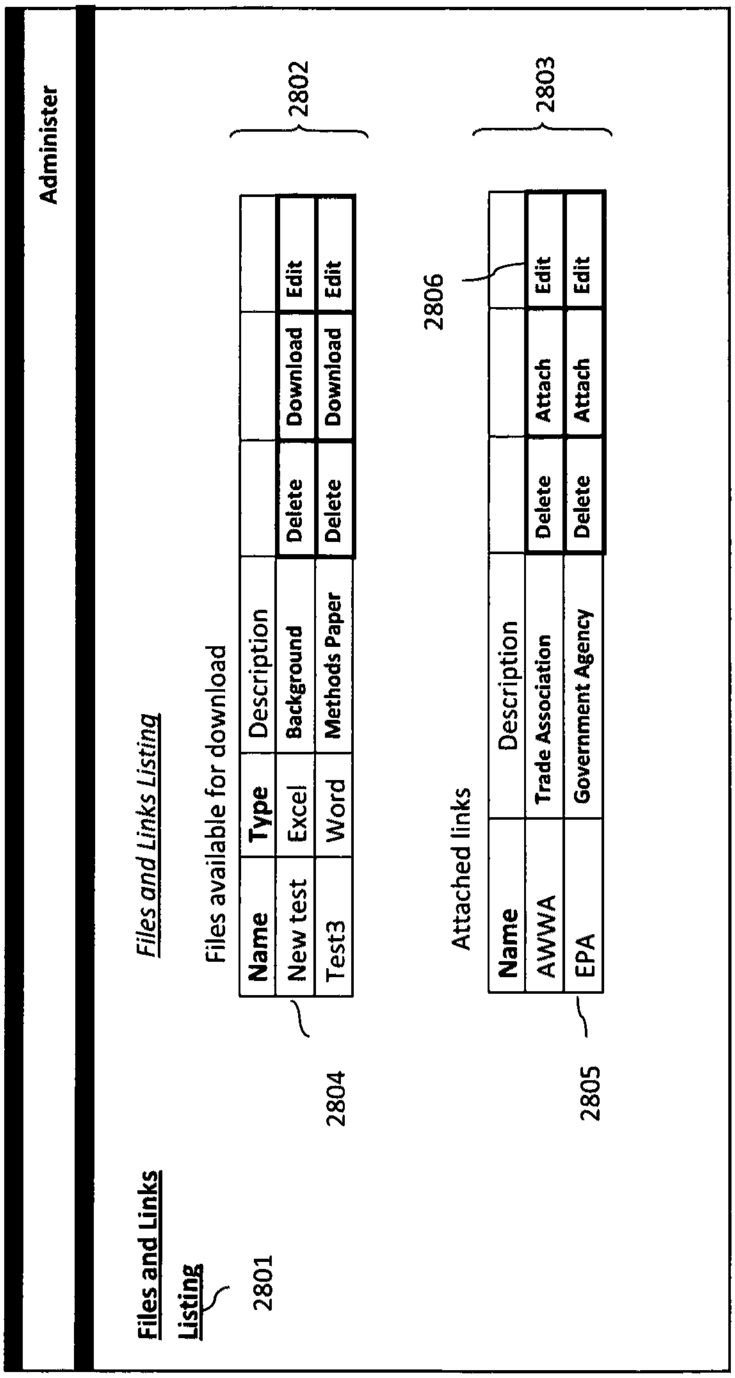
FIG. 28 shows an Organization Files and Links Management Add/Listing Module.
Figure 29:
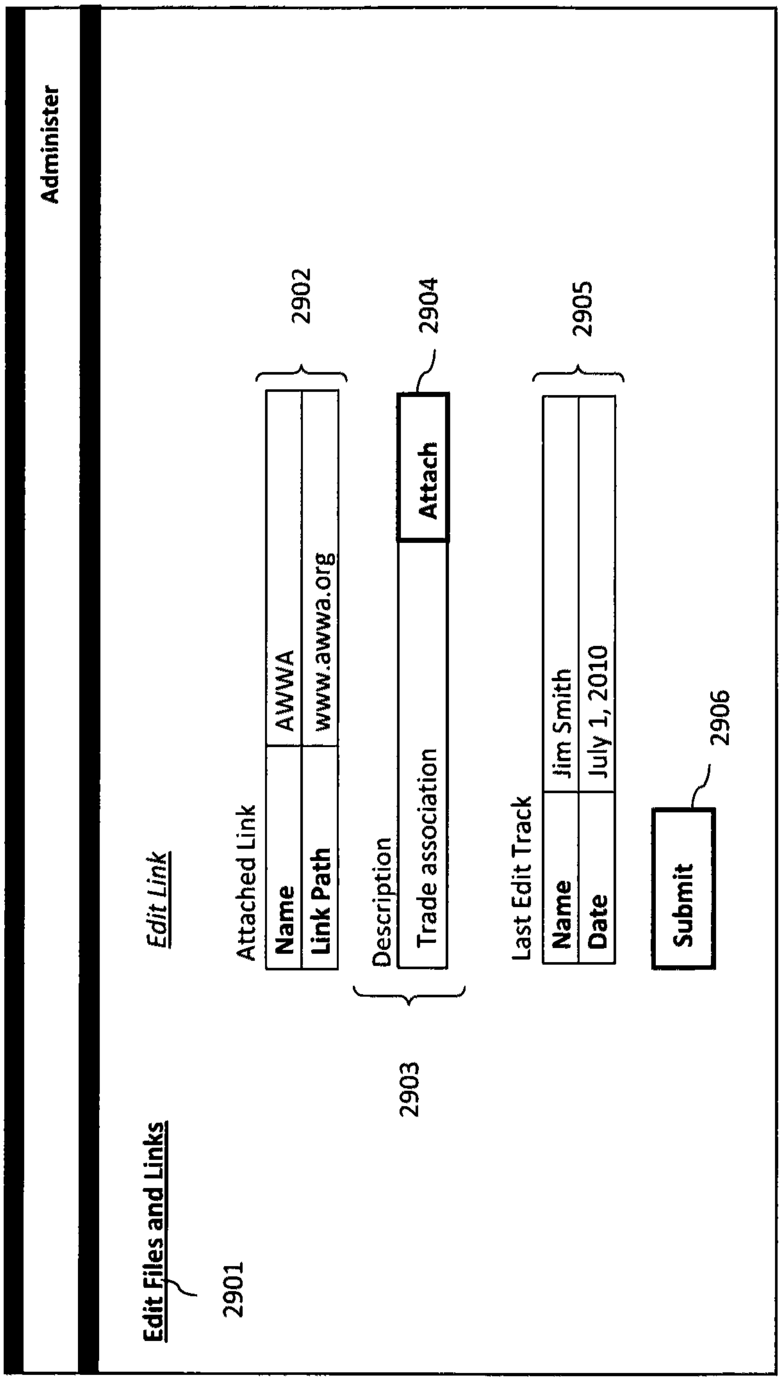
FIG. 29 is a display of an Organization Files and Links Management Edit Module.

FIG. 28 illustrates the screen display for Files and Links Listing, which enables the Authorized User option to view, download or delete files and attach or delete links. This page is accessed by clicking on the Files and Links Listing button on the left side of the page (2801). The Files available for download table (2802) lists files available for download, while the Attached links table (2803) lists available links maintained in the application for a specified organization by name and particular details. Note that per the example, the Excel document (2804) and EPA link (2805) have been added to the Files and Links Listing. Selecting Edit (2806) in either table launched the Edit Files and Links screen, illustrated in FIG. 29. On the Edit Files and Links screen (2901), the Authorized User is permitted to update files and link information Definition (2902) and Description (2903) when required. To change a link, the user may click Attach button (2904). The latest changes are logged and displayed in the Last Edit Track table, which identifies the name of editor and the date last modified (2905). Changes are saved when Submit button (2906) is selected.

4—Define Component

The Define Component identifies the functional attributes for a specific facility within the organization account. There are nine functions in the Define Component that are only accessible for Authorized Users. The functions are comprised of, but not limited, to 3 modules and are illustrated in the following figures. Parameter Manager Function modules are Plant Parameter Adding (FIG. 31), Plant Parameter Listing (FIG. 32), and Plant Parameter Editing (FIG. 33). Chemical Manager Function Modules are Plant Chemical Adding (FIG. 34), Plant Chemical Listing (FIG. 35), and Plant Chemical Editing (FIG. 36). Process Manager Function Modules are Plant Process Adding (FIG. 37), Plant Process Listing (FIG. 38), and Plant Process Editing (FIG. 39). Process Stream Manager Function Modules are Plant Process Stream Adding (FIG. 40), Plant Process Stream Listing (FIG. 41), and Plant Process Stream Editing (FIG. 42). Sampling Point Manager Function Modules are Plant Sampling Point Adding (FIG. 43), Plant Sampling Point Listing (FIG. 44), and Plant Sampling Point Editing (FIG. 45). Issue Type Manager Function Modules are Plant Issue Type Adding (FIG. 46), Plant Issue Type Listing (FIG. 47), and Plant Issue Type Editing (FIG. 48). Notification Manager Function Modules are Plant Notification Adding (FIG. 49), Plant Notification Listing (FIG. 50), and Plant Notification Editing (FIG. 51). Task Manager Function Modules are Plant Task Adding (FIG. 52), Plant Task Listing (FIG. 53), and Plant Task Editing (FIG. 54). Actions Manager Function Modules are Plant Action Adding (FIG. 55), Plant Action Listing (FIG. 56), and Plant Editing (FIG. 57). By clicking on the component, a menu will appear with the linked modules, which are then each accessed by clicking on the individual module button. Utilizing the system disclosed here, Authorized Users are able to set up a facility with specific operative and data requirements. The Define Component can be used to designate specific factors to be identified and tracked by Authorized Users for pertinent data.

The plant definition module is comprised of, but not limited to, a parameter listing module and parameter definition module (add/edit), a chemical listing module and chemical definition module (add/edit), a process listing module and process definition module (add/edit), a process stream listing module and process stream definition module (add/edit), and a sampling point listing module and sampling point definition module (add/edit) under the system disclosed here.

The following figures will be using Plant #3 as an example of how an Authorized Users uses the Define Component of the system disclosed here. FIG. 16 illustrates how Plant #3 was added to the system.

Figure 30:
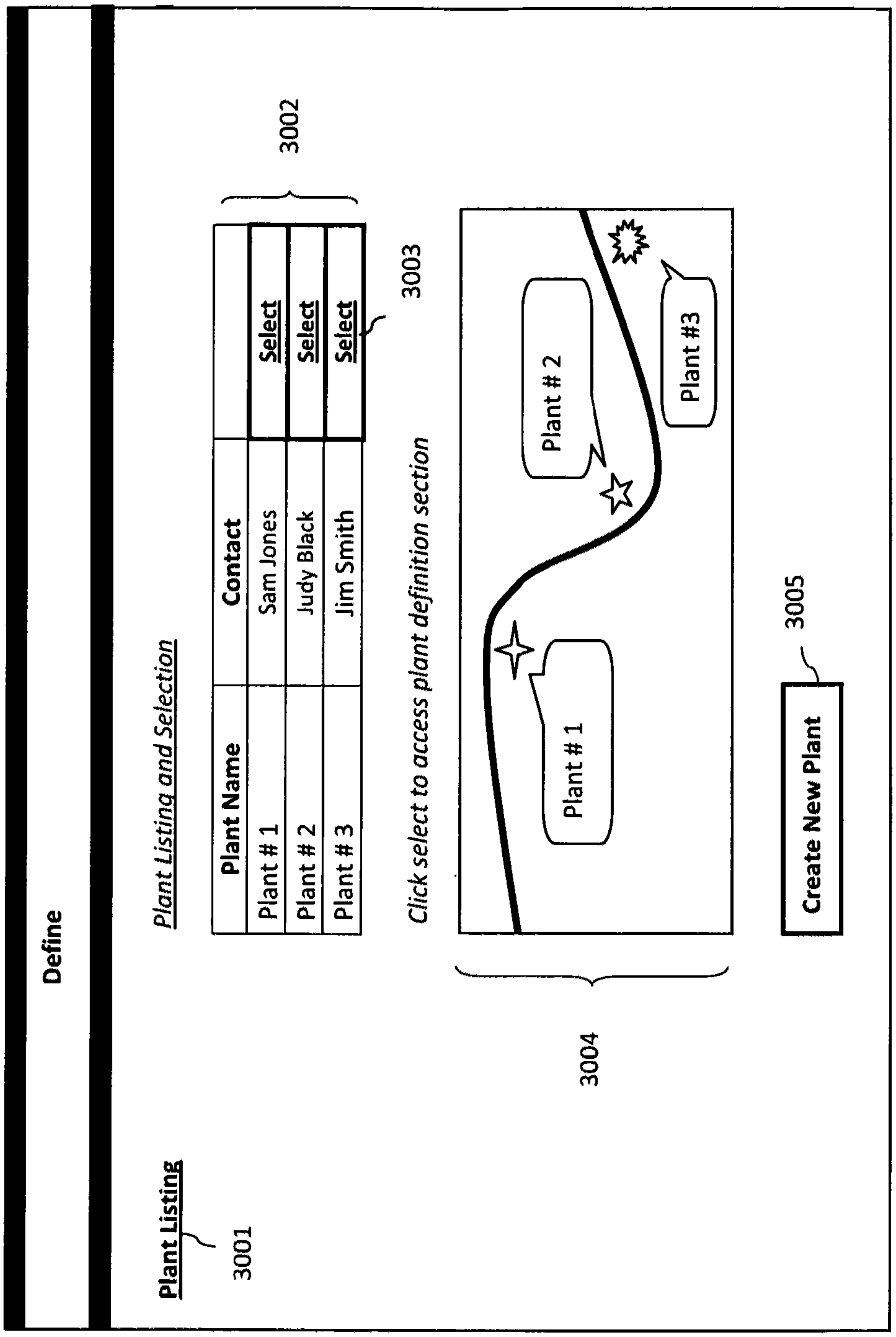
FIG. 30 is a display of a Plant Selection Module.

The process begins with selecting the plant that the Authorized User wants to access. FIG. 30 illustrates the screen for the Plant Listing module (3001), part of the plant definition module under the form-driven user configurable computer implemented solution. The Plant Listing module enables the user to view and select facilities for which the user has reading and/or writing rights as specified by the Authorized User within the organization managing these systems. This page is accessed by clicking on the Plant Listing button on the left of the page (3001). The Plant Listing and Selection table (3002) is a directory of the plants and their assigned contacts. Clicking Select button (3003) allows the user to review a plant's administrative and functional information and to define the plant's fundamentals. A map (3004) provides the geographic location of all facilities within a specified organization . . . . Specific information associated with the facility can be displayed from the map when the user clicks on the specific facility, which is auto populated by the system's display element. The user may click the Create New Plant button (3005) to add another plant under the same organization. This selection will navigate the user to FIG. 18, Add New Plant Listing in the Administer Component to configure a new plant.

Figure 31:
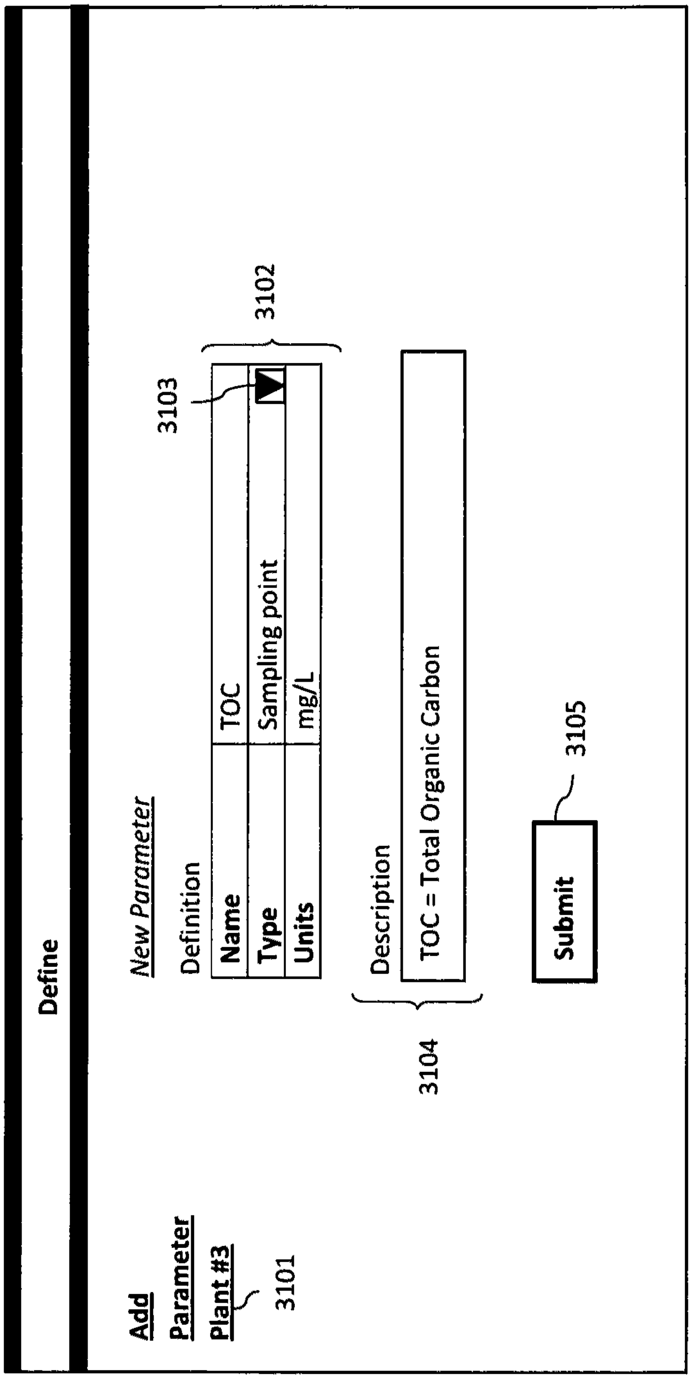
FIG. 31 is a display of a Parameter Adding Module.

FIG. 31 illustrates the screen for Add Parameter, where the user sets the individual parameters to be measured or tracked for a facility within a specified organization. Through this module, the user has the ability to build its own library of parameters as needed. To access this module the user clicks on the Add Parameter button on the left side of the screen (3101) and is provided with a self generated form (3102). In this figure, a new parameter, TOC, is being added. Particular field input on the form will be required, such as parameter name, type, units, minimum value, maximum value, enforce minimum and maximum value, and any special operand. This data will be utilized in the next sections for the predefined plant-specific parameters. The Definition table (3102) is an example of the type of information that the system disclosed here will request. The user defines the name of the parameter, the units and the parameter type. The Type drop-down menu (3103) is significant as this provides the user with pre-set options defined by the system disclosed here. The options under the Type drop-down menu are plant, process, process stream, sampling point, and issue type. In the case of this example, TOC will be applied as a sampling point parameter and is entered in the Description text field (3104). The Submit button (3105) is selected when input is complete.

Figure 32:
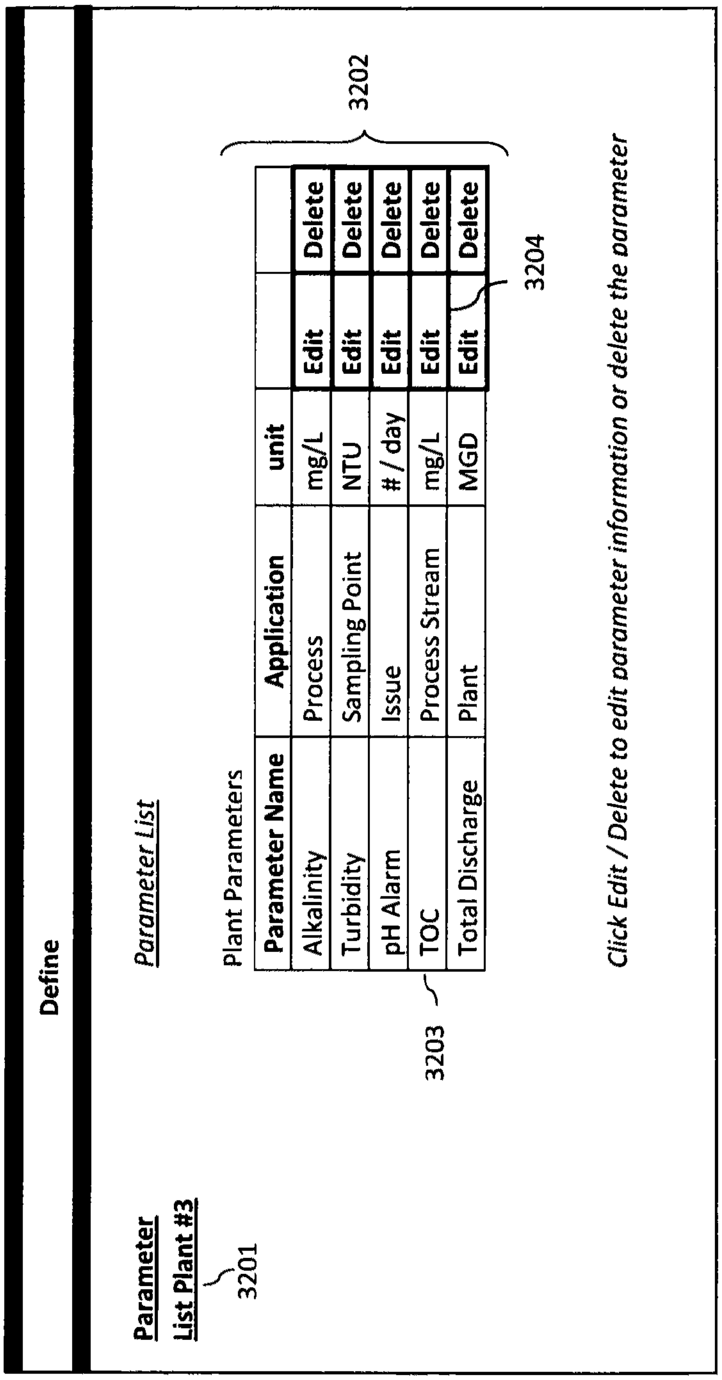
FIG. 32 is a display of a Parameter Listing Module.
Figure 33:
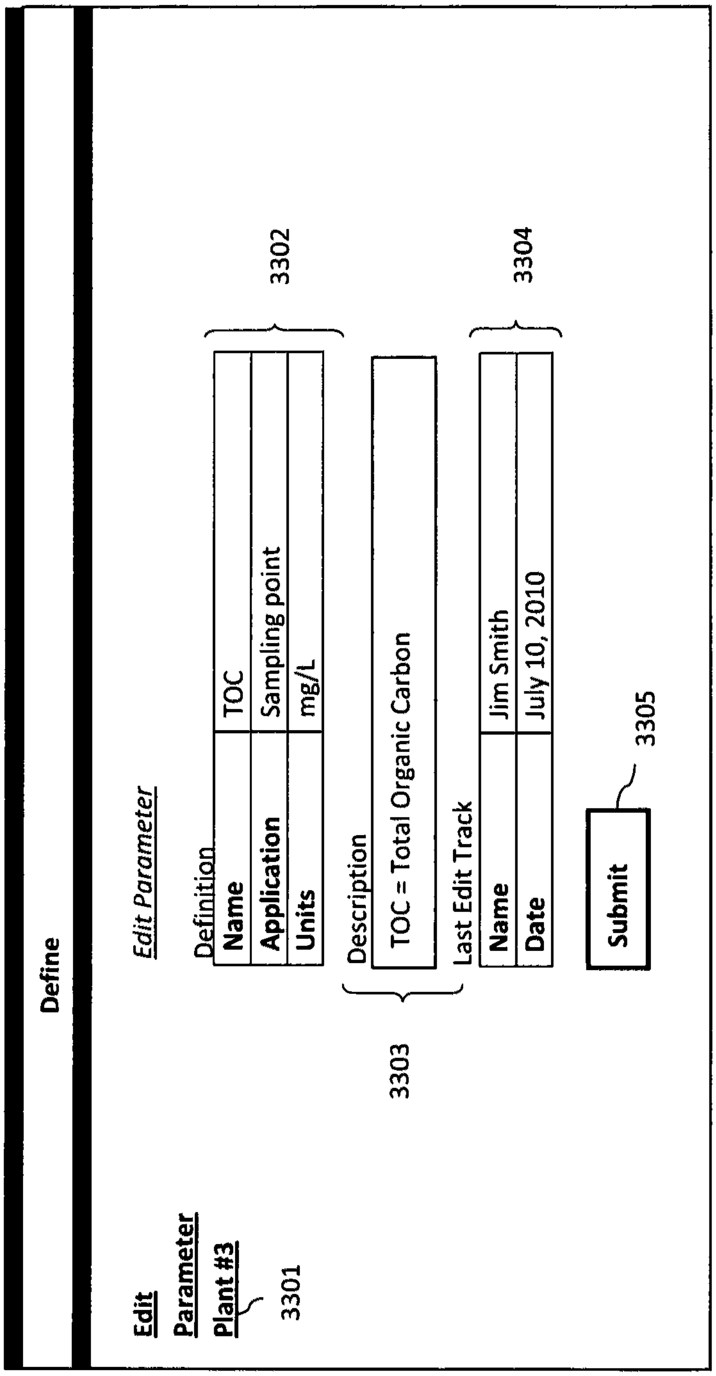
FIG. 33 is a display of a Parameter Editing Module.

FIG. 32 illustrates the screen for the Parameters Listing module, enables the user option to review, edit or delete an existing parameter for a facility within a specified organization. This module is accessed by clicking on the Parameter List button on the left side of the page (3201). The table Plant Parameters (3202) lists the parameters currently utilized for Plant #3 by name and particular details. Note that per the example, TOC (3203) has been added to the Parameter List. The Edit button (3204) is active and the user will be able to edit this parameter immediately even though it was just added to the list of parameters monitored under Plant#3.

Selecting Edit button (3204) will launch the Edit Parameter screen displayed in FIG. 33. In Edit Parameter (3301), the Authorized User is permitted to update and modify Parameter Definition (3302) and Description (3303) when required. The latest changes are logged and displayed in Last Edit Track, which identifies the name of editor and the date last modified (3304). Changes are saved when Submit button (3305) is selected.

Figure 34:
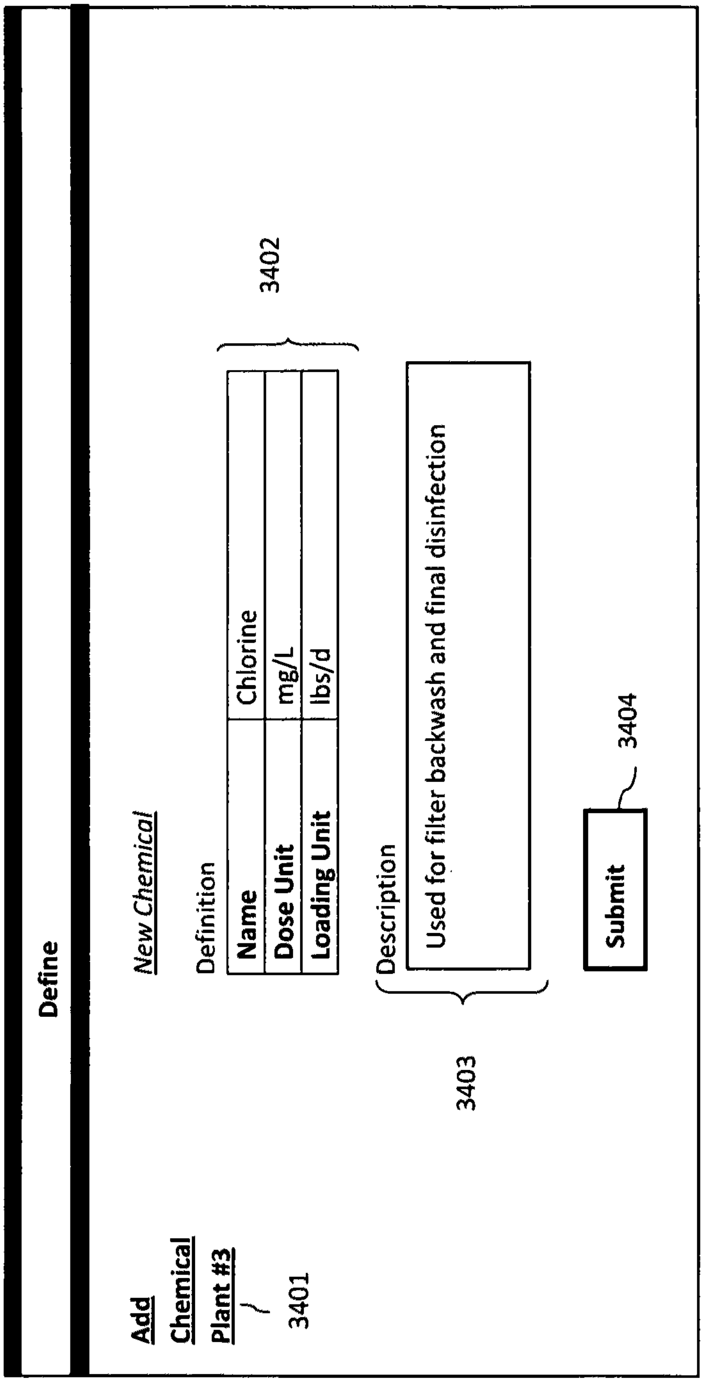
FIG. 34 is a display of a Chemical Adding Module.

FIG. 34 illustrates the Add Chemical screen, where the user sets the chemicals to be utilized and measured for the selected facility within a specified organization. To access this module, the user clicks on the Add Chemical button on the left side of the screen (3401) and is provided with a self generated form (3402). In the Definition table (3402), information relevant to the new chemical is required. Field input on the form will be chemical name and type, as well as chemical dosage, rate, loading and feed density units. This data will be the predefined chemicals to be utilized in the next sections. In this example displayed in FIG. 34, chlorine is the new chemical being added to the list of chemicals used at Plant#3. The Authorized User specifies the units being used for a variety of parameters which applies to the chemical. Additional comments may be entered into the Description text field (3403). Submit button (3404) is selected when input is complete.

Figure 35:
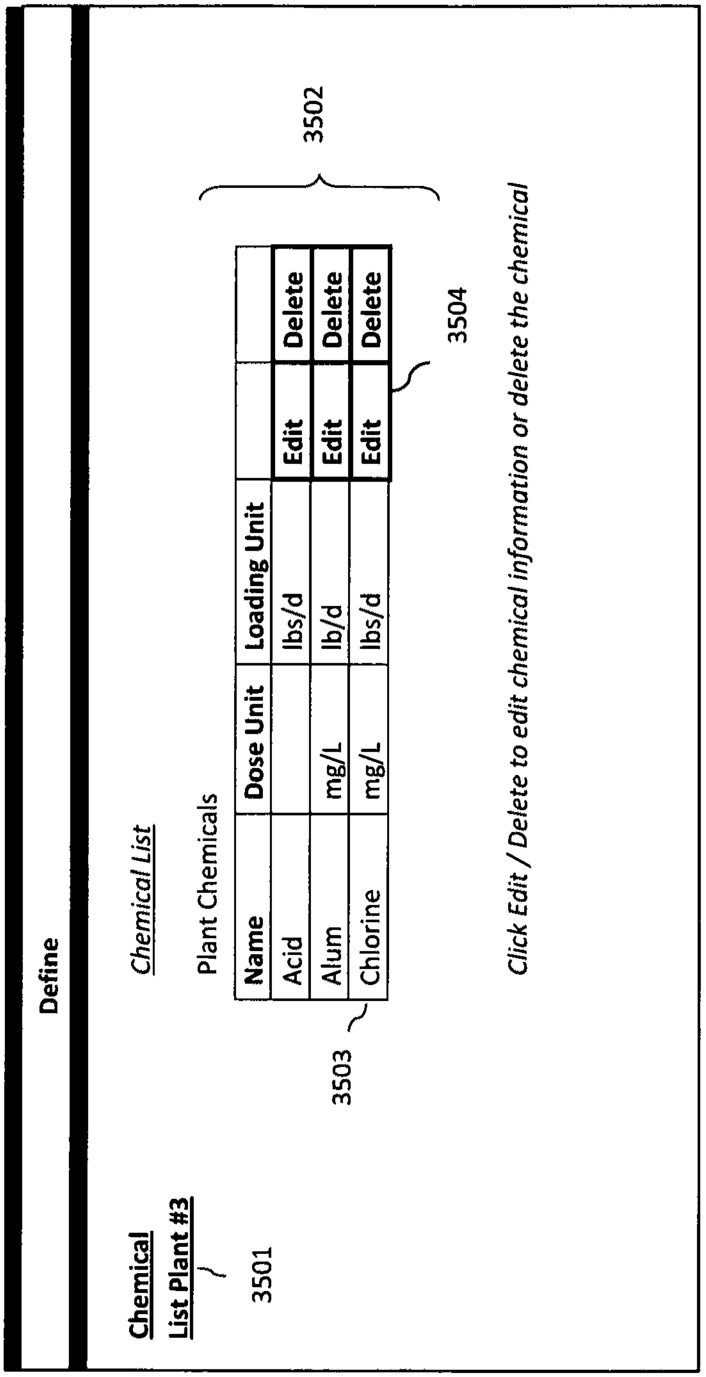
FIG. 35 is a display of a Chemical Listing Module.
Figure 36:
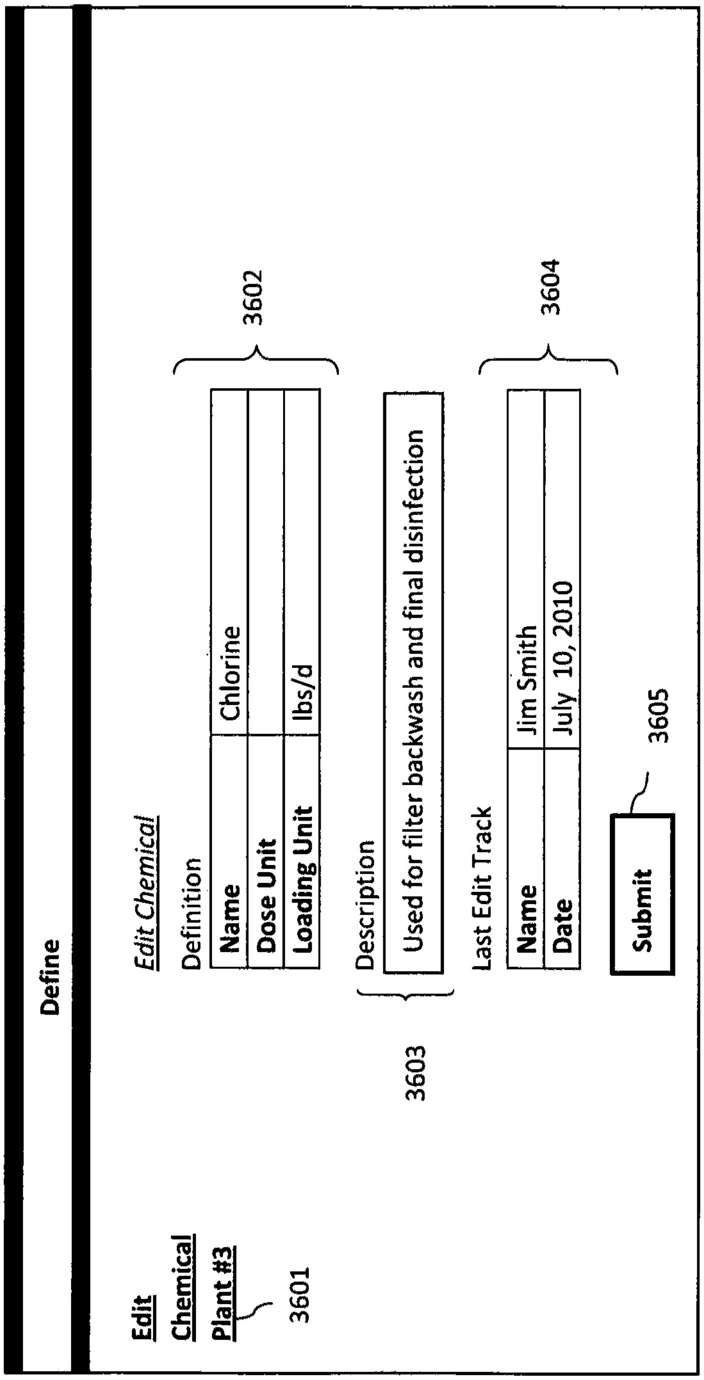
FIG. 36 is a display of a Chemical Editing Module.

FIG. 35 illustrates the Chemical Listing module, which provides the user the option to review, edit or delete an existing chemical for a facility within a specified organization. This module is accessed by clicking on the Chemical List button on the left side of the page (3501). The Plant Chemicals table (3502) lists the chemicals currently utilized for Plant #3 by name and particular details. The new chemical that was added in FIG. 34, Chlorine (3503) has been added to the Chemical List. Selecting the Edit button (3504) for Chlorine will allow the user to edit the information in FIG. 34 and will launch the Edit Chemical screen displayed in FIG. 36. On the Edit Chemical screen (3601), the Authorized User can update chemical Definition (3602) and Description (3603) when required. The latest changes are logged identifying the name of editor and the date last modified (3604). Selecting Submit button (3605) saves changes completed and updates the data storage component allocated for Plant#3 under the computer-implemented solution.

Figure 37:
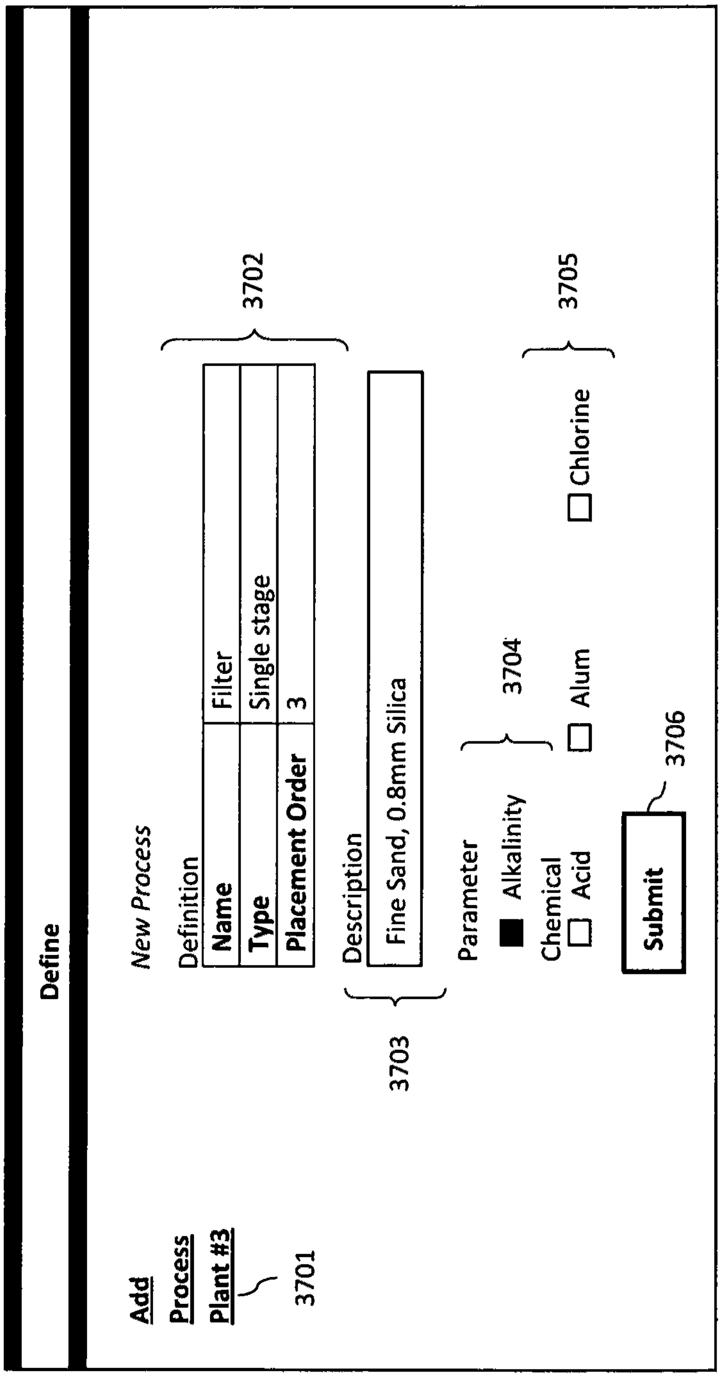
FIG. 37 is a display of a Process Node Adding Module.

FIG. 37 illustrates the screen for Add Process, where the Authorized User identifies the processes utilized at the facility within a specified organization. To access this module the user clicks on the Add Process button on the left side of the screen (3701) and is provided with a self generated form (3702). The new Process Definition Table (3702) presented in FIG. 37 is comprised of three categories: the name of the process, the number of stages in the process, and placement order of the process in the treatment train. The field input on the form will be process name, type, number of process stages, and process placement order. This data will be utilized in the next sections for the predefined process parameters. In the example given in FIG. 37, the user is adding a process called "Filter", which is a single stage process and is placed third in the overall treatment scheme. Additional information can be entered into the Description text fields (3703). The Parameters (3704) and Chemicals (3705) are options made available to the user by the system disclosed here once the parameters and chemicals were added to the system as described by FIGS. 31 and 34. The process parameters listing module and process chemicals listing module are activated to display the monitoring parameters and utilized chemicals in the operation of the process. To select a parameter or chemical, the Authorized User clicks the checkbox to the left of the corresponding item. The Authorized User selected Alkalinity as a parameter to be monitored for the new Filter process being added. The Submit button (3706) is selected when input is complete.

Figure 38:
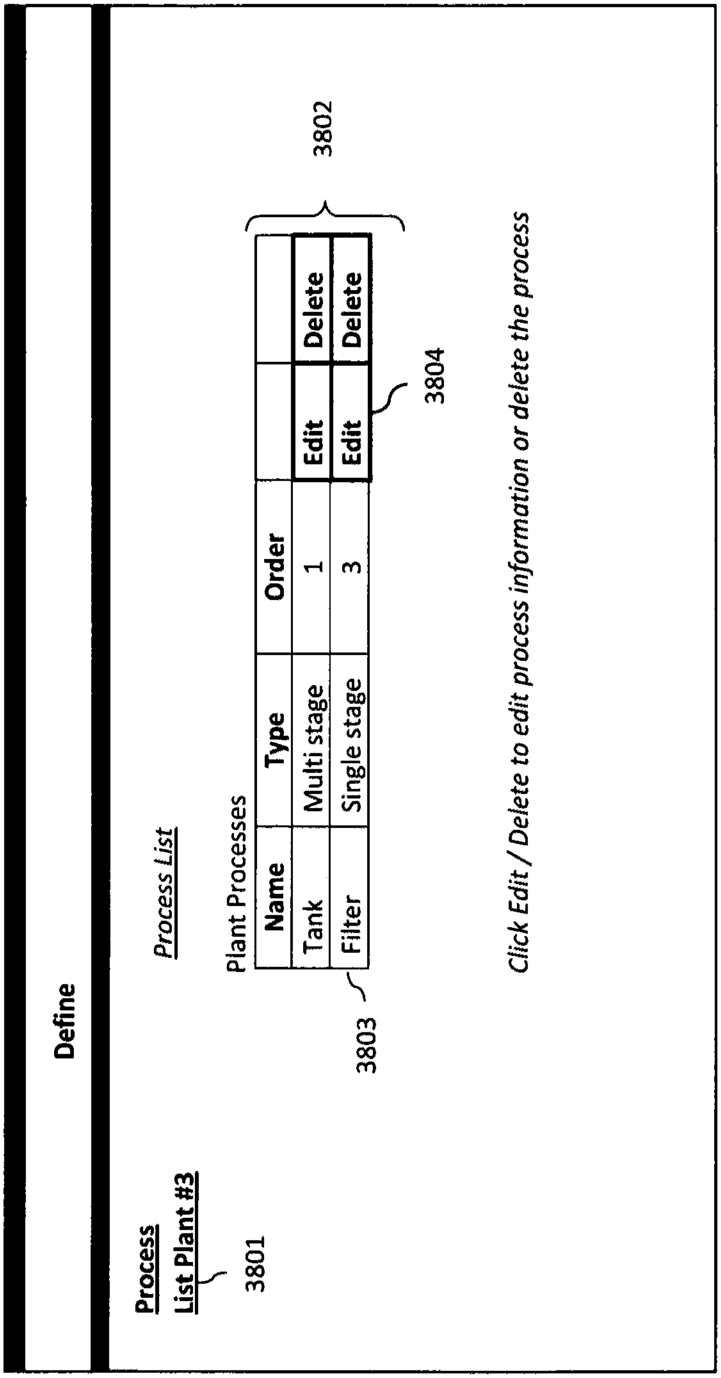
FIG. 38 is a display of a Process Node Listing Module.
Figure 39:
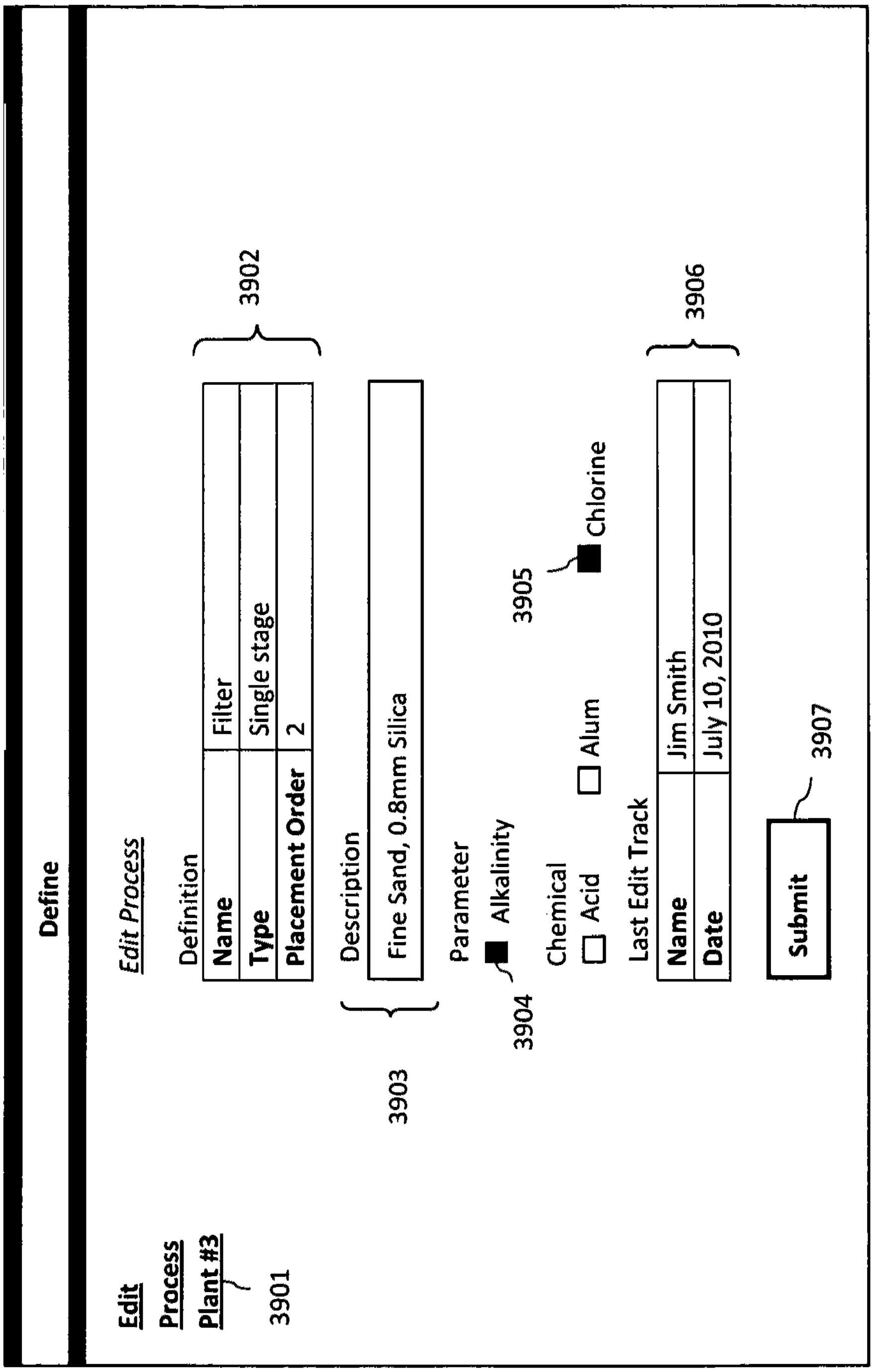
FIG. 39 is a display of a Process Node Editing Module.

FIG. 38 illustrates the Process Listing module, which enables the user to review, edit or delete existing processes for a facility within a specified organization. This module is accessed by clicking on the Process List button on the left of the page (3801). The Plant Processes table (3802) lists the processes currently in the system for Plant #3 by name and particular details. Note that per the example described in the previous paragraph for FIG. 37, Filter (3803) has been added to the Process List. Selecting Edit button (3804) for the Filter launches the Edit Process screen (3901) as displayed in FIG. 39. In the Edit Process screen, the Authorized User is permitted to update process Definition (3902) and Description (3903) when required. In this figure, the chemical Chlorine (3905) has been selected, in addition to the parameter Alkalinity (3904). By the utilization of checkboxes, parameters and chemicals can be added and removed directly. These two modules will be tracked in the Data Logging Component of the system disclosed here. These changes are logged and displayed in the Last Edit Track, which identifies the name of editor and the date last modified (3906). Changes are saved upon selecting Submit button (3907).

Figure 40:
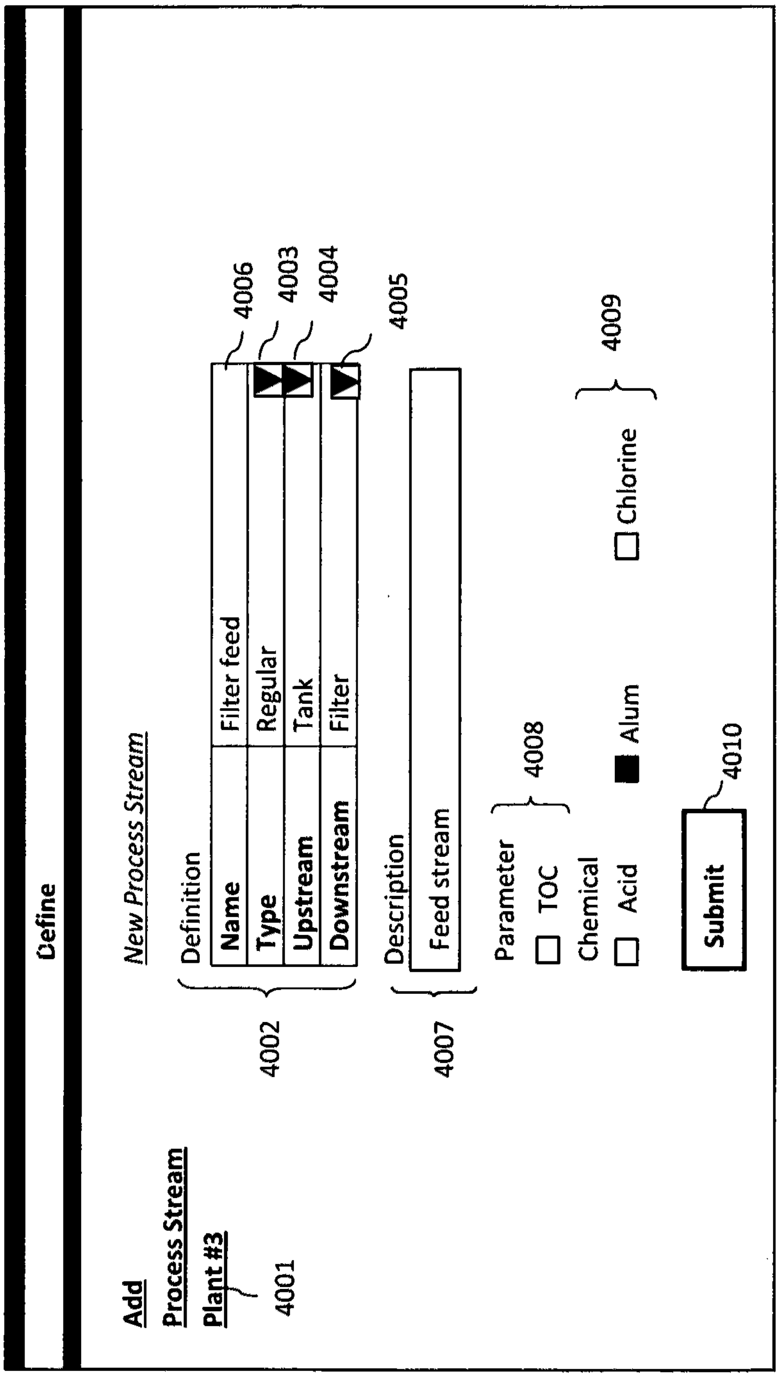
FIG. 40 is a display of a Process Stream Connection Adding Module.

FIG. 40 illustrates the screen for Add Process Stream, where the Authorized User defines for the selected facility within a specified organization a new process stream, which is the link between two processes. To access this module the user clicks on the Add Process Stream button on the left side of the screen (4001) and is provided with a self generated form (4002). The field input on the form will be process stream name, code, type, upstream process and downstream process. This data will be the predefined chemicals to be utilized in the next sections. In the sample Definition table (4002), the Authorized User has the ability to define the new process stream through a series of descriptors, which include a) the name of the process stream, b) the process stream type, c) the upstream process and d) the downstream process. Corresponding drop-down menus (4003, 4004, and 4005) are available for the different descriptors. The Type drop-down menu (4003) is predefined by the system disclosed here which includes types such as feed, product, recycle, regular, waste and by-pass. The Upstream drop-down menu (4004) and the Downstream drop-down menu (4005) list the processes which currently exist in the system. The processes are Filter and Tank as defined in the example of FIG. 37. In the case presented in FIG. 40, the process stream that is being created between the Tank and the Filter is named Filter Feed (4006). Additional comments may be entered in the Description text field (4007). The listed Parameters (4008) and Chemicals (4009) were predefined under the Add Chemical and Add Parameter sections and are the product of the logic operating in the system disclosed here. The process stream parameters listing module and process stream chemicals listing module are activated to display the monitoring parameters and utilized chemicals in the operation of the process stream. The Authorized User can select the chemical or the parameter by clicking on the checkbox to the left of the desired chemical or parameter. In FIG. 40, the user selected Alum, suggesting that Alum is being added to the Filter Feed stream. The Submit button (4010) is selected when input is complete.

Figure 41:
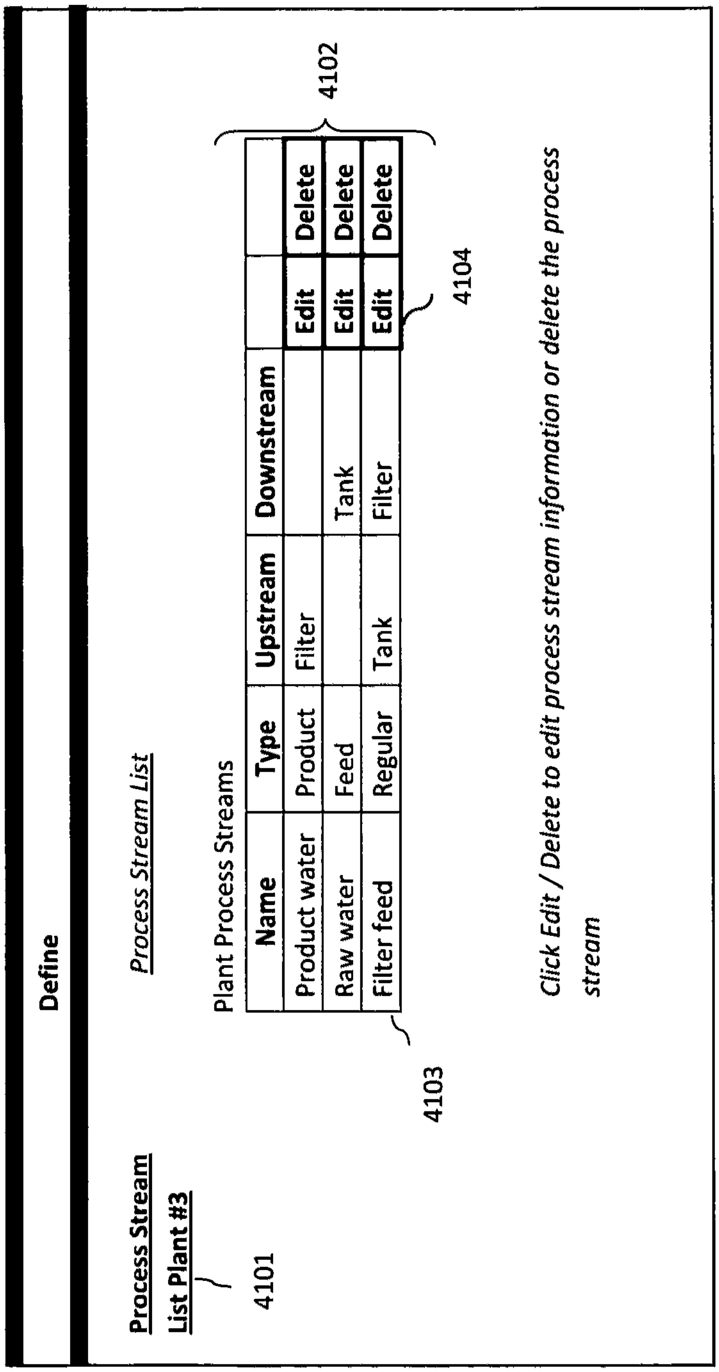
FIG. 41 is a display of a Process Stream Connection Listing Module.
Figure 42:
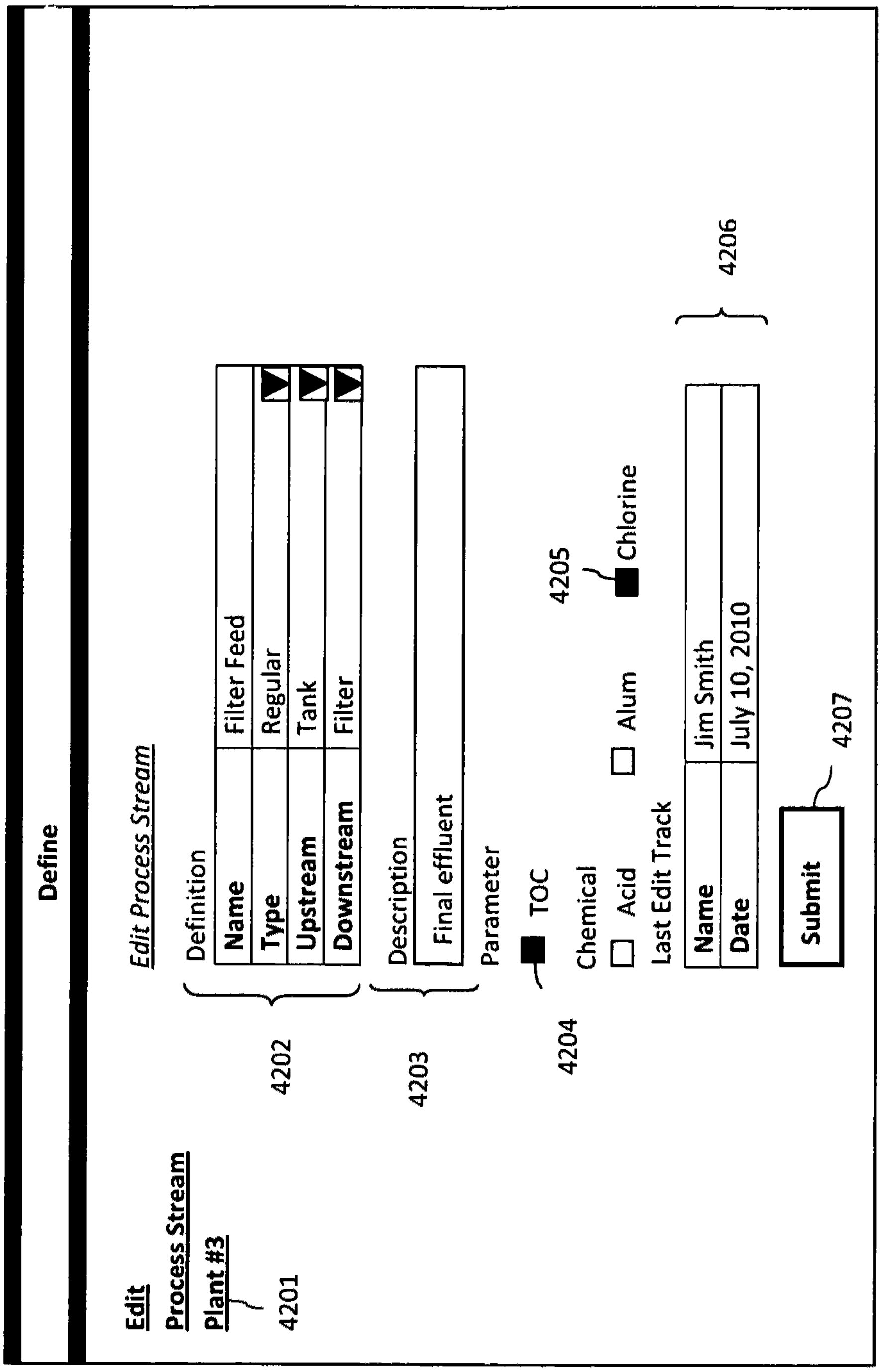
FIG. 42 is a display of a Process Stream Connection Editing Module.

FIG. 41 illustrates the screen for Process Stream Listing Module, which enables the user option to review, edit or delete the existing process streams in the system for a facility within a specified organization. This module is accessed by clicking on the Process Stream List button on the left of the page (4101). The Plant Process Stream table (4102) lists the process streams currently utilized for Plant #3 by name and particular details. The new process, Filter Feed (4103), added in FIG. 40, is now displayed in the Process Stream List. Selecting Edit button (4104) for Filter Feed launches the Edit Process Stream, displayed in FIG. 42. In the Edit Process Stream (4201), the Authorized User is able to update Process Stream Definition (4202) and Description (4203). In this example parameter TOC (4204) and chemical chlorine (4205) have been selected as the attributes to the process steam of filter feed. By the utilization of checkboxes, parameters and chemicals can be added or removed directly. The latest changes are logged in Last Edit Track, which identifies the name of editor and the date last modified (4206). Changes are saved when Submit button (4207) is selected.

Figure 43:
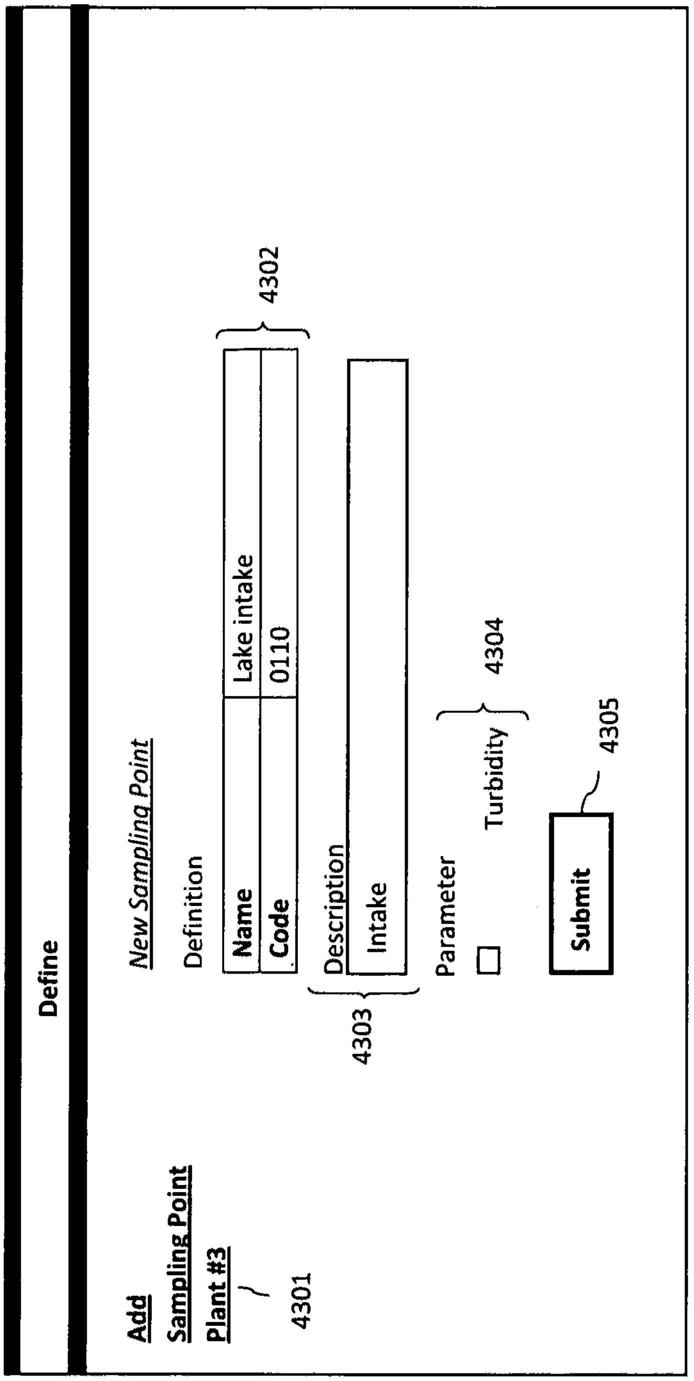
FIG. 43 is a display of a Sampling Point Adding Module.

FIG. 43 illustrates the screen display for Add Sampling Point, where the user defines the descriptors for a given sampling points, which can be any point within or outside the selected facility within a specified organization. A sampling point does not need to be attached to a process or process stream. To access this module the user clicks on the Add Sampling Point button on the left side of the screen (4301) and is provided with a self generated form (4302). The field input on the form will be sampling point name, code, and type. This data will be the predefined sampling points to be utilized in the next sections. The information displayed in the sample Definition table (4302) shows two descriptors: the name, Lake Intake, and a code or reference number "0110". Additional comments can be entered in the Description text field (4303). The Parameters (4304) linked to the facility are provided, so that the user may assign the attributes to the sampling point if applicable; in FIG. 43, no parameter has been selected. The listing of predefined parameters is a function of the parameters that were added in the system under the Add Parameter Module of the system disclosed here. The sampling point parameters listing module is activated to display the monitoring parameters for the sampling point. The Submit button (4305) is selected when input is complete.

Figure 44:
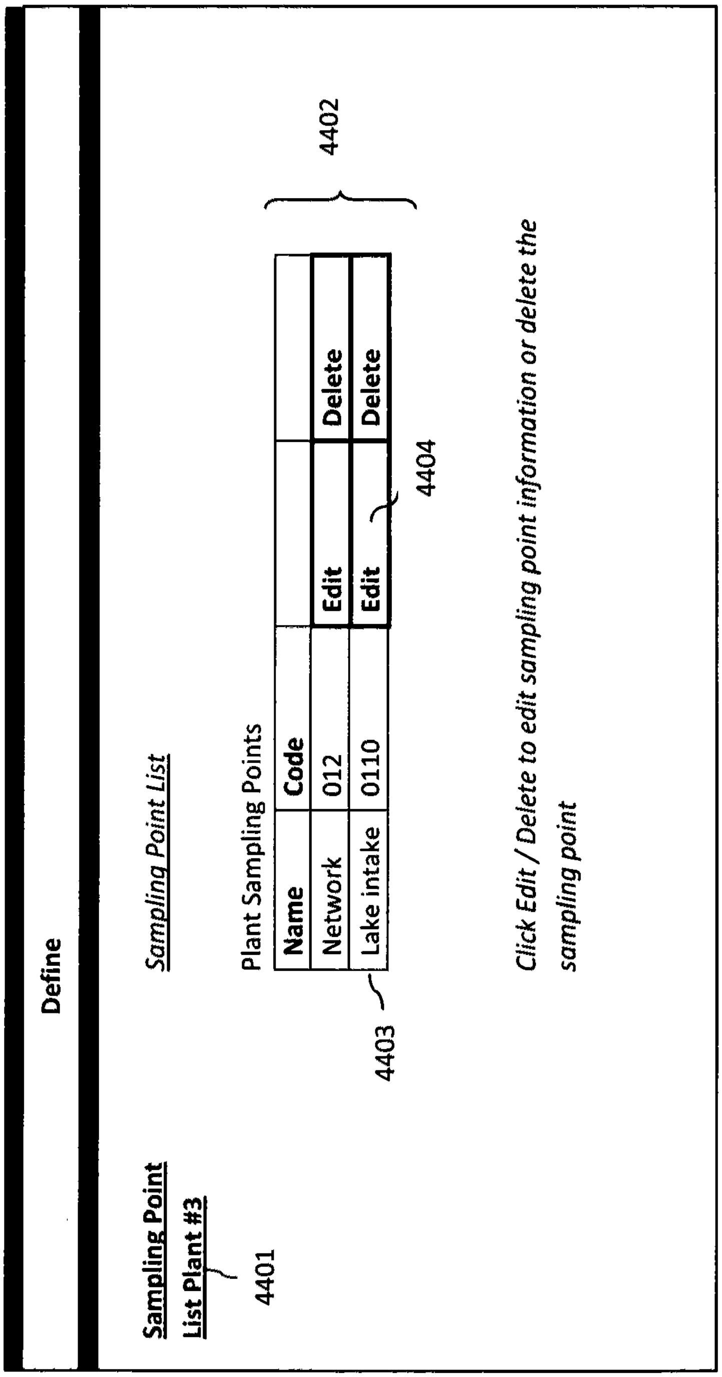
FIG. 44 is a display of a Sampling Point Listing Module.
Figure 45:
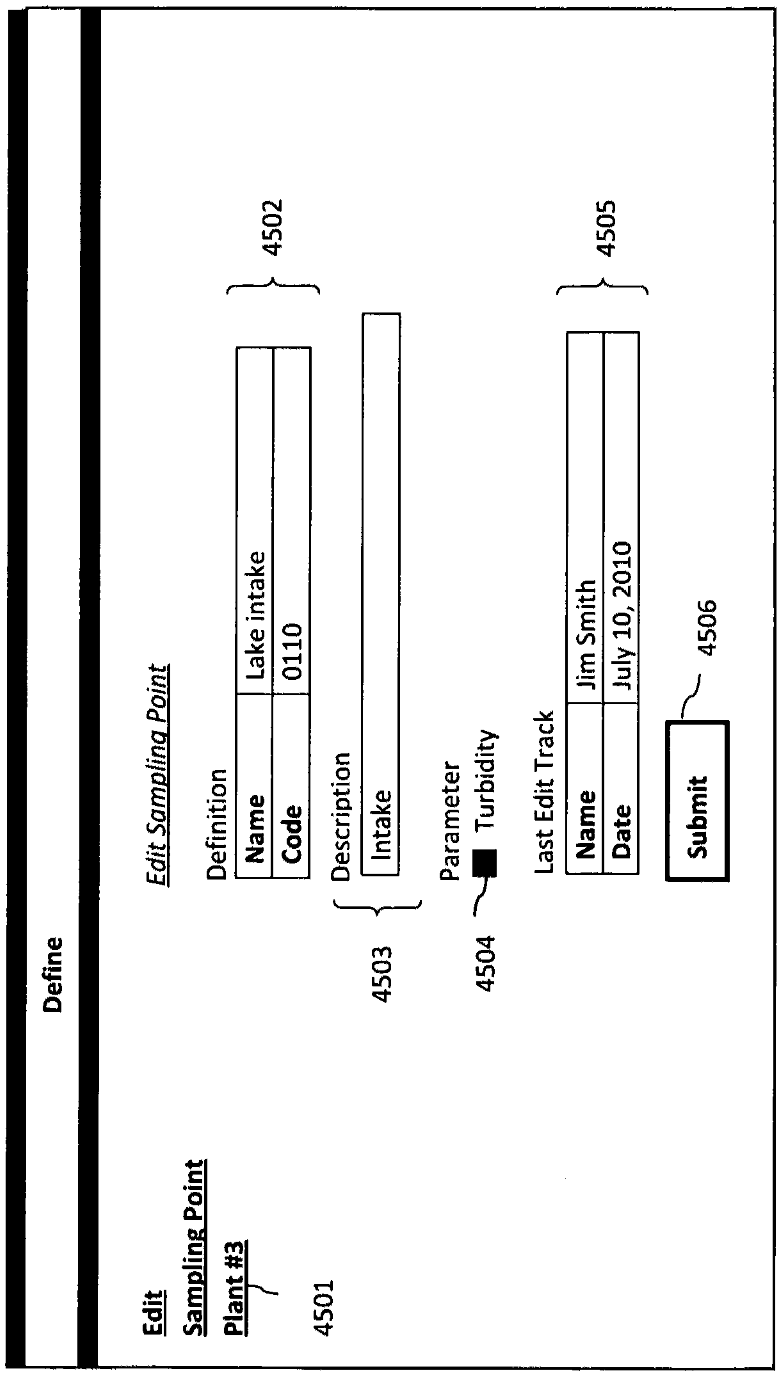
FIG. 45 is a display of a Sampling Point Editing Module.

FIG. 44 illustrates the Sampling Point Listing Module, which enables the user option to review, edit or delete all existing sampling points for a facility within a specified organization. This module is accessed by clicking on the Sampling Point List button on the left side of the page (4401). The Plant Sampling Point table (4402) lists the sampling points currently in the system for Plant #3 by name and particular details. Note that per the example in FIG. 43, Lake Intake (4403) has been added to the Sampling Point List. Clicking Edit button (4404) launches the Edit Sampling Point screen as illustrated by FIG. 45.

On the Edit Sampling Point screen (4501), the Authorized User is permitted to update sampling point Definition (4502) and Description (4503) when required. In this example, the Parameter Turbidity (4504) has been selected as the attribute to the sampling point. By the utilization of checkboxes, parameters and chemicals can be added and removed directly. The latest changes are logged and displayed in the Last Edit Track, which identifies the name of editor and the date last modified (4505). Selecting Submit button (4506) saves changes.

Figure 46:
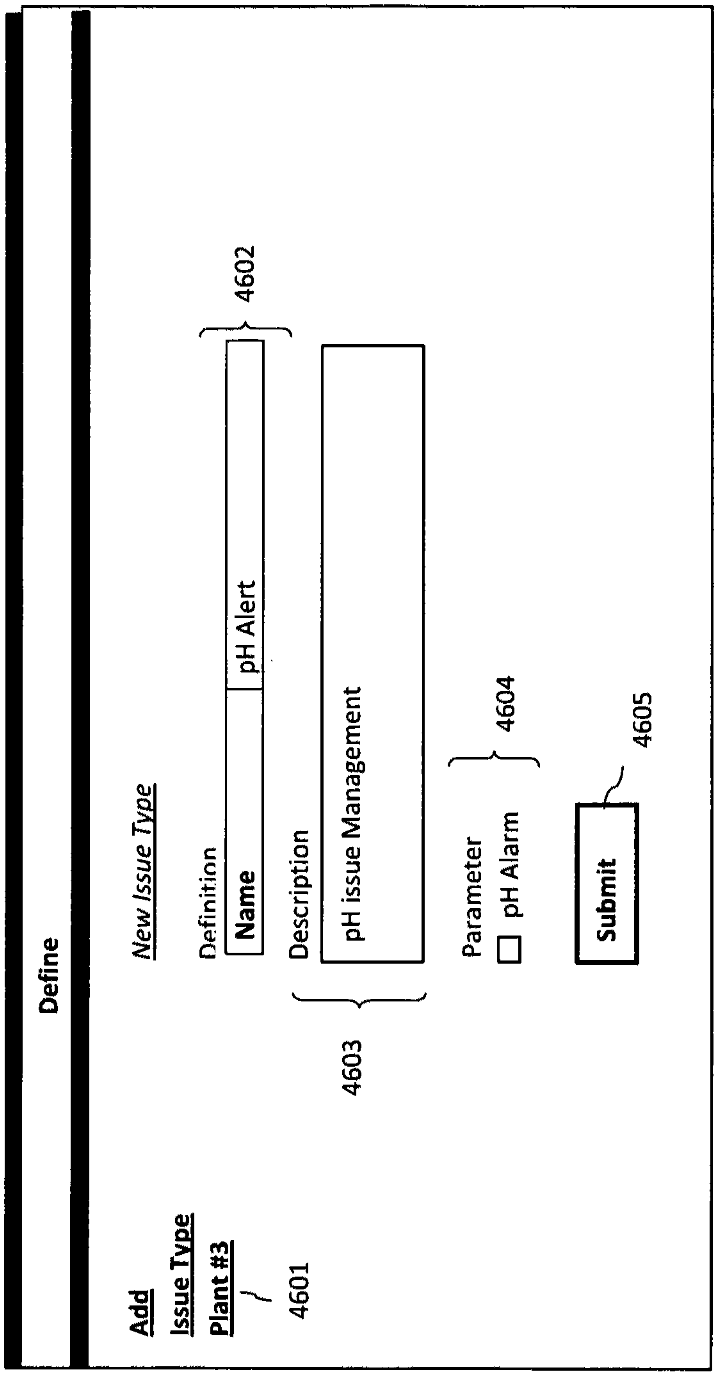
FIG. 46 is a display of an Issue Type Adding Module.

FIG. 46 illustrates the screen for Add Issue Type, where the user sets issue types to be reported at a specific facility within an organization. To access this module the user clicks on the Add Issue button on the left side of the screen (4601) and is provided with a self generated form (4602). The Definition table (4602) consists of a field where the Authorized User can add the name of the issue type being tracked; in this example, pH alert is the issue type that is displayed. Additional comments are entered in the Description text field (4603). The issue parameters (4604) available in the system for this specific plant are presented so that the user may assign the attributes to the issue type if applicable; in this case no parameter has been selected. The Submit button (4605) is selected when input is complete.

Figure 47:
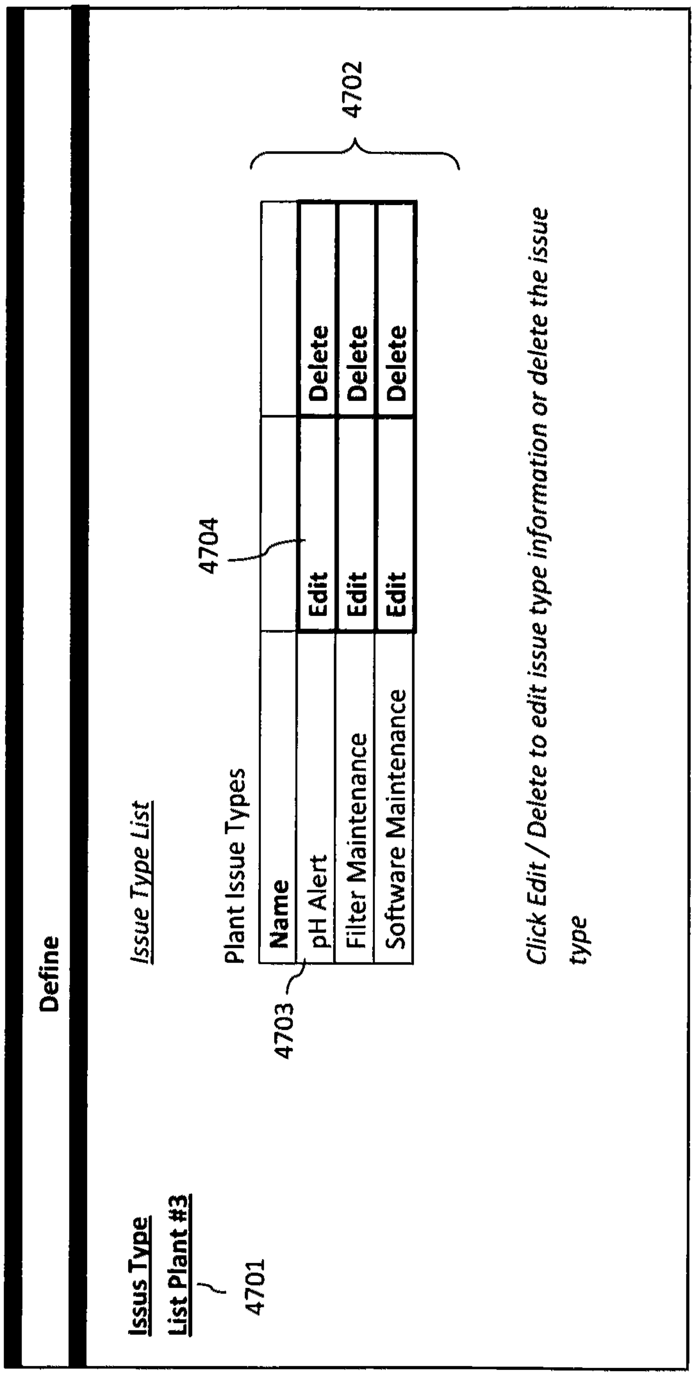
FIG. 47 is a display of an Issue Type Listing Module.
Figure 48:
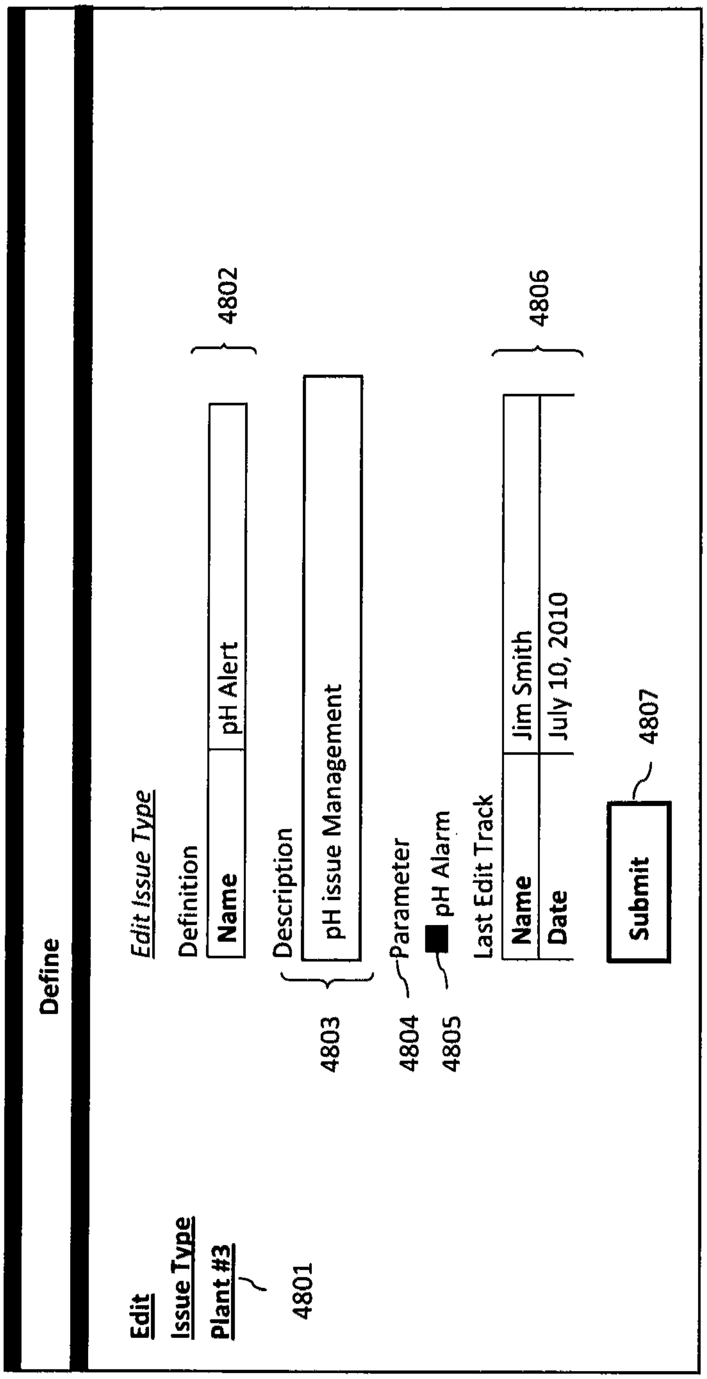
FIG. 48 is a display of an Issue Type Editing Module.

FIG. 47 illustrates the Issue Type List screen, which enables the user to review, edit or delete existing issue types for a facility within a specified organization. This module is accessed by clicking on the Issue Type List button on the left side of the page (4701). The Plant Issue Types table (4702) lists the issue types currently utilized for Plant #3 name and particular details. The new Issue Type, pH Alert (4703) has been added to the Issue Type List. Selecting Edit button (4704) for the pH Alert launches the Edit Issue Type screen as displayed in FIG. 48. The Edit Issue Type screen (4801), where the user is permitted to update Issue Type Definition (4802), Description (4803), and Parameters (4804) when required. In this example parameter pH Alert (4805), has been selected as the attribute to the issue type. The latest changes are logged and displayed in Last Edit Track and identifies the name of editor and the date last modified (4806). Changes are saved upon selecting Submit button (4807).

Figure 49:
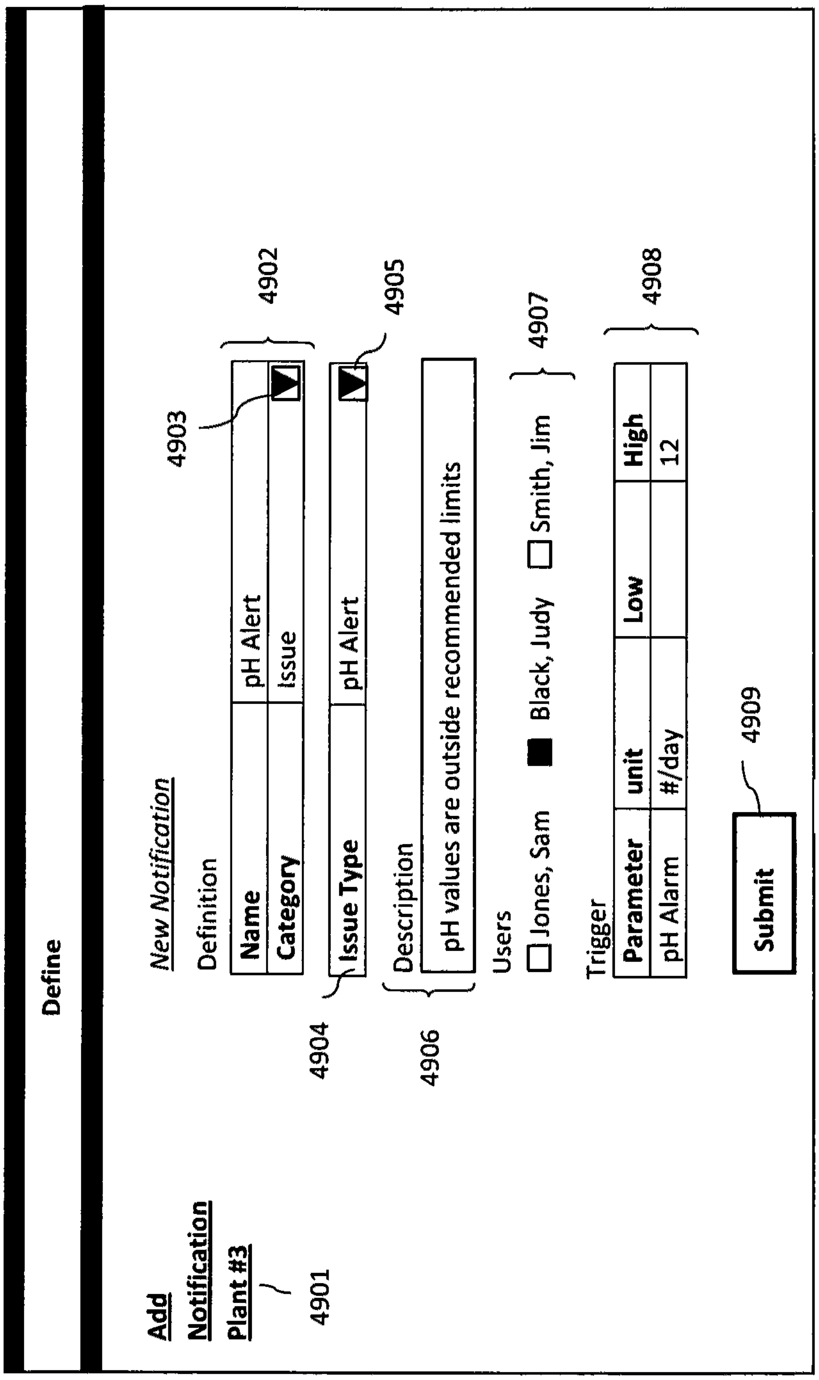
FIG. 49 is a display of a Notification Adding Module.

FIG. 49 illustrates the Add Notification screen, which allows the Authorized User to set automatic notifications to identified users as a follow-up of specific triggers for the selected facility within a specified organization. The logic behind the system disclosed here enables the Authorized Users to drill down to one or several parameters. In FIG. 49, the Authorized User is setting a notification on the pH alert issue that was defined in FIG. 46. To access this module the user clicks on the Add Notification button on the left side of the screen (4901) and is provided with a self generated form (4902). The Definition (4902) is formed of the Name cell, where the name of the issue can be typed in, and a Category drop-down menu (4903) that offers the following options: Plant, Process, Process Stream, Sampling Point, and Issue. In FIG. 49, the Authorized User selected Issue. As a result of this selection the logic guiding the system disclosed here generates Issue Type (4904). Clicking on the Issue Type drop-down menu (4905) will display any issue type that will have been defined under the Add Issue Module. In this example the user would have the choice among three issue type as displayed in FIG. 47.

Once the Authorized User selected pH Alert as the notification issue type, the logic guiding the system disclosed here generates the Trigger table (4908), which displays all parameters tracked under the pH Alert. When the Trigger table (4908) is first generated, columns Low and High are blank.

If the Authorized User had selected process instead of issue, the generated table would have asked the Authorized User to select a specific process then would have generated a table with parameters monitored for that specific parameter.

The Users section (4907) lists the users that have access to the Log and/or Report Component for the selected plant, which in this example is Plant #3. The approved users (4907) are presented, so that the user may specifically direct the notification. The checkbox next to the name, Judy Black, has been selected, indicating that she is the user that will receive this notification.

At this point, the Authorized User can complete the Trigger table (4908), and define the high and/or low triggers for the specific parameters. In FIG. 49, the user has identified 12 alerts per day as a trigger. In this scenario, Judy Black will receive a notification any time the pH Alarm value exceeds 12 alerts per day. Additional comments are entered in the Description text field (4906). The Submit button (4909) is selected when input is complete and the information added becomes part of the data store for the system.

Figure 50:
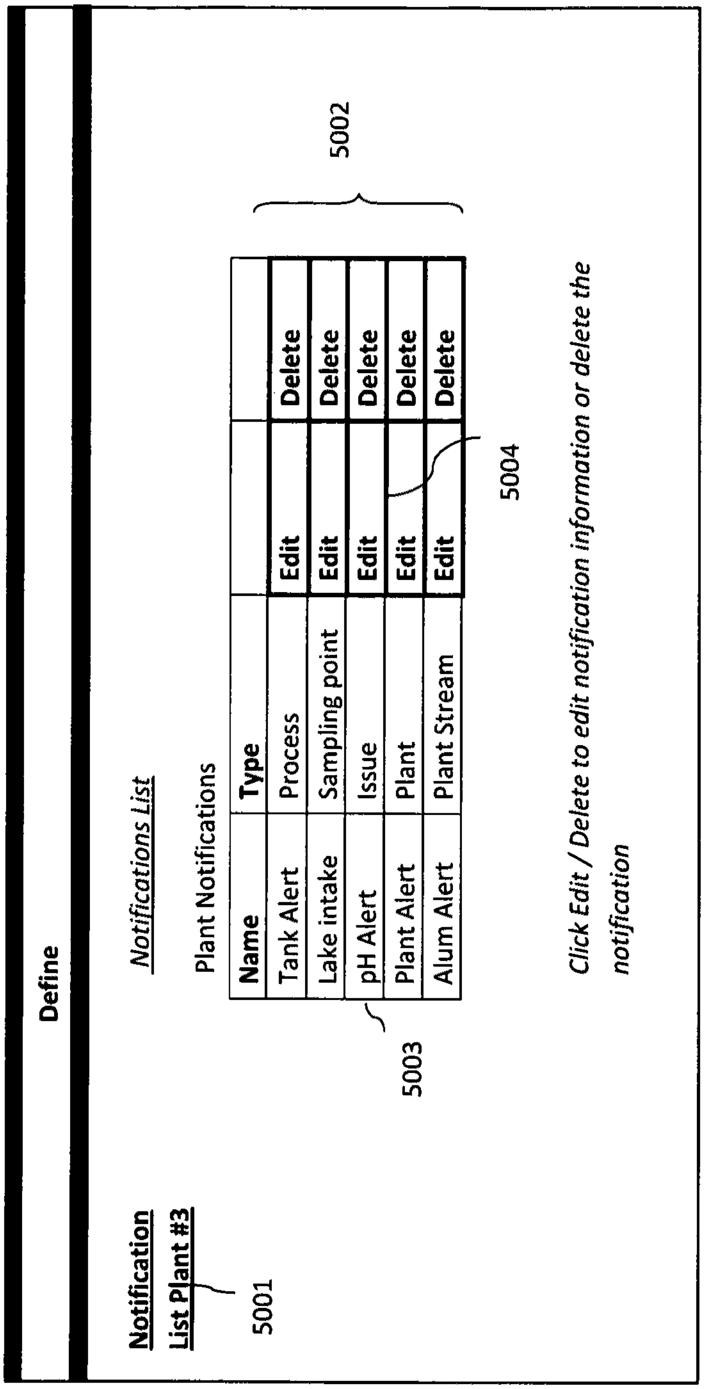
FIG. 50 is a display of a Notification Listing Module.
Figure 51:
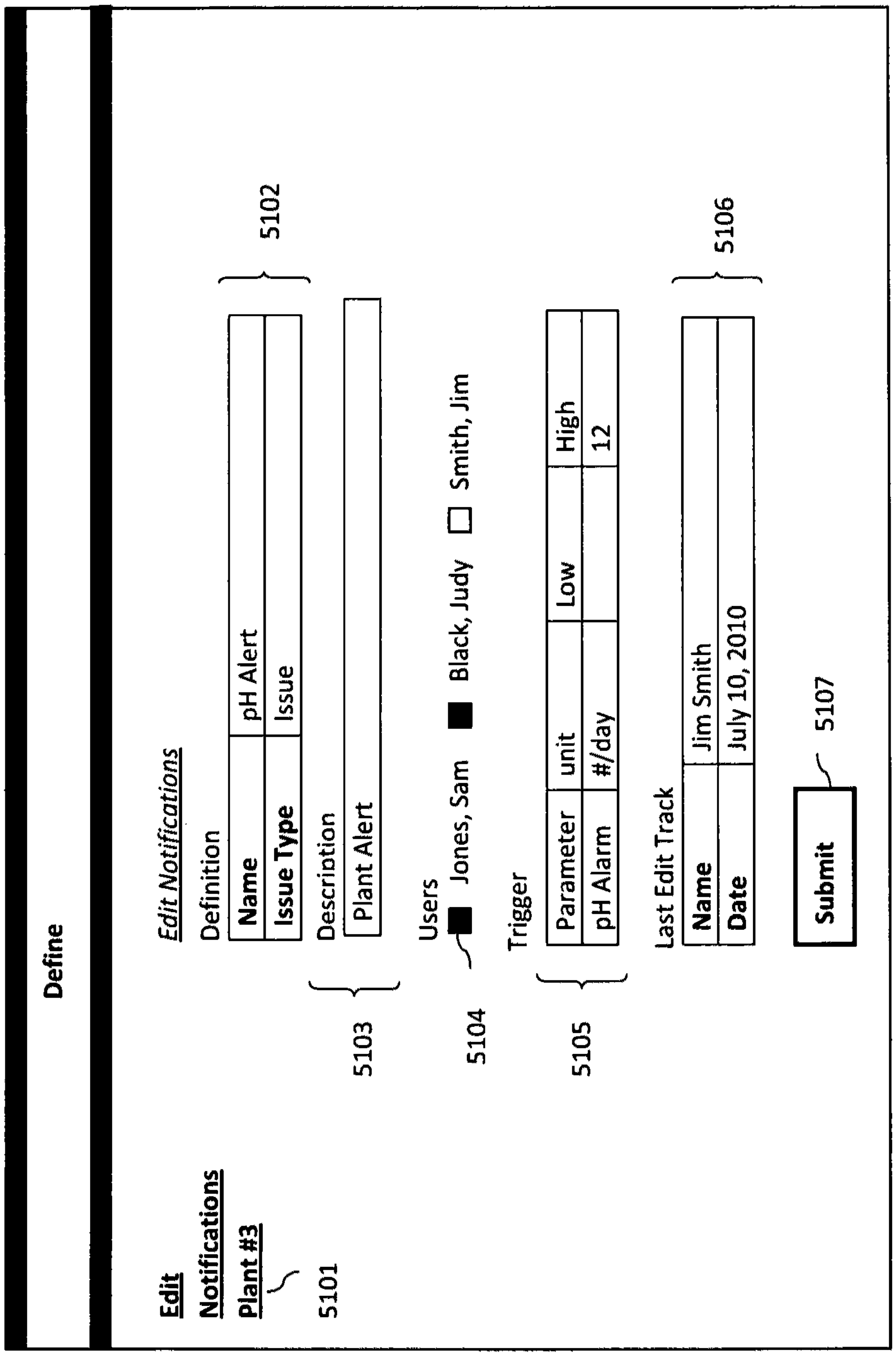
FIG. 51 is a display of a Notification Editing Module.

FIG. 50 illustrates the Notification List screen, which enables the user option to review, edit or delete existing notifications for the selected facility within a specified organization. This module is accessed by clicking on the Notification List button on the left side of the page (5001). The Plant Notifications table (5002) lists the notification currently documented for Plant #3. The new plant notification, pH Alert (5003) has been added to the Notification List. Selecting Edit button (5004) launches Edit Notifications screen as displayed in FIG. 51. Edit Notifications (5101) allows the user to update Notification Definition (5102) and Description (5103) when required. In this example, Sam Jones (5104) was added as a recipient of the pH Alert notification. The High and Low triggers for the specific parameters in the Trigger table (5105) can be modified as well. The latest changes are logged and displayed in Last Edit Track (5106), identifying the name of editor and the date last modified. Changes are saved upon selecting Submit button (5107).

Figure 52:
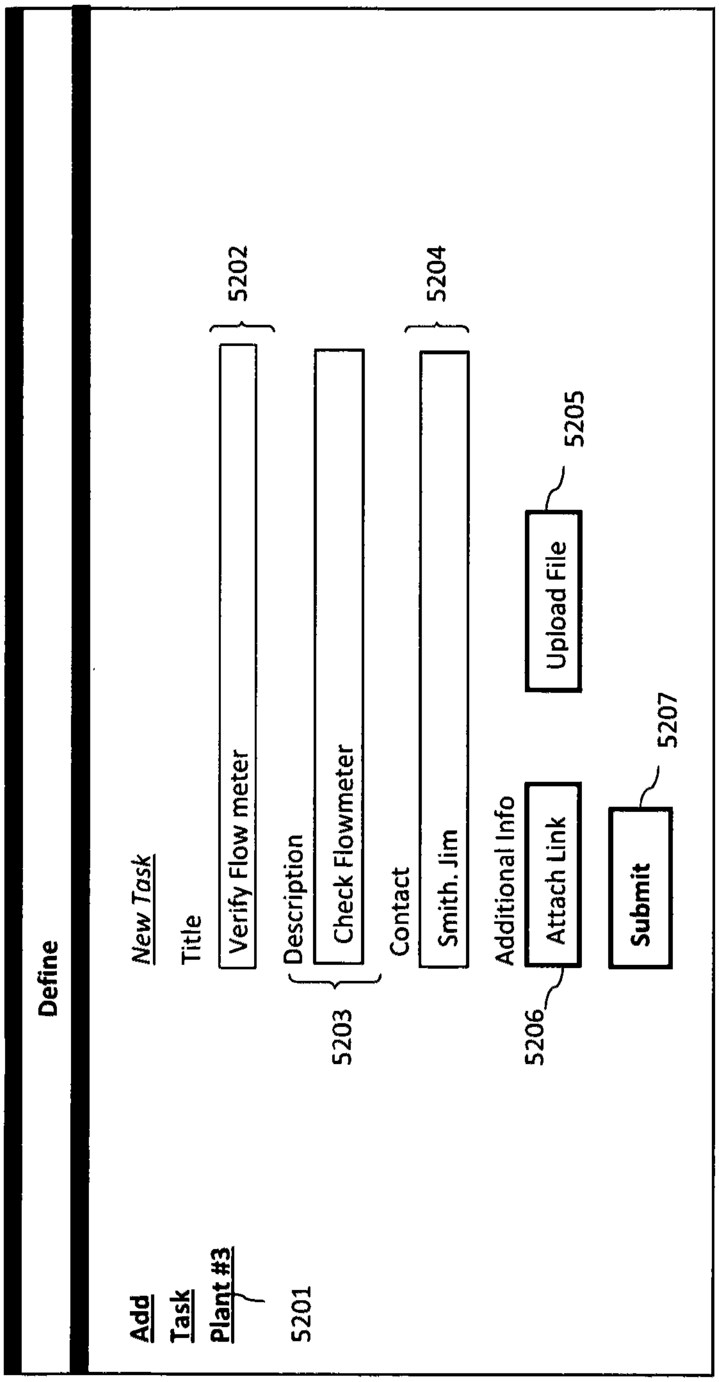
FIG. 52 is a display of a Task Adding Module.

FIG. 52 illustrates the Add Task screen, will allows the Authorized User to define a new task that will be added to the list of plant tasks for a selected facility within a specified organization. Under the logic associated with the system disclosed here tasks are sub units of the action module. Hence an action will be formed by a defined set of tasks. To access this module the user clicks on the Add Task button on the left side of the screen (5201) and is provided with a self generated form (5202). To define a new task, the Authorized User will enter a name in the Title field (5202); in this example the task is Verify flow meter. A Description text field (5203) is available to provide additional information on the task. A contact name can be provided for the task (5204); in this case, the contact name is Jim Smith. If applicable, any documents can be uploaded by clicking Upload file button (5205) and links can be attached by clicking Attach Link button (5206). The Submit button (5207) is selected when input is complete.

Figure 53:
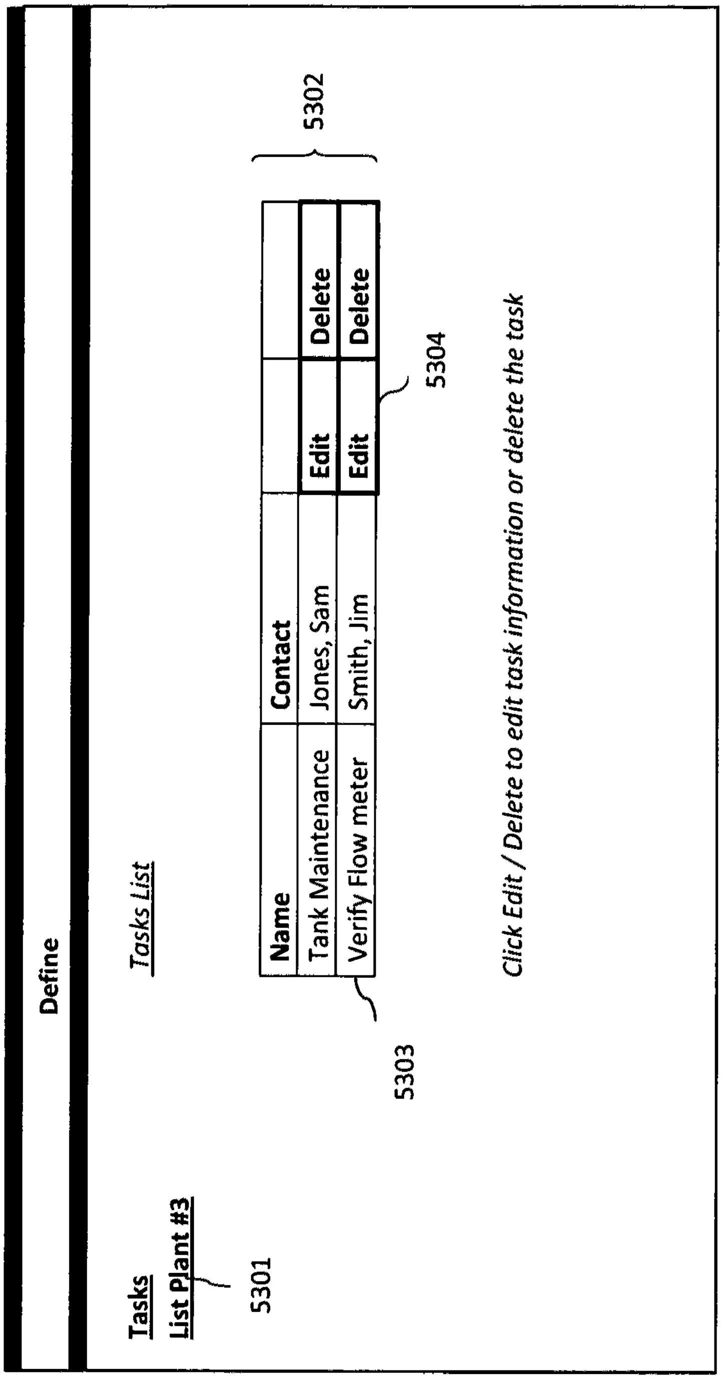
FIG. 53 is a display of a Task Listing Module.
Figure 54:
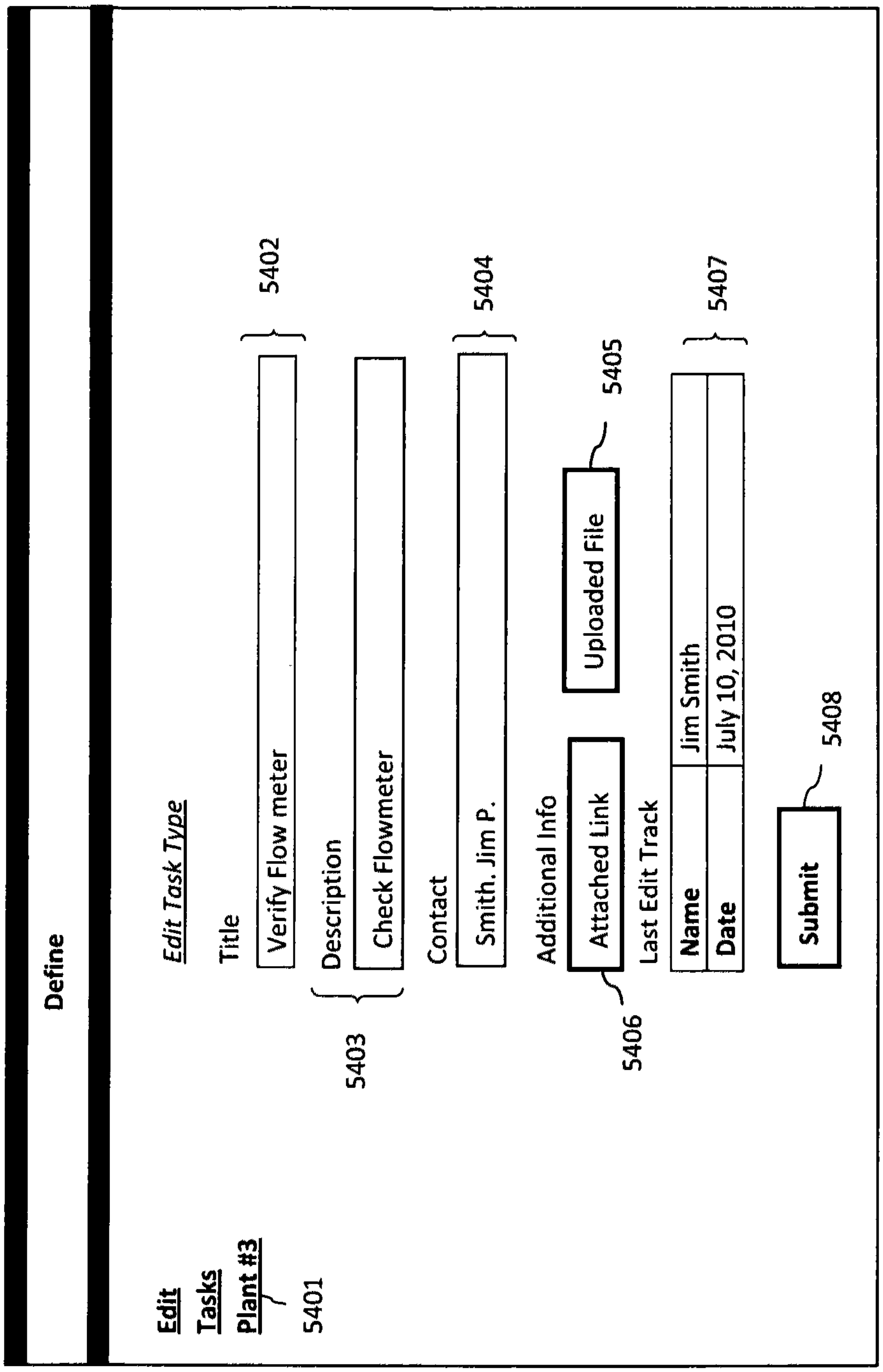
FIG. 54 is a display of a Task Editing Module.

FIG. 53 illustrates the Tasks List screen, which enables the Authorized User option to review, edit or delete existing facility tasks for the selected facility within a specified organization. This module is accessed by clicking on the Task List button on the left side of the page (5301). The Task List table (5302) lists the tasks currently entered for Plant #3. Based on the example above, Verify flow meter and Jim Smith, have been added to the Task List (5303). Selecting Edit button (5304) under the Verify Flow Meter Task opens the Edit Task screen displayed by FIG. 54. The Edit Task screen is where the Authorized User is permitted to update Task Requirements (5402), Description (5403), and Contact Name (5404) as necessary. Any documents can be uploaded by clicking Upload file button (5405) and links can be attached by clicking Attach File button (5406). The latest changes are then logged in the database and are displayed in Last Edit Track (5407), which identifies the name of editor and the date last modified prior to the present change. Selecting Submit button (5408) saves the changes that were just completed.

Figure 55:
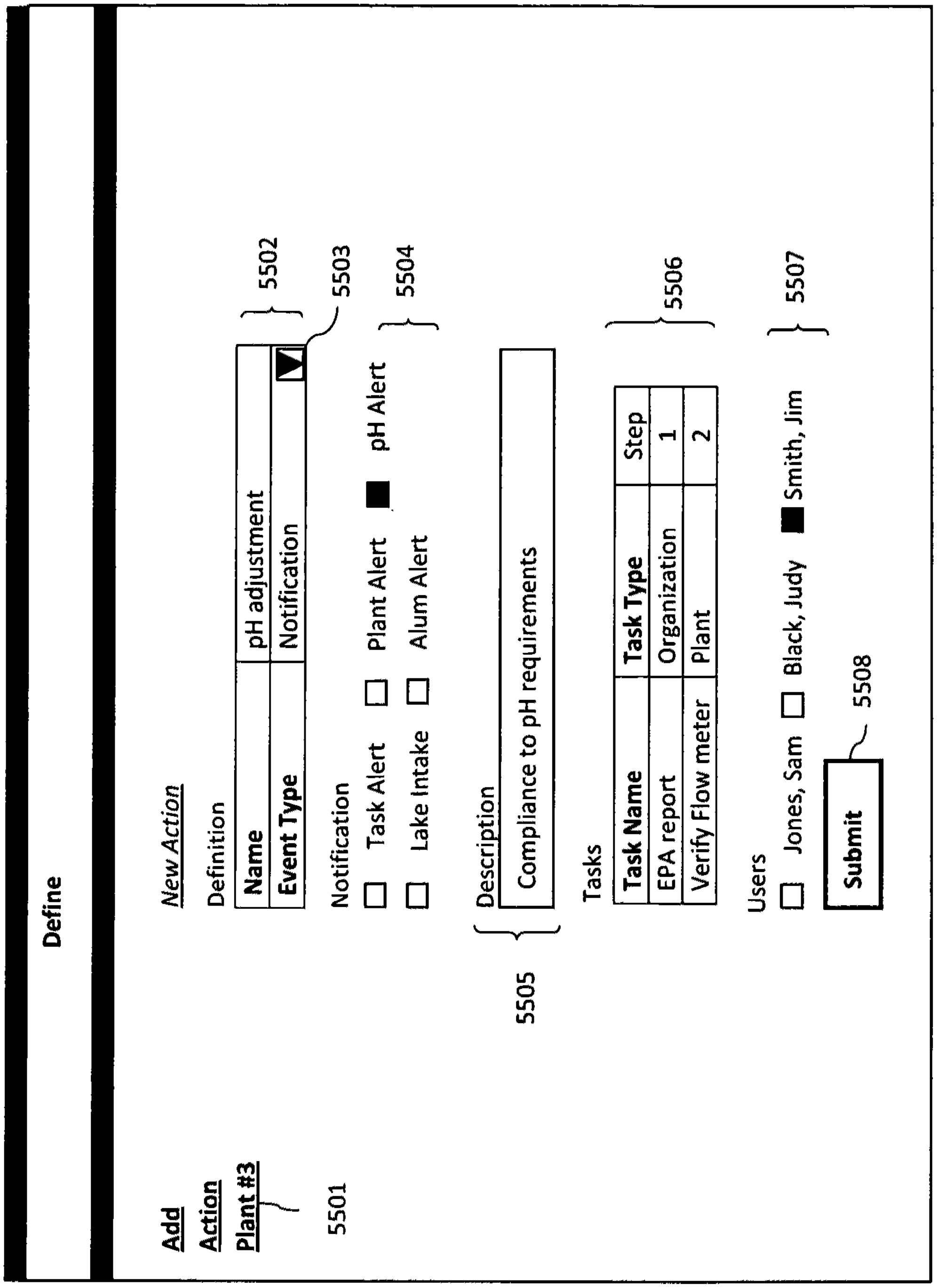
FIG. 55 is a display of an Action Adding Module.

FIG. 55 illustrates the screen display for Add Action, where the Authorized User defines a new action for the selected facility within a specified organization. An action is a combination of tasks which need to be performed in a given order. These tasks can be global tasks or facility-specific tasks. To access this module the user clicks on the Add Action button on the left side of the screen (5501) and is provided with a self generated form (5502). In FIG. 55, the Definition table (5502) lists the new action titled pH adjustment. The trigger for an action message to be issued is defined by using the Event Type drop-down menu (5503). The options under the Event Type drop-down menu include log data, sent notification, published report and published chart. Under the example, the new action is triggered by a notification. In that case, the logic used for the system disclosed here generates the list of notifications (5504) available in the system. This list presented in FIG. 55 is an example of a table generated by the List Action Module which is auto populated by the system's display element . . . .

Additional comments may be entered in the Description text field (5505). A Tasks table (5504) generated by the system disclosed here logic lists all Global and Facility Tasks currently assigned for Plant #3. The user must select the tasks associated with the action but also to rank the sequence in which these tasks need to take place. In this example, EPA report is the Global Task, denoted by the Task Type, which is organization. This task is the first one to be performed, as it is noted as being Step 1. Verify flow meter is a facility Plant #3 task, denoted by the Task Type, which is plant. This task is to be achieved once the EPA report has been taken into consideration, as noted by Step 2.

The system disclosed here also generates the list of authorized Plant #3 System Users (5507), from which the Authorized User selects the recipient or recipients of the action notice, that will be generated once the trigger will have been activated. The trigger in this example is when the number of daily pH alerts will exceed 12. Under FIG. 49, Judy Black was selected as the contact; in FIG. 55 Jim Smith was selected as the user to be the contact for this action. The Submit button (5508) is selected when input is complete.

Figure 56:
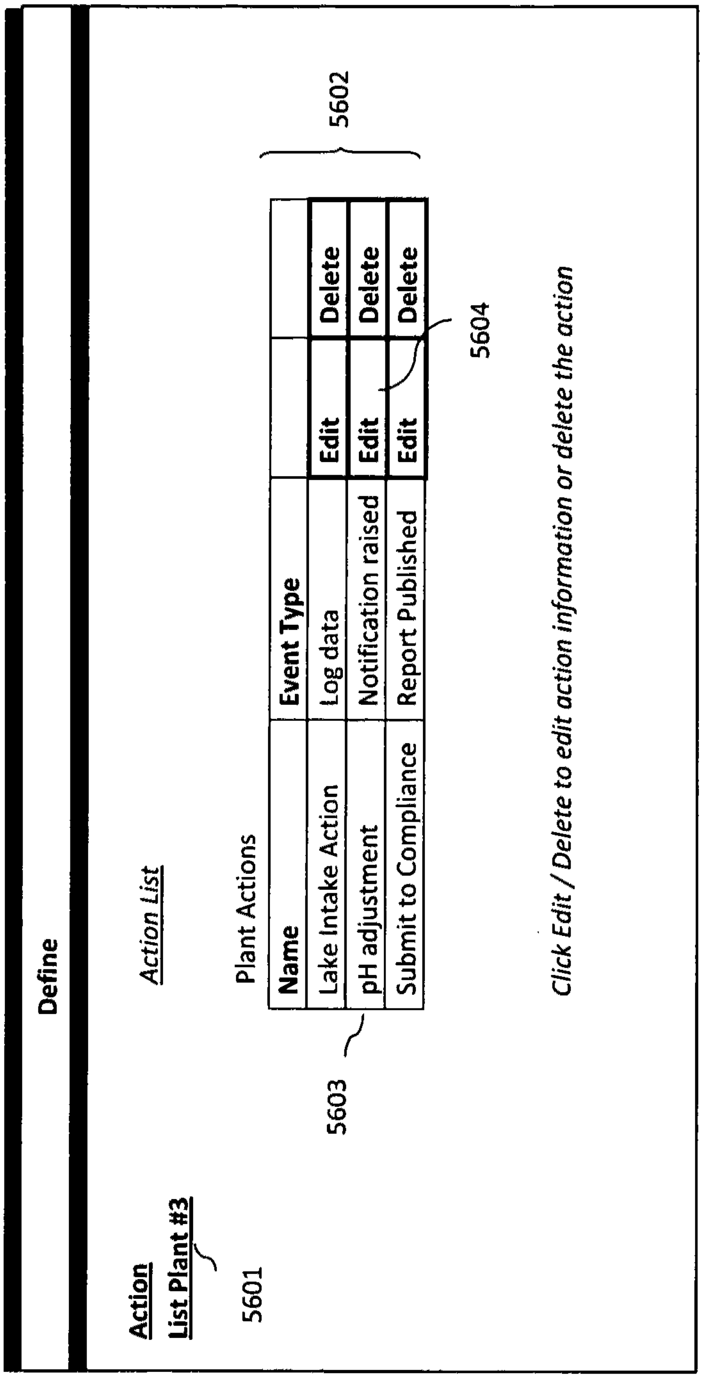
FIG. 56 is a display of a Action Listing Module.
Figure 57:
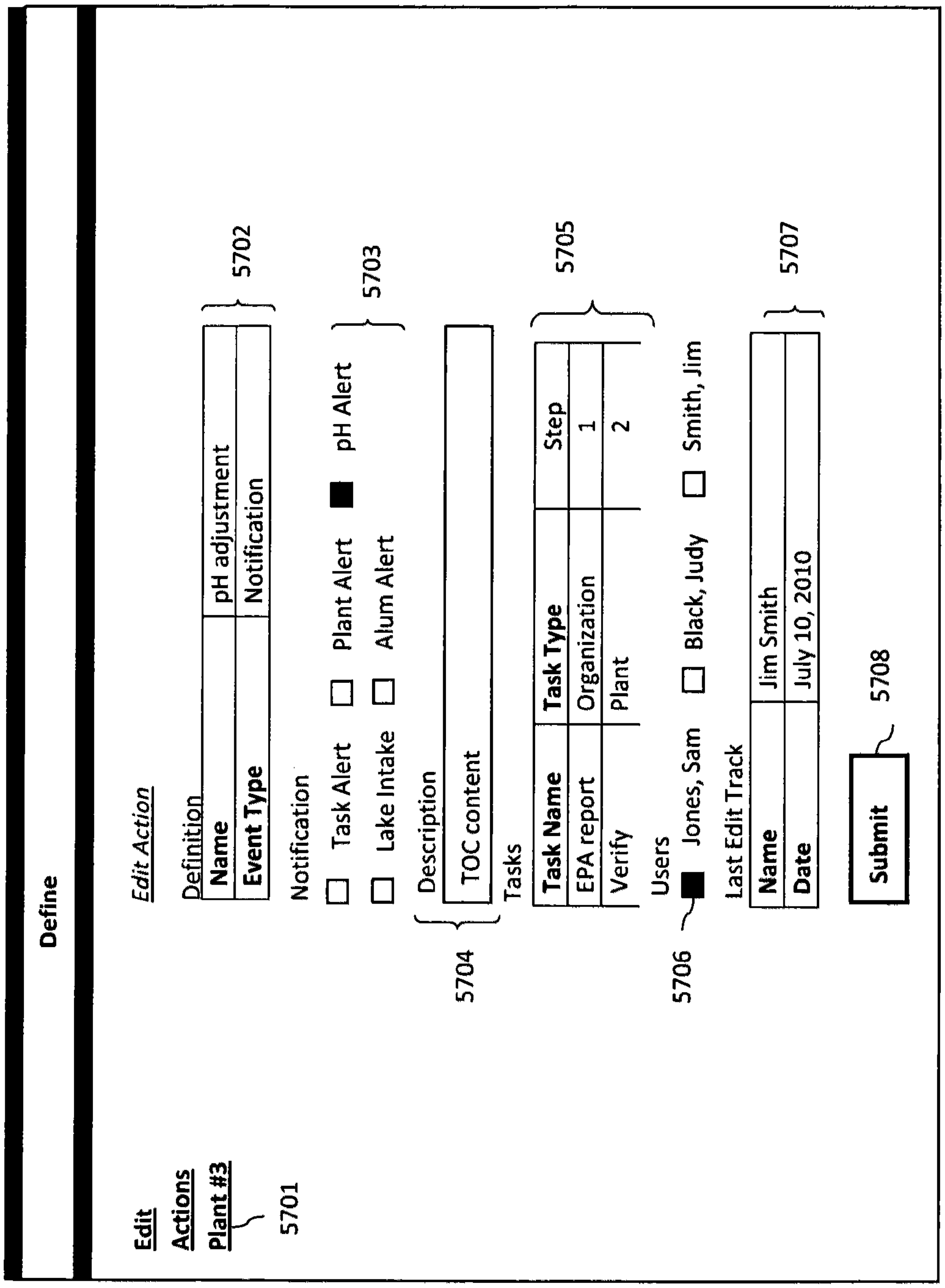
FIG. 57 is a display of an Action Editing Module.

FIG. 56 illustrates the Action List screen, which enables the user option to review, edit or delete existing facility actions within a specified organization. This module is accessed by clicking on the Action List button on the left side of the page (5601). The Plant Actions table (5602) lists the actions currently assigned for Plant #3 facility. In this example, pH adjustment (5603) has been added to the Plant Actions. Selecting Edit button (5604) launches the Edit Action screen displayed in FIG. 57, which enables the Authorized User to edit the information displayed for this specific action. The user is permitted to update Action Name and Event Type (5702), Description (5704), the Step Order (5705) and User Name(s) (5706) as necessary. The list of notifications (5703) available in the system is triggered by the action selected. In this example, the action is unchanged, but the users have been changed from Jim Smith to Sam Jones. The latest changes are logged and displayed in the Last Edit Track, identifying the name of editor and the date last modified (5707). Changes are saved upon selecting Submit button (5708).

5—Data Logging Component

The Log Data Component is the process of data input. There are five functions in the Log Data Component that are only accessible for Authorized Users within a specified organization. Each function is comprised of a minimum of 3 modules and is presented in the following figures of the Log Data Component. Plant Log Manager Function Modules are Plant Log Adding (FIG. 59), Plant Log Search (FIG. 60), and Plant Log Editing (FIG. 61). Process Log Manager Function Modules are Process Log Adding (FIG. 62), Process Log Search and Listing (FIG. 63), and Process Log Editing (FIG. 64). Process Stream Log Manager Function Modules are Process Stream Log Adding (FIG. 65), Process Stream Log Search (FIG. 66), and Process Stream Log Editing (FIG. 67). Sampling Point Log Manager Function Modules are Sampling Point Log Adding (FIG. 68), Sampling Point Log Search and Listing (FIG. 69), and Sampling Point Log Editing (FIG. 70). Plant Issue Type Manager Function Modules are Plant Issue Log Adding Module (FIG. 71), Plant Issue Log Search and Listing Module (FIG. 72), and Plant Issue Log Editing (FIG. 73). By clicking on the component, a menu will appear with the linked modules, which are then each accessed by clicking on the individual module button. Utilizing the form-driven user configurable computer implemented system, Authorized Users are able to log and store pertinent data for analysis and reporting. The Log Data Component can be used to capture specific operative data to retain data integrity and facility efficiency. Plant #3 will be used as the sample plant to illustrate the figures for the Log Data Component.

The plant definition module is comprised of, but not limited to, a plant log listing module and plant log module (add/edit), a process log listing module and process log module (add/edit), a process stream log listing module and process stream log module (add/edit), and a sampling point log listing module and sampling point log module (add/edit) under the system disclosed here.

Figure 58:
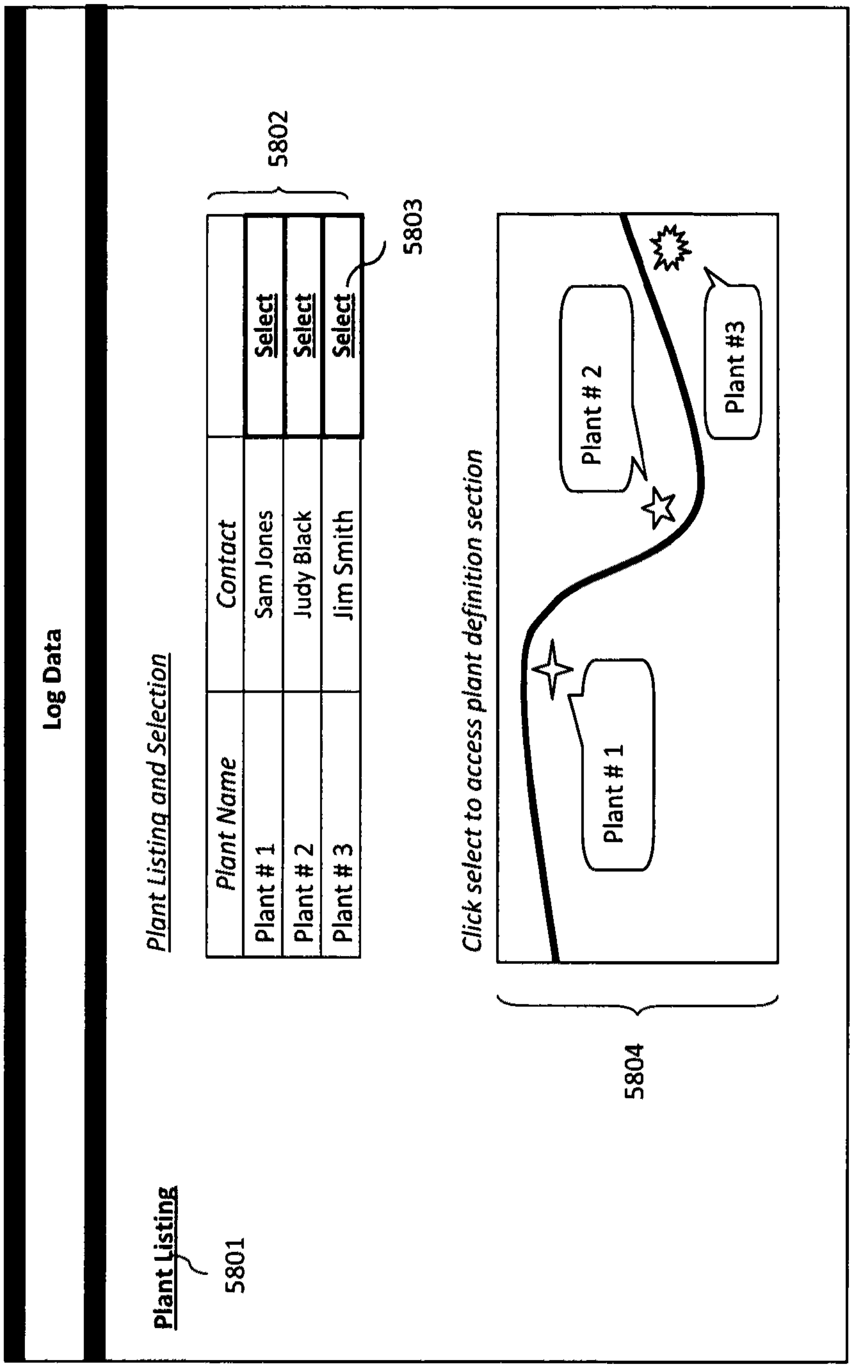
FIG. 58 is a display of a Plant Log Selection Module.

The process begins with selecting the plant the Authorized User wants to access. FIG. 58 displays the Plant Listing screen (5801) that enables the user to view facilities currently maintained in the application. The Plant Listing and Selection table (5802) is a list of the plants and their assigned contacts. Clicking Select button (5803) allows the user to review a plant's administrative and functional information and to log the plant's data. A map (5804) provides the geographic location of all facilities, which is auto populated by the system's display element.

Figure 59:
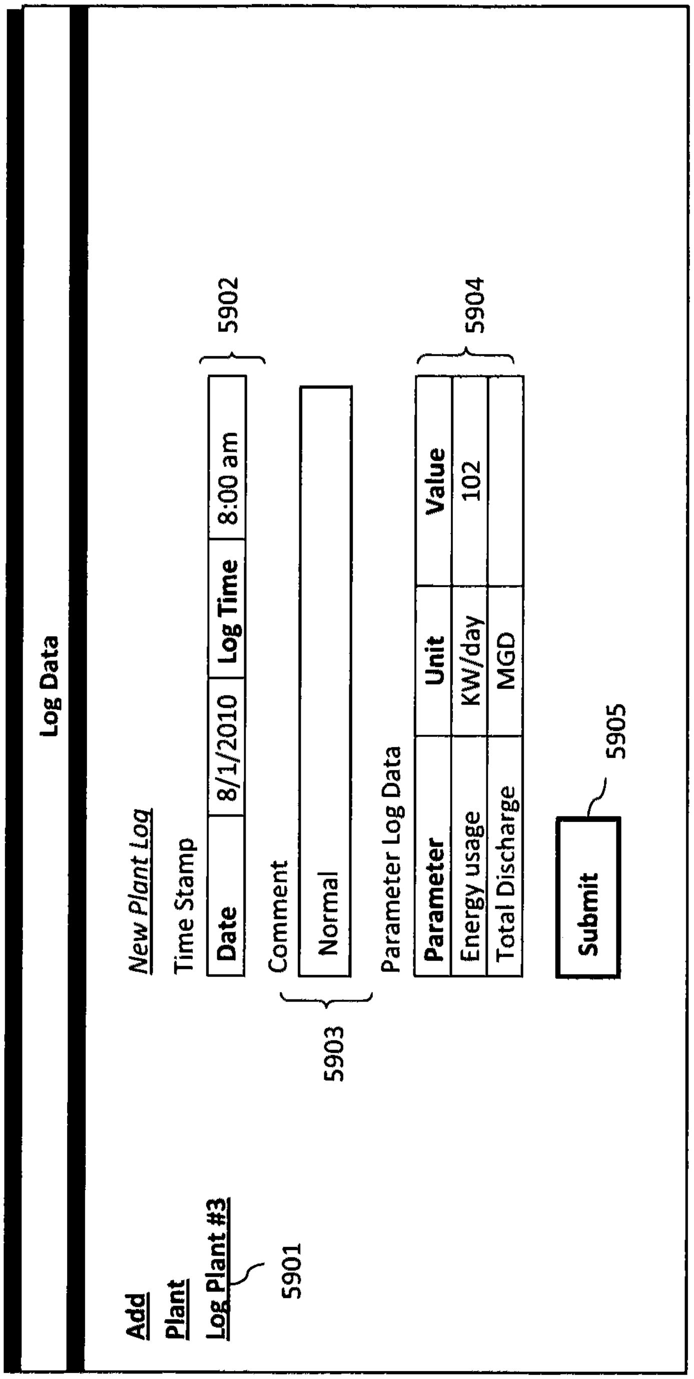
FIG. 59 is a display of a Plant Log Adding Module.

FIG. 59 illustrates the screen display for Add Plant Log, where the user selects from the log Date and Time fields and drop-downs (5902). To access this module the user clicks on the Add Plant Log button on the left side of the screen (5901) and is provided with a self generated form (5902). Additional information can be entered into the Description text field (5903), if user chooses to do so. Predefined plant-specific parameters are displayed, for which the Authorized User can input values (5904), as selected in FIG. 31. The plant log parameters listing module is activated to display the monitoring parameters in the operation of the plant. For those parameters that have been marked for use of special operands, the user can additionally choose whether the measurement is equal to, less than or greater than a particular value. In this example, Aug. 1, 2010 and 8:00 am are utilized for date and time, the value input for energy usage parameter=102, and "Normal' is typed in the Description text field. The Submit button (5905) is selected when input is complete.

Figure 60:
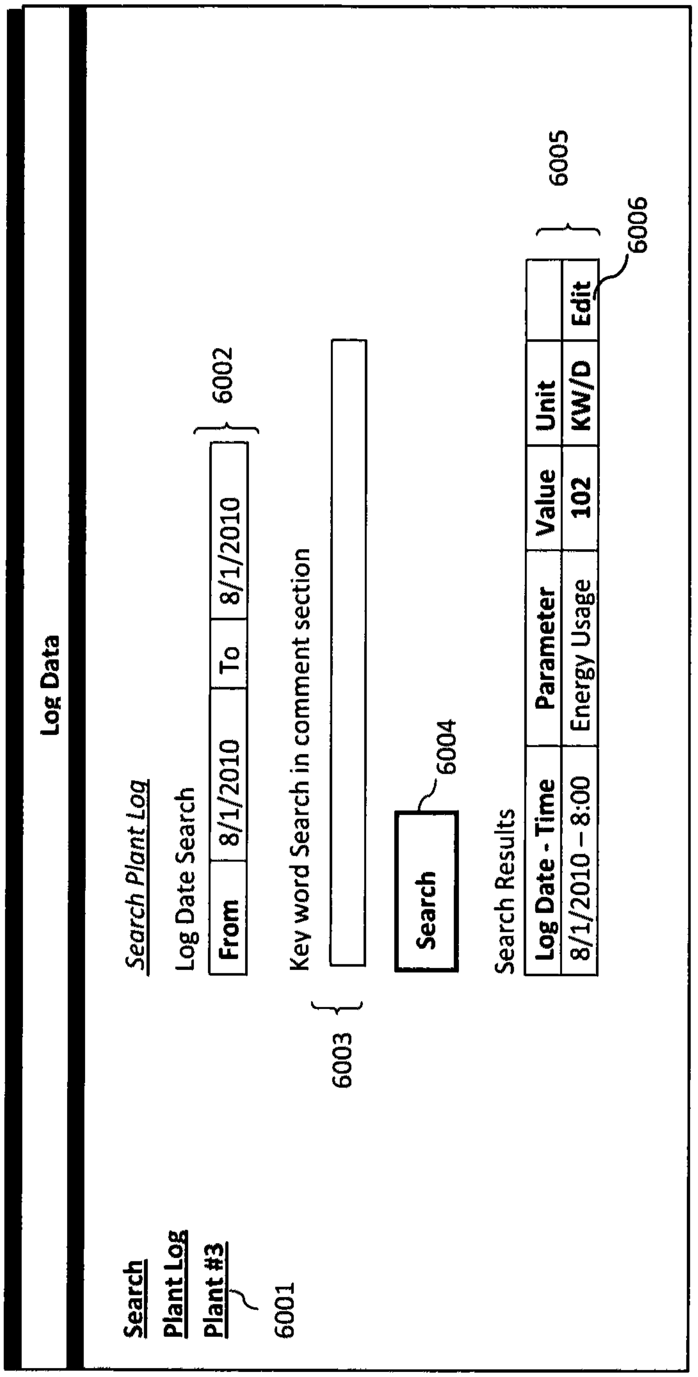
FIG. 60 is a display of a Plant Log Search Module.
Figure 61:
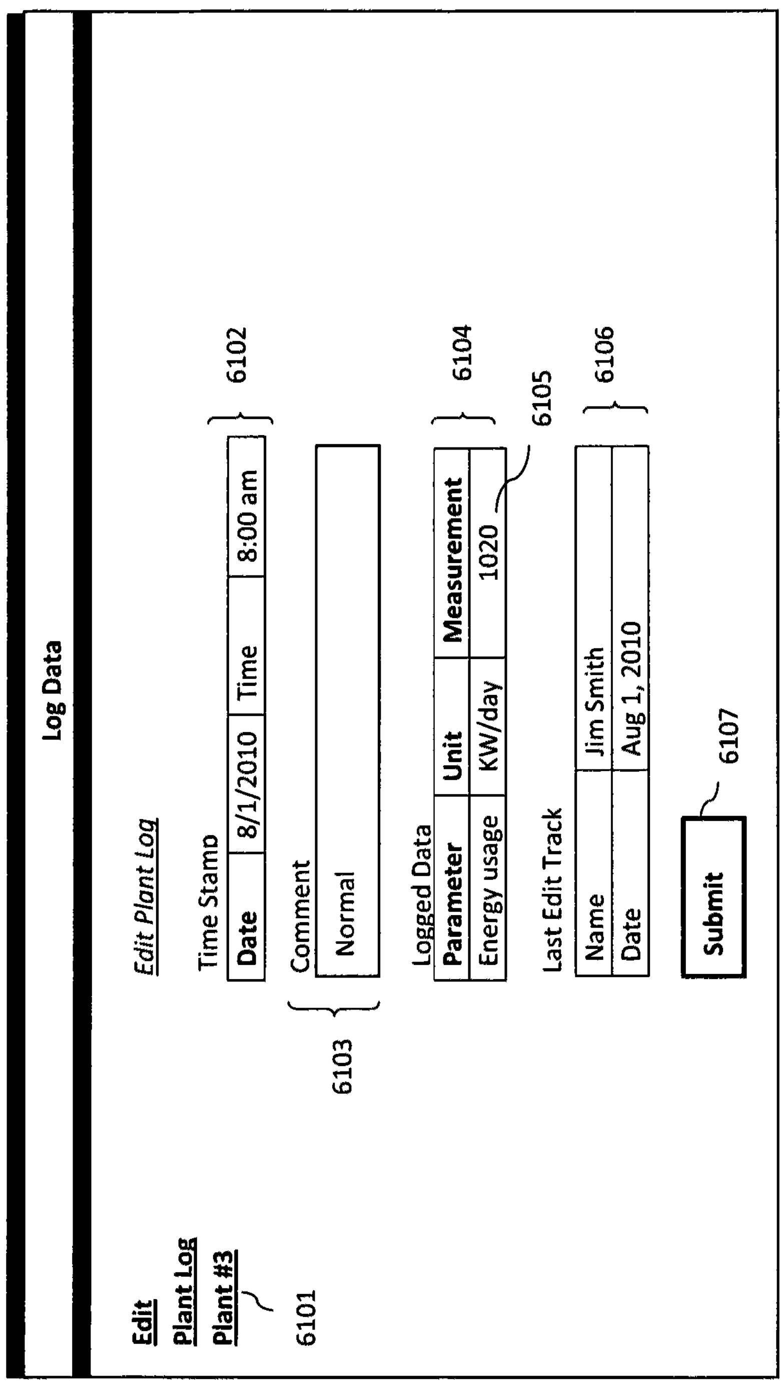
FIG. 61 is a display of a Plant Log Editing Module.

FIG. 60 displays the Plant Log Listing module, which enables the user option to search and review existing plant logs by Date (6002) and/or by Key Word (6003). This module is accessed by clicking on the Search Plant Log button on the left side of the page (6001). Click Search button (6004), to generate the Search Results table (6005) containing log entry results for all plant log input for the date range selected for Plant #3, organized by name and particular details. Selecting Edit button (6006) launches the Edit Plant Log screen (6101), which is part of the Plant Definition module of the form-driven user configurable computer implemented solution. The screenshot displayed in FIG. 61, where the user is permitted to make edits in the Plant Log. The page outlines the original log displaying Date and Time (6102) of the original input, the Comment field (6103), and the Logged Data table (6104). In this example, a measurement of the parameter, Energy usage has been changed from 102 to 1020 (6105). The latest changes are logged and displayed in the Last Edit Track (6106) that displays the name of editor and the date last modified. Changes are saved when Submit button (6107) is selected.

Figure 62:
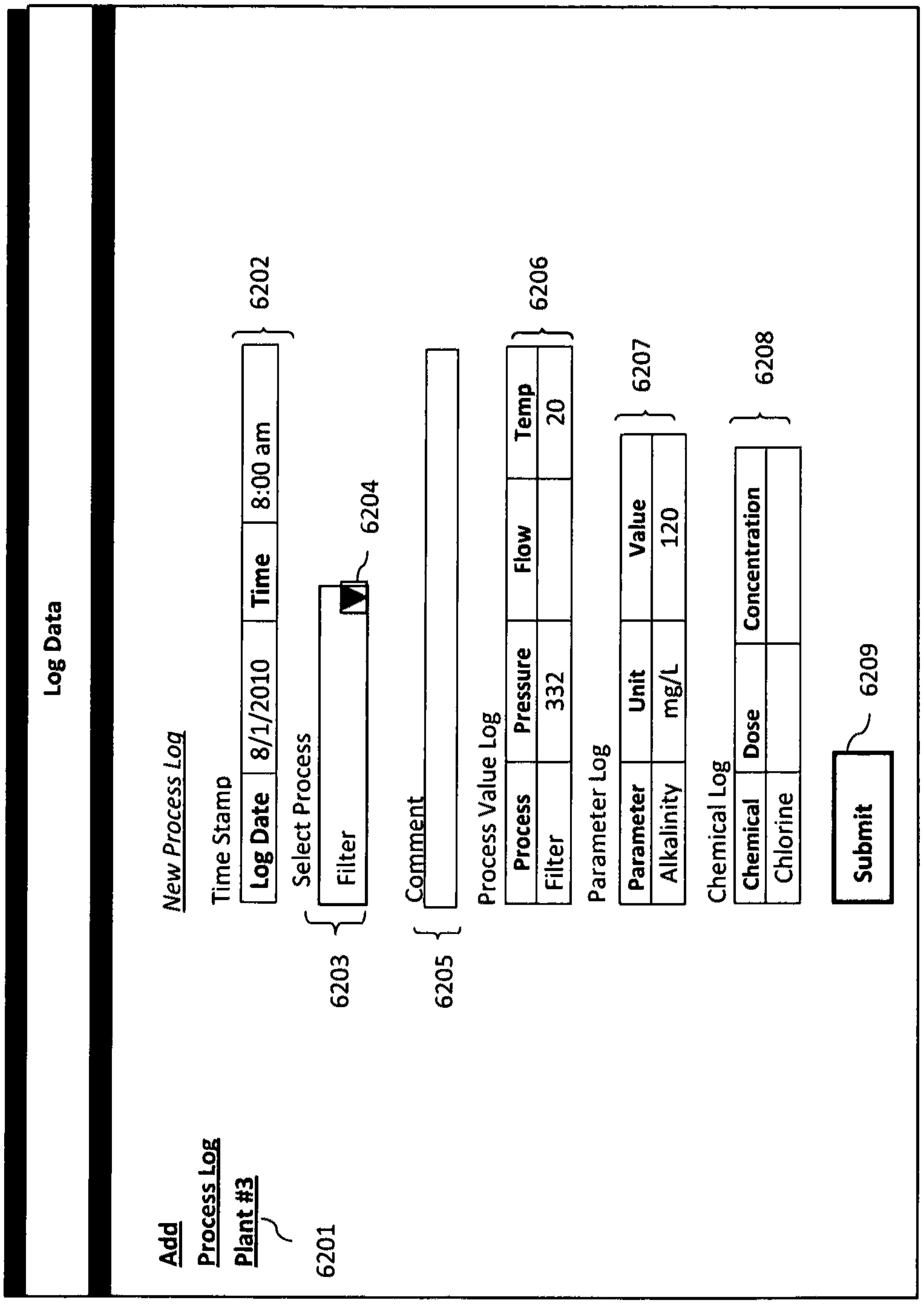
FIG. 62 is a display of a Process Log Adding Module.

FIG. 62 displays the Add Process Log screen, where the user inputs data by selecting from the log Date and Time fields and drop-down menus (6202). To access this module the user clicks on the Add Process Log button on the left side of the screen (6201) and is provided with a self generated form (6202). Additional input fields are for process name, mode and stage. The user has the option of Master mode or Process mode. If Master mode is selected the information can be collected for all processes and process stages for the plant. If process mode is selected the information can be collected for only one process and stage for the plant. The user can select one or several processes for which data will be logged in the Select Process drop-down menu (6203). In this example, the user selected Filter (6204), which was the process that was added under the add process module example. The Comment field (6205) may be utilized for descriptive information.

A predefined Process Parameter table (6206) is generated by the system disclosed here's display element, as well as the predefined Parameter Log (6207) and Chemical Log (6208) tables. The process log parameter listing module and process log chemical listing module are activated to display the monitoring parameters and utilized chemicals in the operation of the process. The Authorized User can to inputs value(s) into these tables. For those parameters that have been marked for use of special operands, the Authorized User can additionally choose whether the measurement is equal to or less than/greater than a particular value. In this example, Aug. 1, 2010 and 8:00 am (6202) are utilized for date and time, the process is Filter (6204), the log input values are 332 for Pressure for Process Value, 20 for Temperature and 120 for Alkalinity, and no input for the Chlorine under Chemical Log. The Submit button (6209) is selected when input is complete.

Figure 63:
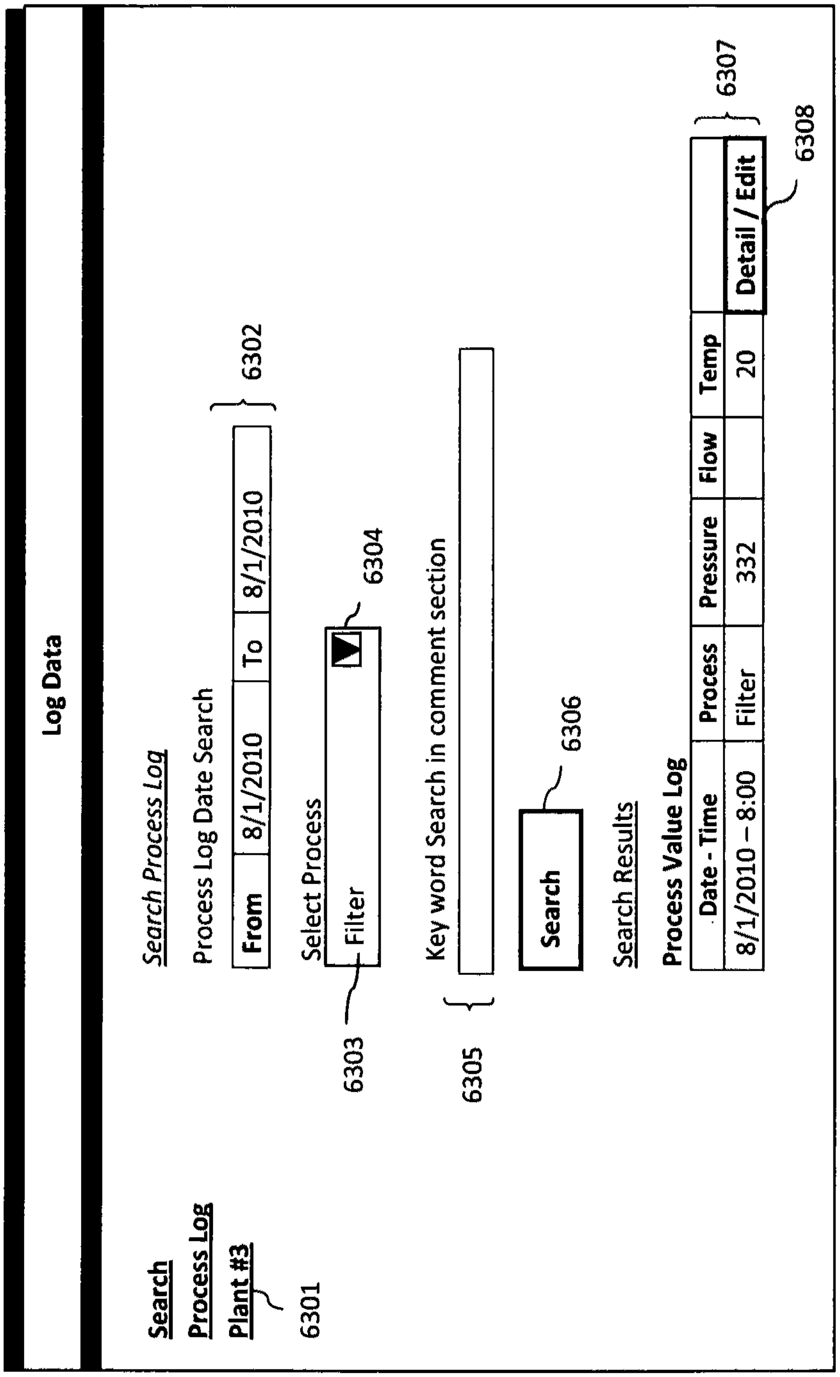
FIG. 63 is a display of a Process Log Search/Listing Module.
Figure 64:
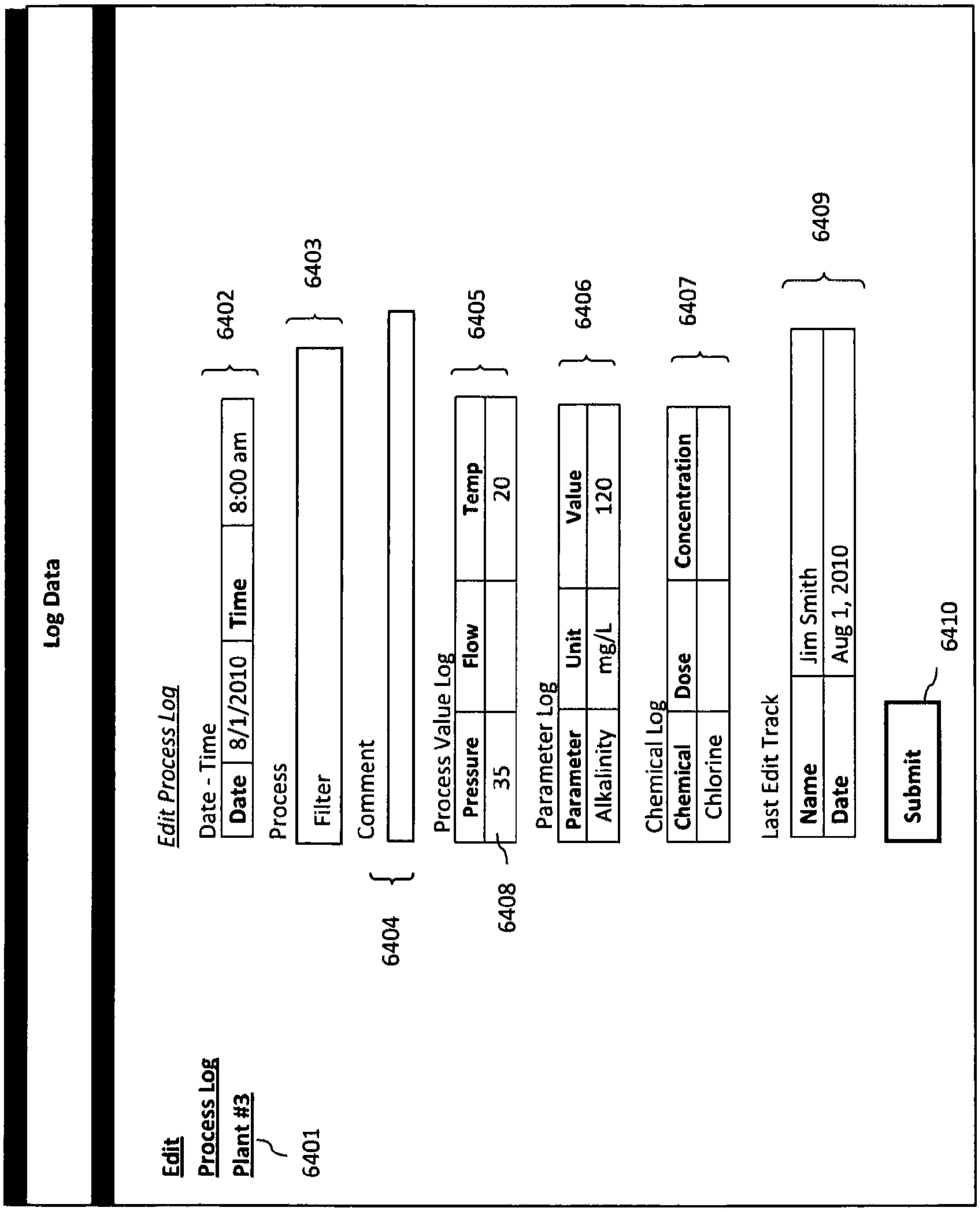
FIG. 64 is a display of a Process Log Editing Module.

FIG. 63 displays the Process Log Listing module, which enables the user option to search and review existing process logs by a date range in the Process Log Date Search table (6302), a process (6303) using the drop-down Select Process menu (6304) and/or by key word in the Key word Search in comment section (6305). This module is accessed by clicking on the Search Process Log button on the left side of the page (6301). When Search button (6306) is clicked, the Process Value Log table (6307) is generated containing process log entry results for the requested query, which includes any predefined process parameters organized by name and particular details. Selecting Edit button (6308) for a specific data log will launches the Edit Process screen with all the information pertaining to that data log. FIG. 64 displays the Edit Process screen (6401), which is part of the Plant Definition module of the form-driven user configurable computer implemented solution, permits the user to make edits in the Process Log. The page outlines the original log displaying Date and Time (6402) of the original input, the Process table (6403), the Comment field (6404), the logged data in the Process Value Log (6405), additional predefined assigned parameters in the Parameter Log (6406) and chemicals in the Chemical Log (6407). In this example, the value for Pressure was changed from 332 to 35 (6408), while all other information remained the same. The latest changes are logged and displayed in the Last Edit Track (6409), which identifies the name of editor and the date last modified. Selecting Submit button (6410) saves changed.

Figure 65:
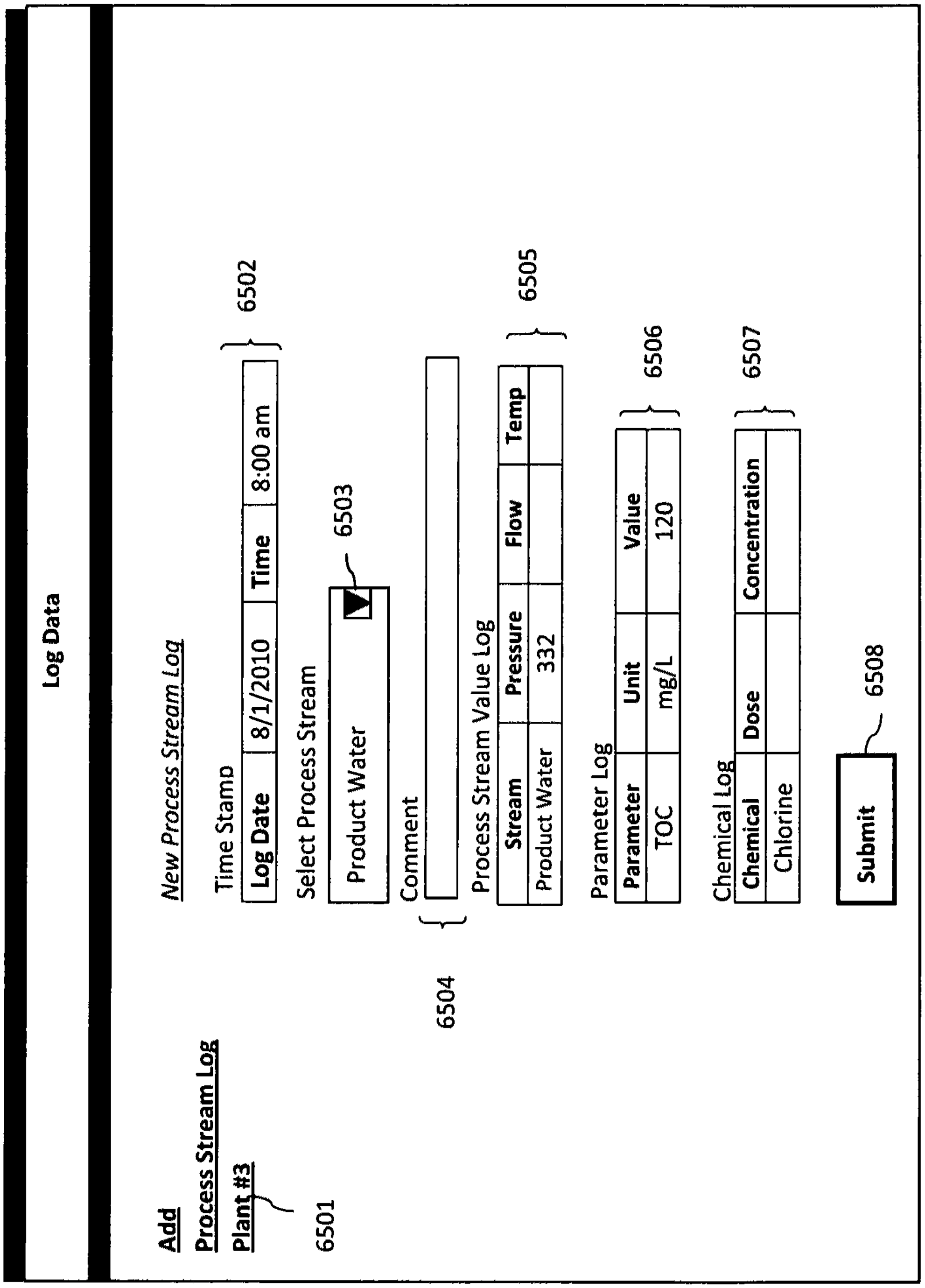
FIG. 65 is a display of a Process Stream Log Adding Module.

FIG. 65 displays the Add Process Steam screen, where the user has the accessibility to input data by use of log Date and Time fields and drop-downs (6502), and to select Master or Process mode. To access this module the user clicks on the Add Process Stream Log button on the left side of the screen (6501) and is provided with a self generated form (6502). With the Select Process Stream drop-down menu (6503), the user has the option to choose one or all available process streams. In the Plant #3 example, the user would have three choices Product Water, Raw Water, Filter feed (as illustrated in FIG. 41). In FIG. 65, the user selected Product Water. The Description field (6504) may be utilized for additional information.

Once the process stream has been selected, the configurable computer implemented system's display element generates three sets of tables, the predefined Process Stream Parameters (6505), the system-predefined Parameter Log (6506) and the Chemical Log table (6507). The process stream log parameter listing module and process stream log chemical listing module are activated to display the monitoring parameters and utilized chemicals in the operation of the process stream. When generated, all three tables are blank and the Authorized User is able to add the information as needed.

For those parameters that have been marked for use of special operands, the user can additionally choose whether the measurement is equal to, less than, or greater than a particular value. In this example, Aug. 1, 2010 and 8:00 am are utilized for date and time, the process stream is Product Water, the log input values are 332=Pressure for Process Value, 120=TOC for Parameter, and no input for the Chlorine under Chemical Log. The Submit button (6508) is selected when input is complete.

Figure 66:
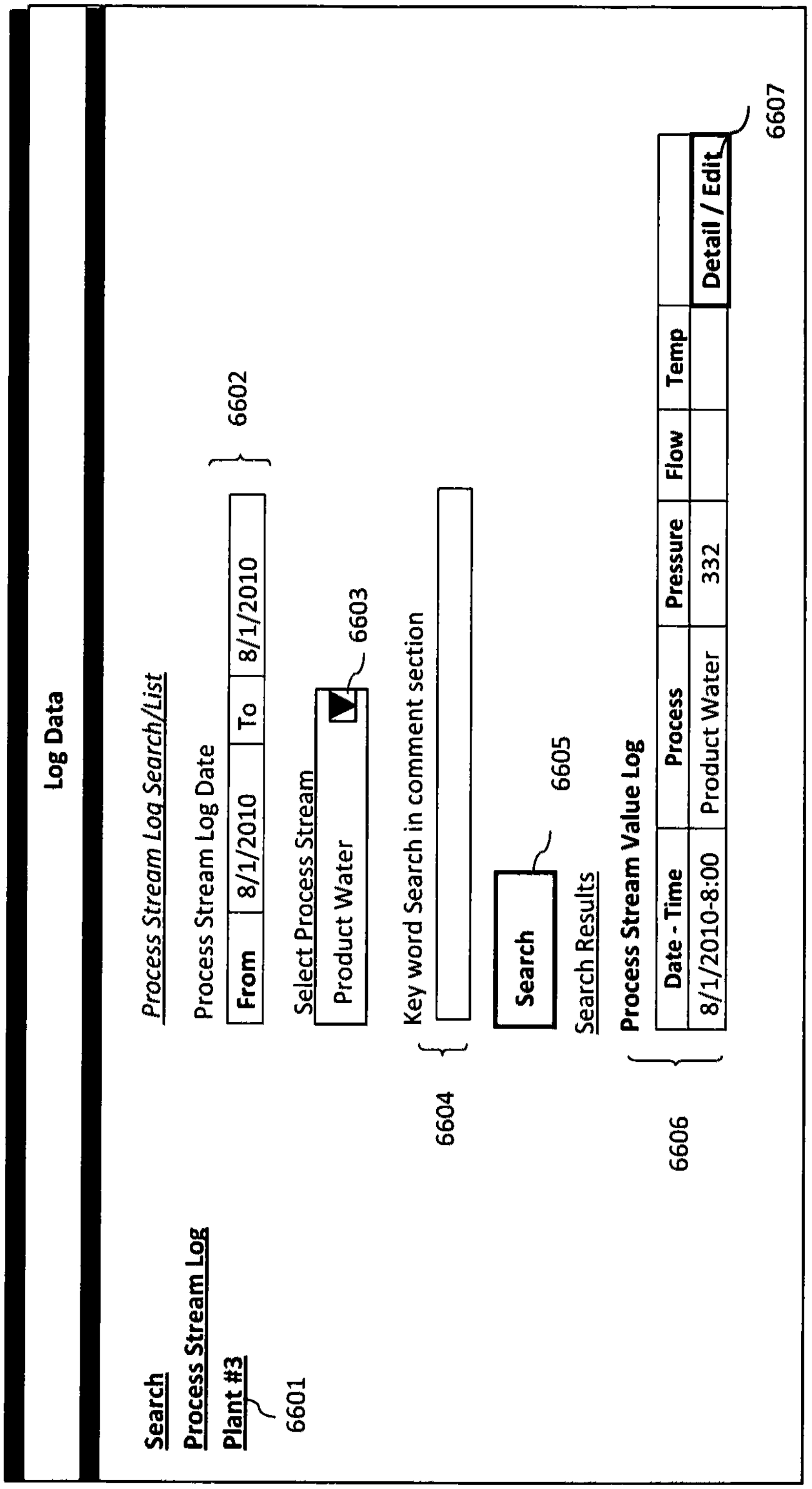
FIG. 66 is a display of a Process Stream Log Search/Listing Module.
Figure 67:
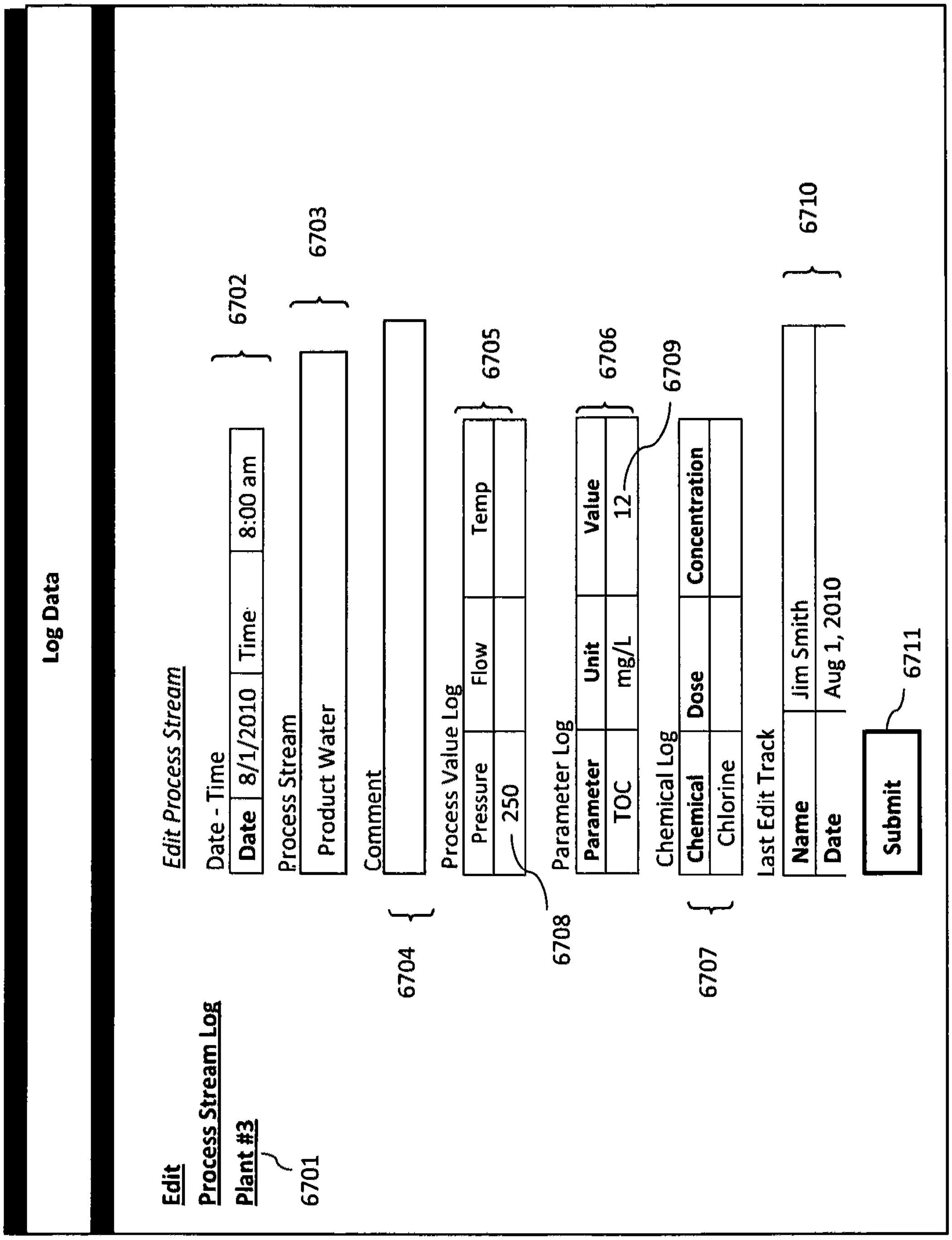
FIG. 67 is a display of a Process Stream Log Editing Module.

FIG. 66 displays the Process Stream Log Listing module, which enables the user to search and review existing process stream logs by a date range (6602), a process selected from the Process Stream drop-down menu (6603) and/or by Key Word (6604). This module is accessed by clicking on the Search Process Stream Log button on the left side of the page (6601). Under the Process Stream drop-down menu (6603), the user can select one or all process streams in the system. Under the Plant #3 example the user would have three choices: Product Water, Raw Water, Filter feed (as explained in FIG. 41). The user selected Product Water for its query.

Once the user clicks on Search button (6605), the Process Stream Value table (6606) is generated of log entry results that display all process stream log input for the date range and process stream selected for Plant #3, and includes any predefined process parameters organized by name and particular details. Selecting Edit button (6607) for a specific data point opens the Edit Process Stream Log window as displayed in FIG. 67. The Edit Process Stream Log button (6701), which is part of the Plant Definition module of the form-driven user configurable computer implemented solution, permits the user to make edits in the Process Stream Log. The page displays the log displaying Date and Time (6702) of the original input, the Process Stream (6703), Comment field (6704), the logged data in the Process Value Log (6705), additional predefined assigned parameters in the Parameter Log (6706) and chemicals in the Chemical Log (6707). In this example, the value for Pressure was changed from 332 to 250 (6708), and the TOC value was adjusted from 120 to 12 (6709); there is no input for the Chlorine under Chemical Log. The latest changes are logged and displayed in the Last Edit Track (6710), identifying the name of editor and the date last modified. Changes are saved upon selecting Submit button (6711).

Figure 68:
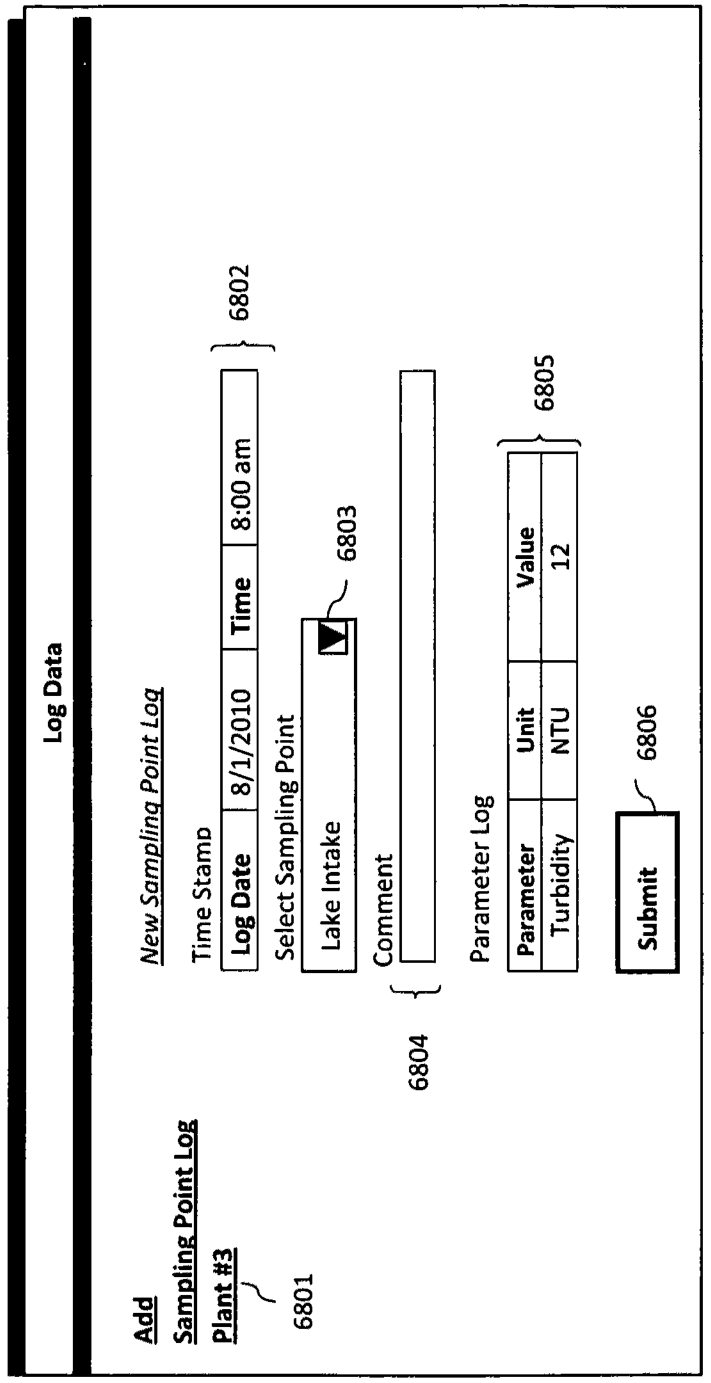
FIG. 68 is a display of a Sampling Point Log Adding Module.

FIG. 68 illustrates the Add Sampling Point Log screen, where the Authorized User has the accessibility to input data by use of log Date and Time fields and drop-downs (6802), and to select Master or Process mode. To access this module the user clicks on the Add Sampling Point Log button on the left side of the screen (6801) and is provided with a self generated form (6802). In the Select Sampling Point drop-down menu (6803), the Authorized User has the option to choose one or all available sampling points in the system. The Select Sampling Point drop-down menu will only display the sampling points that exist in the system. In the case of Plant#3, two sampling points are made available, Network and Lake Intake. The Comment field (6804) may be utilized for additional information. In this example, the user selected Lake Intake and as a result, the Parameter Log table (6805) is generated to enable the Authorized User to upload the data. This data includes any predefined sampling point parameters. The sampling point log parameter listing module is activated and displays the monitoring parameters for the sampling point. For those parameters that have been marked for use of special operands, the user can additionally choose whether the measurement is equal to or less than/greater than a particular value. In this example, Aug. 1, 2010 and 8:00 am are utilized for Date and Time, the Sampling Point is Lake intake, the log input value is 12 for Turbidity in the Parameter Log table. The Submit button (6806) is selected when input is complete.

Figure 69:
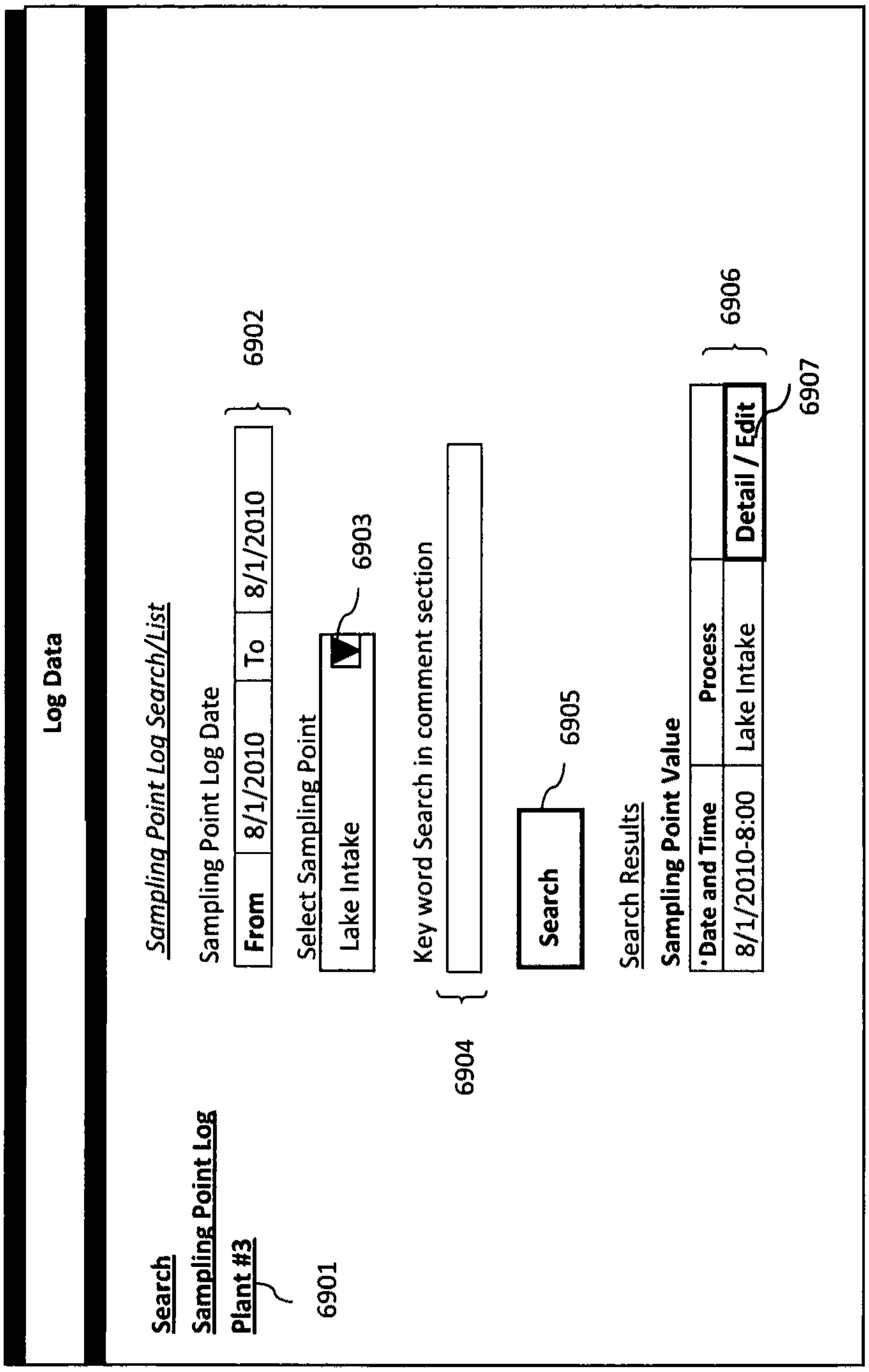
FIG. 69 is a display of a Sampling Point Log Search/Listing Module.
Figure 70:
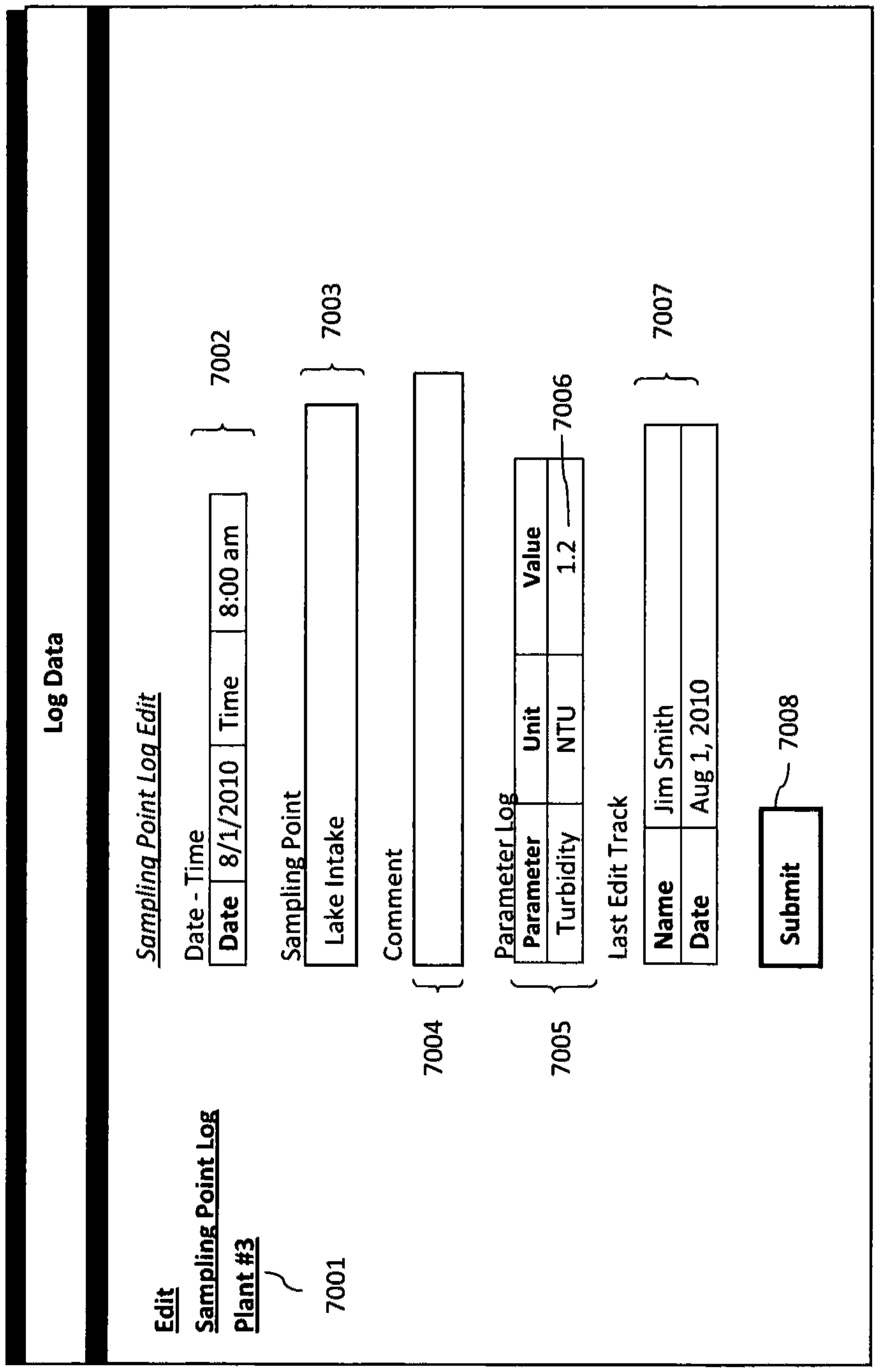
FIG. 70 is a display of a Sampling Point Log Editing Module.

FIG. 69 illustrates the Sampling Point Listing module, which enables the Authorized User option to search and review existing sampling point logs by date (6902), sampling point by drop-down menu (6903) and/or by key word (6904). This module is accessed by clicking on the Search Sampling Point Log button on the left side of the page (6901). The Select Sampling Point menu (6903) is a drop-down menu which enables the user to choose one or all sampling points available in the system. In the case of Plant #3, two sampling points are currently available, Network and Lake Intake. Once the search criteria are set; the Authorized User clicks on Search button (6905). The system disclosed here provides the Authorized User with the Search Results. A table is generated of sampling point log entry results (6906) that displays all log input for the date range selected for Plant #3, with the predefined parameters organized by name and particular details.

For additional detail on a specific point, selecting Edit button (6907) opens a new window, the Edit Sampling Point Log (7001) as displayed in FIG. 70. The Edit Sampling Point Log (7001), which is part of the Plant Definition module of the form-driven user configurable computer implemented solution, permits the user to make edits in the Process Log. The page outlines the original log displaying Date and Time (7002) of the original input, the Sampling Point (7003), the Comment field (7004), and the logged data in the Parameter Log (7005). In this example, the value for Turbidity was changed from 12 to 1.2 (7006). The latest changes are logged and displaced in the Last Edit Track (7007), identifying the name of editor and the date last modified. Changes are saved when Submit button (7008) is selected.

Figure 71:
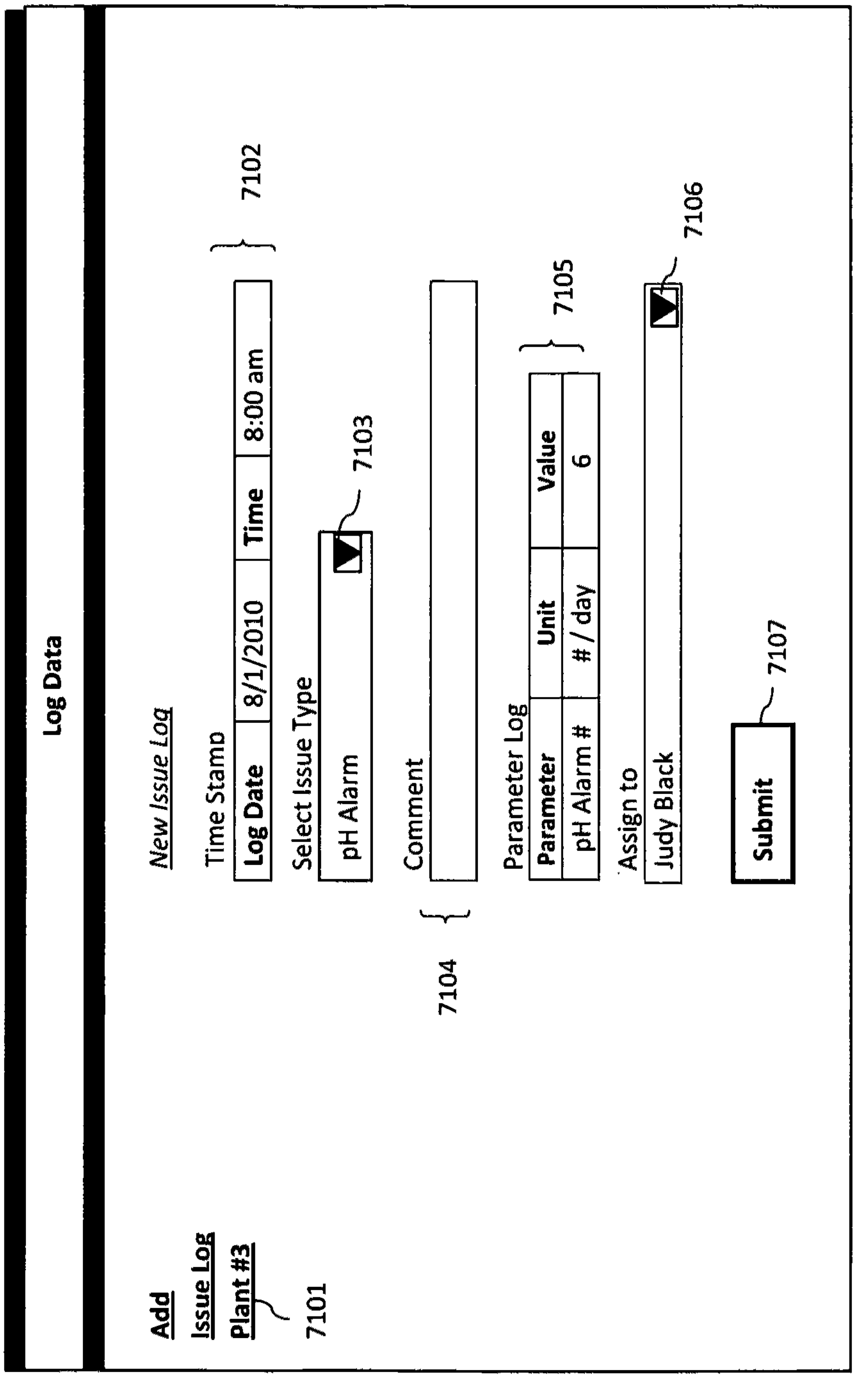
FIG. 71 is a display of an Issue Log Adding Module.

FIG. 71 illustrates the Add Issue Log screen, where the Authorized User has the accessibility to input issue log related data by selecting values from the Date and Time drop-down menus (7102). To access this module the user clicks on the Add Issue Log button on the left side of the screen (7101) and is provided with a self generated form (7102). The Authorized User has the ability to choose one issue type by using the Select Issue Type drop-down menu (7103). In the case of Plant #3 three issue types are currently logged in the system: pH alarm, Filter Maintenance and Software Maintenance (as illustrated in FIG. 47). The Comment field cell (7104) may be utilized for additional information. In FIG. 71, the Authorized User selected pH alarm as the issue type. Once selected, the system disclosed here generates a blank log parameter table (7105) specific to the selected issue. The Authorized User assigns the issue to another specific authorized user, which can be selected from an Assign To drop-down menu (7106). Once complete the Authorized User is done completing the form, the Authorized User click Submit button (7107). At that point, a notification will be sent to the assigned user, and it will be his/her responsibility to close the item by acting on the issue and closing the issue through the issue log module on the system disclosed here. In the example in FIG. 71, the issue is being recorded on Aug. 1, 2010 at 8:00 am, the issue type is pH Alarm, the log input value is 6 pH alarms for that day and the assigned individual is Judy Black.

Figure 72:
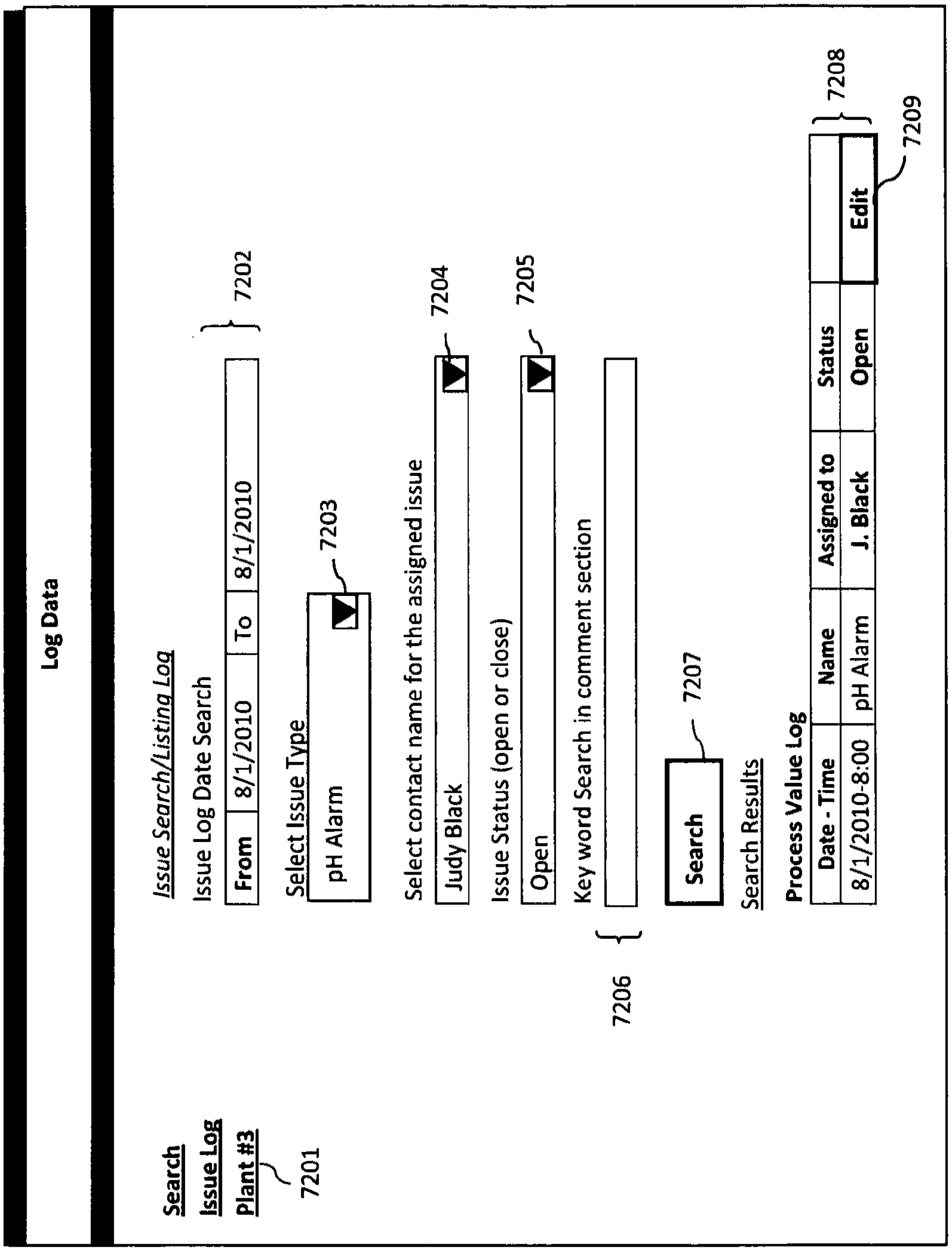
FIG. 72 is a display of an Issue Log Search/Listing Module.
Figure 73:
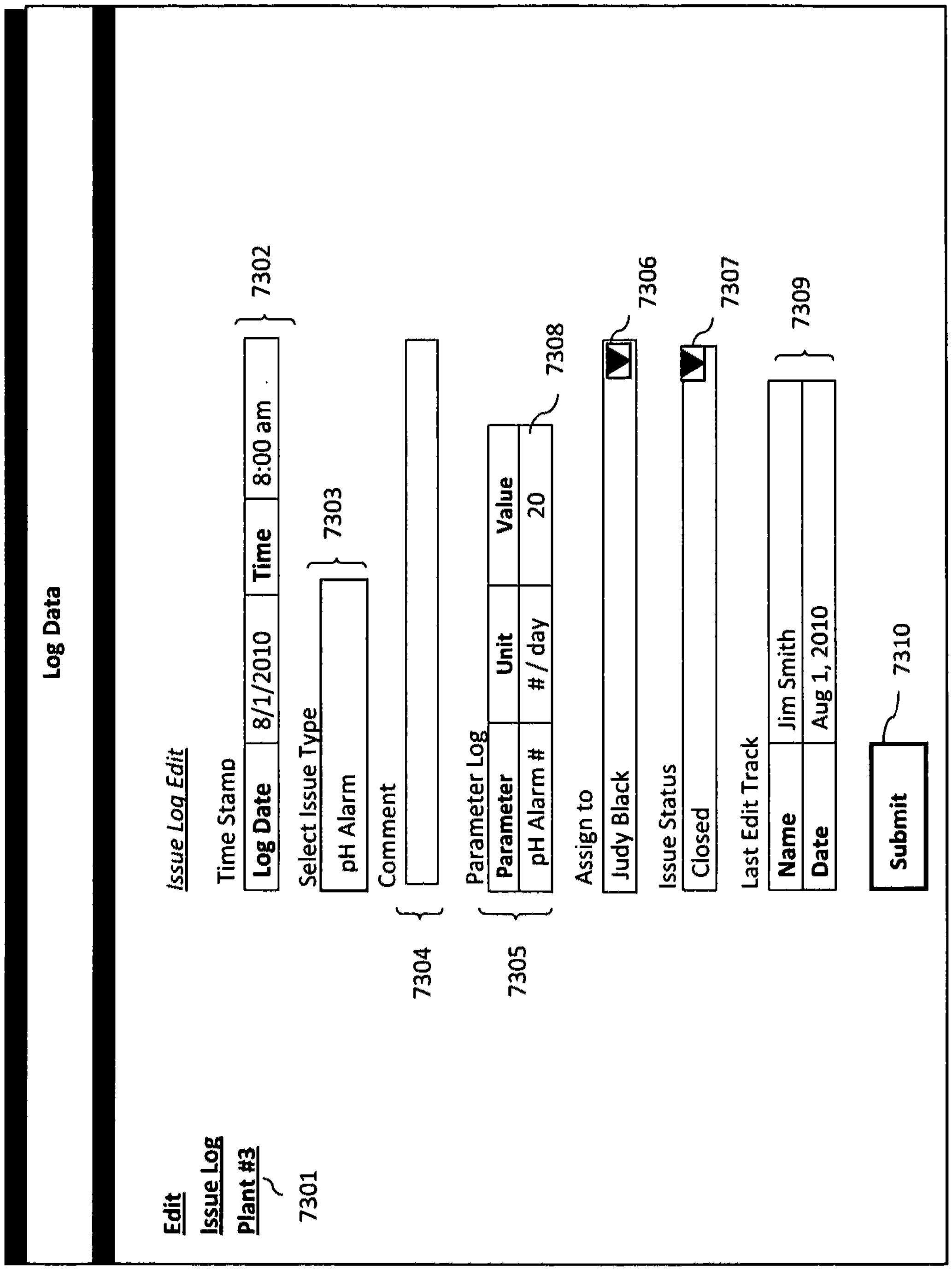
FIG. 73 is a display of an Issue Log Editing Module.

FIG. 72 illustrates the Search/List Issue screen, which enables the user option to search and review existing process logs by Date (7202), issue type by the Select Issue Type drop-down menu (7203), assigned individual by using the Select contact name for the assigned issue drop-down menu (7204), Issue Status (open or closed) by drop-down menu (7205) and/or by key word (7206). This module is accessed by clicking on the Search Issue Log button on the left side of the page (7201).

Once all the information is complete on the requested query, the Authorized User clicks Search button (7207), and the system disclosed here generates the Process Value Log table (7208) that meets the parameters set in the query. Clicking Edit button (7209) opens the Edit Issue Log (7301) in FIG. 73, where the user is permitted to make edits in the Issue Log. The screen displays the log displaying Date and Time (7302) of the original input, the issue type (7303), Comment field (7304), and the logged data in the Parameter Log (7305). In this example the parameter value was changed from 6 to 20 (7308). The Assign to (7306) and Issue Status (7307) may be modified as well. The latest changes are logged and displayed in the Last Edit Track (7309) and identifies the name of editor and the date last modified. Changes are saved when Submit button (7310) is selected.

6—Data Reporting Component

Figure 78:
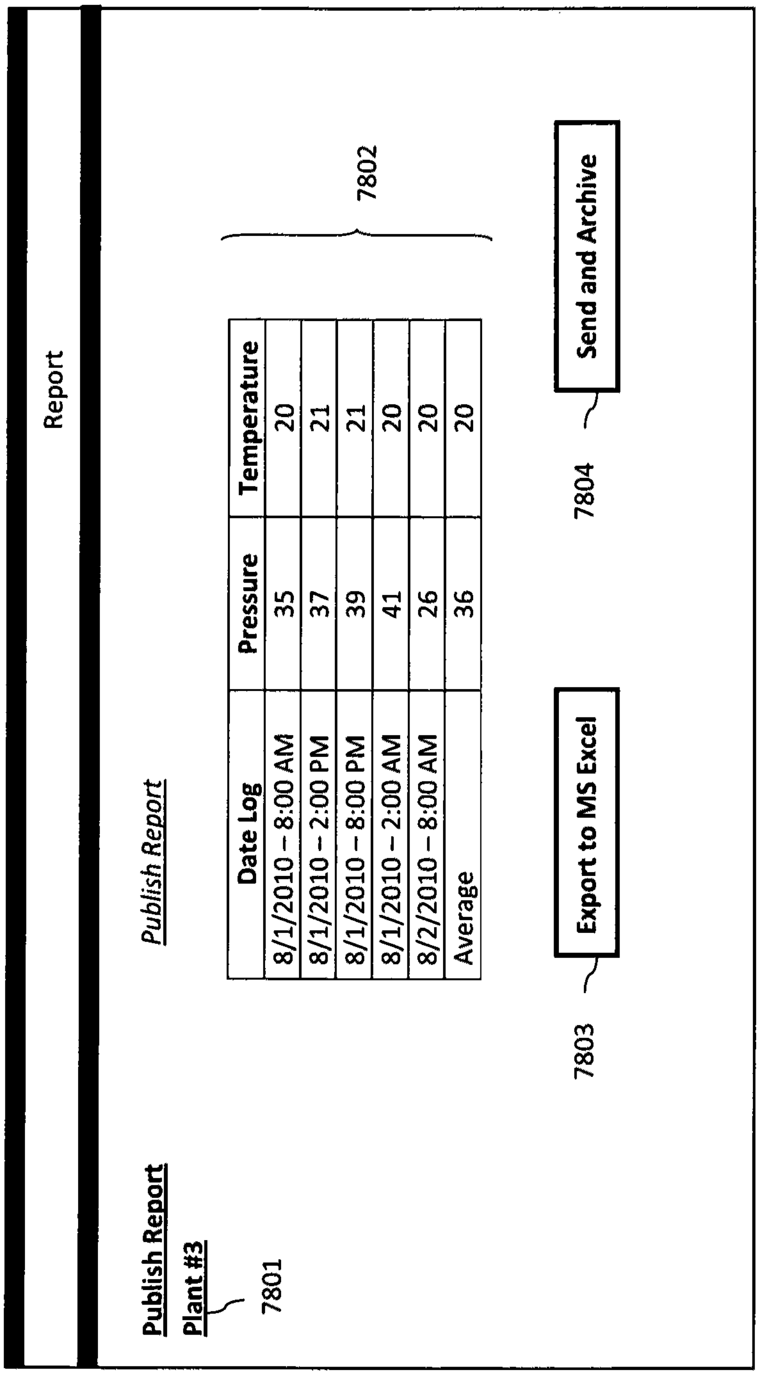
FIG. 78 is a display of a Report Publishing Module.
Figure 82:
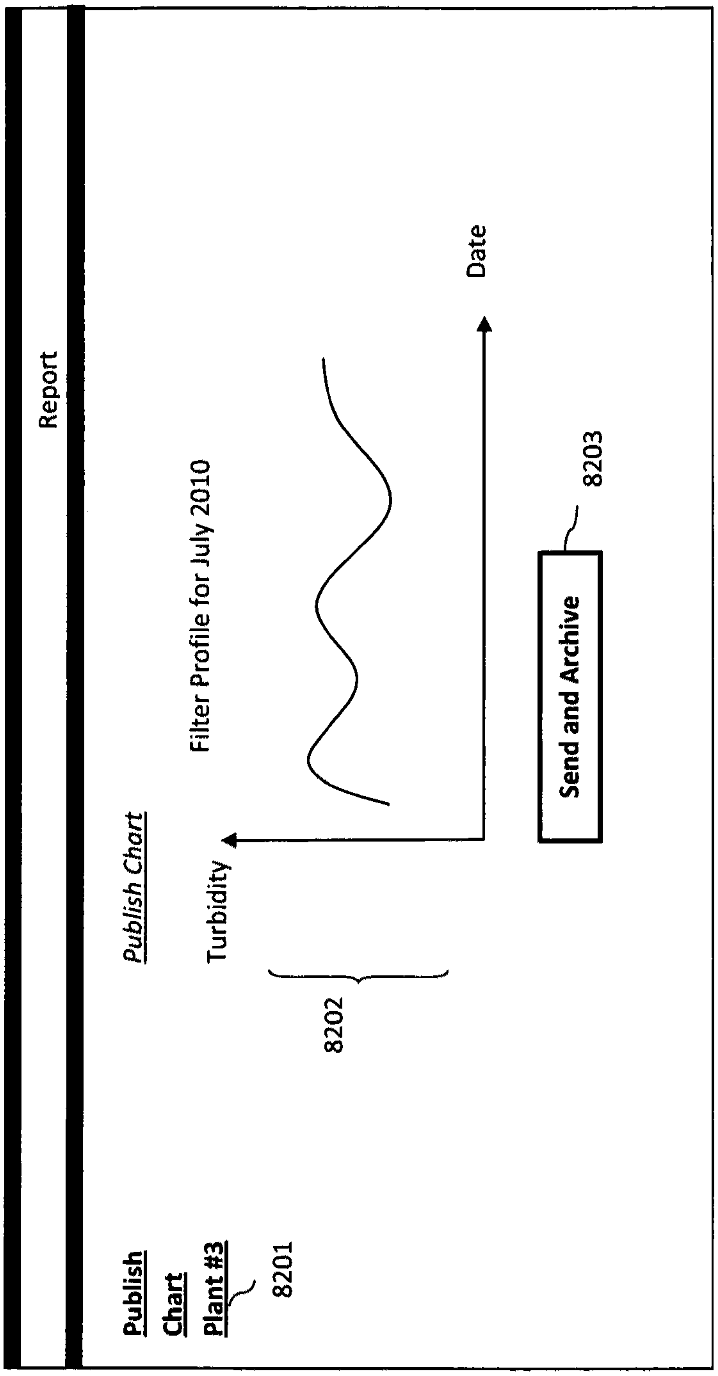
FIG. 82 is a display of a Chart Publishing Module.
Figure 86:
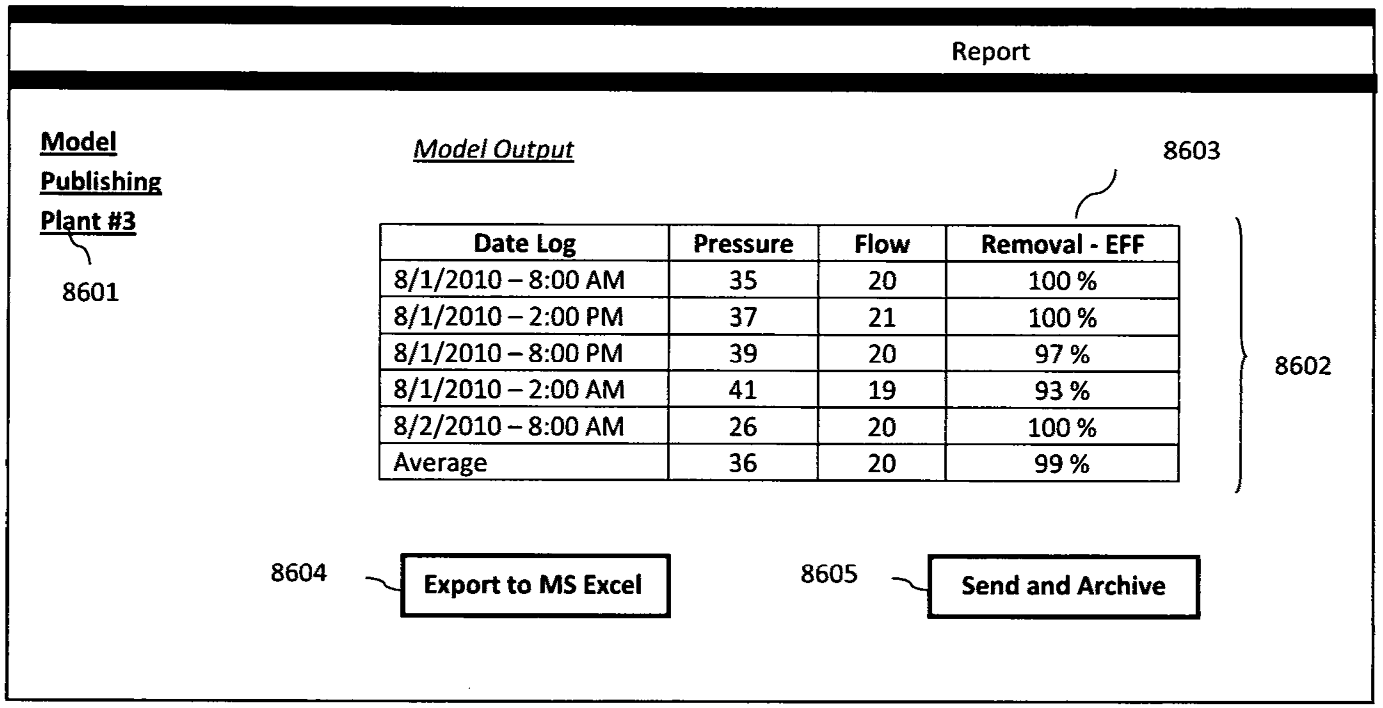
FIG. 86 is a display of a Model Publishing Module.
Figure 90:
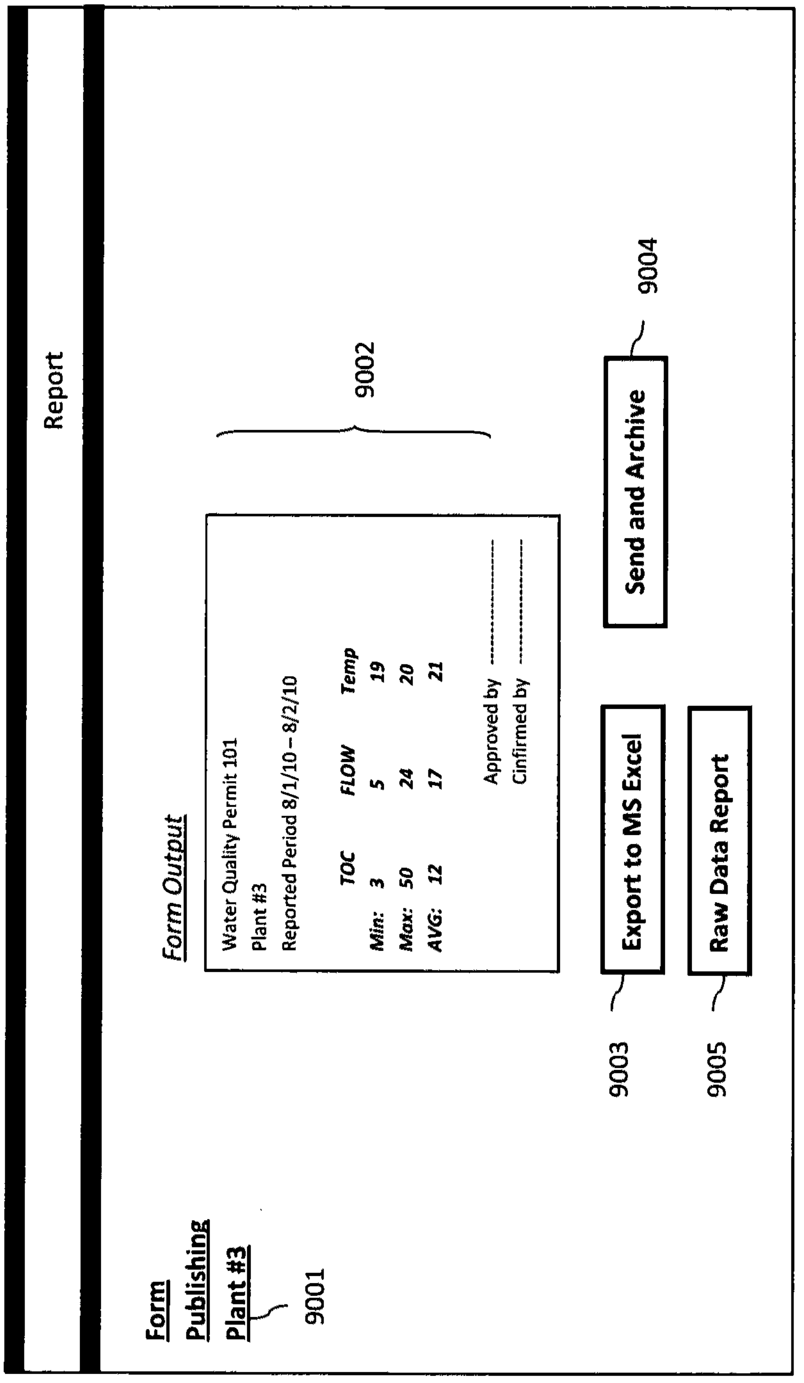
FIG. 90 is a display of a Form Publishing Module.
Figure 94:
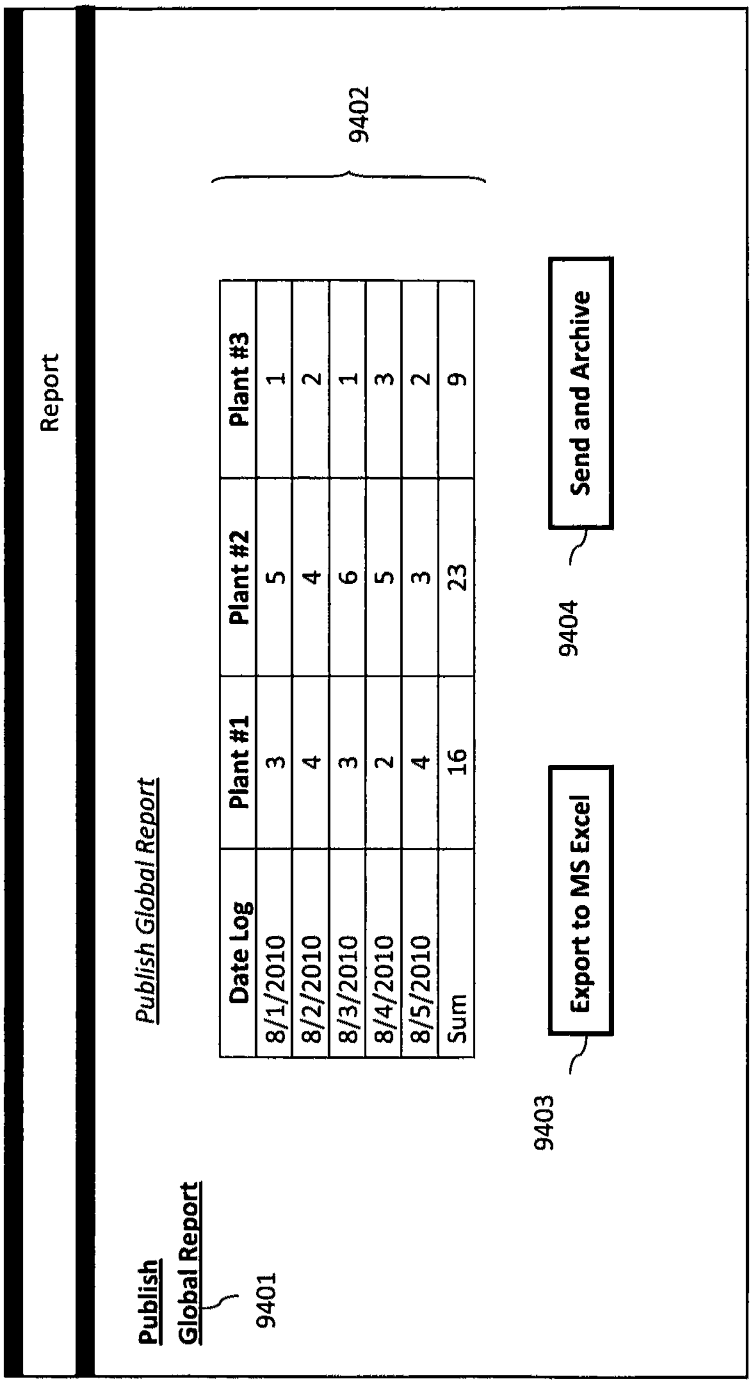
FIG. 94 is a display of a Global Report Publishing Module.
Figure 98:
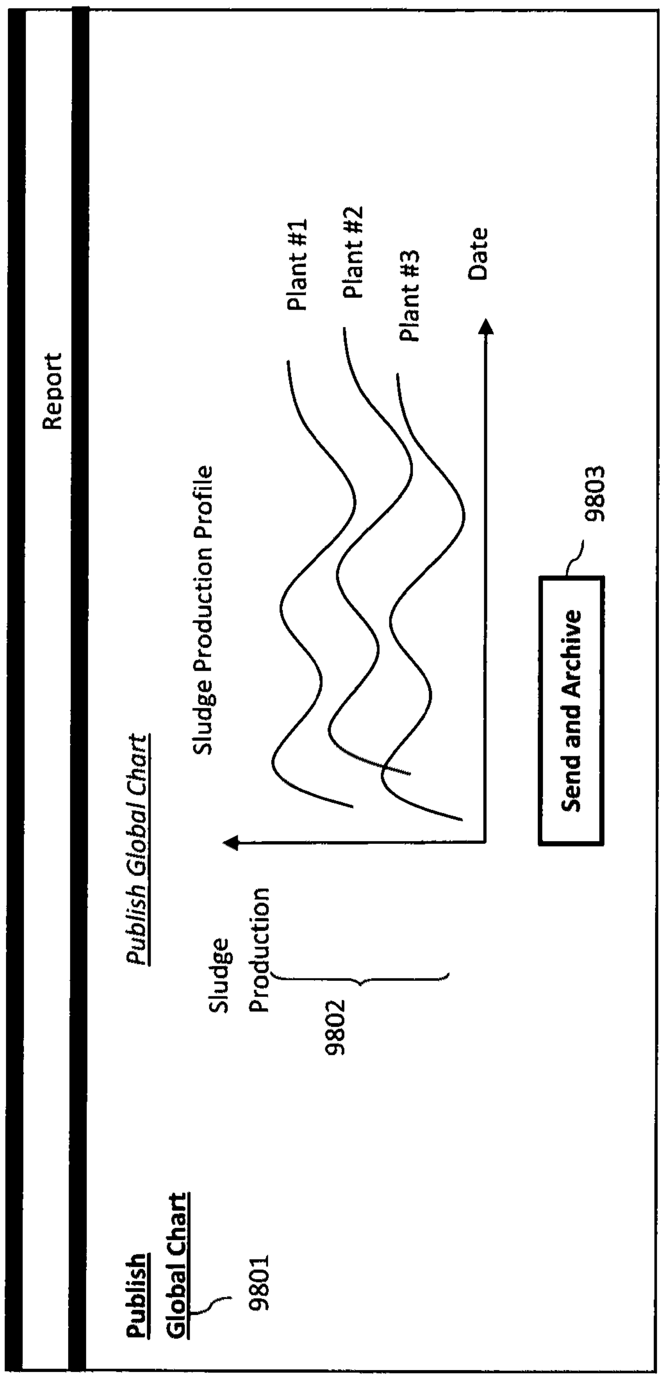
FIG. 98 is a display of a Chart Publishing Module.

The Report Component provides the process for creating custom design reports, charts, models, and forms. There are four functions under Plant Selection for creating reports for single facilities and two functions under the Cross Facility for multiple facility that are only accessible for Authorized Users within a specified organization. The functions are comprised of, but not limited, to 3 modules and are presented in the following figures. Plant Report Manager Function Modules are Report Adding (FIG. 75), Report Listing (FIG. 76), and Report Publishing (FIG. 78). Plant Chart Manager Function Modules include Chart Adding (FIG. 79), Chart Listing (FIG. 80), and Chart Publishing (FIG. 82). Plant Specific Model Manager Function Modules are Model Adding (FIG. 83), Model Listing (FIG. 84), and Model Publishing (FIG. 86). Plant Specific Form Manager Function Modules are Form Adding (FIG. 87), Form Listing (FIG. 88), and Form Publishing (FIG. 90). Reports across several facilities can also be created. The function and modules under Cross Facility are as follows. Global Report Manager Function Modules are Report Adding (FIG. 91), Report Listing (FIG. 92), and Report Publishing (FIG. 94). Global Chart Manager Function Modules are Chart Adding (FIG. 95), Chart Listing (FIG. 96), and Chart Publishing (FIG. 98). By clicking on the component, a menu will appear with the linked modules, which are then each accessed by clicking on the individual module button. Utilizing the system disclosed here, Authorized Users are able to present facility data in selected design modes. The Report Component can be used to compile data and create detailed analysis for a specific facility or multiple facilities. Plant #3 will be uses as a sample plant in the following figures to illustrate the Report Component. See FIG. 16 for instructions on how to add Plant #3 to the system.

The plant definition module is comprised of, but limited to, a report listing module and report definition module (add/edit), and a chart listing module and chart definition module (add/edit) under the system disclosed here.

Figure 74:
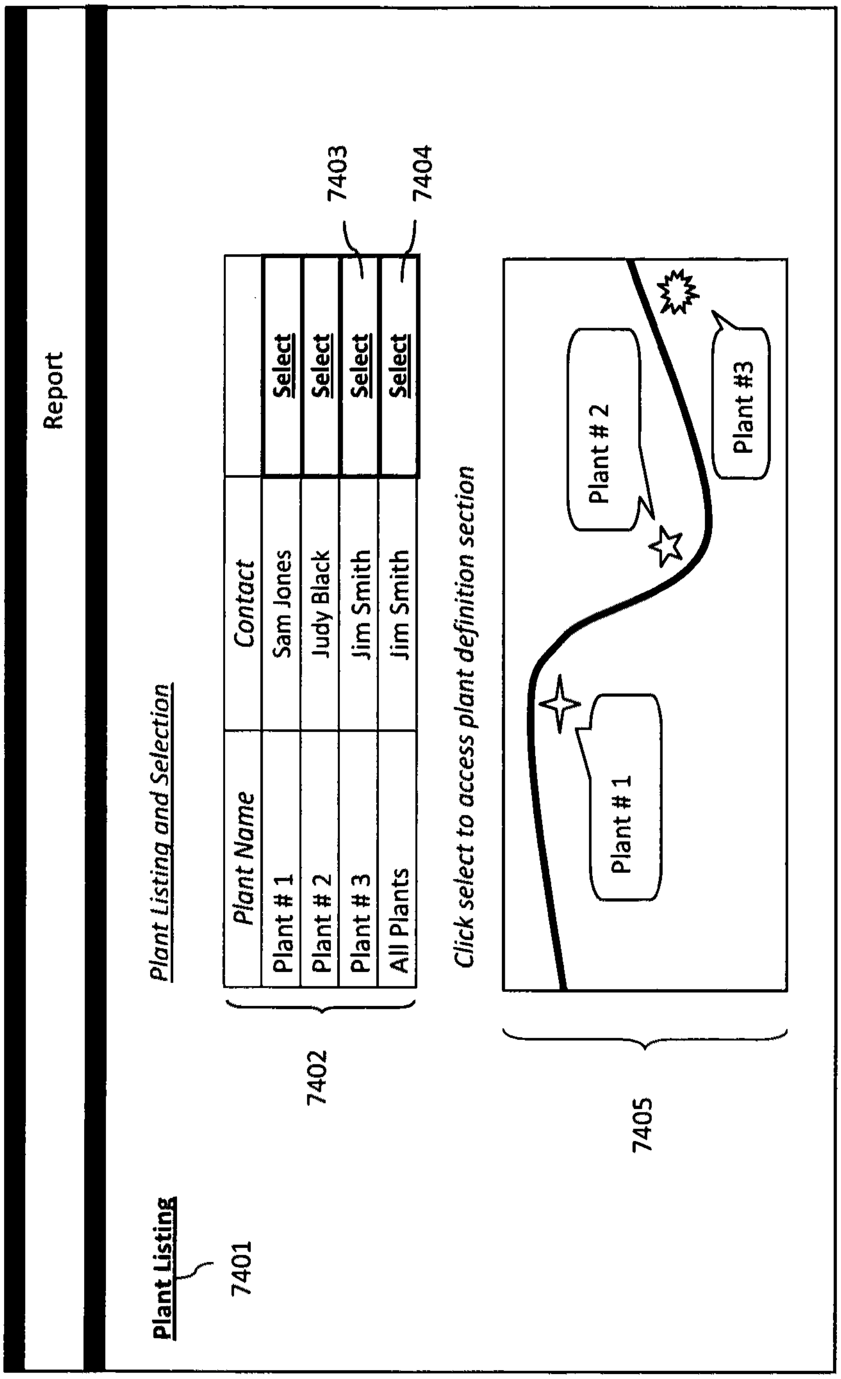
FIG. 74 is a display of a Plant Selection Module.
Figure 75:
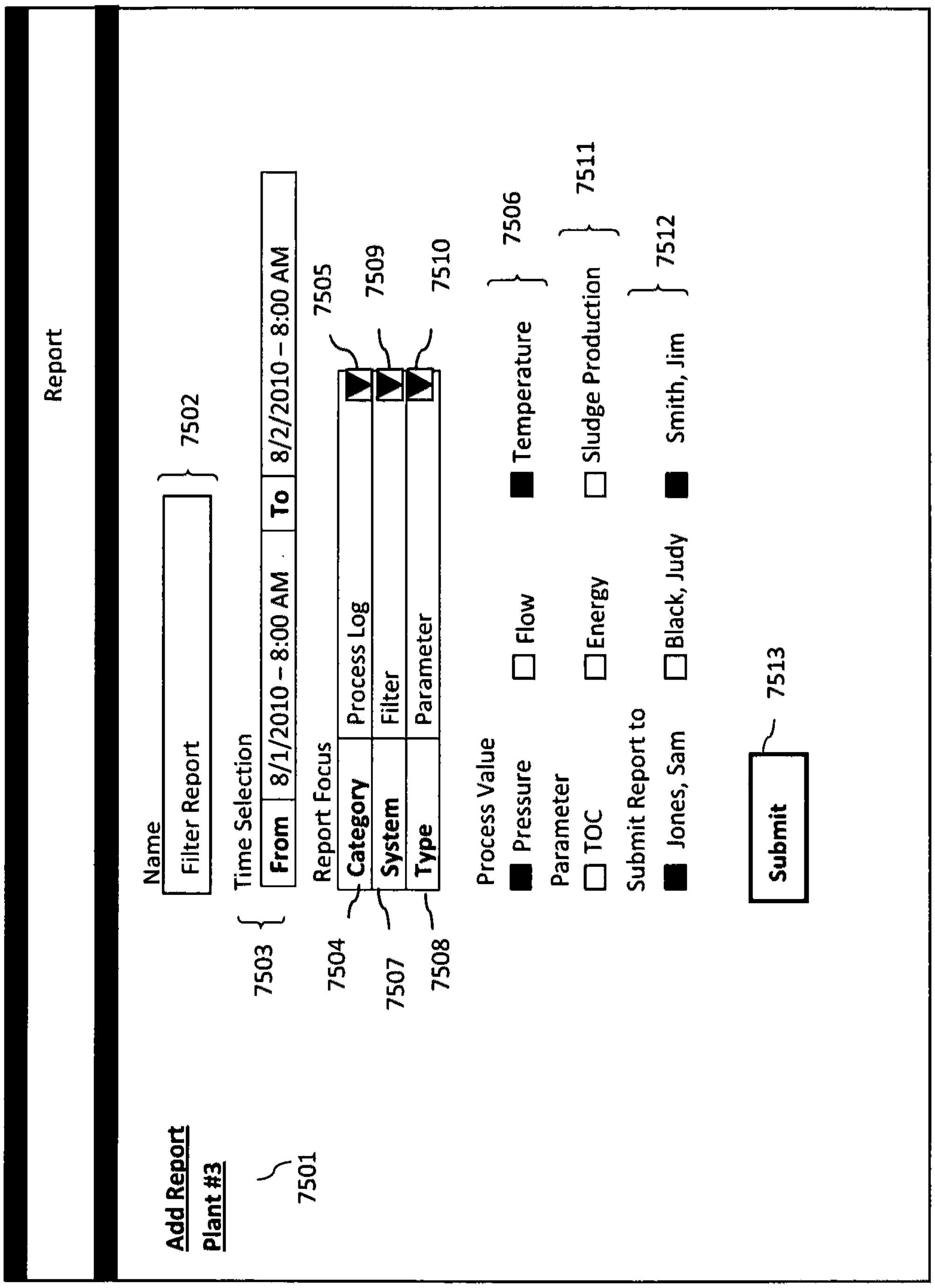
FIG. 75 is a display of a Report Creating Module.

The process begins with selecting the plant the Authorized User wants to access. FIG. 74 illustrates the Plant Listing screen (7401) in the Report Component. The Plant Listing screen allows the Authorized User to select an individual facility or all facilities currently maintained in the application to be used in a report or chart. The Plant Listing and Selection table (7402) is a directory of the plants and their assigned contacts. A map (7405) provides the geographic location of all facilities, which is auto populated by the system's display element. In the case of the single plant reporting and charting capabilities, under the following components in the Report Component, Plant #3 is the example facility. Clicking Select button (7403) allows the user to access the chart and report functionalities on parameters for one facility (Plant#3). To access the chart and report if clicking on select all plants (7404), the user will access the chart and report functionalities focusing on all global parameters FIG. 75 displays the Add Report screen, where the Authorized User has the ability to generate a new report utilizing logged data stored in the database of the system disclosed here. To access this module the user clicks on the Add Report on the left side of the screen (7501) and is provided with a self generated form (7502). A Report Name (7502) is typed in the Name field. A description field can be utilized for additional detail. The date and time range (7503) of the logged data to be extracted is selected for the report. When the Add Report window is first opened, Category (7504) is the only line visible in the Report Focus table. At that point, the Authorized User clicks on the Category drop-down menu (7505) and selects from one of the available data log options: Plant, Process, Process Stream, Issue and Sampling Point. This drop down menu activates the access to the report processes listing module, the report process streams listing modules, the report sampling point listing module, the report parameters listing module and the report chemicals listing module which are all part of the report definition module. In FIG. 75, the Authorized User selected Process Log and the Process Value checkboxes (7506) are displayed, The System (7507) and Type (7508) drop-down menus (7509, 7510) are also displayed. A sub type may be selected as well, if applicable. The value of Filter was selected from the System drop-down menu. The Authorized User will select either a Parameter or Chemical from the Type drop-down menu. In the example presented in FIG. 75, the user chooses Parameter, which prompts the system disclosed here to generate the Parameter checkboxes (7511), and the Submit Report to checkbox (7512). The checkboxes will list the predefined data linked to the option selected.

The Authorized User selects the desired checkboxes for Process Values, Parameters and the Report Recipients. The Submit button (7513) is selected when input is complete.

Figure 76:
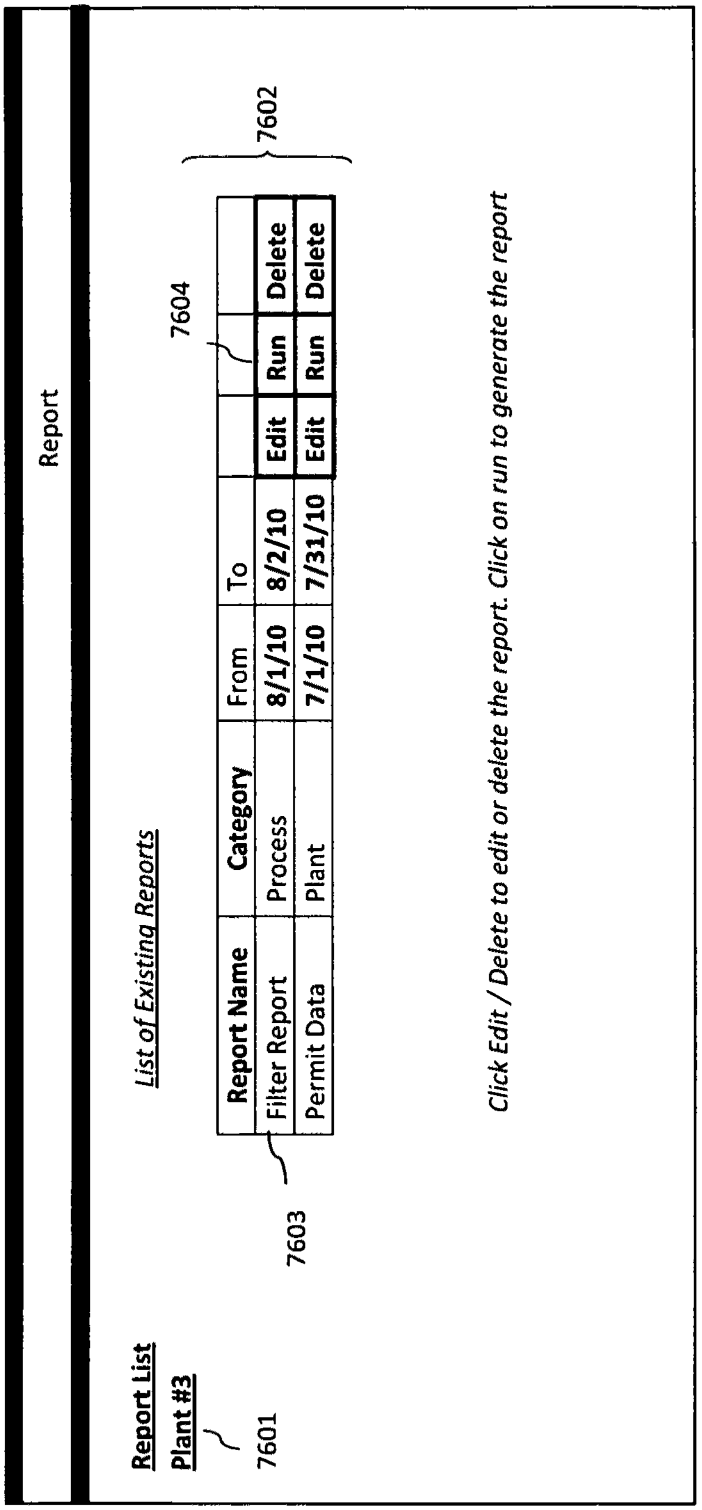
FIG. 76 is a display of a Report Listing and Archiving Module.

FIG. 76 displays the Report List screen, which enables the user option to review and edit, run or delete existing reports. This page is accessed by clicking on the Report List button on the left of the page (7601). The List of Existing Reports (7602) lists the reports currently generated in the system by name and particular details. Filter Report (7603) has been added to the List of Existing Reports (see FIG. 75). Selecting Edit button launches an Edit Report screen. Selecting Run button (7604) for Filter Report will launch the Report Generating screen (FIG. 77), which is also the report rendering module part of the form-driven user configurable computer implemented solution.

Figure 77:
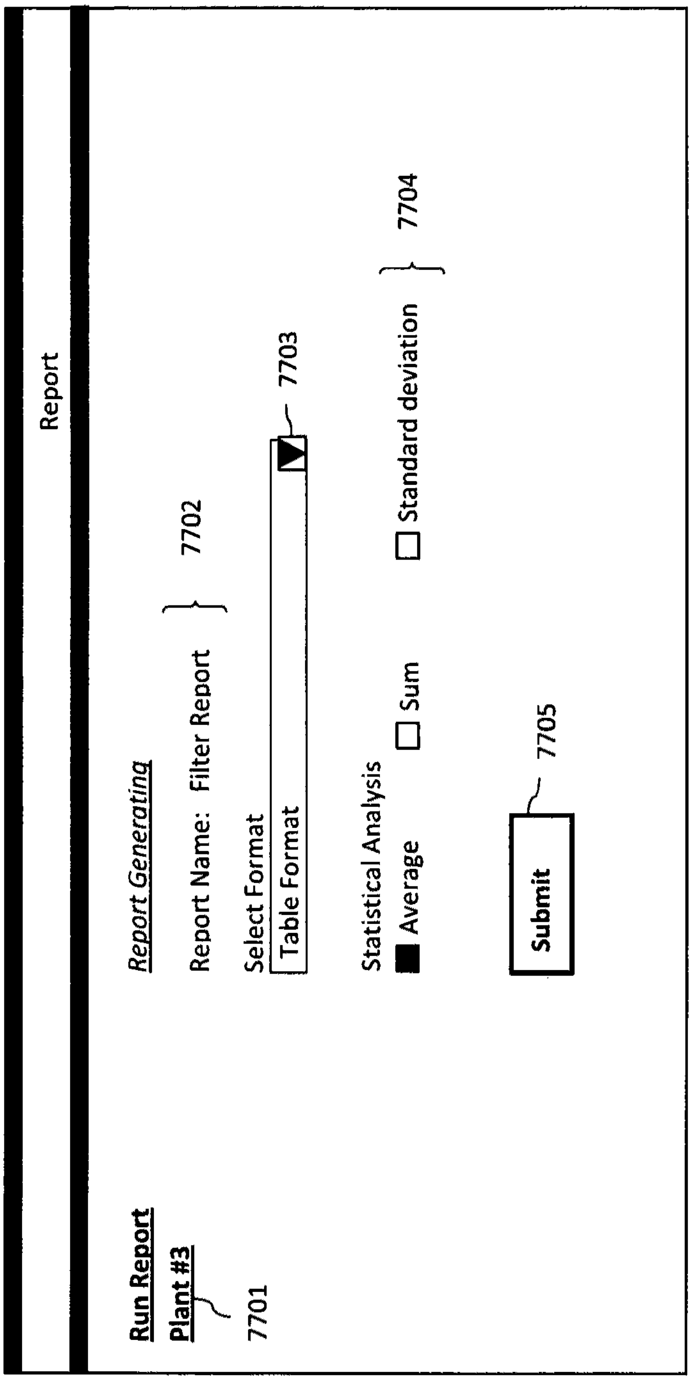
FIG. 77 is a display of a Report Generating Module.

The Report Generating screen (7701) is where the Authorized User will produce a report based on the previous selections. The selected report is displayed by Report Name (7702). The format is selected by the Select Format drop-down menu (7703), which provides three reporting layouts: HTML, Comma Delimited and Table Format. In FIG. 77, the Authorized User chooses the Table Format. Specific statistical analysis can be added to the report output by clicking the Statistical Analysis checkboxes. In the example in FIG. 77, the Filter Report will be generated in a table format and the system disclosed here will also provide specific statistical analysis by clicking the Statistical Analysis checkboxes (7704). In this example, the average for both pressure and temperature is selected. Both parameters were selected under FIG. 75. The Submit button (7705) is selected when input is complete. The output is presented in table format in the Publish Report screen (7801), where the report is presented in the table format (7802). The Authorized User has the option to export the report to Excel (7803) or to file and e-mail (7804) to the identified user in FIG. 75.

Figure 79:
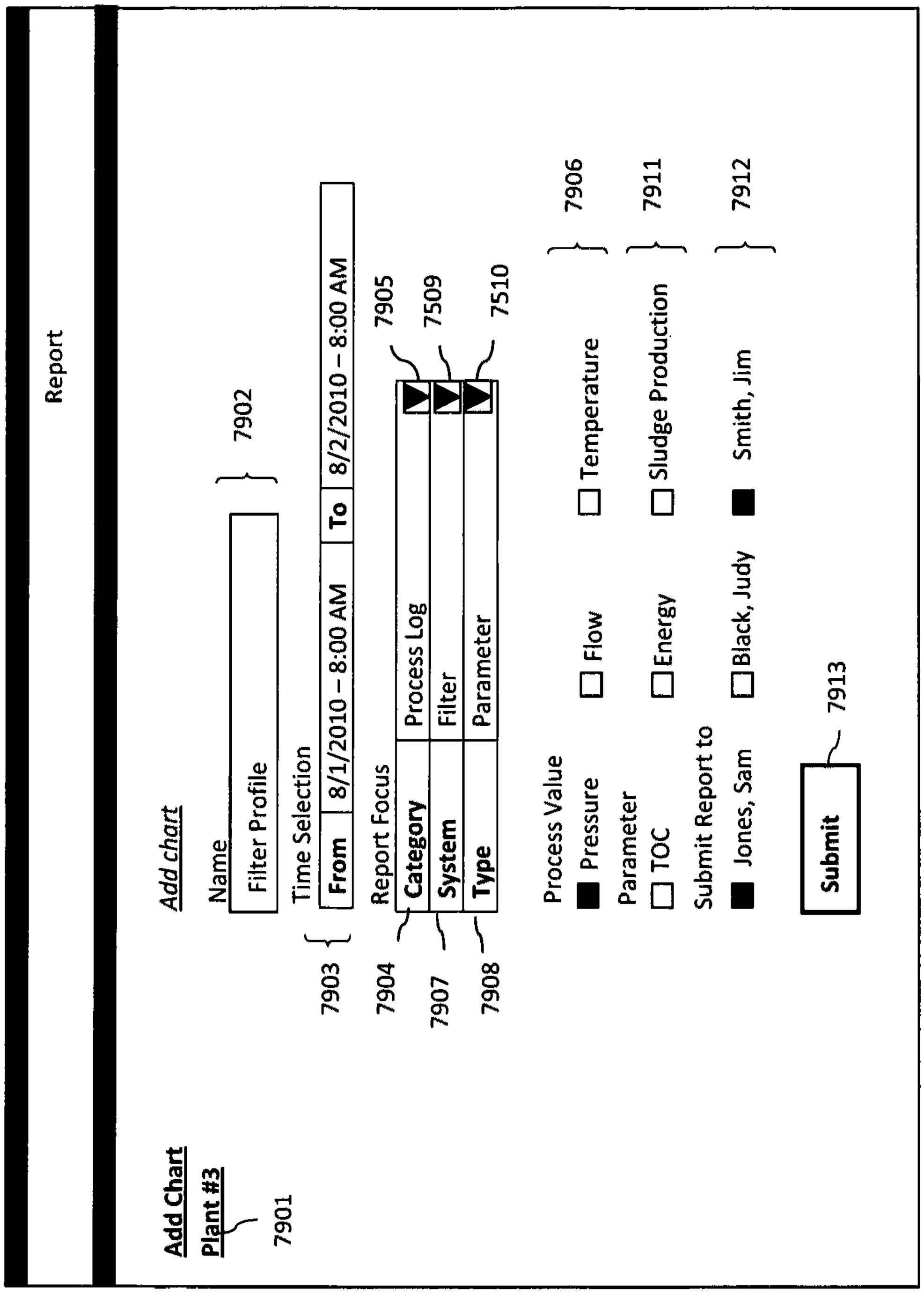
FIG. 79 is a display of a Chart Creating Module.

FIG. 79 illustrates the screen display for Add Chart, where the Authorized User has the ability to generate a new chart utilizing logged data stored in the database of the system disclosed here. To access this module the user clicks on the Add Chart button on the left side of the screen (7901) and is provided with a self generated form (7902). A chart name (7902) is typed in the name field and date/time range (7903) of the log data to be extracted is selected for the chart. A description field can be utilized for additional detail. When the Add Chart window is generated, the Category (7904) is the only line visible in the Chart Focus table. At that point, the Authorized User clicks on the Category drop-down menu (7905), and selects from one of the following Plant, Process, Process Stream, Issue and Sampling Point. This drop down menu activates the access to the chart processes listing module, the chart process streams listing modules, the chart sampling point listing module, the chart parameters listing module and the chart chemicals listing module which are all part of the chart definition module. In FIG. 79, the user selected Process Log and the Process Value checkboxes (7906) are displayed. The System (7907) and Type (7908) drop-down menus (7909, 7910) are also displayed. A sub type may be selected as well, if applicable. In the example, the user chooses Filter, and has the choice of Parameters and Chemicals; the user chooses Parameter which prompts the system disclosed here to generate the Parameter checkboxes (7911) and the Submit Report to checkbox (7912). The checkboxes will list the predefined data linked to the option selected.

The Authorized User selects the desired checkboxes for Process Values, Parameters and the Report Recipients. The Submit button (7913) is selected when input is complete.

Figure 80:
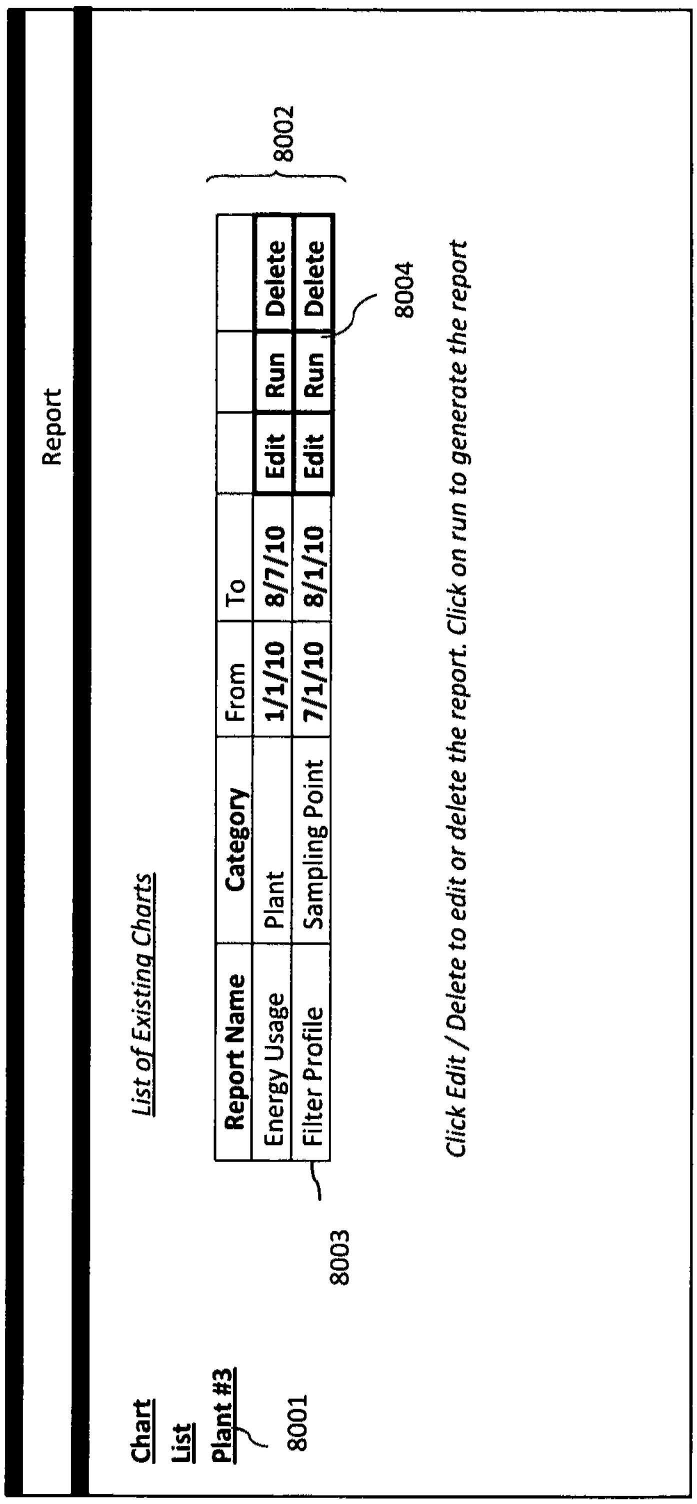
FIG. 80 is a display of a Chart Listing and Archiving Module.

FIG. 80 illustrates the screen display for Chart List, which enables the user option to review and edit, run or delete existing charts. This module is accessed by clicking on the Chart List button on the left of the page (8001). The table (8002) lists the charts currently produced by name and particular details. Based on the example above, Filter Profile (8003) has been added to the List of Existing Charts. Selecting Edit button launches an Edit Report screen. Selecting Run button (8004) will activate the chart rendering module part of the formdriven user configurable computer implemented solution for Filter Chart, and display the window depicted by FIG. 81.

Figure 81:
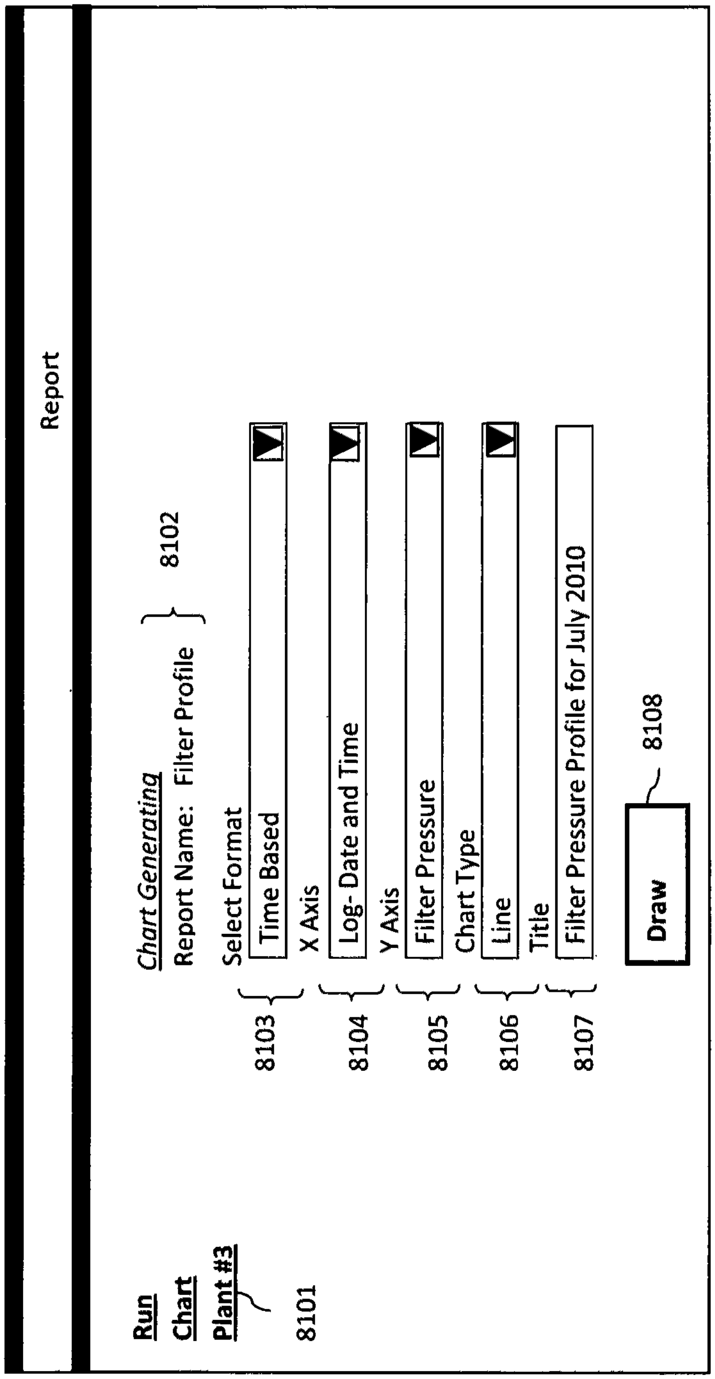
FIG. 81 is a display of a Chart Generating Module.

FIG. 81 illustrates the screen display for Chart Generating (8101), where the user is able to produce a chart based on preceding selections. The selected chart is displayed by Chart Name (8102). The user selects one of two formats using drop-down menu (8103), Time-based and Non-time-based. In FIG. 81, the user has chosen a time-based chart. At that point the system disclosed here self generates all the remaining lines displayed in FIG. 81. The parameters listed are the X-axis (8104), Y-axis (8105), chart type (8106), and chart title (8107), all of which provide drop-down menus to build the graph. In the example above, the Filter Pressure Profile chart for July 2010 will be charted on a time-based format with Log-Date and Time on the X axis, Filter Pressure on the Y Axis, in a line chart type. Draw button (8108) is selected when input is complete. FIG. 82 illustrates the screen display for Publish Chart (8201), where the chart is presented in the format (8202) as selected. The user clicks Send and Archive button (8203) to file in directory.

Figure 83:
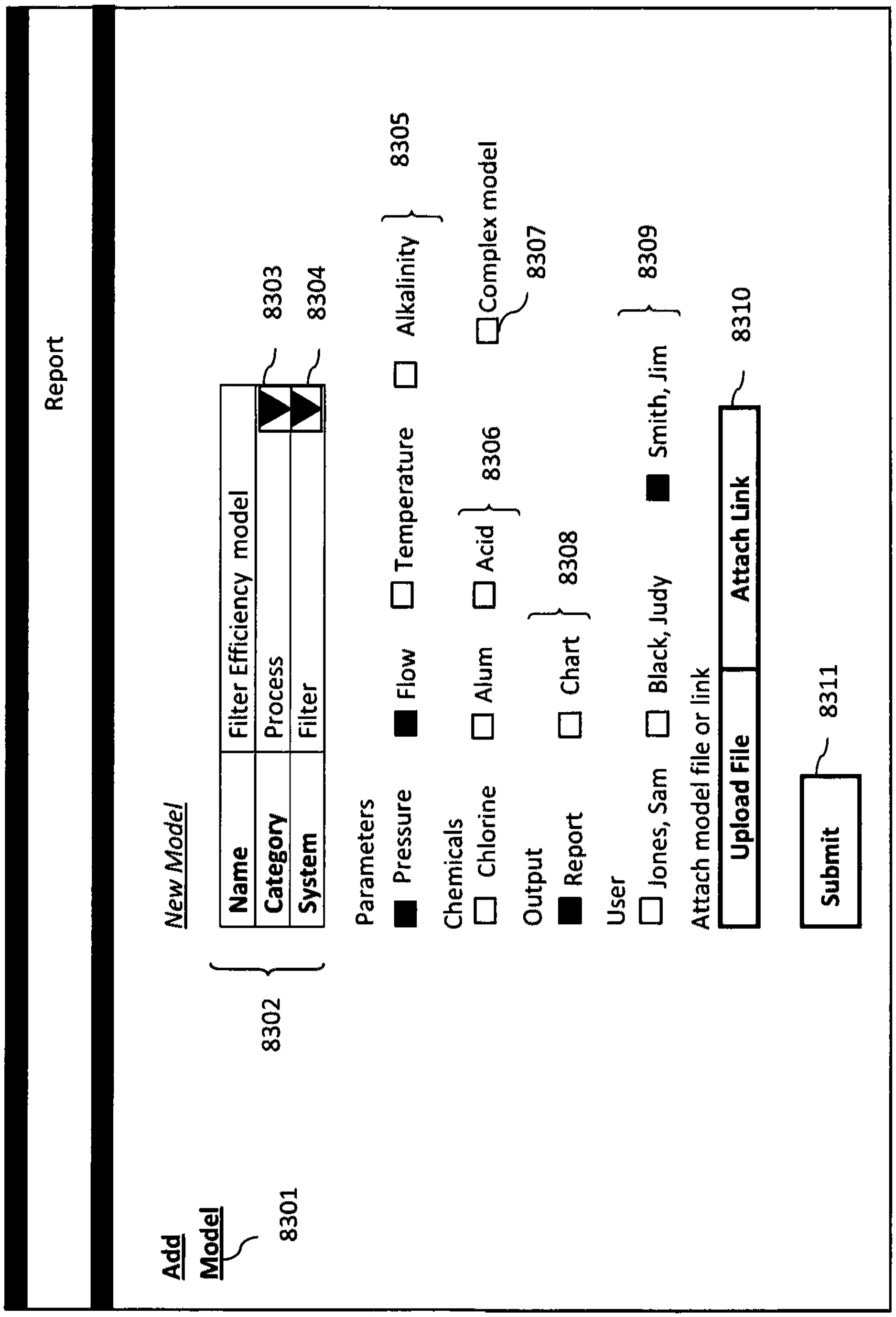
FIG. 83 is a display of a Model Adding Module.

FIG. 83 illustrates the screen display for Add Model, where the user has the ability to add to the facility's data library a model utilizing logged data. A model is considered as a tailored report for which predefined parameters are identified by the authorized user. To access this module the user clicks on the Add Model button on the left side of the screen (8301) and is provided with a self generated form (8302). A model name (8302) is typed in an active cell. The category drop-down (8303) defines the module that will be modeled. The drop-down menu (8303) provides five choices plant, process, process stream, sampling point and issue. Once the Authorized User selects the category, the computer-implemented approach will generate a second drop-down menu (8304), enabling the user to select the model implementation focus. In the example set forth in FIG. 83, the Authorized User selected process and under the second drop-down selected Filter. In the case of Plant#3, the other option would have been Tank (FIG. 38). Once the Authorized User has selected Filter, the system disclosed here generates a series of lists that will enable to define the data feeds to the model. Among these categories are the listed Parameters (8305) from which the user selects the key parameters which would apply to the model. For each parameter selected, the system disclosed here will request the user to better qualify the data to be used through a series of options use raw data, use hourly average, use daily average. A second list is chemical usage (8306). For each chemical used at the facility the Authorized User has the option to select the chemical and use dose or chemical type as an input to the model. If the model is more complex, the user will click the complex model option checkbox (8307), which will prompt the user for more explanation on the model.

Then the user is prompted to define the model output as either a report or a chart (8308). The user is also prompted in defining the Users of the model (8309).

The model can either be uploaded as a file or as a link (8310). In either case the model format will have to have been pre-approved by the Authorized User to be certain the format is compatible with the format of the system disclosed here. Once all the data is in place, the Authorized User can submit the information by clicking on Submit button (8311), which will link the model to the application and preset the data input when in use.

Figure 84:
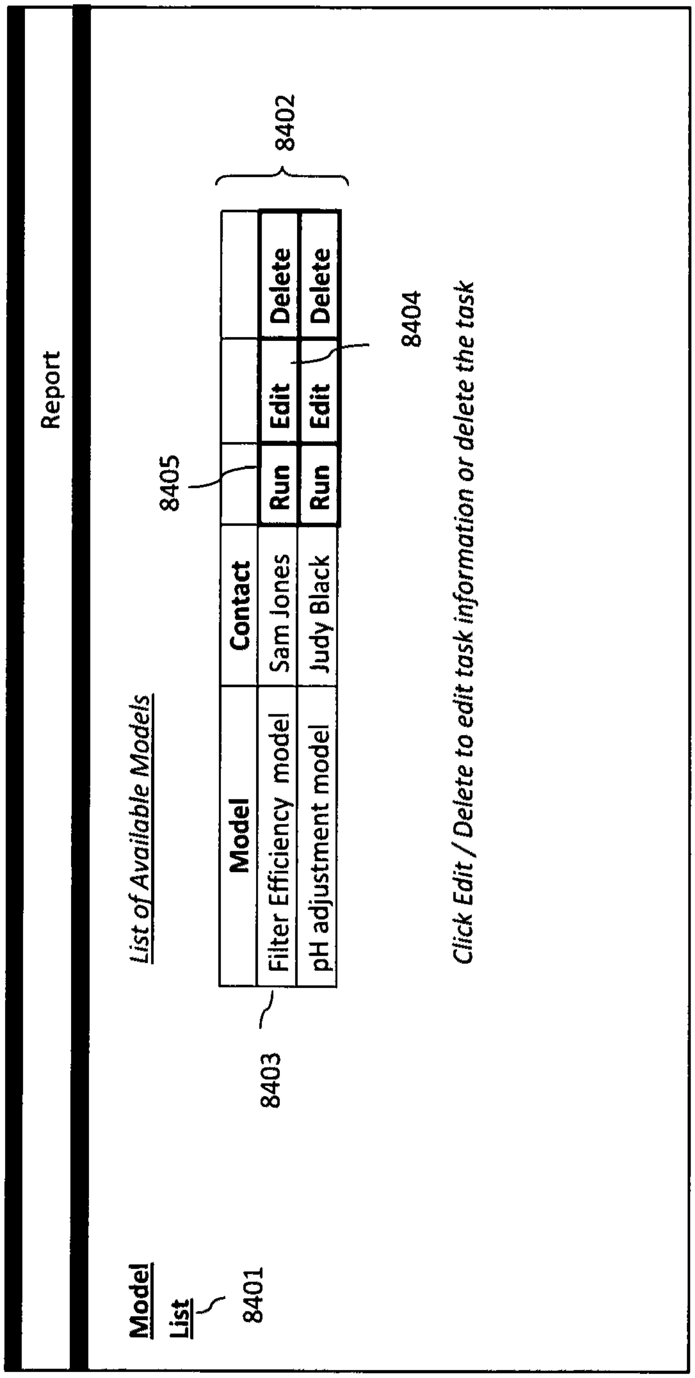
FIG. 84 is a display of a Model Listing Module.

FIG. 84 illustrates the Model List screen, for which enables the Authorized User to review and edit or delete existing models. This page is accessed by clicking on the Model List button on the left of the page (8401). The List of Available Models table (8402) lists the models currently produced by name and particular details. Filter efficiency model (8403), which was added in FIG. 83, has been added to the List of Available Models. By selecting Edit button (8404) on the filter efficiency model, the system disclosed here will open the Add New model window with the filter efficiency model information already populated (see FIG. 83). Clicking Run button (8405) on will open the Run Model screen for the selected facility, as displayed in FIG. 85.

The Model Run screen (8501) enables the user option to define the time period and format output for a specific model run at a given facility. The name of the selected model is displayed in the Modal Name (8502). In the Time Selection drop-down menus (8503), the Authorized User sets the time frame over which the model will be run. Since the model output was define as a report (see FIG. 83), the system disclosed here displays the Select Format drop-down menu (8504).

Figure 85:
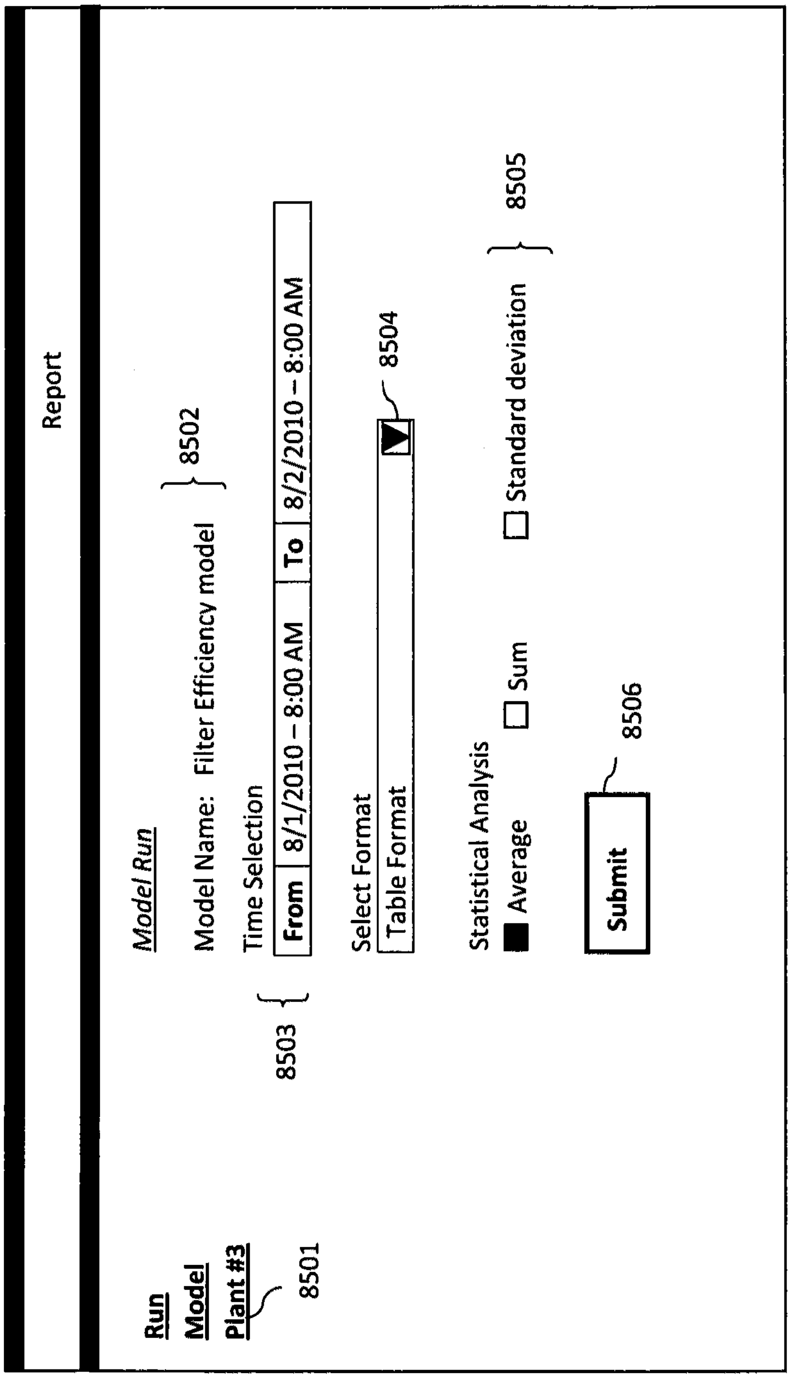
FIG. 85 is a display of a Model Running Module.

The Authorized User can define the format of the report through the drop-down menu (8504), which provides three reporting layouts: HTML, Comma Delimited and Table Format. In FIG. 85, the Authorized User chooses the Table Format. Specific statistical analysis can be added to the report output by clicking the Statistical Analysis checkboxes (8505). To summarized, the Filter Efficiency Model Report will be generated in a table format; the system disclosed here will also provide the average for both pressure and flow, which were the parameters selected as input to the model (see FIG. 83). The Submit button (8506) is selected when input is complete. FIG. 86 illustrates the screen display for the output Model Publishing Module (8601), where the output is presented in the table format (8602). The results of the model are presented in Removal—EFF column (8603). The user can click Export to MS Excel button (8604) or Send and Archive button (8605) to e-mail to the user identified user in FIG. 83 (See User (8306)).

Figure 87:
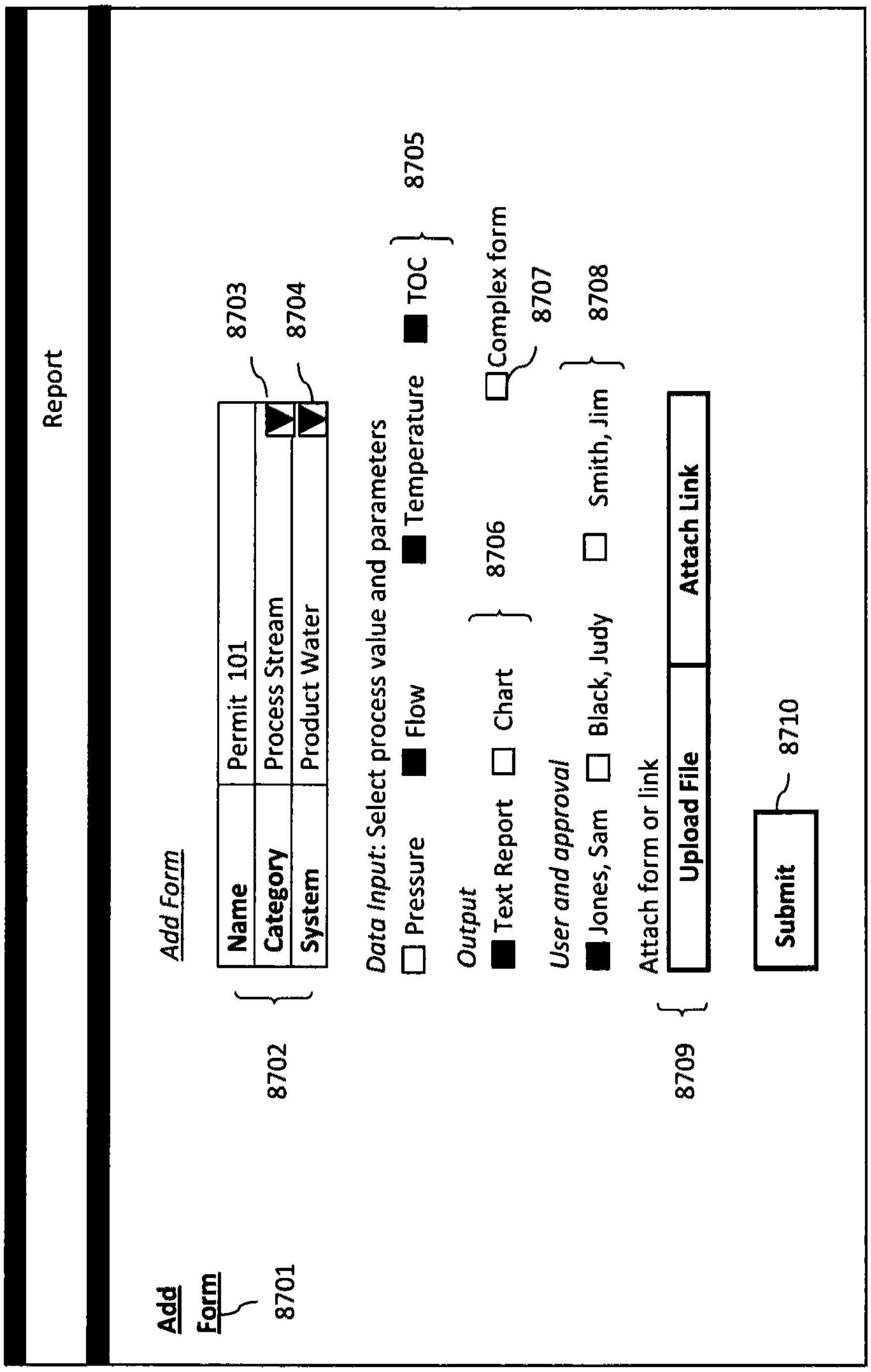
FIG. 87 is a display of a Form Adding Module.

FIG. 87 displays the Add Form screen, where the Authorized User has the ability to add to a form facility's data library by utilizing logged data. A form is considered as a tailored report for which predefined parameters are identified by the Authorized User. To access this module the user clicks on the Add Form button on the left side of the screen (8701) and is provided with a self generated form (8702). A form name is typed in the Name cell. The Category drop-down menu (8703) provides five choices: Plant, Process, Process Stream, Sampling Point and Issue. Once the Authorized User selects the category, the system disclosed here displays the System drop-down menu (8704), enabling the user to select the model. In FIG. 87, the Authorized User selected Process Stream and selected Product Water from the System drop-down menu. In the case of Plant#3, the two other options would have been Filter feed and Raw water (See FIG. 41).

Once the Authorized User has selected Product Water, the system disclosed here generates Data Input (8705), which is a list of parameters that enables the user to define the data required by the form. For each parameter selected, the system disclosed here will request the user to better qualify the data by selecting from various options, such as minimum, maximum, daily average, or monthly average. The Authorized User is then prompted to define the form output, which would be either a report or a chart (8706). If the form is more complex, the user will click the Complex Model Option (8707), which will prompt the user for more explanation on the form. The Authorized User is also prompted to define the users of the form by selecting a User and approval option (8708).

The form can either be uploaded as a file or as a link by clicking either Upload File or Attach Link (8709). In either case the form format will have to have been pre-approved by the Authorized User to be certain the format is compatible with the format of the system disclosed here. Once all the data is in place, the Authorized User can submit the information by clicking on the Submit button (8710), which will link the model to the application and preset the data input when in use.

Figure 88:
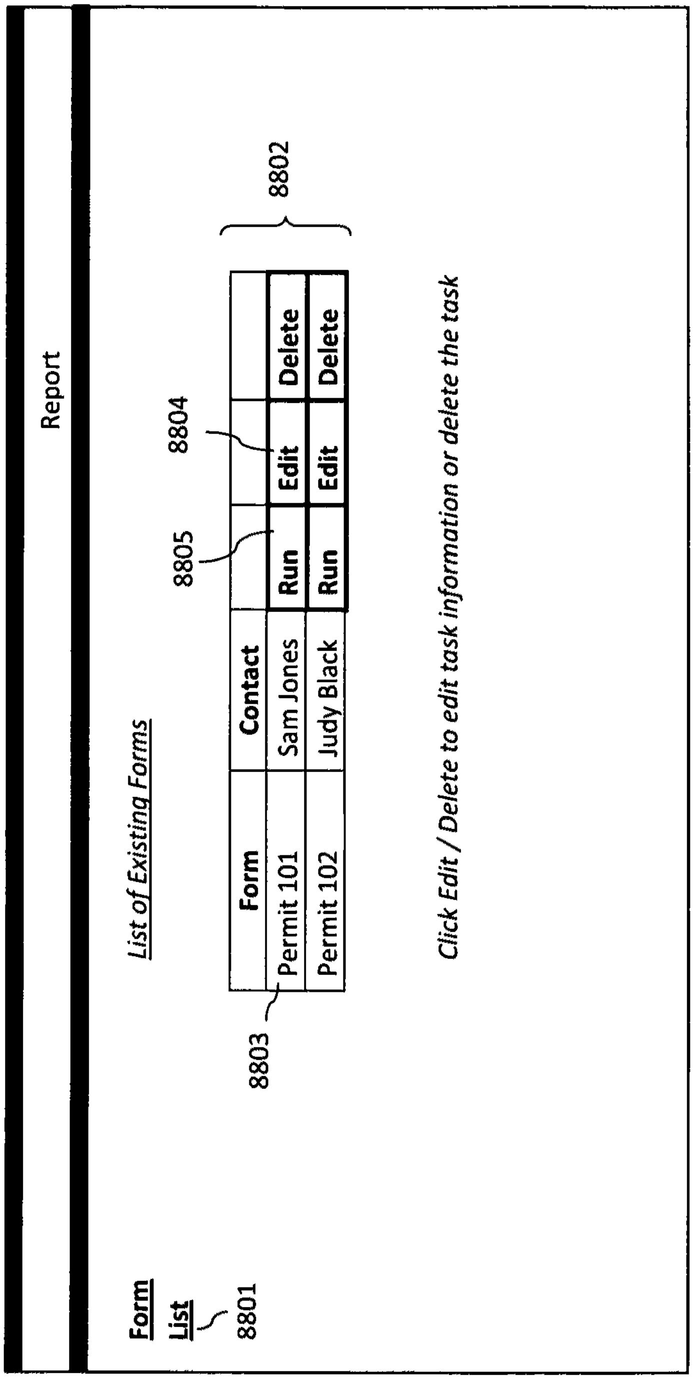
FIG. 88 is a display of a Form Adding Module.

FIG. 88 displays the Form List screen (8801), which enables the user to review and edit or delete existing forms. This page is accessed by clicking on the Form List button on the left of the page (8801). The List of Existing Forms table (8802) lists the forms currently produced by name and particular details. Permit 101 (8803), which was added FIG. 87, has now been added to the List of Available Forms. Selecting Edit (8804) on the Permit 101 will open the Add New Form window with the Permit 101 information already populated (See FIG. 87). When Run (8805) is selected on the Permit 101, the system disclosed here will open the Run Form window for the selected facility as displayed in FIG. 89.

Run Form (8901) enables the Authorized User to define the time period and format output for a specific form output at a given facility. The name of the selected form is displayed in Report Name (8902). The Authorized User sets the time frame over which the form will be run in Time Selection (8903). The Authorized User then specifies if a raw data report should be generated or not. In the case the Authorized User does request a raw data report (8904) and the system disclosed here generates the Select Format drop-down menu (8905) and Statistical Analysis options (8906).

Figure 89:
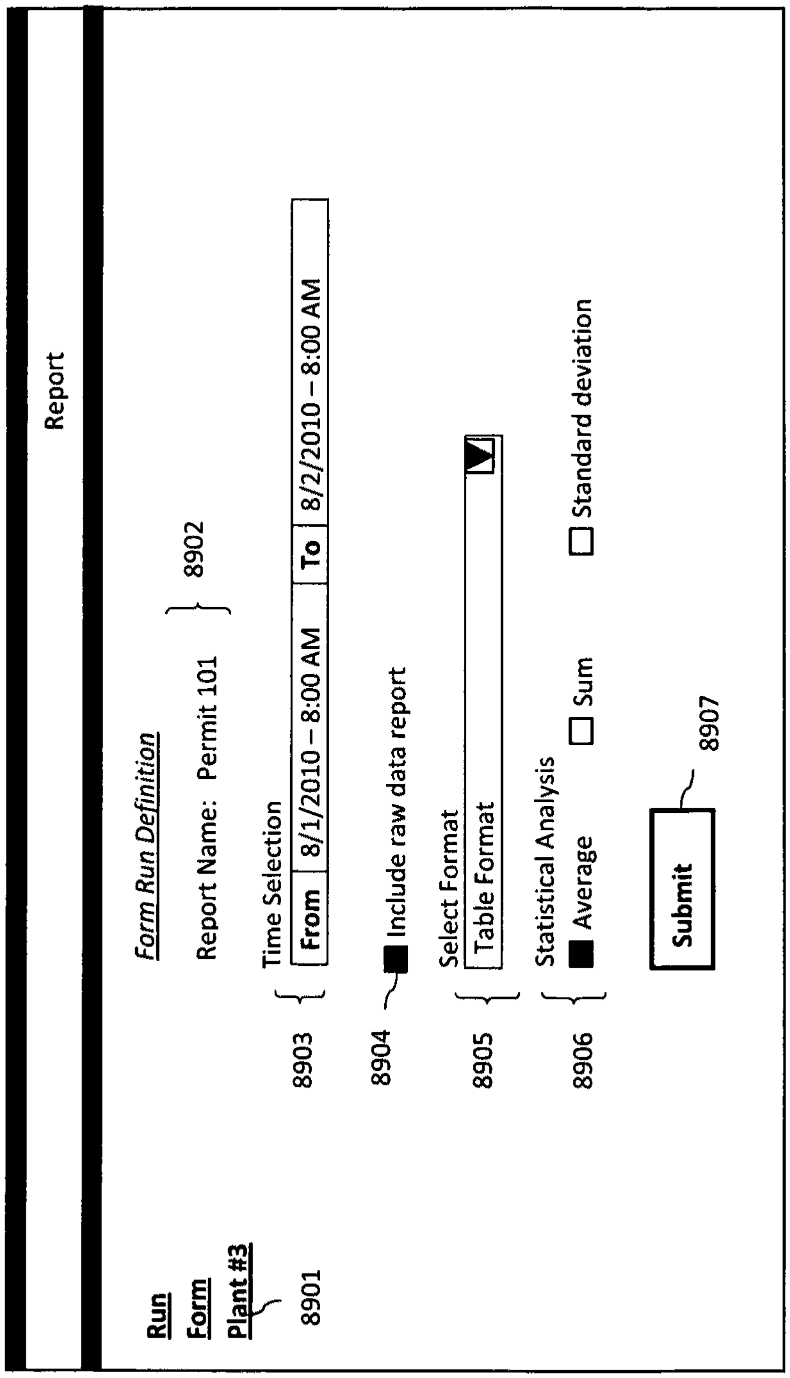
FIG. 89 is a display of a Form Funning Module.

The Select Format drop-down menu (8905) provides three reporting layout options for the raw data HTML, Comma Delimited and Table Format. In FIG. 89, the user chooses the Table Format. Statistical analysis can be added to the report output by selecting from the Statistical Analysis checkboxes (8906). In FIG. 89, Raw Data Report will be generated in a table format and the system disclosed here will also provide the average for Flow, Temperature and TOC data, which were the parameters selected as input to the form (see FIG. 87). The Submit button (8907) is selected when input is complete.

FIG. 90 displays the Form Publishing screen (9001), where the output is presented in a print preview layout (9002). The Authorized User can click Export to MS Excel button (9003) or Send and Archive button to send the form to a user that was previously defined (see FIG. 87). Last, the user can open the raw data report by clicking on button (9005).

Figure 91:
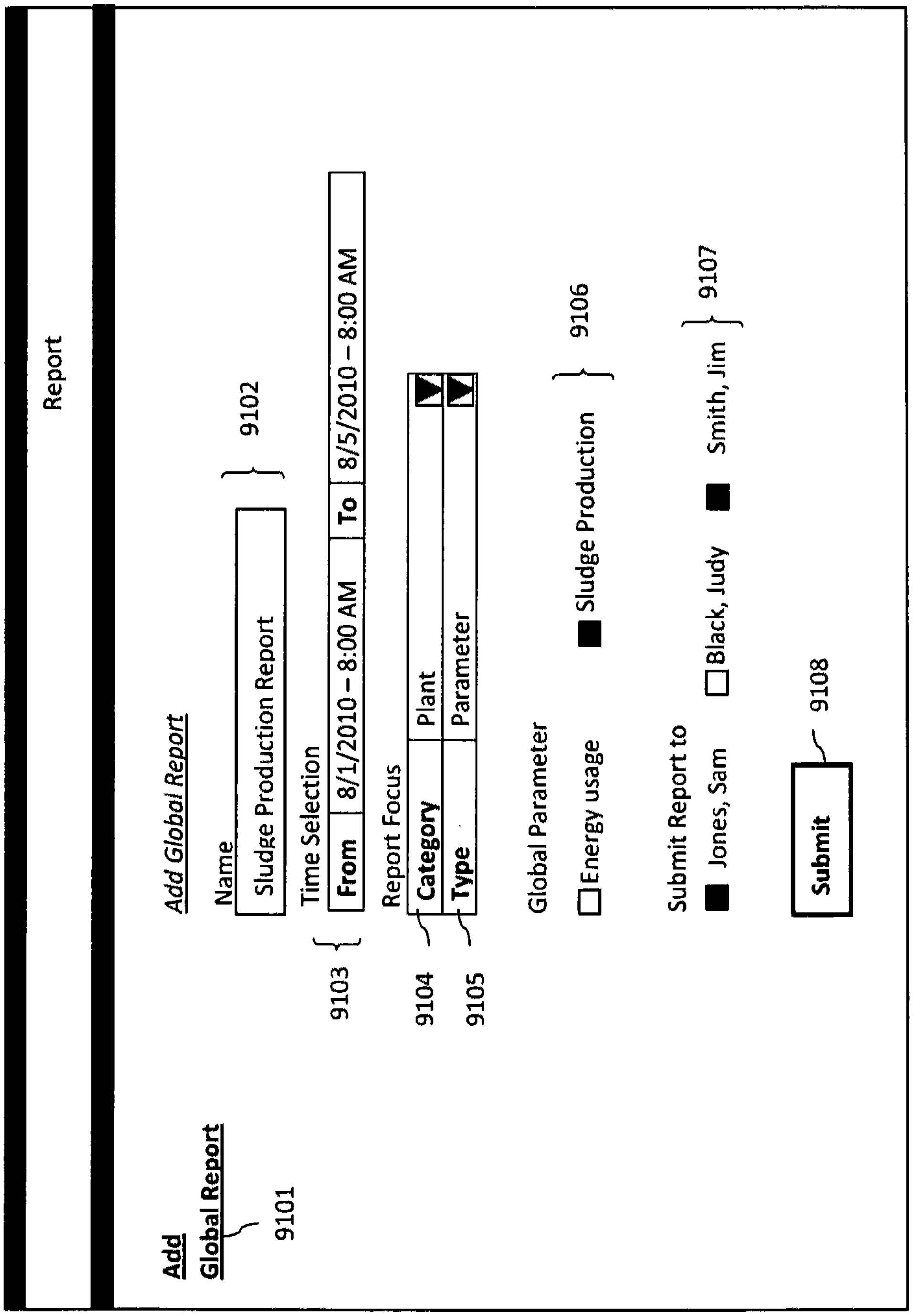
FIG. 91 is a display of a Global Report Creating Module.

To create a global report across several facilities, the Authorized User would use the Add Global Report, displayed in FIG. 91. To access this module the user clicks on the Add Global Report button on the left side of the screen (9101) and is provided with a self generated form (9102). A report name is typed in the Name field (9102) and date/time range of the data to be extracted is selected in the Time Selection table (9103). When the Add Global Report window is first displayed, only the Category drop-down menu (9104) is visible. The Authorized User can select one of the following: Plant, Process, Process Stream, Issue and Sampling Point. In FIG. 91, the user selected Plant Log. Once selected, the computer implementation approach generates the Type drop-down menu (9105), which offers the choice between parameters and chemicals. In FIG. 91, the user chooses Parameter. If Parameter is selected, the system disclosed here generates Global Parameters (9106), which are global parameters and global parameters monitored at the plant level.

After selecting from the Parameter options, the Authorized User identifies specific recipients of the report from the Submit Report to checkboxes (9107) if appropriate. The Submit button (9108) is selected when input is complete.

Figure 92:
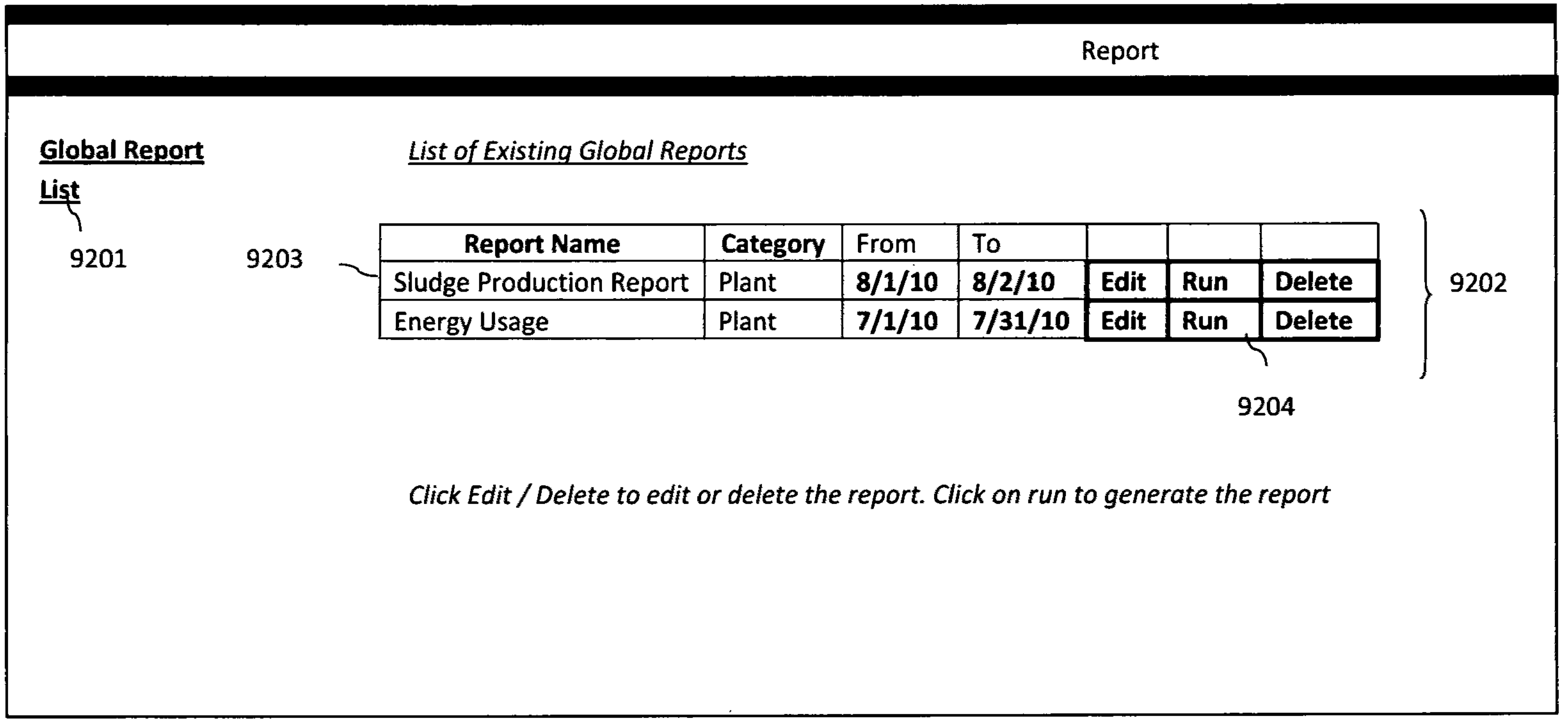
FIG. 92 is a display of a Global Report Listing and Archiving Module.
Figure 93:
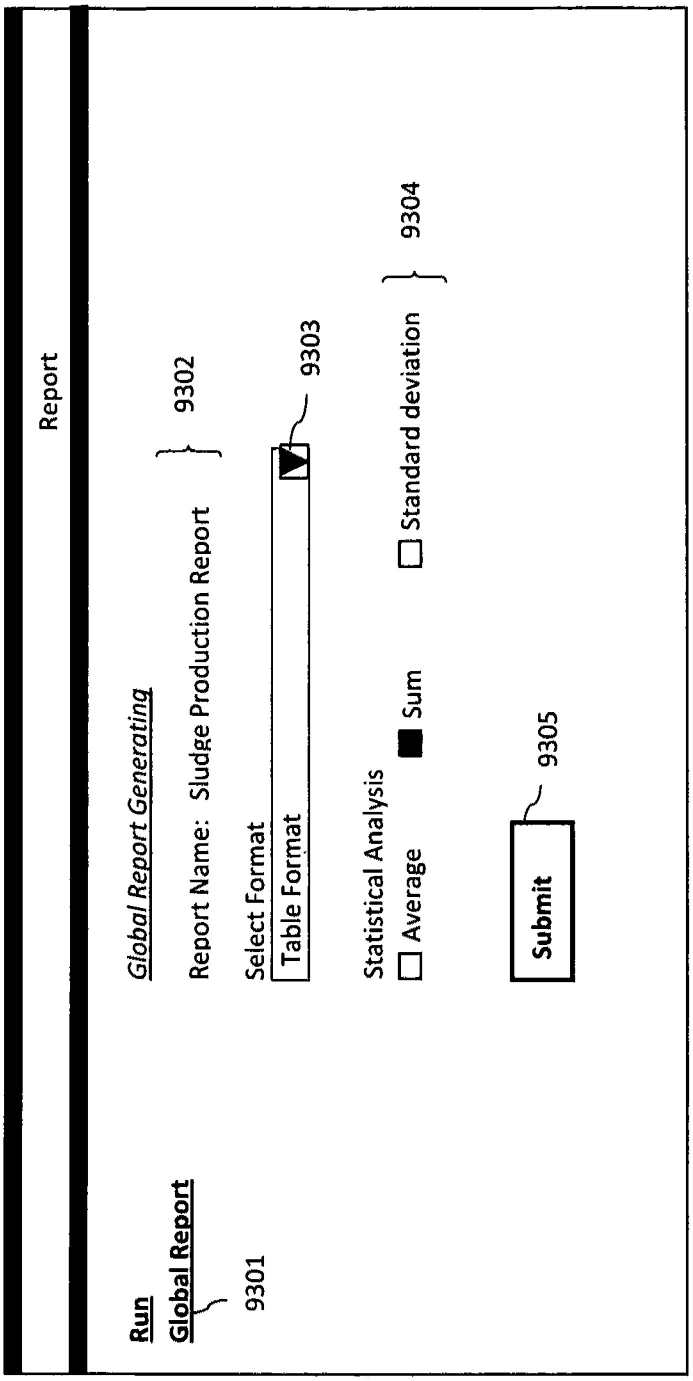
FIG. 93 is a display of a Global Report Generating Module.

FIG. 92 displays the Global Report List screen (9201), where the Authorized User to review and edit, run or delete existing global reports. This page is accessed by clicking on the Organization button on the left of the page (9201). The List of Existing Global Reports (9202) lists the current reports by name and particular details. The Sludge Production Report (9203) has been added to the List of Existing Global Reports. Selecting Run button (9204) for Sludge Production Report will open the Global Report Generating window depicted by FIG. 93, where the Authorized User can produce a report based on the previous selections. The report selected is displayed in the Report Name field (9302). The format is selected in the Select Format drop-down menu (9303), which provides three layout options: HTML, Comma Delimited and Table Format. In FIG. 93, the user chooses the Table Format. Statistic analysis can be added to the report output by selecting from the Statistical Analysis options (9304). In FIG. 93, the Sludge Production Report will be generated in a table format; the system disclosed here will also provide the total amount of sludge produced by each facility over the defined time period. The Submit button (9305) is selected when input is complete. Clicking Submit button will launch the Publish Global Report screen (9401), where the report is presented in the table format (9402) as selected. The user has the option to click Export to MS Excel button (9403) or Send and Archive button (9404) to the user identified in FIG. 87.

Figure 95:
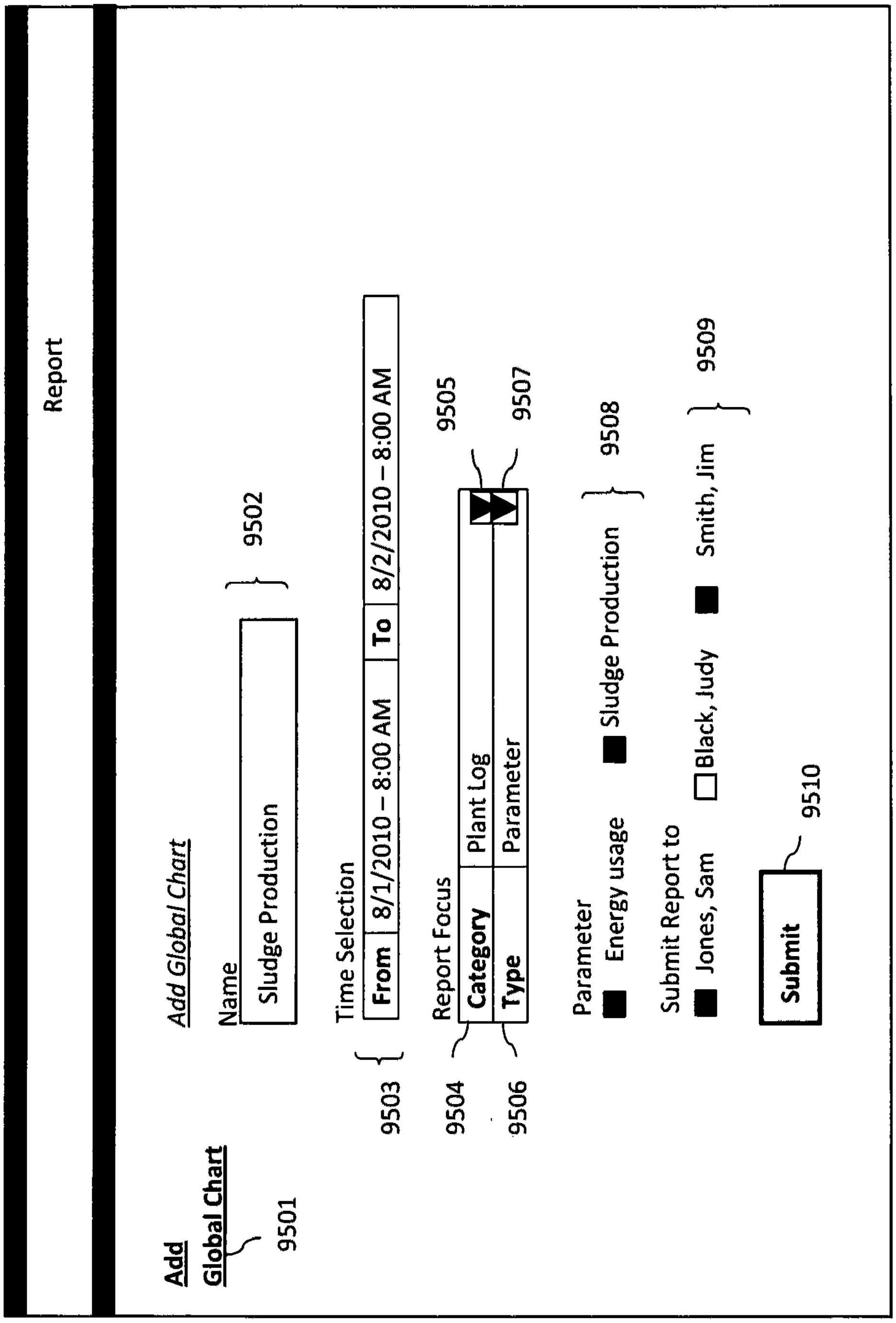
FIG. 95 is a display of a Chart Creating Module.

FIG. 95 displays the Add Global Chart screen, where the Authorized User has the ability to generate a new global chart utilizing logged data stored in the database of the system disclosed here. To access this module the user clicks on the Add Global Chart button on the left side of the screen (9501) and is provided with a self generated form (9502). A chart name is typed in the Name field (9502) and the date/time range of the data to be extracted is selected in the Time Selection table (9503). When the Add Global Report window is generated, only the Category drop-down menu (9504) is visible. At that point, the Authorized User clicks from the Category drop-down menu (9505) and selects from one of the following: Plant, Process, Process Stream, Issue and Sampling Point. In FIG. 95, the user selected Plant Log. Once selected, the computer implementation approach generates the Type drop-down menu (9506), which offers two choices of data types: Parameter or Chemicals. In FIG. 95, the user chooses Parameter using the drop-down menu (9507). When Parameter is selected, the system disclosed here generates the Parameter checkboxes (9508) which list the global parameters monitored at the plant level.

After the Authorized User identifies the Parameter that will be used in the chart, he or she identifies specific recipients of the report by making a selection from the Submit Report to checkboxes (9509). The Submit button (9510) is selected when input is complete.

Figure 96:
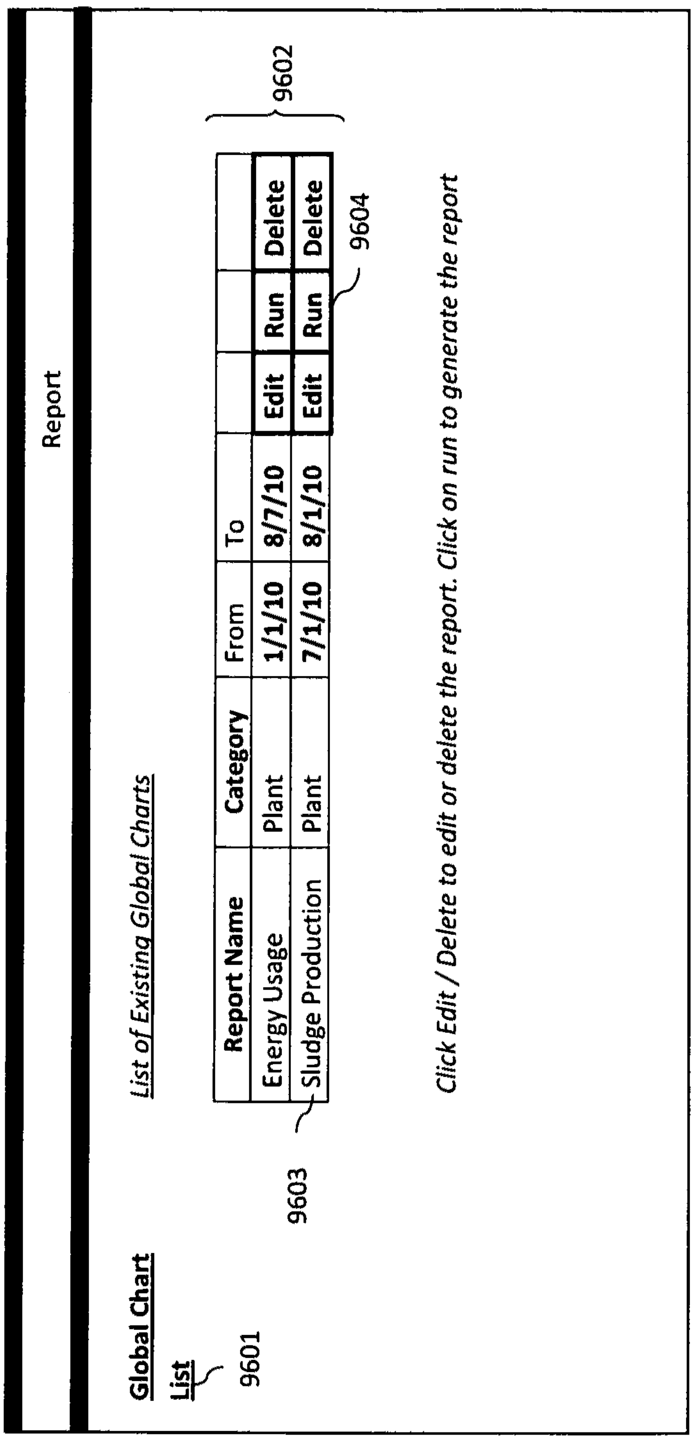
FIG. 96 is a display of a Chart Listing and Archiving Module.

FIG. 96 displays the Global Chart List screen (9601), where the user can review and edit, run or delete existing charts. The List of Existing Global Charts (9602) lists the previously created charts by name and particular details. Sludge Production (9603), which was added in FIG. 95, has now been added to the List of Existing Global Charts. Selecting Run (9604) for Sludge Production, the system disclosed here will open the Global Chart Generating window depicted in FIG. 97.

Figure 97:
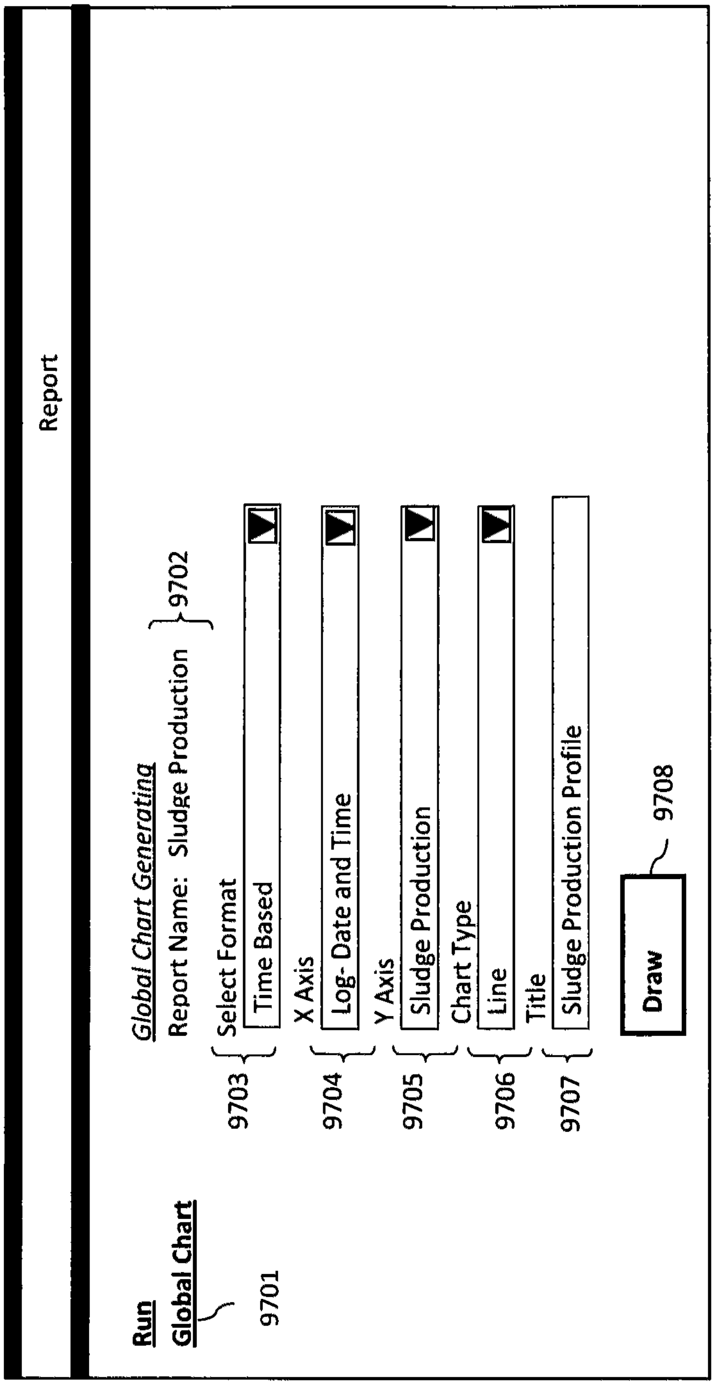
FIG. 97 is a display of a Chart Generating Module.

The Global Chart Generating screen (9701) is where the user can a chart based on report generation. This page is accessed by clicking on the Global Chart List button on the left of the page (9601). The report selected is displayed in the Report Name field (9702). The Authorized User will choose one of two formats using the Select Format drop-down menu (9704), either Time based or Non-time based. In FIG. 97, the user selects a time based chart. If Time based is selected, the system disclosed here generates the other chart properties, which include: the X-axis (9704), Y-axis (9705), chart type (9706), and chart title (9707). In this example, the Sludge Production Global Chart will be charted on a time based format with Log-Date and Time on the X axis, Filter Pressure on the Y Axis, in a line chart type. The Draw link (9708) is selected when input is complete. Clicking Draw button launches the Publish Global Report (9801) in FIG. 98, which displays a print preview of the chart (9802). The user clicks Send and Archive button (9803) to file send the chart to the users identified under FIG. 87, at the same time the file is archived in the database.

7—User Home Page Component

Figure 106:
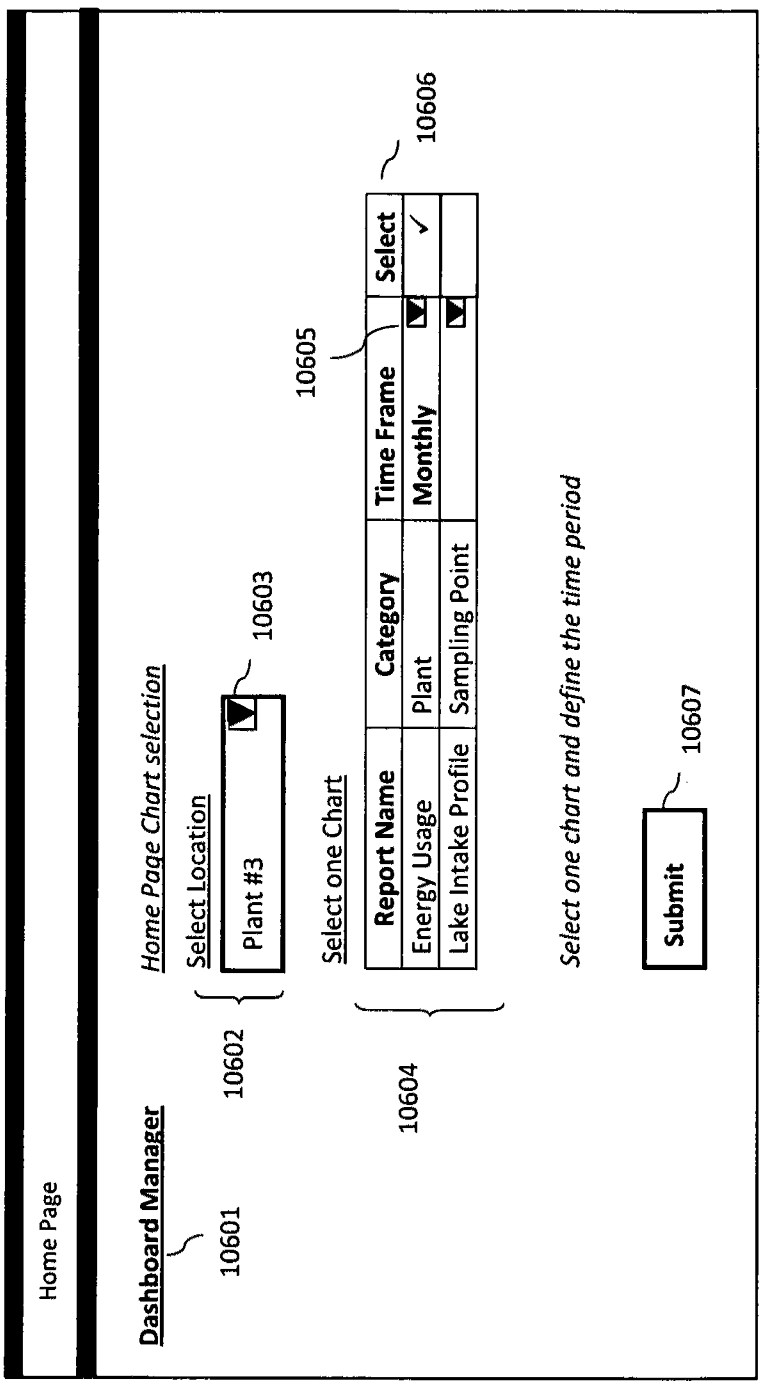
FIG. 106 is a display of a User Specific Home Page Dashboard Chart Selection Module.
Figure 107:
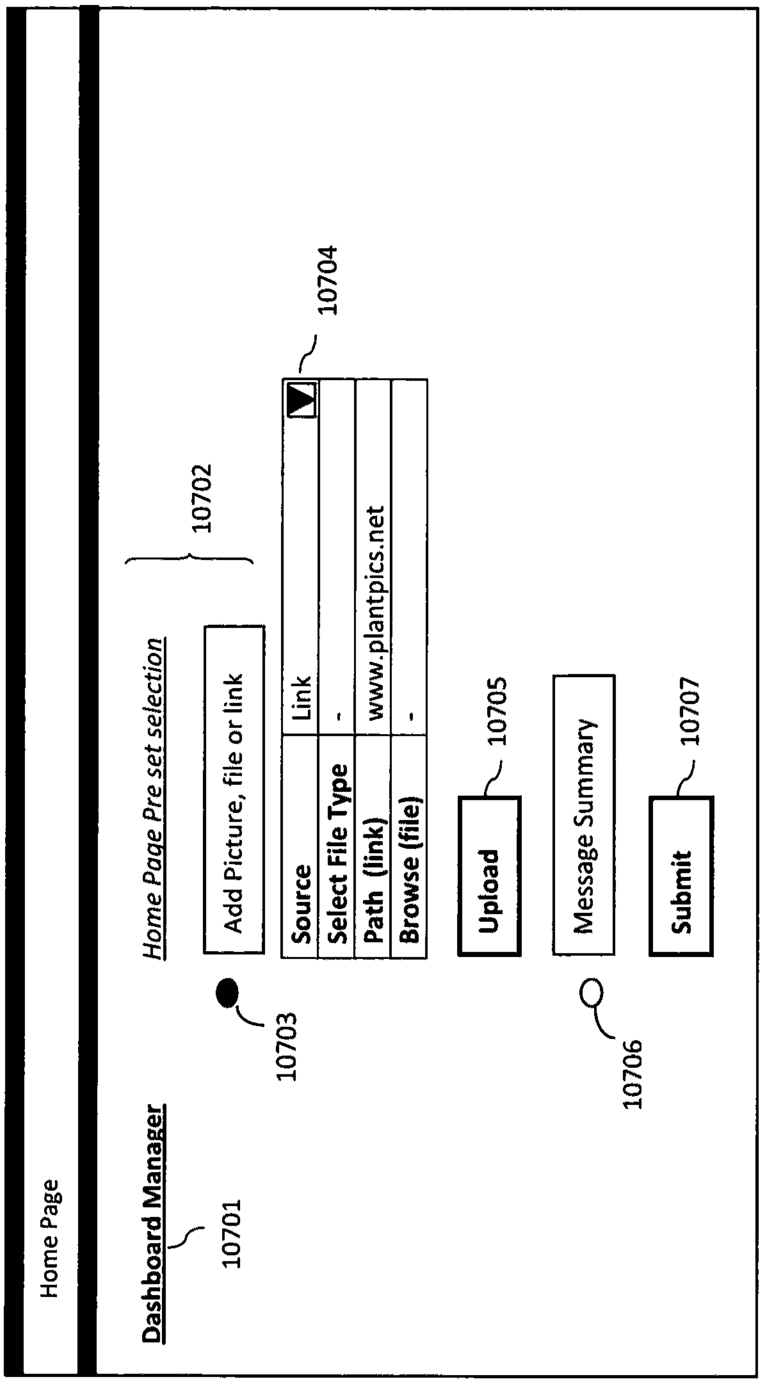
FIG. 107 shows a User Specific Home Page Dashboard Pre-Set Selection Module.

The Home Page Component presents an organizational tool for the user to manage work production. There is one function under Plant Selection, two functions under the User site set-up and the General Information Manager Function that are only accessible for Authorized Users within a specified organization. The functions are comprised of, but not limited, to 3 modules and are illustrated in the following figures. Workflow Manager Function Modules are Specific Plant Action Listing (FIG. 99), User Specific Notification Listing and Selecting (FIG. 100), Action Log and Task Description (FIG. 101). The functions and modules under The User Site Set-up are as follows: Dashboard Manager Function Modules are Home Page Set-up (FIG. 104), Data Selection (FIG. 105), Chart Selection (FIG. 106), and Pre-set File (FIG. 107). Personal Profile Manager Function modules are: User Profile Viewing and Editing (FIG. 108), and User and Organization Permission Access (FIG. 109). The modules under General Information Manager Function are: Bulletin Board Posting (FIG. 110), Bulletin Board Response (FIG. 111), Announcement Listing and Viewing (FIG. 112), and File Download and Link Access (FIG. 113). By clicking on the Component, a menu will appear with the linked modules, which are then each accessed by clicking on the individual module button. Utilizing the system disclosed here, Authorized Users are able to design personalized reporting views, review personal access, and access organizational information. The Home Page Component enables the user to customize reports/charts for view only status for analysis.

Figure 99:
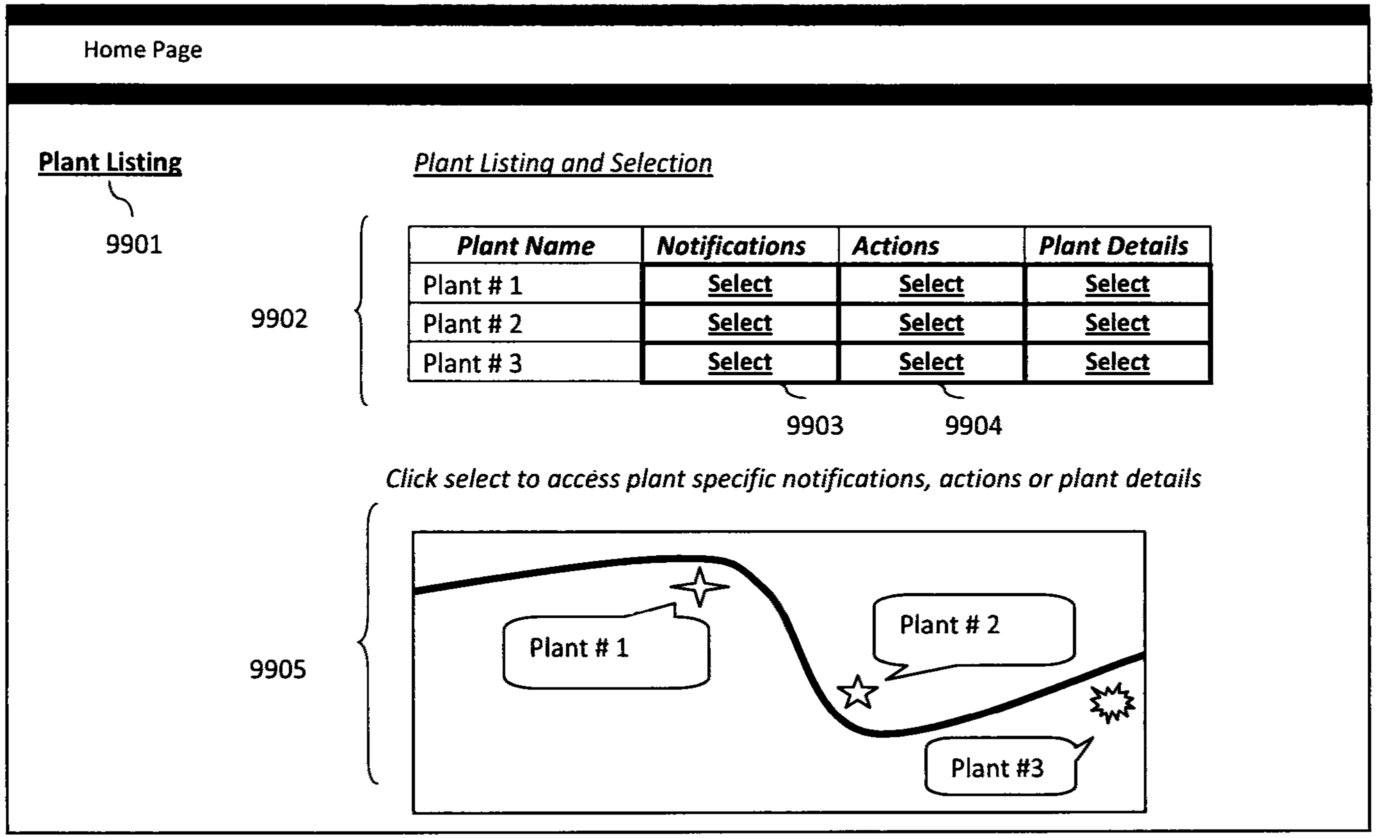
FIG. 99 is a display of a Plant Selection Module.

The process begins with selecting the plant the Authorized User wants to access. FIG. 99 illustrates the screen display for User Home Page Plant Listing and Selection (9901) under the Home Page Component enabling the Authorized User the option to review an individual facility currently maintained in the application. The table (9902) is a directory of the plants and three options for review: notifications, actions, and plant details for that particular plant. Clicking on Select button (9903) will allow the Authorized User to access the notifications for Plant #3, while clicking Select button (9904) will allow the Authorized User to access the actions for Plant #3. A map (9905) provides the geographic location of all facilities, which is auto populated by the system's display element.

Figure 100:
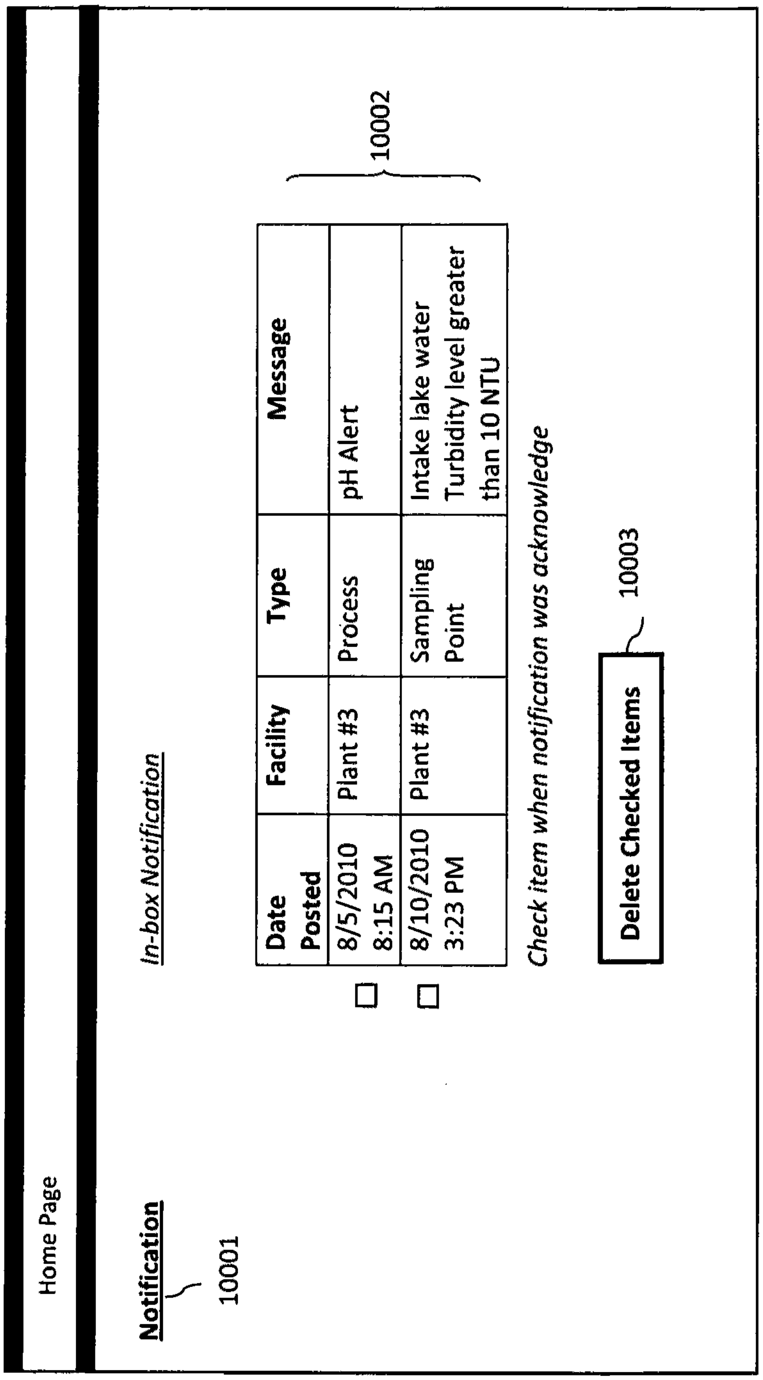
FIG. 100 is a display of a User Specific Notification Listing and Selection Module.
Figure 101:
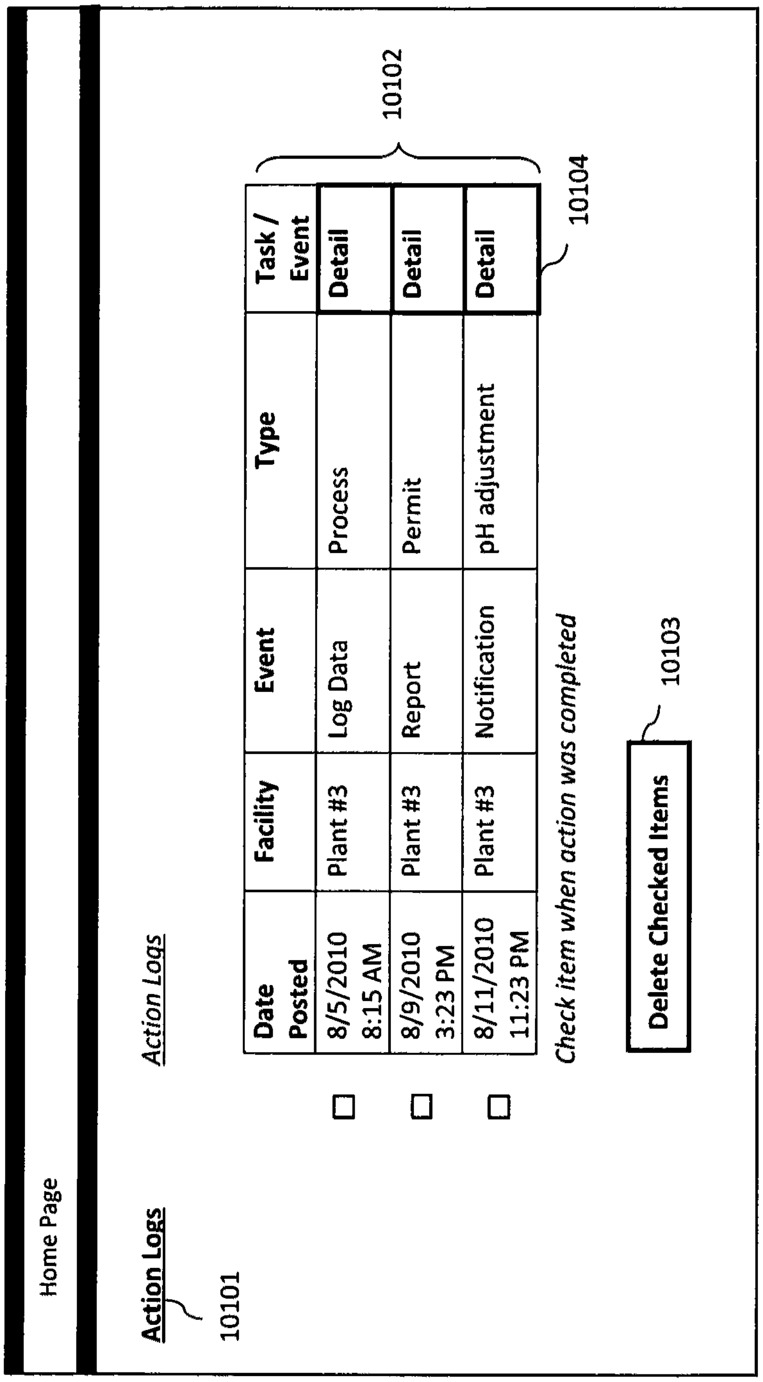
FIG. 101 is a display of a User Specific Plant Action Listing Module.

Selecting notifications (9903) in FIG. 99, a window opens to FIG. 100. FIG. 100 illustrates the screen display for In-box Notification (10001), where the designated user receives notifications pertaining to a specific plant, self generated by the system disclosed here once specific triggers were activated. Notifications triggers are set under the Define Component of the system disclosed here. The notification list (10002) presented as an example contains the fundamental information and is sent when a defined issue has reached its target value. Once the user has taken note of the notification, the user has the ability to remove the message from the list by checking the box left to the message and click on Delete Checked Items button (10003). Based on the example above in Add Notification (FIG. 49), pH Alert, a new notification, is sent for the organizational review.

Figure 102:
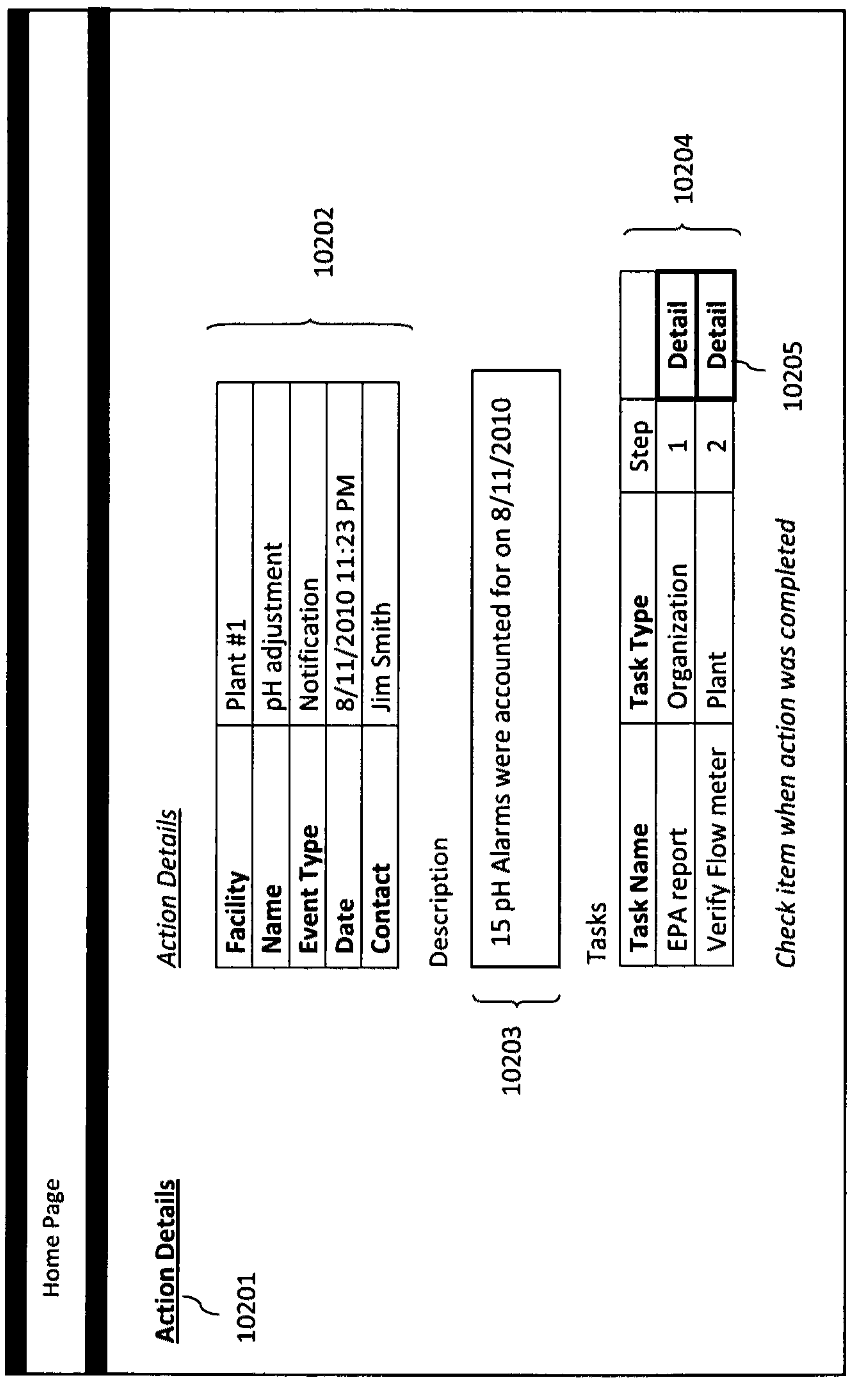
FIG. 102 is a display of an Action Specific Description Module.
Figure 103:
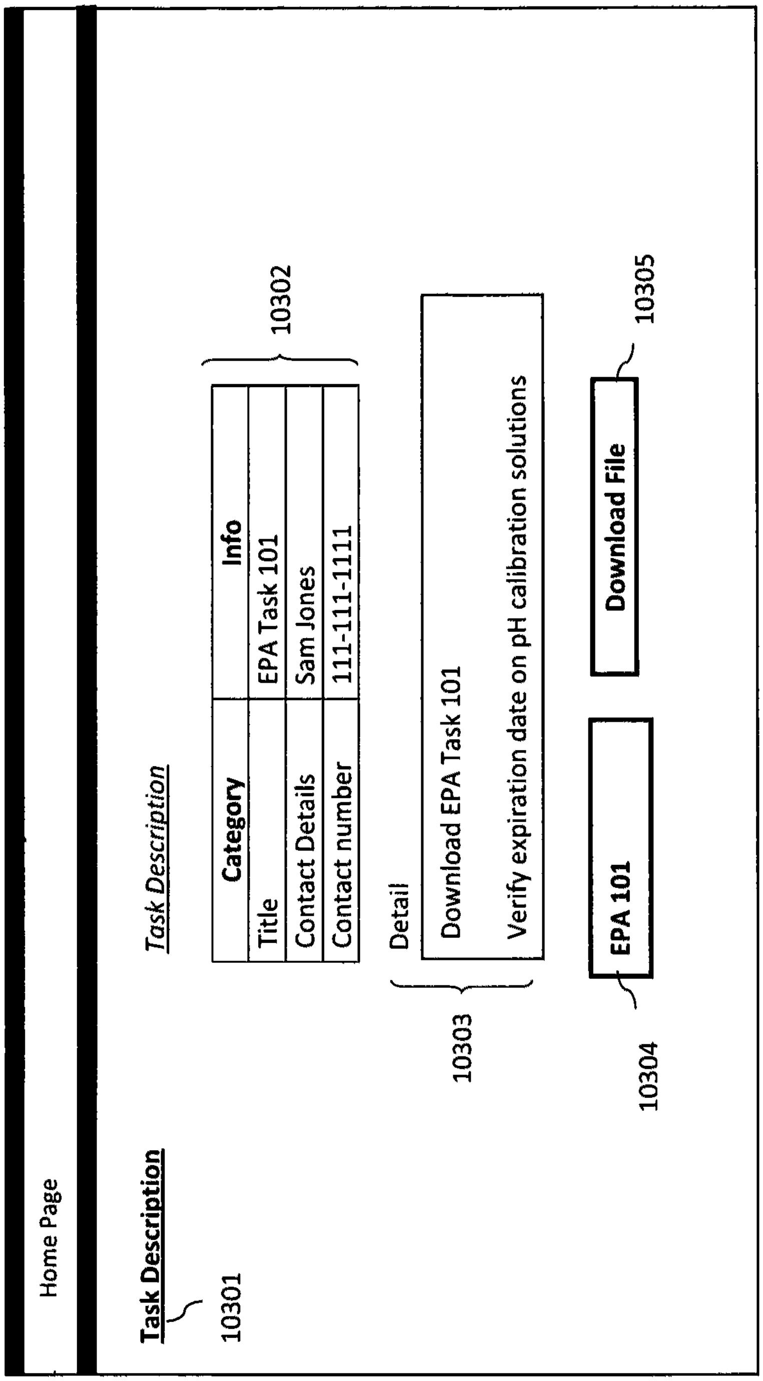
FIG. 103 is a display of a Task Description Module.

Selecting any action (9904) in FIG. 99 will open the window illustrated in FIG. 101. FIG. 101 illustrates the screen display for Action Logs (10101), where the designated user receives the actions required for a facility. The action list (10102) contains the fundamental information and is sent when a defined issue has reached its target value, and subsequently alerts the designated user(s). Click on Delete Checked Items button (10103) to remove an action from the list. Based on the example above in Add Action (FIG. 55), pH adjustment, a new action, is sent for the organizational review. Selecting Detail button (10104), FIG. 102 illustrates the screen display for Action Details (10201), where the user is able to view action record information (10202), description (10203), and the task step order (10204). Note that the examples are: 1) EPA report from FIG. 22, Add Global Task is step 1 and 2) Verify Flow Meter from FIG. 52, Add Task for Individual Facility is step 2. Selecting Detail button (10205) in FIG. 103 illustrates the screen display for Task Description (10301), where the user is able to view the task record information (10302) and the detail (10303) which directs the task completion order. Step 1 requires a download of EPA Task 101 which is executed by clicking on Browse button (10304) to locate file and Download File button (10305) to execute.

Figure 104:
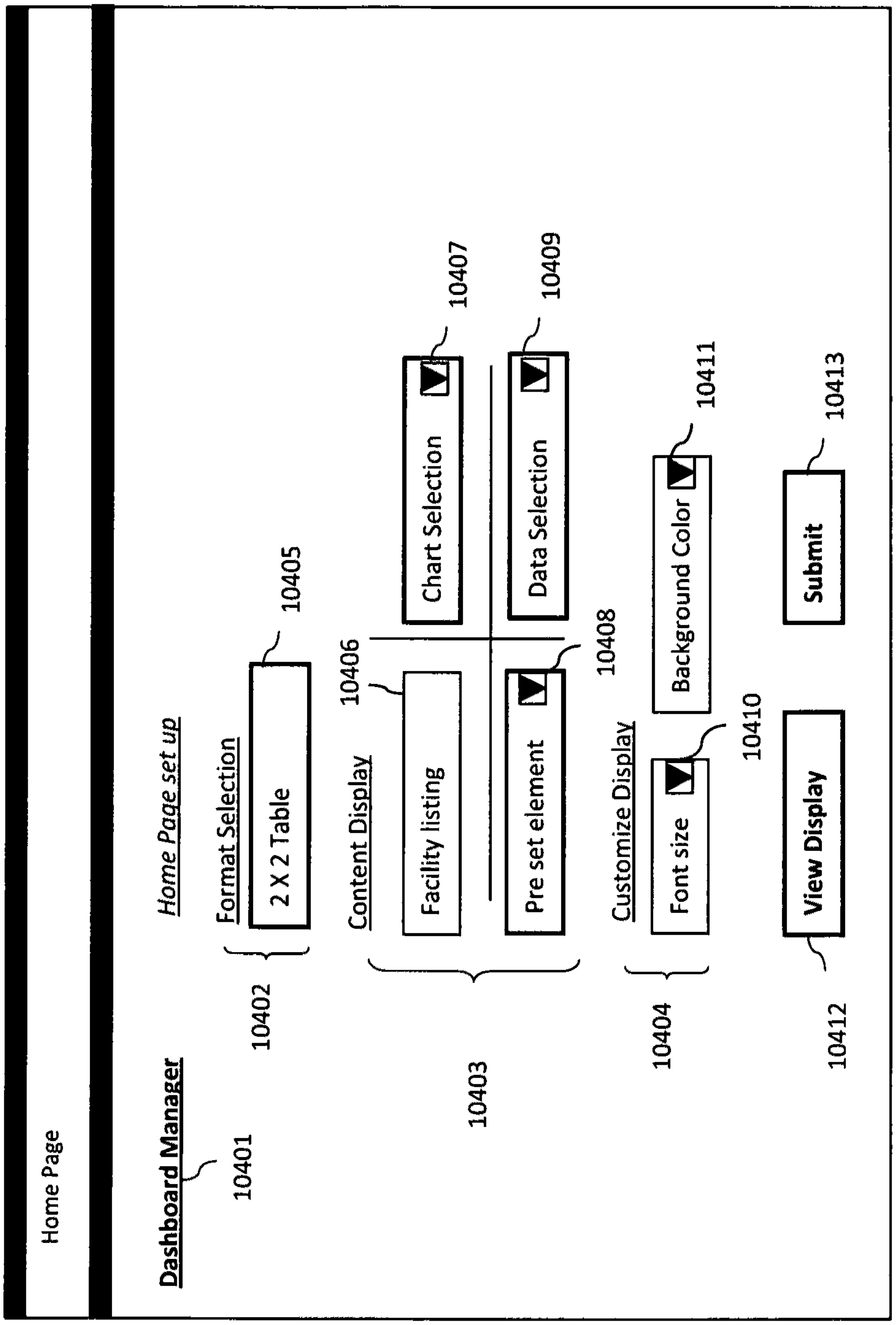
FIG. 104 is a display of a User Specific Home Page Dashboard Set Up Module.
Figure 105:
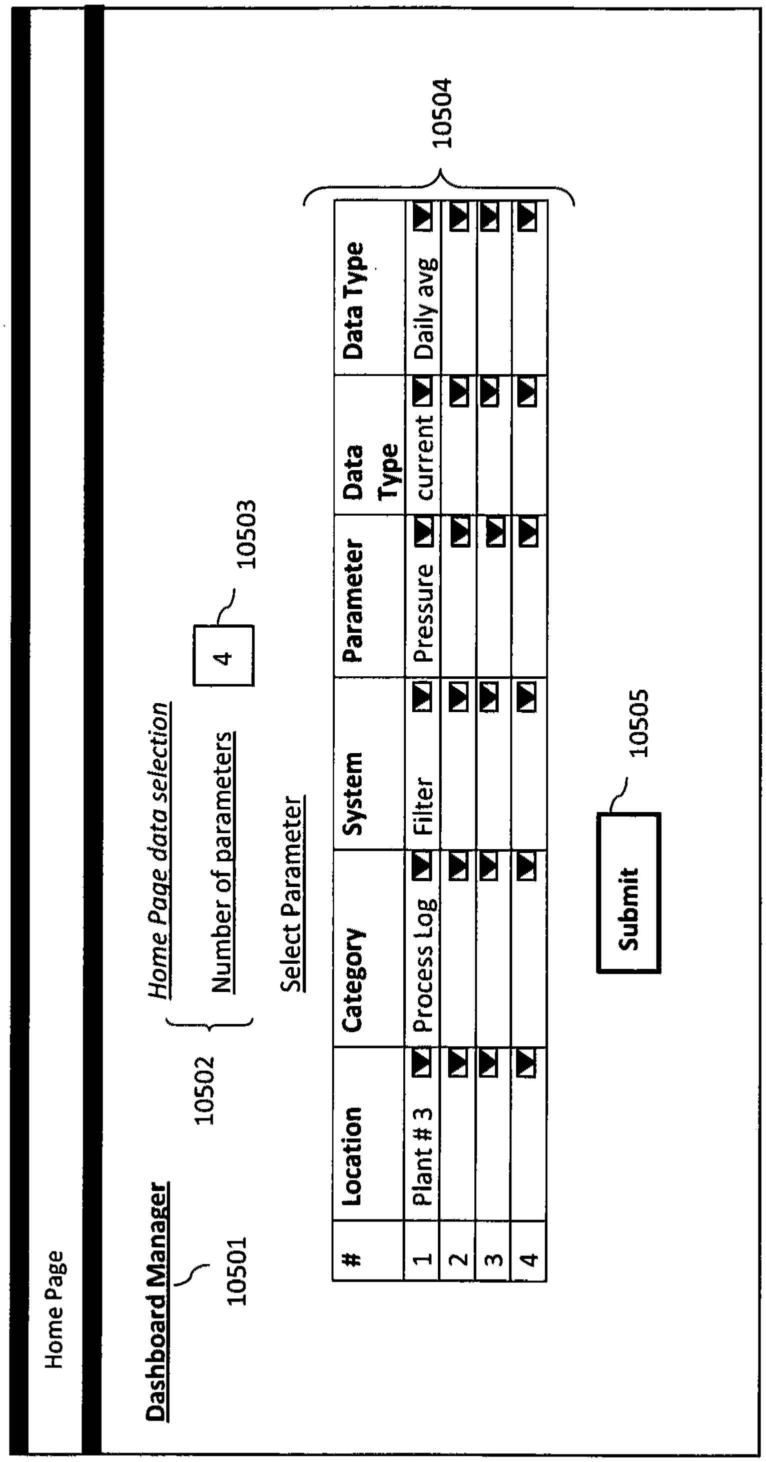
FIG. 105 is a display of a User Specific Home Page Dashboard Data Selection Module.

FIG. 104 illustrates the screen display for Dashboard Manager which enables the user to select settings to individualize their homepage view. The user clicks on the Dashboard Manager button on the left side of the screen (10401) and is provided with a self generated form (10402). The fields in Format Selection (10402), Content Display (10403) and Customize Display (10404) utilize drop-down menus to alter the appearance of the homepage to suit the user's preference. Under Format (10402), the table size may be selected (10405). Under Content Display (10403), there are selections in facility listing (10406), Chart Selection (10407), Pre-set module (10408), and Data Selection (10409). Under Customize Display (10404), the Font Size (10410) and Background Color (10411) can be modified. Click on View Display button (10412) to preview the page with selected settings. Clicking Submit button (10413) displays the screen in FIG. 105. FIG. 105 illustrates the screen display for Dashboard Manager (10501) for Home Page Data Selection (10502). The user utilizes the field to input the number of parameters (10503) required. The Select Parameter Table (10504) allows the user to utilize the drop-down menus to choose the Plant Location, Category, System, Parameter, and two modes of Data Types for the data requested. Submit button (10505) is selected when input is completed for the next screenshot in FIG. 106. FIG. 106 illustrates the screen display for Dashboard Manager (10601) for Home Page Chart Selection (10602). The user utilizes the drop-down menu in Select Location (10603) to choose a facility. In this example, Plant #3 is selected. The applicable charts are presented in table format (10604) and the user selects the time frame (10605) utilizing a drop-down menu. Click on the desired cell under the Select column (10606) and a checkmark will designate the chart requested. Click on Submit button (10605) to save changes. FIG. 107 illustrates the screen display for Dashboard Manager (10701) for Home Page Pre-set Selection (10702). The user clicks on the radio box to Add Picture, File or Link (10703) and utilizes the drop-down menu in Source (10704) to make the selection. In this example, Link is selected. Click on Upload (10705) to execute process. A Message Summary (10706) is the other option for the user to perform. Click Submit button (10707) to save changes.

FIG. 108 illustrates the screen display for User Profile, where the user is given access to create a personal profile. The user clicks on the User Profile button on the left side of the screen (10801) and is provided with a self generated form (10802). Fundamental information (10802) is required and as well as a password (10803) to log on to the application. The Submit button (10804) is selected when input is complete. Also available on this page is the User Access Definition table (10805), which displays on a read only mode the authorized component functions the user has access to within the system disclosed here. User Access is managed from the Administer Component. FIG. 109 illustrates the screen display for User Access Permission (10901, where the authorized is able to review personal access to the components.

Figure 110:
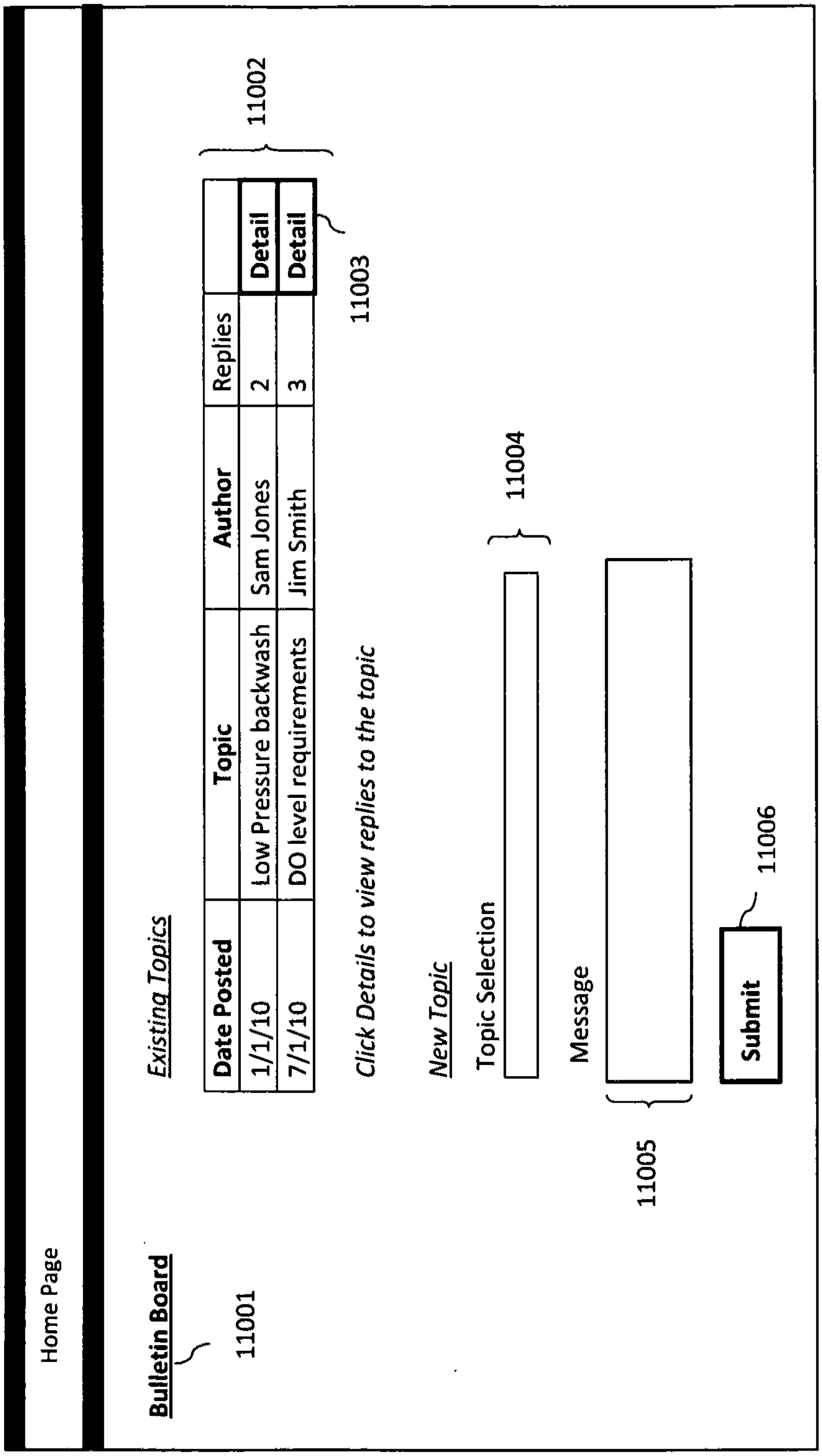
FIG. 110 is a display of a Bulletin Board Posting Module.
Figure 111:
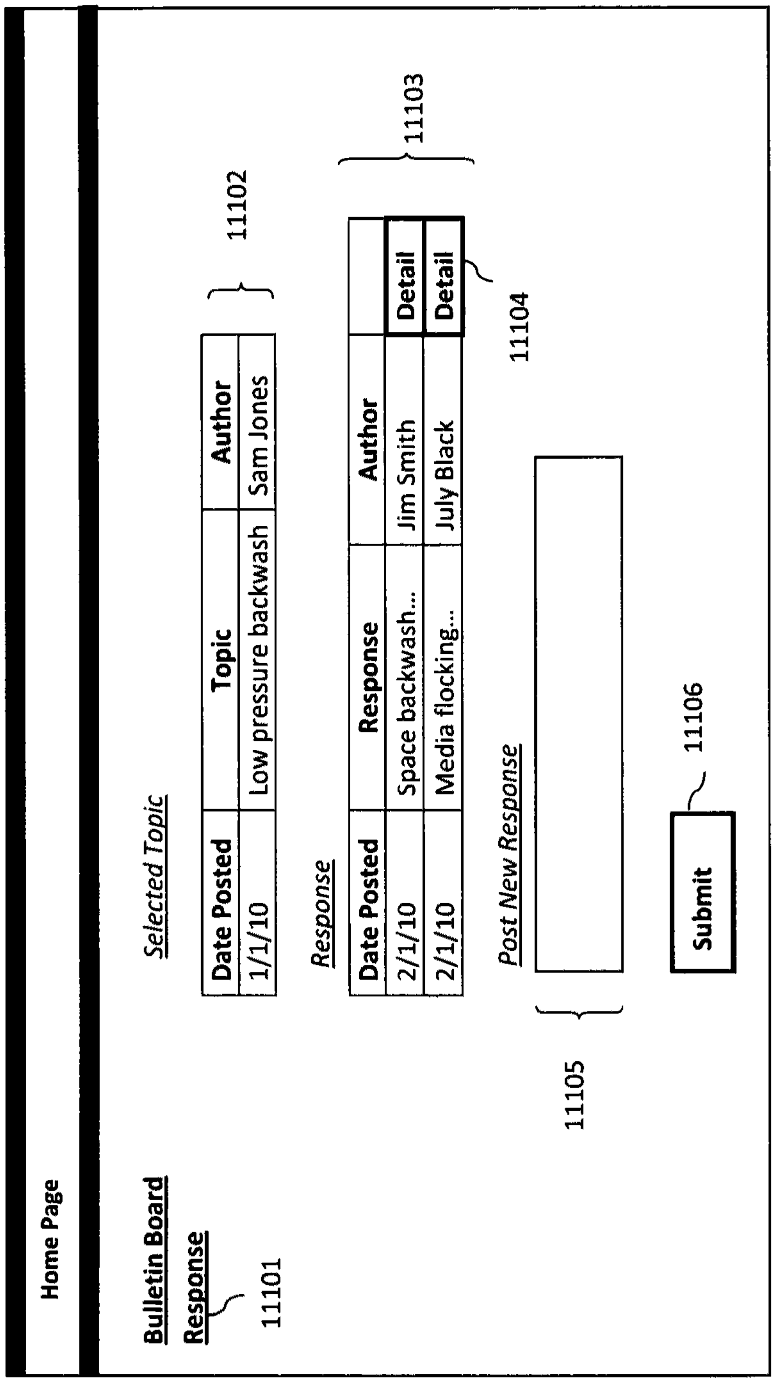
FIG. 111 is a display of a Bulletin Board Response Module.

FIG. 110 illustrates the screen display for Bulletin Board, where the user can view informational postings from users within the organization. The user clicks on the Bulletin Board button on the left side of the screen (11001). The table lists the topics currently available for discussion (11002), and the full posting and related replies are viewed by selecting detail button (11003) on the topic row. To add a new topic for posting, the user types in the New Topic field for Topic Selection (11004) and Message (11005). The Submit button (11006) is selected when input is complete. FIG. 111 illustrates the screen display for Bulletin Board Response (11101), which enables the user to review the selected topic (11102) and the associated responses (11103); click on Detail button (11104) to see full response. To post a new response, the user utilizes the field marked Post New Response (11005). Response is posted upon selecting Submit button (11106).

FIG. 112 illustrates the screen display for Files and Links List, where the approved users have access to review existing global files and links. The user clicks on the Files and Links button on the left side of the screen (11201). The file table (11202) lists the documents currently available and clicking Download button (11203) on the selected row executes this process. The link table (11204) lists the sites available and clicking on the address (11205) on the selected row executes this process. The links and files visible under this module of the system disclosed here were added exclusively from the Administer Component, thus keeping task specific or plant specific documents distinct and respecting possible confidentiality considerations placed on specific documents.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A form-based user-configurable computer-implemented system for managing processing plant information, the system comprising:

a plant definition module comprising a form displayed on a computer screen capable of allowing a user to enter and save information about said processing plant, said plant definition module further comprising:

a processes listing module capable of displaying a list of processes in said plant;

a sampling points listing module capable of displaying a list of sampling points in said plant;

a sampling point logs listing module capable of displaying a list of sampling point log search fields for said plant; and a reports listing module capable of displaying a list of reports for said plant;

a parameters listing module responsive to said plant definition module, capable of displaying a list of plant parameters;

a parameter definition module responsive to said parameters listing module wherein said parameter definition module comprises a form displayed on said computer screen capable of allowing a user to enter and save information about at least one plant parameter;

a process definition module responsive to said processes listing module wherein said process definition module comprises a form displayed on said computer screen capable of allowing a user to enter and save process definition information for said plant, said process definition module further comprising a process parameters listing module capable of displaying list of process parameters employed to monitor processes in said plant;

a sampling points definition module responsive to said sampling points listing module wherein said sampling points definition module comprises a form displayed on said computer screen capable of allowing a user to enter and save sampling points definition information for said plant, said sampling points definition module further comprising a sampling point parameters listing module capable of displaying a list of sampling point parameters employed to collect information in the plant; and a report rendering module responsive to said reports listing module wherein said report rendering module comprises a form displayed on said computer screen further comprising a submit button, the actuation of which causes a report to be shown on said computer screen.

2. The system of claim 1, wherein:

said parameter definition module form further comprises:

a plurality of parameter input fields responsive to user input comprising a name field, a units field, a minimum value field, and a maximum value field;

a save button displayed on said computer screen that is responsive to user input; and capable of transferring the user-provided contents of said parameter definition input fields to a computer memory in response to a signal from said save button wherein said data movement element does not require user-supplied computer code to transfer said user input field content into a computer memory;

said process definition module form further comprises:

a plurality of chemical definition input fields responsive to user input comprising a process name field and a process type field;

a save button displayed on said computer screen that is responsive to user input; and a data movement element capable of transferring the user-provided contents of said organization definition input fields to a computer memory in response to a signal from said button wherein said data movement element does not require user-supplied computer code to transfer said user input field content into said computer memory; and said sampling points definition module form further comprises:

a plurality of sampling point definition input fields responsive to user input comprising a sampling point name field and a sampling point type field;

a save button displayed on said computer screen that is responsive to user input;

a data movement element capable of transferring the user-provided contents of said sampling point definition input fields to a computer memory in response to a signal from said save button wherein said data movement element does not require user-supplied computer code to transfer said user input field content into said computer memory.

3. The system of claim 2, further comprising a users listing module and a user definition module wherein said users definition module is responsive to said users listing module and said users listing module further comprises a user functions listing module and wherein:

said users listing module is capable of showing a list of existing users of said system;

said user definition module comprises a form displayed on said computer screen comprising a user definition input field; and said user functions listing module is capable of displaying and changing the modules accessible to a specific system user.

4. The system of claim 3, further comprising:

a sampling point log module responsive to said sampling point logs listing module, further comprising a sampling point log parameters listing module; and a report definition module responsive to said reports listing module, further comprising:

a report sampling points listing module; and a report parameters listing module wherein:

said sampling point log module comprises a form displayed on said computer screen showing at least one sampling point log field;

said sampling point log parameters listing module is capable of displaying parameters employed to collect sampling point log information;

said report definition module comprises a form displayed on said computer screen, said form comprising a report definition input field;

said report sampling points listing module capable of displaying sampling points employed by the plant; and said report parameters listing module is capable of displaying parameters employed by the plant.

5. The system of claim 4, wherein:

said plant definition module further comprises a chemicals listing module;

said system further comprises a chemical definition module responsive to said chemicals listing module;

said process definition module further comprises a process chemicals listing module; and said a report definition module further comprises a report chemicals listing module;

wherein:

said chemicals listing module is capable of displaying chemicals employed in said plant;

said chemical definition module further comprises a form displayed, on said computer screen, said form comprising a chemical definition input field;

said process chemicals listing module is capable of displaying process chemicals employed in the plant; and said report chemicals listing module is capable of displaying chemicals employed in the plant.

6. The system of claim 5, wherein:

said plant definition module further comprises a process logs listing module;

said system further comprises a process log module responsive to said process logs listing module, further comprising a process log parameters listing module and a process log chemicals listing module; and said report definition module further comprises a report processes listing module;

wherein:

said process logs listing module further comprises a form displayed on said computer screen, said form comprising a process log search field;

said process log module further comprises a form displayed on said computer screen, said form comprising a process log field;

said process log parameters listing module is capable of displaying parameters employed to collect process log information;

said process log chemicals listing module is capable of displaying chemicals employed to collect process log information; and said report processes listing module is capable of displaying processes employed by the plant.

7. The system of claim 6, wherein:

said plant definition module further comprises a plant logs listing module; and said system further comprises a plant log module responsive to said plant logs listing module, further comprising a plant log parameters listing module;

wherein:

said plant logs listing module further comprises a form displayed on said computer screen, said form comprising a plant log search field;

said plant log module further comprises a form displayed on said computer screen, said form comprising a plant log field; and said plant log parameters listing module is capable of displaying log parameters employed to collect plant log information.

8. The system of claim 7, wherein:

said plant definition module further comprises a process streams listing module and a process stream logs listing module;

said system further comprises a process streams definition module responsive to said process streams listing module, further comprising a process stream parameters listing module and a process stream chemicals listing module;

said system further comprises a process stream log module responsive to said process stream logs listing module, further comprising a process stream log parameters listing module and a process stream log chemicals listing module; and said report definition module further comprises a report process streams listing module;

wherein:

said process streams listing module is capable of displaying process streams employed by the plant;

said process stream logs listing module comprises a form displayed on said computer screen further comprising a process stream log search field;

said process streams definition module comprises a form displayed on said computer screen further comprising a process stream input field;

said process stream parameters listing module is capable of displaying process stream parameters employed in the plant;

said process stream chemicals listing module is capable of displaying process stream chemicals employed in the plant;

said process stream log module comprises a form displayed on said computer screen further comprising a process stream log field;

said process stream log parameters listing module is capable of displaying parameters employed to collect process stream log information;

said process stream log chemicals listing module is capable of displaying chemicals employed to collect process stream log information; and said report process streams listing module is capable of displaying process streams employed by the plant.

9. The system of claim 8, further comprising an organization definition module comprising a plants listing module and said users listing module wherein:

said plant definition module is responsive to said plants listing module;

said parameters listing module is responsive to said organization definition module; and wherein:

said organization definition module further comprises a form displayed on said computer screen comprising an organization definition input field; and said plant definition module is capable of displaying a listing of plants controlled by said organization.

10. The system of claim 9 wherein:

said plant definition module further comprises a charts listing module;

said system further comprises a chart definition module responsive to said charts listing module, further comprising:

a chart processes listing module;

a chart process streams listing module;

a chart sampling points listing module;

a chart parameters listing module; and a chart chemicals listing module; and said system further comprises a chart rendering module responsive to said charts listing module;

wherein:

said charts listing module comprises a display element capable of showing a list of existing charts for the plant;

said chart definition module further comprises a form displayed on said computer screen comprising a chart definition input field;

said chart process listing module is capable of displaying processes employed by the plant;

said chart process streams listing module is capable of displaying process streams employed by the plant;

said chart sampling points listing module is capable of displaying sampling points employed by the plant;

said chart parameters listing module is capable of displaying parameters employed by the plant;

said chart chemicals listing module is capable of displaying chemicals employed by the plant; and said chart rendering module comprises a form displayed on said computer screen comprising a chart rendering input field.

11. The system of claim 10, wherein said system is implemented using a client-server architecture in which forms are displayed in a web browser on a client computer and data is stored on a server and wherein said client computer and said server communicate using an internet protocol.

12. The system of claim 10 wherein:

a) the organization definition module form further comprises;

a plurality of organization definition input fields responsive to user input comprising:

an organization name field;

an organization description field;

an organization contact person's name field;

an organization address field;

an organization phone number field;

an organization fax number field;

an organization email address field;

an organization web address field;

a plant quantity field;

a user quantity field; and a save button displayed on said computer screen that is responsive to user input;

a data movement element capable of transferring the user-provided contents of said organization definition input fields to a computer memory in response to a signal from said button wherein said data movement element does not require user-supplied computer code to transfer said user input field content into said computer memory;

b) the plants listing module further comprises a display element, said display element being capable of showing:

a list of existing plants structured by name and description;

at least one edit button wherein said edit button is responsive to user input and wherein the actuation of said edit button causes the opening of the plant definition module; and a create new plant button wherein said create new plant button is responsive to user input and wherein the actuation of said create new plant button causes the opening of the plant definition module with empty fields;

c) said plant definition module form further comprises:

a plurality of plant definition input fields responsive to user input comprising:

a plant name field;

a plant description field;

a plant contact field;

a plant address field;

a plant phone field;

a plant fax field;

a plant email field;

a plant web address field;

a plant flow units field;

a plant pressure units field;

a plant temperature units field;

a plant start date field; and a plant track history field; and a save button displayed on said computer screen that is responsive to user input;

a data movement element capable of transferring the user-provided contents of said plant definition input fields to a computer memory in response to a signal from said save button wherein said data movement element does not require user-supplied computer code to transfer said user input field content into said computer memory;

d) the parameters listing module is further capable of displaying:

a listing of parameters that are employed in the organization and shared across the plants of the organization when the parameters listing module is actuated from the organization definition module; and a listing of the parameters in the plant without the ability to share with other plants in the organization when the parameters listing module is actuated from the plant definition module;

a list of existing parameters structured by name and description;

at least one edit button for each existing parameter wherein said edit button is responsive to user input and wherein the actuation of said edit button causes the opening of the parameter definition module; and an add new parameter button wherein said add new parameter button is responsive to user input wherein the actuation of said add new parameter button causes the opening of the parameter definition module with empty fields;

e) said parameter definition module form input fields further comprise:

a parameter description field;

a parameter type field; and a parameter enforce minimum and maximum field; and a parameter special operands field;

f) the chemicals listing module further comprises a display element, said display element being capable of showing:

a list of existing chemicals structured by name and description;

at least one edit button wherein said edit button is responsive to user input and wherein the actuation of said edit button causes the opening of the chemical definition module; and an add new chemical button wherein said add new chemical button is responsive to user input and wherein the actuation of said add new chemical button causes the opening of the chemical definition module with empty fields;

g) said chemical definition module form further comprises:

a plurality of chemical definition input fields responsive to user input comprising:

a chemical name field;

a chemical description field;

a chemical type field;

a chemical dosage units field;

a chemical rate units field;

a chemical loading units field;

a chemical feed density units field; and a save button displayed on said computer screen that is responsive to user input;

a data movement element capable of transferring the user-provided contents of said chemical definition input fields to a computer memory in response to a signal from said save button wherein said data movement element does not require user-supplied computer code to transfer said user input field content into said computer memory;

h) the processes listing module further comprises a display element, said display element being capable of showing:

a list of existing processes structured by name and description;

at least one edit button wherein said edit button is responsive to user input and wherein the actuation of said edit button causes the opening of the process definition module; and an add new process button wherein said add new process button is responsive to user input and wherein the actuation of said add new process button causes the opening of the process definition module with empty fields;

i) said process definition module process definition input fields further comprise a process description field and a number of process stages field;

j) the process parameters listing module further comprises a display element, said display element being capable of showing:

a list of existing parameters structured by name comprising:

a parameter name field;

a parameter description field;

a parameter type field;

a parameter units field;

a parameter minimum value field;

a parameter maximum value field;

a parameter enforce minimum and maximum field;

a parameter special operands field; and a check box for each parameter to accept or remove its usage for the process;

at least one edit button for each existing parameter wherein said edit button is responsive to user input and wherein the actuation of said edit button causes the opening of the parameter definition module; and an add new parameter button wherein said add new parameter button is responsive to user input wherein the actuation of said add new parameter button causes the opening of the parameter definition module with empty fields;

a save button displayed on said computer screen that is responsive to user input;

a data movement element capable of transferring the user-provided contents of said chemical definition input fields to a computer memory in response to a signal from said save button wherein said data movement element does not require user-supplied computer code to transfer said user input field content into said computer memory;

k) said process chemicals listing module further comprises a display element, said display element being capable of showing:

a list of existing chemicals structured by name comprising:

a chemical name field;

a chemical description field;

a chemical type field;

a chemical dosage units field;

a chemical rate units field;

a chemical loading units field;

a chemical feed density units field; and a check box for each existing chemical to accept or remove its usage for the process;

at least one edit button wherein said edit button is responsive to user input and wherein the actuation of said edit button causes the opening of the chemical definition module; and an add new chemical button wherein said add new chemical button is responsive to user input and wherein the actuation of said add new chemical button causes the opening of the chemical definition module with empty fields;

a save button displayed on said computer screen that is responsive to user input;

a data movement element capable of transferring the user-provided contents of said chemical definition input fields to a computer memory in response to a signal from said save button wherein said data movement element does not require user-supplied computer code to transfer said user input field content into said computer memory;

l) said process streams listing module further comprises a display element, said display element being capable of showing:

a list of existing process streams structured by name and description;

at least one edit button wherein said edit button is responsive to user input and wherein the actuation of said edit button causes the opening of the process stream definition module; and an add new process stream button wherein said add new process stream button is responsive to user input and wherein the actuation of said add new process stream button causes the opening of the process stream definition module with empty fields;

m) said process stream definition module form further comprises:

a plurality of process stream definition input fields responsive to user input comprising:

a process stream name field;

a process stream description field;

a process stream code field;

a process stream type field;

an upstream process field;

a downstream process field; and a save button displayed on said computer screen that is responsive to user input;

a data movement element capable of transferring the user-provided contents of said process stream definition input fields to a computer memory in response to a signal from said save button wherein said data movement element does not require user-supplied computer code to transfer said user input field content into said computer memory;

n) said process stream parameters listing module further comprises a display element, said display element being capable of showing:

a list of existing parameters structured by name comprising:

a parameter name field;

a parameter description field;

a parameter type field;

a parameter units field;

a parameter minimum value field;

a parameter maximum value field;

a parameter enforce minimum and maximum field;

a parameter special operands field; and a check box for each parameter to accept or remove its usage for the process;

at least one edit button for each existing parameter wherein said edit button is responsive to user input and wherein the actuation of said edit button causes the opening of the parameter definition module; and an add new parameter button wherein said add new parameter button is responsive to user input wherein the actuation of said add new parameter button causes the opening of the parameter definition module with empty fields;

a save button displayed on said computer screen that is responsive to user input; and a data movement element capable of transferring the user-provided contents of said parameter definition fields to a computer memory in response to a signal from said save button wherein said data movement element does not require user-supplied computer code to transfer said user input field content into said computer memory;

o) said process stream chemicals listing module further comprises a display element, said display element being capable of showing:

a list of existing chemicals structured by name comprising:

a chemical name field;

a chemical description field;

a chemical type field;

a chemical dosage units field;

a chemical rate units field;

a chemical loading units field;

a chemical feed density units field; and a check box for each existing chemical to accept or remove its usage for the process;

at least one edit button wherein said edit button is responsive to user input and wherein the actuation of said edit button causes the opening of the chemical definition module; and an add new chemical button wherein said add new chemical button is responsive to user input and wherein the actuation of said add new chemical button causes the opening of the chemical definition module with empty fields;

a save button displayed on said computer screen that is responsive to user input;

a data movement element capable of transferring the user-provided contents of said chemical definition input fields to a computer memory in response to a signal from said save button wherein said data movement element does not require user-supplied computer code to transfer said user input field content into said computer memory;

p) said sampling points listing module comprising a display element, said display element being capable of showing:

a list of existing sampling points structured by name and description;

at least one edit button wherein said edit button is responsive to user input and wherein the actuation of said edit button causes the opening of the sampling points definition module; and an add new sampling point button wherein said add new sampling point button is responsive to user input and wherein the actuation of said add new sampling point button causes the opening of the sampling point definition module with empty fields;

q) said sampling points definition module input fields further comprise a sampling point description field and a a sampling point code field;

r) said sampling point parameters listing module further comprises a display element, said display element being capable of showing:

a list of existing parameters structured by name comprising:

a parameter name field;

a parameter description field;

a parameter type field;

a parameter units field;

a parameter minimum value field;

a parameter maximum value field;

a parameter enforce minimum and maximum field;

a parameter special operands field; and a check box for each parameter to accept or remove its usage for the process;

at least one edit button for each existing parameter wherein said edit button is responsive to user input and wherein the actuation of said edit button causes the opening of the parameter definition module; and an add new parameter button wherein said add new parameter button is responsive to user input wherein the actuation of said add new parameter button causes the opening of the parameter definition module with empty fields;

a save button displayed on said computer screen that is responsive to user input; and a data movement element capable of transferring the user-provided contents of said parameter definition fields to a computer memory in response to a signal from said save button wherein said data movement element does not require user-supplied computer code to transfer said user input field content into said computer memory;

s) said plant logs listing module form further comprises:

a plurality of plant log search fields, said fields being responsive to user input, and said plant log search fields comprising:

a log date from search field;

a log date to search field;

a log description search field;

a search button wherein said search button is responsive to user input;

a list of existing plant logs retrieved based on said plan log search fields, and said list ordered by one from the group of said log date from, said log date to, and said log description;

at least one edit button wherein said edit button is responsive to user input and wherein the actuation of said edit button causes the actuation of the plant log module; and an add new plant log button wherein said add new plant log button is responsive to user input and wherein of said add new plant log button causes the opening of the plant log module with empty fields;

t) said plant log module form further comprises:

a plurality of plant log fields responsive to user input comprising:

a log date field;

a log time field;

a log description field;

a save button displayed on said computer screen that is responsive to user input;

a data movement element capable of transferring the user-provided contents of said plant log input fields to a computer memory in response to a signal from said save button wherein said data movement element does not require user-supplied computer code to transfer said user input field content into said computer memory;

u) said plant log parameters listing module further comprises a display element, said display element being capable of showing:

a list of existing plant parameters structured by name comprising;

a parameter name field;

a parameter description field;

a parameter type field;

a parameter units field;

a parameter minimum value field;

a parameter maximum value field;

a parameter enforce minimum and maximum field;

a parameter special operands field;

wherein the list of process parameters has been defined as part of said parameters listing module; and a save button displayed on said computer screen that is responsive to user input;

a data movement element capable of transferring the user-provided contents of said parameter definition input fields to a computer memory in response to a signal from said save button wherein said data movement element does not require user-supplied computer code to transfer said user input field content into said computer memory;

v) said process logs listing module comprises:

a form displayed on said computer screen said form comprising:

a plurality of process log search fields responsive to user input comprising:

a log date from search field;

a log date to search field;

a process name selection search field; and a description search field;

a search button displayed on said computer screen that is responsive to user input;

a display element to display existing list of process logs retrieved based on user entered search fields and structured by log date, log time, process name and description;

at least one edit button wherein said edit button is responsive to user input and wherein the actuation of said edit button causes the actuation of the process log module; and an add new process log button wherein said add new process log button is responsive to user input and wherein the actuation of said add new process log button causes the opening of the process log module with empty fields;

w) said process log module form further comprises:

a plurality of process log fields responsive to user input comprising:

a log mode field;

a log date field;

a log time field;

a log description field;

a process name selection field; and a process stage field;

a log mode selection choice button that allows the user to select a master mode to collect process log information for all processes and process stages for the plant in a single step;

a log mode selection choice button that allows the user to select an individual mode to collect process log information for only one selected process and stage for the plant in a single step;

a save button displayed on said computer screen that is responsive to user input;

a data movement element capable of transferring the user-provided contents of said process log input fields to a computer memory in response to a signal from said save button wherein said data movement element does not require user-supplied computer code to transfer said user input field content into said computer memory;

x) said process log parameters listing module further comprises a display element, said display element being capable of showing:

a list of existing process parameters structured by name comprising;

a parameter name field;

a parameter description field;

a parameter type field;

a parameter units field;

a parameter minimum value field;

a parameter maximum value field;

a parameter enforce minimum and maximum field;

a parameter measurement field;

a parameter special operands field;

wherein the list of process parameters has been defined as part of said parameters listing module; and a save button displayed on said computer screen that is responsive to user input;

a data movement element capable of transferring the user-provided contents of said parameter definition input fields to a computer memory in response to a signal from said save button wherein said data movement element does not require user-supplied computer code to transfer said user input field content into said computer memory;

y) said process log chemicals listing module further comprises a display element, said display element being capable of showing:

a list of existing chemicals structured by name comprising:

a chemical name field;

a chemical description field;

a chemical type field;

a chemical dosage units field;

a chemical dosage measurement field;

a chemical rate units field;

a chemical rate measurement field;

a chemical loading units field;

a chemical loading measurement field;

a chemical feed density units field;

a chemical feed density measurement field;

wherein the list of chemicals has been defined as part of said chemicals listing module; and a save button displayed on said computer screen that is responsive to user input;

a data movement element capable of transferring the user-provided contents of said chemical input fields to a computer memory in response to a signal from said save button wherein said data movement element does not require user-supplied computer code to transfer said user input field content into said computer memory;

z) said process stream logs listing module form further comprises:

a plurality of process stream log search fields responsive to user input comprising:

a log date from search field;

a log date to search field;

a process stream name selection search field; and a description search field;

a search button displayed on said computer screen that is responsive to user input;

a display element to display existing list of process stream logs retrieved based on user entered search fields and structured by log date, log time, process stream name and description;

at least one edit button wherein said edit button is responsive to user input and wherein the actuation of said edit button causes the actuation of the process stream log module; and an add new process stream log button wherein said add new process stream log button is responsive to user input and wherein the actuation of said add new process stream log button causes the opening of the process stream log module with empty fields;

aa) said process stream log module form comprises:

a plurality of process stream log fields responsive to user input comprising:

a log mode field;

a log date field;

a log time field;

a log description field; and a process stream name selection field;

a log mode selection choice button that allows the user to select a master mode to collect process stream log information for all processes and process stages for the plant in a single step;

a log mode selection choice button that allows the user to select an individual mode to collect process stream log information for only one selected process and stage for the plant in a single step;

a save button displayed on said computer screen that is responsive to user input;

a data movement element capable of transferring the user-provided contents of said process stream log fields to a computer memory in response to a signal from said save button wherein said data movement element does not require user-supplied computer code to transfer said user input field content into said computer memory;

ab) said process stream log parameters listing module further comprises a display element, said display element being capable of showing:

a list of existing process parameters structured by name comprising;

a parameter name field;

a parameter description field;

a parameter type field;

a parameter units field;

a parameter minimum value field;

a parameter maximum value field;

a parameter enforce minimum and maximum field;

a parameter measurement field;

a parameter special operands field;

wherein the list of process parameters has been defined as part of said parameters listing module; and a save button displayed on said computer screen that is responsive to user input;

a data movement element capable of transferring the user-provided contents of said parameter definition input fields to a computer memory in response to a signal from said save button wherein said data movement element does not require user-supplied computer code to transfer said user input field content into said computer memory;

ac) said process stream log chemicals listing module further comprises a display element, said display element being capable of showing:

a list of existing chemicals structured by name comprising:

a chemical name field;

a chemical description field;

a chemical type field;

a chemical dosage units field;

a chemical dosage measurement field;

a chemical rate units field;

a chemical rate measurement field;

a chemical loading units field;

a chemical loading measurement field;

a chemical feed density units field;

a chemical feed density measurement field;

wherein the list of chemicals has been defined as part of said chemicals listing module; and a save button displayed on said computer screen that is responsive to user input;

a data movement element capable of transferring the user-provided contents of said chemical input fields to a computer memory in response to a signal from said save button wherein said data movement element does not require user-supplied computer code to transfer said user input field content into said computer memory;

ad) said sampling point logs listing module further comprises a form displayed on said computer screen wherein said sampling logs listing module form comprises:
sampling point search fields comprising:
a log date from search field;
a log date to search field;
a sampling point name selection search field; and
a description search field; and
a search button responsive to user input;
a display element to display existing list of sampling point logs retrieved based on user entered search fields and structured by log date, log time, sampling point name and description;
at least one edit button wherein said edit button is responsive to user input and wherein the actuation of said edit button causes the actuation of the sampling point log module; and
an add new sampling point log button wherein said add new sampling point log button is responsive to user input and wherein the actuation of said add new sampling point log button causes the opening of the sampling point log module with empty fields;

ae) said sampling point log module form further comprises:
a plurality of sampling point log fields responsive to user input comprising:
a log mode field;
a log date field;
a log time field;
a log description field; and
a sampling point name selection field;
a log mode selection choice button that allows the user to select a master mode to collect sampling point log information for all processes and process stages for the plant in a single step;
a log mode selection choice button that allows the user to select an individual mode to collect process sampling point log information for only one selected process and stage for the plant in a single step;
a save button displayed on said computer screen that is responsive to user input;
a data movement element capable of transferring the user-provided contents of said sampling point log input fields to a computer memory in response to a signal from said save button wherein said data movement element does not require user-supplied computer code to transfer said user input field content into said computer memory;

af) said sampling point log parameters listing module further comprises a display element, said display element being capable of showing:
a list of existing process parameters structured by name comprising;
a parameter name field;
a parameter description field;
a parameter type field;
a parameter units field;
a parameter minimum value field;
a parameter maximum value field;
a parameter enforce minimum and maximum field;
a parameter measurement field;
a parameter special operands field;
wherein the list of process parameters has been defined as part of said parameters listing module; and
a save button displayed on said computer screen that is responsive to user input;
a data movement element capable of transferring the user-provided contents of said parameter definition input fields to a computer memory in response to a signal from said save button wherein said data movement element does not require user-supplied computer code to transfer said user input field content into said computer memory;

ag) said reports listing module comprises a display element, said display element capable of showing:
a list of existing reports structured by name and description;
at least one edit button wherein said edit button is responsive to user input and wherein the actuation of said edit button causes the actuation of the report definition module; and
an add new report button wherein said add new report button is responsive to user input and wherein the actuation of said add new report button causes the opening of the report definition module with empty fields;
at least one run button wherein said run button is responsive to user input and wherein the actuation of said run button causes the opening of said report rendering module; and ah) said report definition module form further comprises:
a plurality of report definition input fields responsive to user input comprising:
a log date from field;
a log date to field;
a description field;
a report type selection field; and
a report sub type selection field;
a save button displayed on said computer screen that is responsive to user input; and
a data movement element capable of transferring the user-provided contents of said report definition input fields to a computer memory in response to a signal from said save button wherein said data movement element does not require user-supplied computer code to transfer said user input field content into said computer memory;

ai) said report processes listing module further comprises a display element, said display element being capable of showing:
an ordered list of names of existing processes generated using said process definition module;
a check box for each process to accept or remove its usage in the report;

aj) said report process streams listing module further comprises a display element, said display element being capable of showing:
an ordered list of names of existing process streams generated using said process streams definition module;
a check box for each process stream to accept or remove its usage in the report;

ak) said report sampling points listing module further comprises a display element, said display element being capable of showing:
an ordered list of names of existing sampling points generated using said sampling points definition module;

a check box for each sampling point to accept or remove its usage in the report;

al) said report parameters listing module further comprises a display element, said display element being capable of showing:

an ordered list of names of existing parameters generated using said parameter definition module;

a check box for each parameter to accept or remove its usage in the report;

am) said report chemicals listing module further comprises a display element, said display element being capable of showing:

an ordered list of names of existing chemicals generated using said chemical definition module;

a check box for each chemical to accept or remove its usage in the report;

an) said report rendering module form further comprises:

a plurality of report rendering input fields responsive to user input comprising a report rendering type field;

a submit button displayed on said computer screen responsive to user input;

a data movement element capable of transferring the user-provided contents of said report rendering input fields to a computer memory in response to a signal from said submit button wherein said data movement element does not require user-supplied computer code to transfer said user input field content into said computer memory; and a report rendering display element that displays the report data upon receiving an actuation signal from the submit button;

ao) said charts listing module display element further comprises:

a list of existing charts ordered by name and description;

at least one edit button wherein said edit button is responsive to user input and wherein the actuation of said edit button causes the actuation of the chart definition module; and an add new chart button wherein said add new chart button is responsive to user input and wherein the actuation of said add new chart button causes the opening of the chart definition module with empty fields;

at least one run button wherein said run button is responsive to user input and wherein the actuation of said run button causes the opening of a chart rendering module; and ap) said chart definition module form further comprises:

a plurality of chart definition input fields responsive to user input comprising:

a log date from field;

a log date to field;

a description field;

a chart type selection field; and a chart sub type selection field;

a save button displayed on said computer screen that is responsive to user input;

a data movement element capable of transferring the user-provided contents of said chart definition input fields to a computer memory in response to a signal from said save button wherein said data movement element does not require user-supplied computer code to transfer said user input field content into said computer memory;

aq) said chart processes listing module further comprises a display element, said display element being capable of showing:

an ordered list of names of existing processes generated using said process definition module;

a check box for each process to accept or remove its usage in the chart;

ar) said chart process streams listing module further comprises a display element, said display element being capable of showing:

an ordered list of names of existing process streams generated using said process streams definition module; and a check box for each process stream to accept or remove its usage in the chart;

as) said chart sampling points listing module further comprises a display element, said display element being capable of showing:

an ordered list of names of existing sampling points generated using said sampling points definition module;

a check box for each sampling point to accept or remove its usage in the chart;

at) said chart parameters listing module further comprises a display element, said display element being capable of showing:

an ordered list of names of existing parameters generated using said parameter definition module;

a check box for each parameter to accept or remove its usage in the chart;

au) said chart chemicals listing module further comprises a display element, said display element being capable of showing:

an ordered list of names of existing chemicals generated using said chemical definition module;

a check box for each chemical to accept or remove its usage in the chart;

av) said chart rendering module form further comprises:

a plurality of chart rendering input fields responsive to user input comprising a chart rendering type field; and a submit button displayed on said computer screen responsive to user input;

a data movement element capable of transferring the user-provided contents of said chart rendering input fields to a computer memory in response to a signal from said submit button wherein said data movement element does not require user-supplied computer code to transfer said user input field content into said computer memory;

a chart rendering display element that displays the chart upon receiving an actuation signal from the submit button;

aw) said users listing module comprises a display element, said display element is capable of showing:

said list of existing users;

at least one edit button wherein said edit button is responsive to user input and wherein the actuation of said edit button causes the actuation of the user definition module; and an add new user button wherein said add new user button is responsive to user input and wherein the actuation of said add new user button causes the opening of the definition module with empty fields; and ax) said user definition module form further comprises:

a plurality of user definition input fields responsive to user input comprising:

a user login name field;

a user password field;

a user contact field;

a user address field;

a user phone field;

a user fax field; and a user email field;

a save button displayed on said computer screen that is responsive to user input;

a data movement element capable of transferring the user-provided contents of said user definition input fields to a computer memory in response to a signal from said save button wherein said data movement element does not require user-supplied computer code to transfer said user input field content into said computer memory;

ay) said user functions listing module further comprises a display element, said display element being capable of showing:

an ordered grid of users and modules with checkboxes to accept or allow a specific user to access a particular module;

a save button displayed on said computer screen that is responsive to user input;

a data movement element capable of transferring the updated contents of the display to a computer memory in response to a signal from said save button wherein said data movement element does not require user-supplied computer code to transfer said user input field content into said computer memory.

13. A form based method for defining, recording, and reporting processing plant information, the method comprising the steps of:

connecting a client computer to a server computer;

entering processing plant definition information into forms displayed on said client computer wherein said plant definition information comprises:

at least one parameter for a processing plant;

at least one process for said processing plant wherein said process comprises at least one process definition and said process definition comprises at least one process parameter;

at least one sampling point for said processing plant wherein said sampling point comprises at least one sampling point definition and said sampling point definition comprises at least one sampling point parameter;

at least one sampling point log for said processing plant; and at least one report for said processing plant;

saving said processing plant definition information to said server computer;

entering a log datum for said plant into a form on said client computer;

saving said log datum to said server computer;

actuating a button on said client computer, the actuation of which sends a report to said client computer wherein said report comprises said log datum.

14. Said form based method of claim 13 further comprising the step of entering user access rights information into a form displayed on said client computer.

15. Said form based method of claim 14 wherein:

entering processing plant definition information further comprises information for at least one process stream for said processing plant and said process stream information comprises a process stream definition, a list of process stream chemicals, and at least one process streams chemical definition; and said report comprises at least one process stream.

16. Said form based method of claim 15 further comprising the steps of:

defining charts;

defining chart processes;

defining chart sampling points defining chart parameters;

defining chart chemicals; and rendering a chart to be displayed on said client computer.

17. Said form based method of claim 13 wherein:

entering processing plant definition information further comprises information for at least one chemical for said processing plant and said chemical information comprises a chemical definition;

entering at least one process further comprises entering at least one chemical for said process; and said report comprises at least one chemical.

18. Said form based method of claim 17 further comprising the step of entering organization information wherein said organization information comprises the step of identifying which processing plant belongs to which organization and the step of entering user access rights information further comprises the step of identifying which plants a user can access.

19. Said form based method of claim 13 wherein said client computer and said server computer communicate using an internet protocol.

20. A form based client-server system for defining, recording, and reporting processing plant information, the system comprising:

a computer-readable memory wherein said memory is located in one from the group of a server computer, a client computer, and a combination of said client computer and said server computer;

a computer program stored on the computer-readable memory and adapted to be executed on a processor wherein the computer program displays the following on a client computer:

a plant definition input form for a processing plant;

a list of processes for the processing plant;

a list of sampling points for the processing plant;

a list of sampling point logs for the processing plant;

a list of reports for the processing plant;

a list of parameters for the processing plant;

a list of parameter definitions for the processing plant;

a list of process definitions for the processing plant;

a list of process parameters for the processing plant;

a list of sampling points for the processing plant;

a list of sampling parameters for the processing plant;

a sampling point log parameters input form capable of receiving:

a sampling point log parameter name;

a sampling point log parameter description; and a sampling point log parameter measurement;

a report containing data recorded on a plurality of sampling log parameters input forms.

* * * * *